US010568314B2

(12) United States Patent
Sandford et al.

(10) Patent No.: US 10,568,314 B2
(45) Date of Patent: Feb. 25, 2020

(54) INSECT TRAP DEVICE AND METHOD OF USING

(71) Applicant: The Procter & Gamble Company, Cincinnati, OH (US)

(72) Inventors: Andrew F Sandford, Marlborough, MA (US); Daniel B Lazarchik, Boston, MA (US); Lars R Lieberwirth, Shanghai (CN); Hans-Peter Schafer, Wayland, MA (US)

(73) Assignee: The Procter & Gamble Company, Cincinnati, OH (US)

( * ) Notice: Subject to any disclaimer, the term of this patent is extended or adjusted under 35 U.S.C. 154(b) by 396 days.

(21) Appl. No.: 15/163,748

(22) Filed: May 25, 2016

(65) Prior Publication Data

US 2016/0262367 A1 Sep. 15, 2016

Related U.S. Application Data

(63) Continuation of application No. PCT/US2014/067196, filed on Nov. 24, 2014.

(Continued)

(51) Int. Cl.

*A01M 1/14* (2006.01)
*A01M 1/02* (2006.01)

(52) U.S. Cl.

CPC ............ *A01M 1/145* (2013.01); *A01M 1/023* (2013.01)

(58) Field of Classification Search

CPC ................................. A01M 1/00; A01M 1/02; A01M 1/04; A01M 1/10–145; F21S 8/035

(Continued)

(56) References Cited

U.S. PATENT DOCUMENTS

| | | | |
|---|---|---|---|
| 2,307,163 A | 1/1943 | Shea | |
| 3,023,539 A | 3/1962 | Emerson, Jr. | |

(Continued)

FOREIGN PATENT DOCUMENTS

| | | | |
|---|---|---|---|
| AT | 169968 B * | 12/1951 | ............ A01M 1/145 |
| AT | 513518 B1 | 5/2014 | |

(Continued)

OTHER PUBLICATIONS

Supplementary European Search Report dated Jul. 26, 2017, Appl. No. PCT/US2014/067196, 11 pgs.

(Continued)

*Primary Examiner* — Magdalena Topolski
*Assistant Examiner* — Morgan T Barlow
(74) *Attorney, Agent, or Firm* — Melissa G. Krasovec

(57) ABSTRACT

The insect trap includes a trap portion and a base portion. The trap portion includes an enclosure with an adhesive surface and a first opening, where the adhesive surface is at least partially contained within the enclosure and is configured to adhere to an insect. The base portion includes a lighting element and a mounting portion, where the lighting element is configured to provide light to the trap portion and where the mounting portion is configured to communicate with and receive power from a power source. The trap portion is configured to removably engage the base portion and receive light from the base portion when engaged therewith. The base portion includes a snap protrusion and the trap portion includes a snap recess for receiving the snap protrusion, such that when the snap protrusion is received by the trap portion, the base portion and trap portion are engaged in a snap fit.

15 Claims, 60 Drawing Sheets

Related U.S. Application Data

(60) Provisional application No. 61/916,257, filed on Dec. 15, 2013, provisional application No. 61/910,023, filed on Nov. 27, 2013.

(58) Field of Classification Search
USPC .............................. 43/58, 107, 113, 114, 115
See application file for complete search history.

(56) References Cited

U.S. PATENT DOCUMENTS 3,348,332 A 10/1967 Oconnell
3,729,857 A * 5/1973 Giordano ................ A01M 1/04 43/112
3,729,858 A 5/1973 Bradshaw
3,768,196 A * 10/1973 Iannini .................... A01M 1/04 43/112
3,796,001 A * 3/1974 Jackson .................. A01M 1/08 43/113
3,823,506 A * 7/1974 Iannini .................... A01M 1/04 43/112
3,835,577 A * 9/1974 Soulos .................... A01M 1/04 43/112
3,894,351 A * 7/1975 Iannini .................... A01M 1/04 43/112
3,986,292 A * 10/1976 Klebanoff ............... A01M 1/04 43/112
4,086,720 A * 5/1978 Wiser ...................... A01M 1/04 362/802
4,117,624 A * 10/1978 Phillips ................. A01M 1/145 43/113
4,141,173 A * 2/1979 Weimert ................. A01M 1/08 43/113
4,212,129 A 7/1980 Shumate
D282,390 S 1/1986 Ford et al.
4,654,998 A 4/1987 Clay
4,686,789 A * 8/1987 Williams .............. A01M 1/145 43/113
4,700,506 A * 10/1987 Williams .............. A01M 1/145 43/113
4,709,502 A 12/1987 Bierman
4,709,503 A 12/1987 McQueen
4,815,231 A 3/1989 McQueen
4,899,485 A 2/1990 Schneidmiller
4,953,320 A 9/1990 Nelson
5,044,112 A * 9/1991 Williams .............. A01M 1/145 43/113
D323,014 S 1/1992 Demarest et al.
5,099,598 A 3/1992 Carter
D326,702 S 6/1992 Demarest
5,142,815 A 9/1992 Birdsong
RE34,402 E * 10/1993 Williams .............. A01M 1/145 43/113
5,311,697 A 5/1994 Cavanaugh et al.
5,365,690 A 11/1994 Nelson et al.
D357,725 S 4/1995 Biasetti
5,425,197 A 6/1995 Smith
5,477,636 A 12/1995 Musket
5,505,017 A 4/1996 Nelson et al.
5,513,465 A 5/1996 Demarest et al.
5,556,192 A 9/1996 Wang
5,572,825 A 11/1996 Gehret
5,588,250 A 12/1996 Chiba et al.
5,595,018 A 1/1997 Wilbanks
5,608,987 A 3/1997 Meyer
5,651,211 A 7/1997 Regan et al.
5,657,576 A 8/1997 Nicosia
5,713,153 A * 2/1998 Cook ...................... A01M 1/02 43/114
5,722,199 A * 3/1998 Demarest .............. A01M 1/145 43/113
5,759,561 A 6/1998 Angst et al.
5,799,436 A 9/1998 Nolen et al.
5,915,948 A 6/1999 Kunze et al.
5,950,355 A 9/1999 Gilbert
5,974,727 A 11/1999 Gilbert
D418,575 S 1/2000 Ohmura
6,055,766 A 5/2000 Nolen et al.
6,108,965 A 8/2000 Burrows et al.
6,361,752 B1 3/2002 Demarest et al.
6,375,943 B1 4/2002 Raw et al.
6,392,549 B1 5/2002 Wu
6,393,759 B1 5/2002 Brown et al.
6,397,515 B1 6/2002 Brown et al.
6,478,440 B1 * 11/2002 Jaworski ................ A01M 1/04 362/253
D467,295 S 12/2002 Andrews et al.
6,560,919 B2 5/2003 Burrows et al.
6,594,946 B2 7/2003 Nolen et al.
6,655,078 B2 12/2003 Winner et al.
6,718,687 B2 4/2004 Robison et al.
6,860,061 B2 3/2005 Nosse et al.
6,871,443 B2 3/2005 Lambert et al.
6,886,292 B2 5/2005 Studer et al.
6,910,298 B2 6/2005 Schneidmiller
6,959,510 B1 11/2005 Nelson et al.
D521,102 S 5/2006 Hoyes
7,036,268 B2 5/2006 Taylor et al.
7,096,621 B2 8/2006 Nelson et al.
D533,930 S 12/2006 Keller, Jr. et al.
7,143,542 B2 12/2006 Taylor et al.
7,191,560 B2 3/2007 Harris
7,383,660 B2 6/2008 Greening
7,401,436 B2 7/2008 Chyun
7,412,797 B1 * 8/2008 Hiscox .................... A01M 1/02 43/107
7,503,675 B2 3/2009 Demaret et al.
7,591,099 B2 9/2009 Lang et al.
7,607,255 B2 10/2009 Hu
7,614,180 B2 11/2009 Dirand et al.
D612,039 S 3/2010 Ko et al.
D612,446 S 3/2010 Galili
D614,278 S 4/2010 Schwartz et al.
7,788,845 B2 9/2010 Nelson et al.
7,832,140 B2 11/2010 Wilbanks
D629,500 S 12/2010 Koenig et al.
7,856,752 B1 12/2010 Eilerson
7,937,887 B2 5/2011 Child
8,016,207 B2 9/2011 Kvietok et al.
8,099,900 B2 1/2012 Rivera
8,104,223 B1 1/2012 Rodriguez
8,109,036 B1 2/2012 Wilbanks
8,135,265 B2 * 3/2012 Tollens ................. A01M 1/205 392/395
8,210,448 B2 7/2012 Kvietok et al.
8,211,419 B2 7/2012 Siljander et al.
D669,151 S 10/2012 Frisch
8,281,514 B2 10/2012 Fleming
8,291,638 B2 10/2012 Larsen
8,316,578 B2 11/2012 Faham et al.
8,375,625 B2 2/2013 Larsen
8,387,306 B2 3/2013 Cink
8,402,691 B2 3/2013 Coventry
8,572,890 B1 11/2013 Lark et al.
8,707,614 B2 4/2014 Larsen
8,709,337 B2 * 4/2014 Gruenbacher ............ A61L 9/04 239/34
8,740,110 B2 6/2014 Gruenbacher et al.
8,793,928 B2 8/2014 Larsen
8,845,118 B2 * 9/2014 Formico ............... F21V 33/006 362/253
8,852,501 B2 10/2014 Hedman
9,089,121 B2 7/2015 Diclaro et al.
D736,341 S 8/2015 Lieberwirth et al.
9,327,046 B2 * 5/2016 Turner .................... A61L 9/122
D780,284 S 2/2017 Lieberwirth et al.
D780,285 S 2/2017 Lieberwirth et al.
2001/0042337 A1 11/2001 Lambert et al.
2002/0032980 A1 3/2002 Nelson et al.
2002/0139040 A1 10/2002 Burrows et al.
2003/0000126 A1 * 1/2003 Lenz ..................... A01M 1/023 43/112
2003/0041506 A1 3/2003 Coventry

(56) References Cited

U.S. PATENT DOCUMENTS

| | | | | | |
|---|---|---|---|---|---|
| 2003/0051391 | A1 | 3/2003 | Jablin | | |
| 2003/0217503 | A1 | 11/2003 | Robison | | |
| 2004/0025412 | A1 | 2/2004 | Simchoni et al. | | |
| 2004/0139648 | A1 | 7/2004 | Durand et al. | | |
| 2004/0200129 | A1 | 10/2004 | Studer et al. | | |
| 2004/0218380 | A1 | 11/2004 | Taylor et al. | | |
| 2004/0237381 | A1 | 12/2004 | Durand et al. | | |
| 2004/0237382 | A1 | 12/2004 | Durand et al. | | |
| 2005/0019361 | A1* | 1/2005 | Durand | A01M 1/02 | 424/405 |
| 2005/0066570 | A1 | 3/2005 | Mosher et al. | | |
| 2005/0210735 | A1 | 9/2005 | Harmer et al. | | |
| 2006/0080888 | A1 | 4/2006 | Greening | | |
| 2006/0150472 | A1 | 7/2006 | Harris | | |
| 2006/0218851 | A1 | 10/2006 | Weiss et al. | | |
| 2006/0283075 | A1 | 12/2006 | Feldhege et al. | | |
| 2007/0011940 | A1 | 1/2007 | Chen et al. | | |
| 2007/0056208 | A1 | 3/2007 | Chen et al. | | |
| 2008/0001551 | A1 | 1/2008 | Abbondanzio et al. | | |
| 2008/0141578 | A1 | 6/2008 | Chen et al. | | |
| 2008/0196296 | A1 | 8/2008 | Studer et al. | | |
| 2008/0229652 | A1 | 9/2008 | Willcox et al. | | |
| 2008/0236028 | A1 | 10/2008 | McBride et al. | | |
| 2009/0100743 | A1 | 4/2009 | Prater | | |
| 2009/0145019 | A1 | 6/2009 | Nolen et al. | | |
| 2009/0223115 | A1 | 9/2009 | Lang et al. | | |
| 2010/0024278 | A1 | 2/2010 | Simchoni-Barak et al. | | |
| 2010/0071254 | A1 | 3/2010 | Calkins et al. | | |
| 2010/0229459 | A1 | 9/2010 | Simchoni-Barak et al. | | |
| 2010/0263260 | A1 | 10/2010 | Engelbrecht et al. | | |
| 2010/0287816 | A1 | 11/2010 | Abelbeck | | |
| 2011/0030267 | A1 | 2/2011 | Nolen et al. | | |
| 2011/0041384 | A1* | 2/2011 | Willcox | A01M 1/04 | 43/113 |
| 2011/0041385 | A1 | 2/2011 | Faham et al. | | |
| 2011/0138678 | A1 | 6/2011 | Smith | | |
| 2012/0124890 | A1 | 5/2012 | Hainze | | |
| 2012/0167450 | A1 | 7/2012 | Frisch | | |
| 2012/0186136 | A1* | 7/2012 | Schneidmiller | A01M 29/34 | 43/107 |
| 2012/0186137 | A1* | 7/2012 | Schneidmiller | A01M 1/04 | 43/121 |
| 2012/0204475 | A1* | 8/2012 | Schneidmiller | A01M 1/04 | 43/113 |
| 2012/0294828 | A1* | 11/2012 | Zhang | A01M 1/106 | 424/84 |
| 2013/0097918 | A1* | 4/2013 | Coventry | A01M 1/106 | 43/107 |
| 2013/0145680 | A1 | 6/2013 | Soltis et al. | | |
| 2013/0180161 | A1 | 7/2013 | Vasudeva et al. | | |
| 2013/0212926 | A1* | 8/2013 | McGavin | A01M 1/106 | 43/107 |
| 2013/0312314 | A1 | 8/2013 | Greening et al. | | |
| 2013/0318854 | A1* | 12/2013 | Zhang | A01M 1/145 | 43/2 |
| 2014/0075824 | A1* | 3/2014 | Roulston | A01M 1/023 | 43/107 |
| 2016/0000060 | A1 | 1/2016 | Sandford et al. | | |
| 2016/0262367 | A1 | 9/2016 | Sandford et al. | | |
| 2017/0035039 | A1 | 2/2017 | Sandford et al. | | |

FOREIGN PATENT DOCUMENTS

| | | | | | |
|---|---|---|---|---|---|
| AU | 2009208773 | B2 | | 9/2014 | |
| CA | 2447854 | A1 | | 11/2001 | |
| CH | 255022 | A | * | 6/1948 | A01M 1/04 |
| CN | 2790173 | | | 6/2006 | |
| CN | 201067044 | | | 6/2008 | |
| CN | 201093261 | Y | | 7/2008 | |
| CN | 201107985 | | | 9/2008 | |
| CN | 201107993 | | | 9/2008 | |
| CN | 2011/63944 | | | 12/2008 | |
| CN | 101743943 | A | | 6/2010 | |
| CN | 201577439 | U | | 9/2010 | |
| CN | 202285958 | U | | 7/2012 | |
| CN | 202551965 | U | | 11/2012 | |
| CN | 103168765 | | | 6/2013 | |
| CN | 203072705 | U | | 7/2013 | |
| CN | 203952202 | | | 11/2014 | |
| DE | 702467 | C | * | 2/1941 | A01M 1/04 |
| DE | 3225412 | | | 1/1984 | |
| EP | 0947134 | A2 | | 10/1999 | |
| EP | 0976323 | A2 | | 2/2000 | |
| EP | 1161865 | A2 | | 12/2001 | |
| EP | 1213958 | B1 | | 11/2003 | |
| EP | 1827092 | | | 12/2010 | |
| EP | 2807921 | A1 | | 12/2014 | |
| FR | 385129 | A | * | 5/1908 | A01M 1/145 |
| FR | 422209 | A | * | 3/1911 | A01M 1/04 |
| FR | 25121 | E | * | 12/1922 | A01M 1/04 |
| FR | 40788 | E | * | 8/1932 | A01M 1/02 |
| FR | 751672 | A | * | 9/1933 | A01M 1/04 |
| FR | 840852 | A | * | 5/1939 | A01M 1/02 |
| FR | 853213 | A | * | 3/1940 | A01M 1/00 |
| FR | 974742 | A | * | 2/1951 | A01M 1/04 |
| FR | 1098139 | A | * | 7/1955 | A01M 1/04 |
| FR | 1396573 | A | * | 4/1965 | A01M 1/04 |
| FR | 2900793 | | | 3/2011 | |
| GB | 191201297 | A | | 8/1912 | |
| GB | 380380 | A | * | 9/1932 | A01M 1/02 |
| GB | 398636 | A | * | 9/1933 | A01M 1/02 |
| GB | 12373705 | | | 10/2002 | |
| GB | 2381181 | | | 4/2003 | |
| GB | 2457103 | A | | 8/2015 | |
| IN | 2011CH01965 | A | | 11/1965 | |
| JP | 55-170987 | | | 5/1979 | |
| JP | U1995007457 | | | 2/1995 | |
| JP | H10229801 | | | 9/1998 | |
| JP | 11146751 | A | | 6/1999 | |
| JP | 11-289951 | | | 10/1999 | |
| JP | 2000/253793 | | | 9/2000 | |
| JP | 2000/287600 | | | 10/2000 | |
| JP | 2000270749 | A | | 10/2000 | |
| JP | 2000333582 | A | | 12/2000 | |
| JP | 2002084958 | A | | 3/2002 | |
| JP | 2002125560 | A | | 5/2002 | |
| JP | 2002253101 | A | | 9/2002 | |
| JP | 2003009744 | | | 1/2003 | |
| JP | 2004159626 | | | 6/2004 | |
| JP | 2005046100 | A | | 2/2005 | |
| JP | 2005065630 | | | 3/2005 | |
| JP | 2005095149 | | | 4/2005 | |
| JP | 2005/245312 | | | 9/2005 | |
| JP | 03746430 | B2 | | 2/2006 | |
| JP | 2007074908 | | | 3/2007 | |
| JP | 2008154500 | | | 7/2008 | |
| JP | 04166358 | B2 | | 10/2008 | |
| JP | 4549722 | | | 9/2010 | |
| JP | 2012/045004 | | | 3/2012 | |
| JP | 05149183 | B2 | | 2/2013 | |
| JP | 2014195466 | | | 10/2014 | |
| KR | 2008100721 | A | | 11/2008 | |
| KR | 2010/0033336 | | | 3/2010 | |
| KR | 1020110050769 | | | 12/2012 | |
| RU | 2360413 | C2 | | 7/2009 | |
| WO | WO1990/12501 | | | 11/1990 | |
| WO | WO 1992017060 | A1 | | 10/1992 | |
| WO | WO1999/34671 | | | 7/1999 | |
| WO | WO 2000/003588 | A1 | | 1/2000 | |
| WO | WO2001/22813 | | | 4/2001 | |
| WO | WO2001/68154 | | | 9/2001 | |
| WO | WO 2002012127 | | | 2/2002 | |
| WO | WO 2001/089295 | B1 | | 9/2002 | |
| WO | WO 2003/032722 | A1 | | 4/2003 | |
| WO | WO 2004/068944 | A2 | | 8/2004 | |
| WO | WO2004/071935 | | | 8/2004 | |
| WO | WO2005/053389 | | | 6/2005 | |
| WO | WO 2008/096352 | A3 | | 8/2008 | |
| WO | WO 2009/075839 | A1 | | 6/2009 | |
| WO | WO 2011/094219 | A1 | | 8/2011 | |
| WO | WO 2014/134371 | A1 | | 9/2014 | |

(56) References Cited

FOREIGN PATENT DOCUMENTS

| | | |
|---|---|---|
| WO | WO 2015/081033 | 6/2015 |
| WO | WO 2015/164849 | 10/2015 |

OTHER PUBLICATIONS

International Search Report and Written Opinion dated Feb. 6, 2015, Appl. No. PCT/US2014/067196, 14 pgs.
International Search Report and Written Opinion dated Feb. 6, 2015, Appl. No. PCT/US2014/019175, 22 pgs.
International Search Report and Written Opinion dated Feb. 6, 2015, Appl. No. PCT/US2015/027684, 15 pgs.
International Search Report and Written Opinion dated Feb. 6, 2015, Appl. No. PCT/US2016/013007, 19 pgs.
On-line article in the Atlanta Journal Constitution, Jul. 9, 1993 by Leigh Ann Miller describing a new product, the Enforcer® Over Nite Flea and Insect Trap, 1 page.

* cited by examiner

INSECT TRAP DEVICE AND METHOD OF USING

TECHNICAL FIELD

The present disclosure is related generally to an insect trap, more particularly, to a removable insect trap having a minimal footprint and an aesthetically pleasing design.

BACKGROUND

Flying insect pests have long been a nuisance and a health hazard. Since ancient times, insect traps have been used to eliminate flying insects, and hundreds of different traps have been proposed and developed over the centuries. There has always been a need to eliminate flies and mosquitos that inevitably find their way into homes. Recent US outbreaks of Eastern Equine Encephalitis, West Nile virus and harmful *E. Coli* infections, public health threats that can be spread by flying insects, have only increased this need. Because insects may see and be attracted to a combination of ultraviolet (UV) and visible light, an indoor insect trap may have its own UV and visible light sources. Insect traps commonly have a fluorescent tube that emits both UV and visible light to attract insects and a glue board to trap them. However, insect traps incorporating fluorescent tubes and the transformers that power them may be too large to fit wherever they're needed and too expensive to afford one for every room in the house. In addition, insects may contact the fluorescent tube and over time it may accumulate dust and insect debris, blocking the light and reducing the trap's effectiveness. Furthermore, the glue board may be difficult to remove and replace without touching trapped insects and adhesive.

SUMMARY

An insect trap is provided. The insect trap includes a trap portion and a base portion. The trap portion includes an enclosure with an adhesive surface and a first opening, wherein the adhesive surface is at least partially contained within the enclosure and is configured to adhere to an insect. The base portion includes a lighting element and a mounting portion, wherein the lighting element is configured to provide light to the trap portion and wherein the mounting portion is configured to communicate with and receive power from a power source. The trap portion is configured to removably engage the base portion and receive light from the base portion when engaged therewith. The base portion includes a snap protrusion and the trap portion includes a snap recess for receiving the snap protrusion, wherein when the snap protrusion is received by the trap portion, the base portion and trap portion are engaged in a snap fit.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Figure 1:
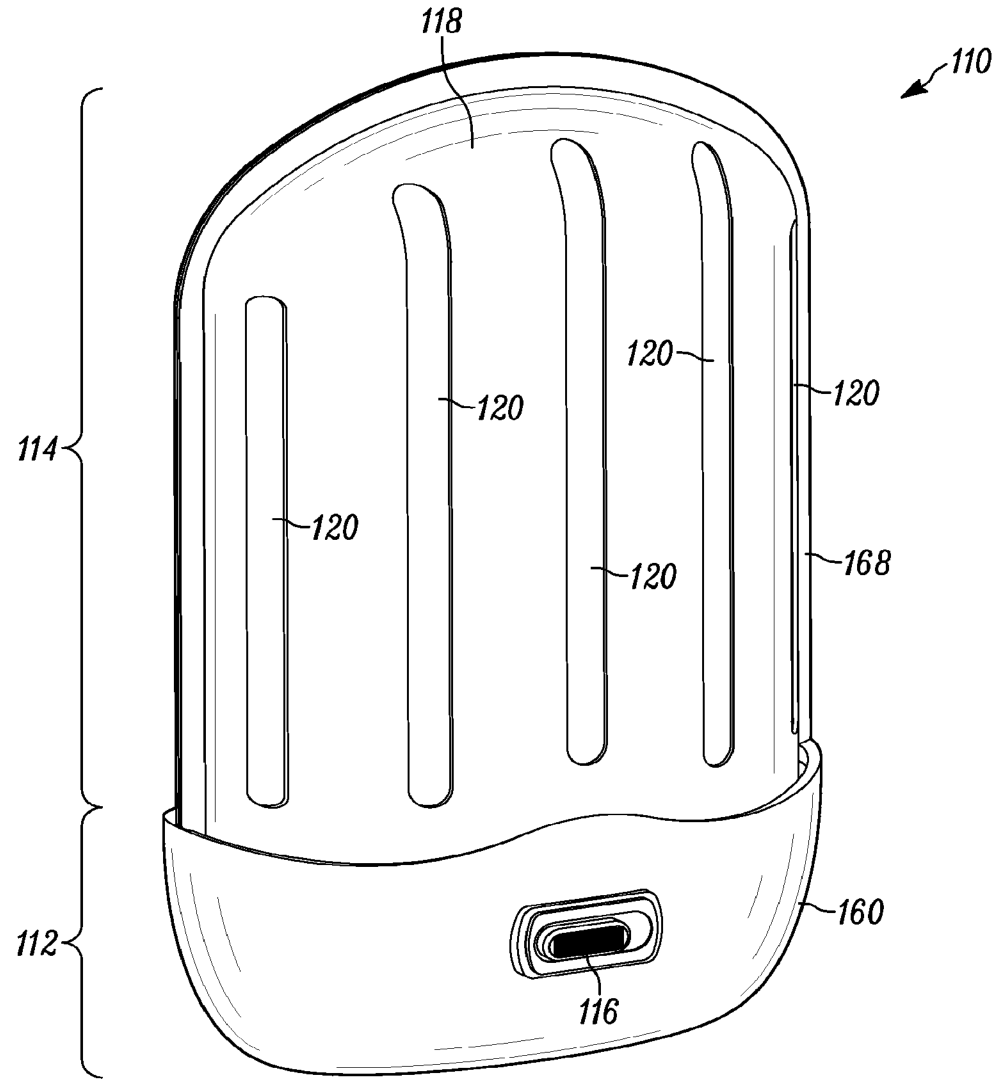
FIG. 1 is a front perspective view of a first embodiment of an insect trap in accordance with principles of the disclosure.

With reference to the drawings, FIG. 1 is a front perspective view of an embodiment of an insect trap, indicated generally at 110. Insect trap 110 includes a base portion 112 and a removable trap portion 114. A front surface 160 of base portion 112 may include a switch 116, configurable to enable insect trap 110 to be turned on or off by closing or opening switch 116 as desired by the user. Alternatively, switch 116 may be configured to control other features such as light intensity, combinations of light wavelengths, different modes or frequencies of flickering light, an automatic setting that turns on when the room gets dark, or a remote control setting, for example. Switch 116 may be manually operated, although switch 116 may also be operated electrically, optically, electro-mechanically, electro-optically, or by any other method or combination of methods for opening or closing switch 116. Trap portion 114 includes a front housing 118 with at least one opening 120 in a front surface 168. Opening 120 in front housing 118 may be configured to admit a wide variety of insects into insect trap 110, or alternatively it may be configured to admit one or more specific insect species. In some embodiments, opening 120 is configured to prevent the user's fingers from penetrating opening 120 and inadvertently touching trapped insects or adhesive when removing and replacing trap portion 114. In some embodiments, opening 120 has a size and shape such that a sphere 25 mm in diameter cannot pass through opening 120, and has a size and shape such that a sphere 1 mm in diameter can pass through any portion of opening 120. Opening 120 may be of uniform or of varying width, shape and orientation, and if trap portion 114 has more than one opening 120, they may be of identical or of differing widths, shapes and orientations. Opening 120 may be configured to attract one or more individual insect species or a variety of insect species.

Figure 2:
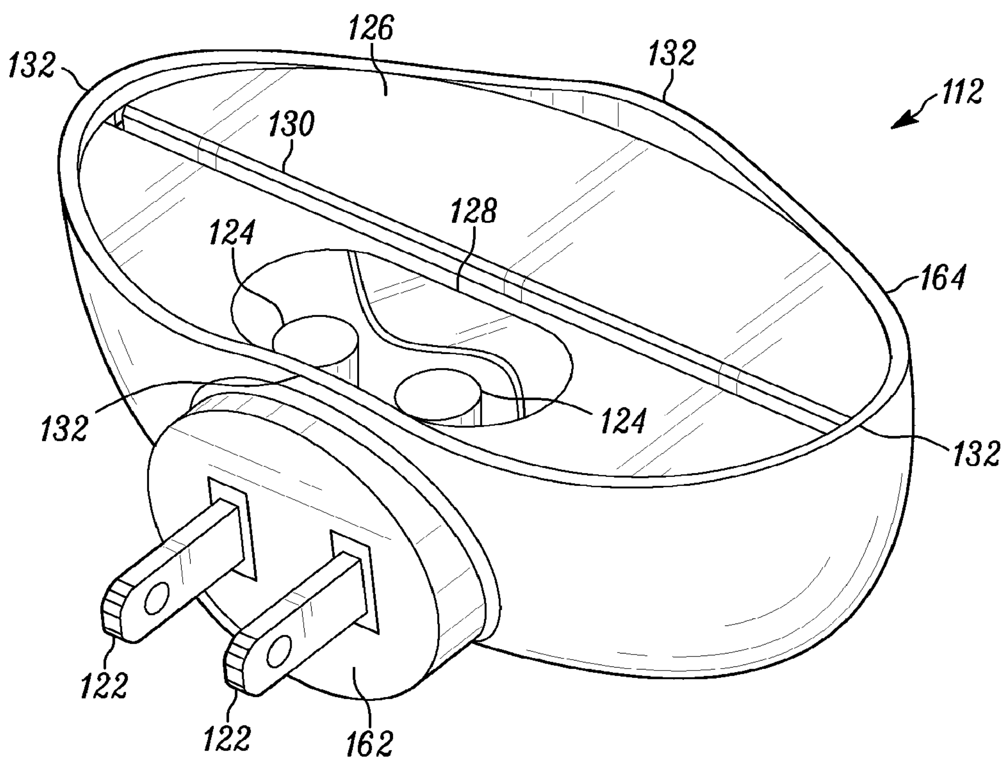
FIG. 2 is a rear perspective view of a base portion of the insect trap of FIG. 1.

FIG. 2 is a rear perspective view of base portion 112 of insect trap 110 with trap portion 114 removed. Protruding from a rear surface 162 of base portion 112 are a plurality of electrically conductive prongs 122, adapted to mount insect trap 110 to a wall and provide power to insect trap 110 by inserting conductive prongs 122 into a standard household electrical wall socket. Alternatively, base portion 112 may be configured to sit or hang wherever desired and receive power from batteries (not shown) mounted in base portion 112. While an electrical socket and batteries have been described as providing power to insect trap 110, any suitable power source may be used. Base portion 112 includes a lighting element such as one or more light emitting diodes (LEDs) 124. In some embodiments, LEDs 124 include at least one that emits ultraviolet (UV) light and at least one that emits visible light. In some embodiments, LEDs 124 include at least one that emits UV light and at least one that emits blue light, to better attract a wide variety of insect species. In some embodiments, the lighting element emits a combination of wavelengths to mimic sunlight. In some embodiments, LEDs 124 include at least one that emits infrared (IR) light, to better attract certain species of insects such as mosquitos. Mounted in a top surface 126 of base portion 112 may be a transparent or translucent window 128, shown partially cut away to reveal LEDs 124. Window 128 protects LEDs 124 from dust and insect debris, and allows base portion 112 to be easily cleaned. In top surface 126 may be a slot 130, and on the perimeter 164 of top surface 126 is a rim or upwardly directed protrusions 132.

Figure 3:
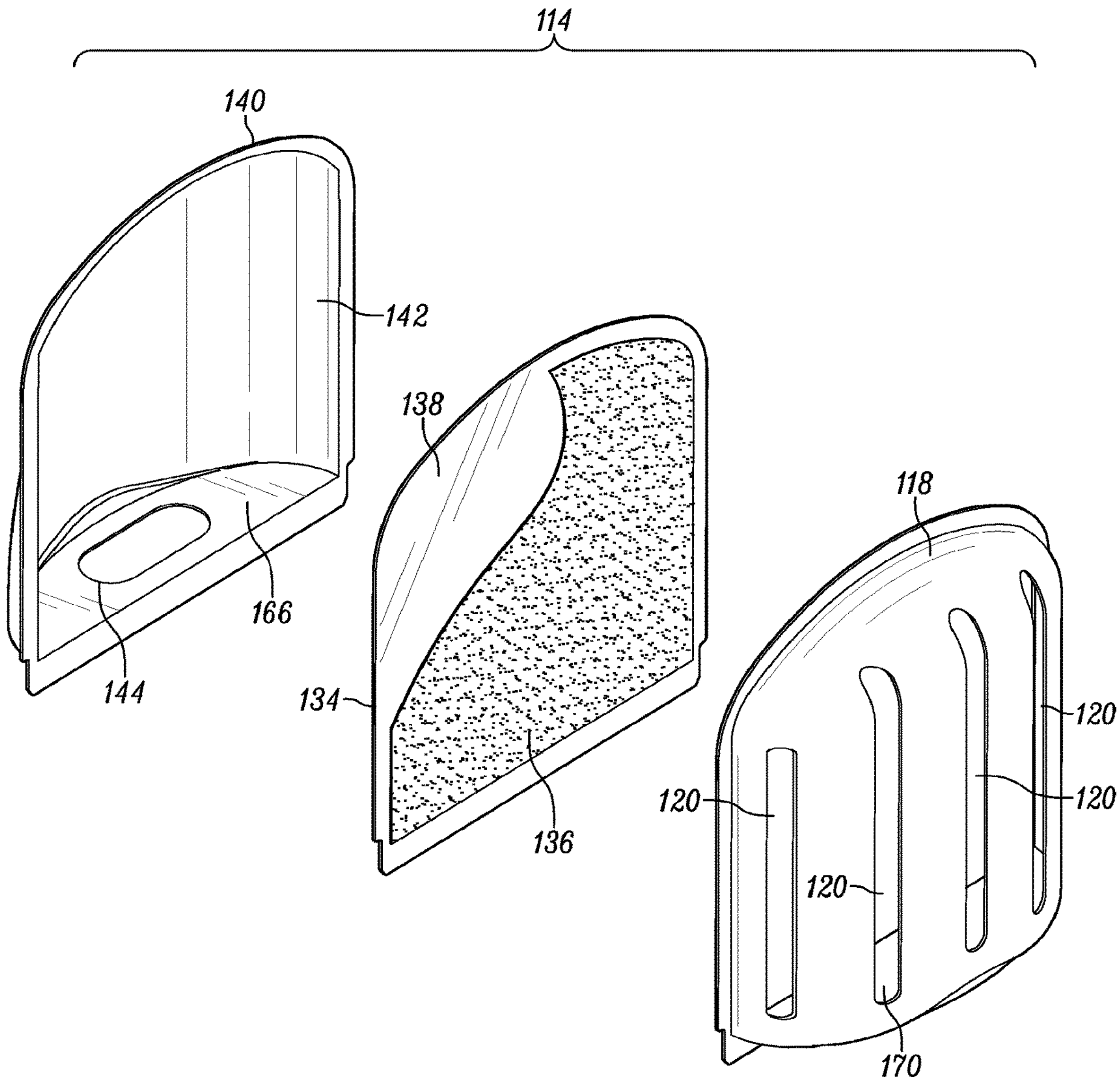
FIG. 3 is an exploded view of a trap portion of the insect trap of FIG. 1.

FIG. 3 is an exploded view of trap portion 114 of insect trap 110. Trap portion 114 includes a divider 134 which may have a front surface 138, and a rear housing 140. In some embodiments, divider 134 is constructed from or includes a transparent or translucent material and may be coated with a transparent or translucent adhesive 136 on front surface 138. Adhesive 136 is shown partly cut away in this view. In some embodiments, divider 134 is configured to polarize light transmitted through it in an orientation similar to that of daylight to further attract flying insects, a wide variety of which are known to detect polarized light. In some embodiments, the material and thickness of divider 134 and the material and thickness of adhesive 136 are selected to transmit a substantial proportion of the UV and/or visible and/or IR light, for example greater than 60% of the light is transmitted through divider 134 and adhesive 136. In some embodiments, rear housing 140 includes a reflective-coated inside surface 142. Alternatively, the material and surface finish of rear housing 140 may be configured to reflect and disperse UV and/or visible and/or IR light without a reflective coating. Rear housing 140 may include an opening 144 on its bottom surface 166, or alternatively opening 144 may be replaced by a transparent or translucent window (not shown).

In some embodiments, front housing 118 and rear housing 140 are thermoformed from opaque sheet plastic. Alternatively, other opaque, transparent or translucent materials such as paper, paperboard, cardboard or paper pulp may also be used. In some embodiments, front housing 118 and rear housing 140 are constructed by injection molding, casting or by other suitable manufacturing techniques. As shown, divider 134 is substantially planar, although it may be formed into a convex, concave or saddle-shaped contour, or a combination of contours to optimize the even distribution of light. Alternatively, divider 134 may have ribs or other features that increase adhesive surface area and create regions of light/dark contrast, which are highly visible to a wide variety of insects and may be more attractive to them.

In some embodiments, front housing 118 may be coated with transparent, translucent or opaque adhesive on an inside surface 170 to provide additional insect trapping efficiency and capacity. In addition, front housing 118 may also have a reflective coating (not shown) underneath the adhesive coating on inside surface 170 to enhance its attraction to insects and further improve the insect trapping efficiency and effectiveness.

In some embodiments, front housing 118, divider 134 and rear housing 140 are joined together at their perimeters with adhesive, although they may also be joined by other commonly used packaging assembly techniques such as ultrasonic welding or RF sealing, or any other suitable assembly method. The materials of trap portion 114 may also include one or more insect attractants. For example, trap portion 114 may be impregnated with sorbitol, coleopteran attractants including brevicomin, dominicalure, frontalin, grandlure, ipsdienol, ipsenol, japonilure, lineatin, megatomoic acid, multistriatin, oryctalure, sulcatol, and trunc-call, dipteran attractants including ceralure, cue-lure, latilure, medlure, moguchun, muscalure, and trimedlure, homopteran attractants including rescalure, lepidopteran attractants such as disparlure, straight chain lepidopteran pheromones including codlelure, gossyplure, hexalure, litlure, looplure, orfralure, and ostramone, and other insect attractants such as eugenol, methyl eugenol, and siglure, or other substances to provide a scent that further increases the insect-attracting efficiency of insect trap 110. In such embodiments, the insect attractant is integral to trap portion 114. Alternatively, the insect attractants may be embedded in a separate piece (not shown) that mounts on inside surface 170 of front housing 118 or through opening 120 in front housing 118 or on front surface 138 of divider 134. It is desirable for such attractants to be detectable by an insect for approximately a 2 meter radius from insect trap 110.

Figure 4:
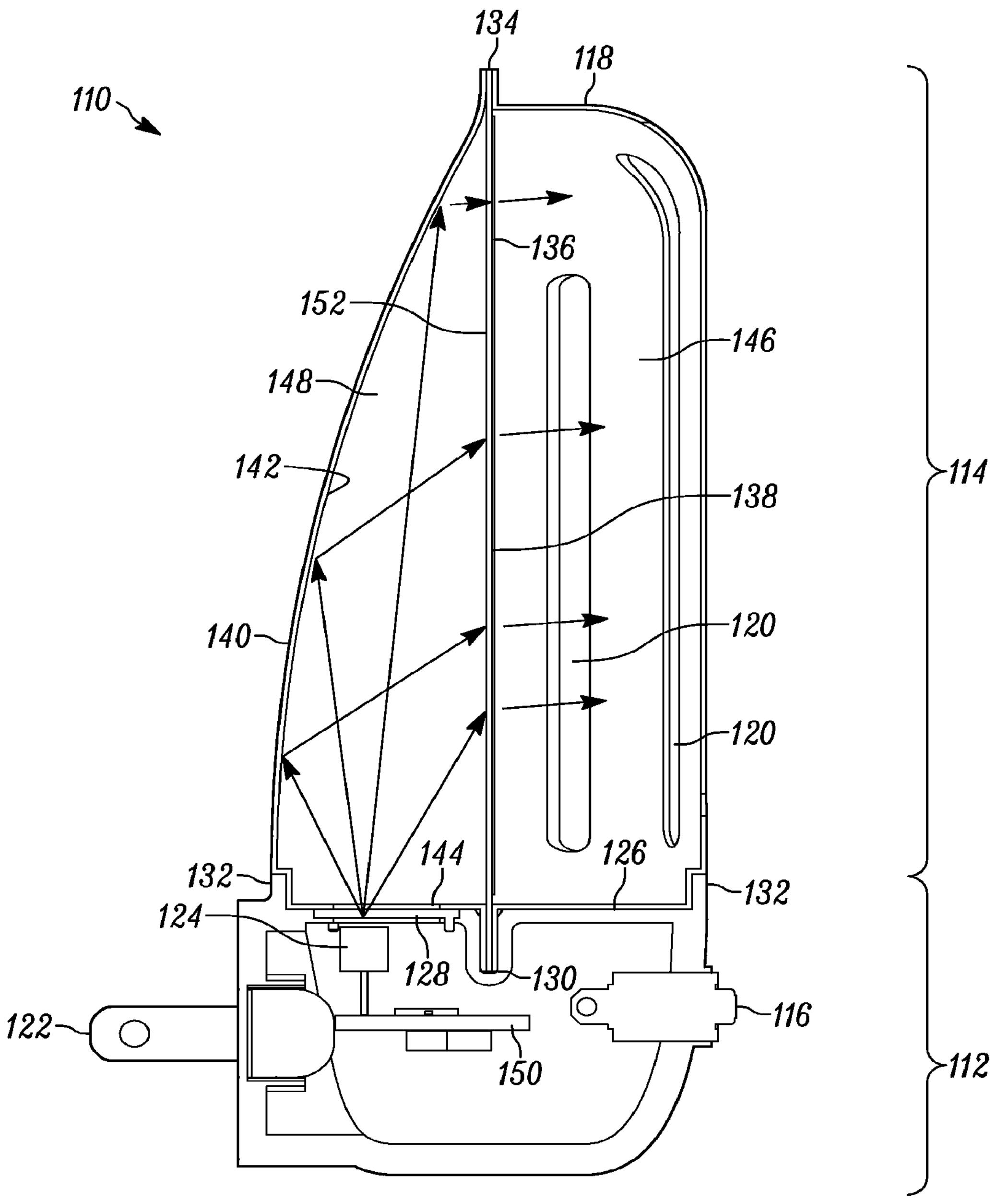
FIG. 4 is a cross-sectional view through the insect trap of FIG. 1.

FIG. 4 is a cross-sectional view through insect trap 110. As shown, divider 134 separates trap portion 114 into a front enclosure 146 and a rear enclosure 148. In some embodiments, base portion 112 includes a circuit board 150 having a programmable processor or chip (not shown) for executing commands, electrically connected to conductive prongs 122, only one of which is shown, switch 116 and LEDs 124, only one of which is shown. For clarity, however, not all of the electrical connections are shown. Circuit board 150 may include electronic circuitry to receive ordinary household current from conductive prongs 122, respond to the position of switch 116 and provide power to illuminate LEDs 124. Circuit board 150 may include an energy stabilizer such as a full wave rectifier circuit or any other circuit that provides steady voltage to LEDs 124 when switch 116 is in the closed position, although it may also provide a varying voltage to LEDs 124 to provide a flickering light that mimics movement that some insect species, including mosquitoes, may find attractive. For example, light flickering frequencies in the approximate range of 0.05 Hz (e.g., to mimic the breathing rate of large mammals) to 250 Hz (e.g., the highest flicker frequency to attract male houseflies), may be desirable and the lighting element may be configured to flicker within this range. Circuit board 150 may provide power to LEDs 124 to provide UV and/or visible and/or IR light, although it may be configured to provide power to only UV LEDs 124 or to only visible light LEDs 124 or to only IR light LEDS 124, or to provide variable power to produce combinations of flickering UV and/or visible and/or IR light. Circuit board 150 may also be configured to drive a transmitter or transceiver such as a piezoelectric speaker (not shown) or other device that may be mounted in the base portion 112 to emit an insect-attracting sound. In some embodiments, the transmitter or transceiver may emit recorded and/or generated insect sounds or vibrations to better attract insects such as mosquitoes, midges, moths and flies, and may include one or more of insect call, reply, courtship and copulatory songs. In some embodiments, the transmitter or transceiver may emit recorded and/or generated insect-attracting sounds or vibrations such as the heartbeat of a mammal. For example, the transmitter or transceiver may emit an insect-attracting sound or sounds having a frequency in the range of approximately 0.5 Hz (e.g., the heart rate of large mammals) to approximately 240 kHz (e.g., the highest frequency detectable by insects). In some embodiments, the frequency is in the range of approximately 5 Hz to 100 kHz. In some embodiments, the frequency is in the range of approximately 35 Hz to 50 Khz. It is desirable for such insect-attracting sound to be detectable by an insect within approximately a 2-meter distance from insect trap 110. It is desirable for such insect-attracting sound to be undetectable by a human beyond approximately a 1-meter distance from insect trap 110.

As shown, slot 130 in top surface 126 of base portion 112 and protrusions 132 on top surface 126 of base portion 112 engage with trap portion 114 to secure it in place during use, although any other form of attachment may be substituted that allows trap portion 114 to be securely but removably mounted to base portion 112.

In the operation of insect trap 110, conductive prongs 122 are inserted into a wall electrical socket, and switch 116 is moved to a closed position. LEDs 124 emit light, represented by arrows, preferably UV and visible light, which is transmitted through window 128 in base portion 112, through opening 144 in rear housing 140 of trap portion 114, into rear enclosure 148, and directly onto inside surface 142 of rear housing 140 and a rear surface 152 of divider 134. In some embodiments, light is not manipulated in base portion 112 and is emitted directly into trap portion 114. Inside surface 142 of rear housing 140 may include a concave shape and may be configured to reflect and disperse the light from LEDs 124 to distribute the light evenly onto rear surface 152 of divider 134, although inside surface 142 of rear housing 140 may have a convex or a saddle shape or a combination of shapes, or may also have ribs or other features to more evenly distribute the light. Alternatively, an optical enhancer such as an anamorphic lens (not shown) or any other lens or combination of lenses configured to distribute the light (e.g., evenly, according to specific patterns, at a focal point, etc.) onto rear surface 152 of divider 134, may be mounted to rear housing 140 at or near opening 144 or mounted to base portion 112 at or near window 128, and may replace or augment the role of inside surface 142 of rear housing 140. In some embodiments, the light from LEDs 124 directly strikes rear surface 152 of divider 134 at an oblique angle (e.g., an acute angle from approximately 0° to 90°) and spreads across divider 134, and replaces or augments the role of inside surface 142 of rear housing 140 or of the lens or lenses mounted to rear housing 140.

Thereafter, light transmits through divider 134 and adhesive 136 on front surface 138, and into front enclosure 146. Light may be further evenly distributed by the light-diffusing properties of divider 134, adhesive 136 on front surface 138, or both. A portion of the light entering front enclosure 146 continues through opening 120 in front housing 118 and is emitted into the surrounding area where the insect trap 110 is installed. Insects are attracted to the light emitted through adhesive coating 136 and through opening 120 in front housing 118, and fly or crawl into opening 120 and onto adhesive 136, where they become trapped in the adhesive (e.g., from adhesive 136). A user may observe trapped insects by looking through opening 120 in front housing 118.

When a sufficient number of insects have been trapped, the user may easily remove and discard the entire used trap portion 114 without touching the trapped insects, insect debris or adhesive, which remain out of reach inside trap portion 114, and replace it with a new trap portion 114. New trap portion 114 has fresh adhesive-coated surfaces and light-directing surfaces, ensuring that insect trap 110 will continue to efficiently and effectively attract and trap insects.

In some embodiments, because trap portion 114 mounts on top of, and not in front of, base portion 112, insect trap 110 protrudes minimally from the wall when plugged into an ordinary household wall socket, and therefore intrudes minimally into the home environment. In some embodiments, insect trap 110 is configured such that when insect trap 110 is mounted to a wall, its overall depth, defined by the overall distance insect trap 110 protrudes from the wall, is smaller than its overall height and its overall width.

It should be appreciated that a benefit of insect trap 110 is the manipulation of light within trap portion 114. In some embodiments, light manipulation occurs solely within trap portion 114. Light manipulation may include reflection, refraction, polarization, dispersion and/or diffusion and is achieved by engaging with a manipulative element or surface (e.g., inside surface 142, divider 134 and adhesive 136). In some embodiments, light manipulation produces an even distribution of light on adhesive 136. In some embodiments, light is manipulated to produce a predetermined pattern on the adhesive 136 or within trap portion 114, for example, an even distribution, an even distribution with hot spots of higher intensity, hot spot patterns, and/or combinations thereof.

Any suitable adhesive material may be used as part of an adhesive surface for trapping an insect. In some embodiments, pressure sensitive adhesives such as acrylics, butyl rubber, natural rubber, nitriles, silicones, styrene block copolymers, styrene-ethylene/propylene, styrene-isoprene-styrene, vinyl ethers may be used. Generally, the thickness of such adhesives will be in the range of approximately 0.01 mm to 1 mm. In some embodiments, the adhesive thickness is in the range of approximately 0.05 mm to 0.2 mm, with a thickness of approximately 0.1 mm being most often used.

An insect trap 110 of this configuration may accommodate a variety of different trap portions 114 that may be removably mounted to base portion 112, each trap portion 114 being uniquely configured to attract and trap a specific species or multiple species of flying insect. For example, the overall size and shape of trap portion 114, and the size, shape, location and orientation of opening 120 in front housing 118 of trap portion 114, may be uniquely configured to attract and trap a specific species or multiple species of flying insect. For example, in some embodiments, trap portion 114 is approximately 20 mm to 600 mm wide, 20 mm to 600 mm high and 5 mm to 150 mm deep. In some embodiments, trap portion 114 is approximately 20 mm to 200 mm wide, 20 mm to 200 mm high and 5 mm to 80 mm deep. In some embodiments, trap portion 114 is approximately 20 mm to 130 mm wide, 20 mm to 130 mm high and 5 mm to 50 mm deep.

In some embodiments, base portion 112 is approximately 20 mm to 600 mm wide, 10 mm to 150 mm high and 10 mm to 150 mm deep. In some embodiments, base portion 112 is 20 mm to 200 mm wide, 10 mm to 100 mm high and 10 mm to 80 mm deep. In some embodiments, base portion 112 is 20 mm to 130 mm wide, 10 mm to 50 mm high and 10 mm to 50 mm deep.

As provided herein, opening 120 may be a variety of shapes and/or sizes. For example, opening 120 may be circular, square, rectangular, polygonal and/or elliptical in shape. Alternatively, opening 120 may be slot shaped having a straight, curved or undulating shape or pattern. When opening 120 is circular, opening 120 may be approximately 0.5 mm to 30 mm in diameter. In some embodiments, circular opening 120 is approximately 0.5 mm to 20 mm in diameter. In some embodiments, circular opening 120 is approximately 0.5 mm to 15 mm in diameter. When opening 120 is slot shaped, opening 120 may be approximately 2 mm to 30 mm wide and 5 mm to 500 mm long. In some embodiments, slot shaped opening 120 is approximately 2 mm to 20 mm wide and 5 mm to 200 mm long. In some embodiments, slot shaped opening 120 is approximately 2 mm to 15 mm wide and 5 mm to 100 mm long.

In some embodiments, opening 120 covers all or a portion of front housing 118. For example, opening 120 may cover a range of approximately 1% to 75% of the surface area of front housing 118. In some embodiments, opening 120 covers approximately 5% to 50% of the surface area of front housing 118. In some embodiments, opening 120 covers approximately 10% to 30% of the surface area of front housing 118.

Figure 5:
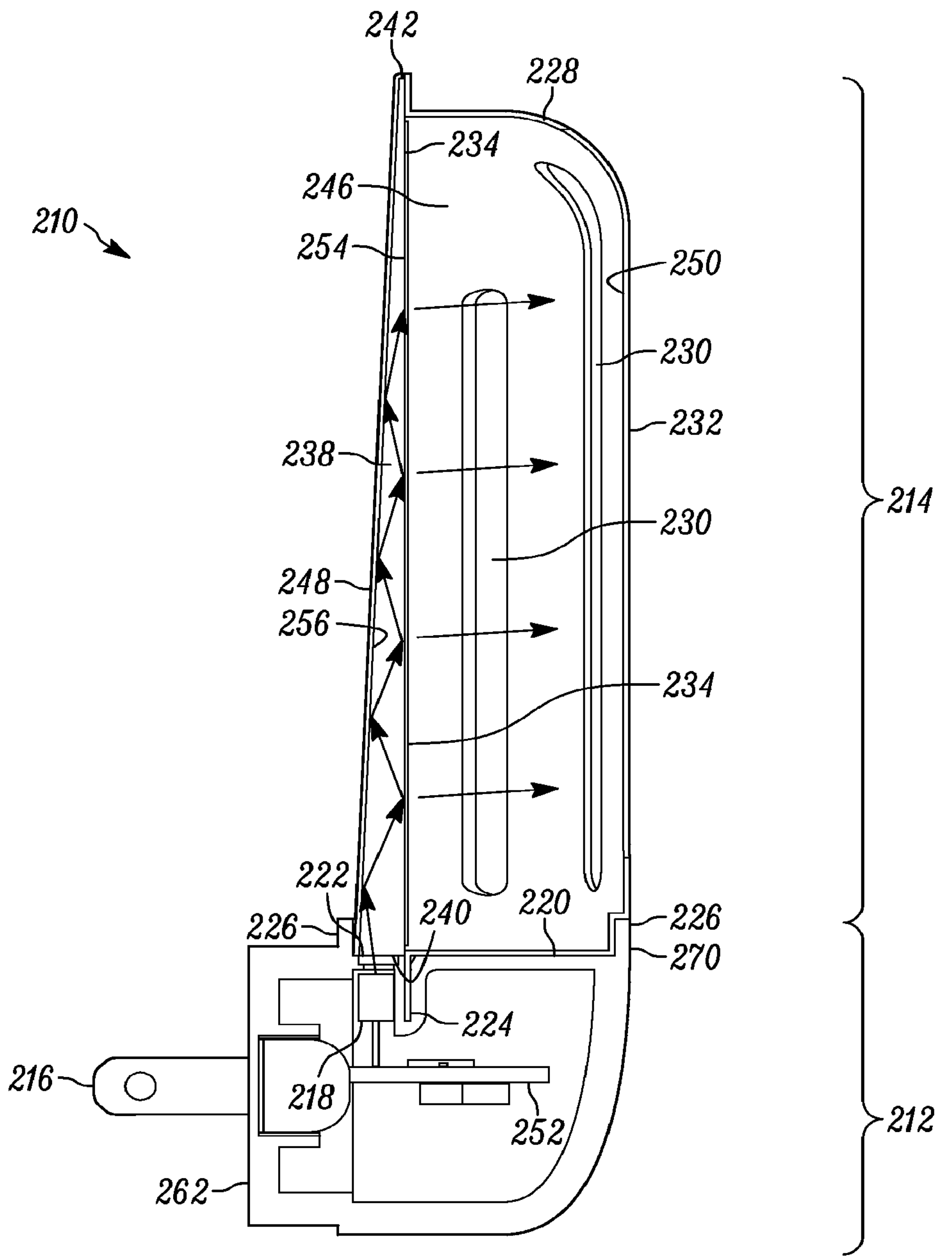
FIG. 5 is a cross-sectional view through a second embodiment of an insect trap in accordance with principles of the disclosure.

FIG. 5 is a cross-sectional view of a second embodiment of an insect trap, indicated generally at 210. Insect trap 210 includes a base portion 212 and a removable trap portion 214. Protruding from a back surface 262 of base portion 212 are a plurality of electrically conductive prongs 216, only one of which is shown, adapted to mount insect trap 210 to a wall and provide power to insect trap 210 by inserting conductive prongs 216 into a standard household electrical wall socket. Alternatively, base portion 212 may be configured to sit or hang wherever desired and receive power from batteries (not shown) mounted in base portion 212. While an electrical socket and batteries have been described as providing power to insect trap 210, any suitable power source may be used. Base portion 212 includes a lighting element such as one or more LEDs 218, only one of which is shown. In some embodiments, LEDs 218 include at least one that emits ultraviolet (UV) light and at least one that emits visible light. In some embodiments, LEDs 218 include at least one that emits UV light and at least one that emits blue light to better attract a wide variety of insect species. In some embodiments, the lighting element emits a combination of wavelengths to mimic sunlight. In some embodiments, LEDs 218 include at least one that emits infrared (IR) light, to better attract certain species of insects such as mosquitos and fleas.

In some embodiments, mounted in a top surface 220 of base portion 212 is a transparent or translucent window 222. Window 222 protects LEDs 218 from dust and insect debris, and allows base portion 212 to be easily cleaned. Top surface 220 of base portion 212 may include a slot 224, and on perimeter 270 of top surface 220 are upwardly directed protrusions 226. Trap portion 214 includes a front housing 228 with at least one opening 230 and a light-conducting body 238. Opening 230 in front housing 228 may be configured to admit a wide variety of insects into insect trap 210, or alternatively it may be configured to admit one or more specific insect species. In some embodiments, opening 230 is configured to prevent user's fingers from penetrating opening 230 and inadvertently touching trapped insects or adhesive when removing and replacing trap portion 214. In some embodiments, opening 230 has a size and shape such that a sphere 25 mm in diameter cannot pass through opening 230, and has a size and shape such that a sphere 1 mm in diameter may pass through any portion of opening 230. Opening 230 may be of uniform or of varying width, shape and orientation, and if trap portion 214 has more than one opening 230, they may be of identical or of differing widths, shapes and orientations. Opening 230 may be configured to attract one or more individual insect species or a variety of insect species. In some embodiments, light-conducting body 238 includes a front surface 254, an adhesive coating or an adhesive layer 234 on front surface 254, and a rear cover 248. In some embodiments, the material and thickness of adhesive layer 234 are selected to transmit a substantial proportion of the UV and/or visible and/or IR light, for example greater than 60% of the light is transmitted through adhesive layer 234. Light-conducting body may be tapered and configured to receive light through a bottom surface 240 from LEDs 218 and deflect and evenly distribute the light (e.g., through front surface 254 and adhesive layer 234). Rear cover 248 may be configured to prevent light from escaping through a top surface 242, a back surface 256 and side surfaces (not shown) of light-conducting body 238. As provided herein, any suitable light-conducting body may be used.

In some embodiments, front housing 228 is thermoformed from opaque plastic sheet, although other opaque, transparent or translucent materials such as paper, paperboard, cardboard or paper pulp may also be used. In some embodiments, front housing 228 is constructed by injection molding, casting or by other suitable manufacturing techniques. Front housing 228 may also be coated with transparent, translucent or opaque adhesive on an inside surface 250 to provide additional insect trapping efficiency and capacity. In addition, front housing 228 may also have a reflective coating (not shown) underneath the adhesive coating on inside surface 250 to enhance its attraction to insects and further improve the insect trapping efficiency and effectiveness. Front housing 228 and light-conducting body 238 may be joined together where they intersect or engage by ultrasonic welding or high frequency (HF) welding, although they may also be permanently or removably joined by adhesive or by other commonly used packaging assembly techniques or by any other suitable assembly method.

As shown, front housing 228 and light-conducting body 238 together form a front enclosure 246. Light-conducting body 238 may be tapered (e.g., thicker at bottom surface 240 and thinner at top surface 242), and may be constructed from any transparent material that conducts UV and/or IR and/or visible light, such as acrylic or polycarbonate plastic. The inside surfaces (not shown) of rear cover 248 may have a reflective coating to reflect light back into light-conducting body 238 and through front surface 254, thereby increasing its light-transmitting efficiency. Light-conducting body 238 may also have facets or other light-directing features of varying size, depth, and density on front surface 254 to enhance its light-transmitting efficiency. Alternatively, in some embodiments, light-conducting body 238 has facets or other light-directing features on front surface 254 and not be tapered. Light-conducting body 238 with microscopic facets or other features on front surface 254 is commonly referred to as a Light Guide Plate, although the facets or other features may also be larger and still function effectively.

Alternatively, in some embodiments, light-conducting body 238 may not have an adhesive coating, and light conducting body 238 and rear cover 248 may be part of base portion 212. In such embodiments, trap portion 214 may include a transparent or translucent back plate (not shown) with an adhesive coating on its front surface, attached at its perimeter to front housing 228.

The materials of the trap portion 214 may also include one or more insect attractants. For example, trap portion 214 may be impregnated with sorbitol, coleopteran attractants including brevicomin, dominicalure, frontalin, grandlure, ipsdienol, ipsenol, japonilure, lineatin, megatomoic acid, multistriatin, oryctalure, sulcatol, and trunc-call, dipteran attractants including ceralure, cue-lure, latilure, medlure, moguchun, muscalure, and trimedlure, homopteran attractants including rescalure, lepidopteran attractants such as disparlure, straight chain lepidopteran pheromones including codlelure, gossyplure, hexalure, litlure, looplure, orfralure, and ostramone, and other insect attractants such as eugenol, methyl eugenol, and siglure, or other substances to provide a scent that further increases the insect-attracting efficiency of insect trap 210. In such embodiments, the insect attractant is integral to trap portion 214. Alternatively, the insect attractants may be embedded in a separate piece (not shown) that mounts on inside surface 250 of front housing 228 or through opening 230 in front housing 228 or on front surface 254 of light-conducting body 238. It is desirable for such attractants to be detectable by an insect for approximately a 2-meter radius from insect trap 210.

In some embodiments, base portion 212 includes a circuit board 252 having a programmable processor or chip (not shown) for executing commands, electrically connected to conductive prongs 216 and LEDs 218. For clarity, however, not all of the electrical connections are shown. Circuit board 252 may include electronic circuitry to receive ordinary household current from conductive prongs 216 and provide power to illuminate LEDs 218. Circuit board 252 may include an energy stabilizer such as a full wave rectifier circuit or any other circuit that provides steady voltage to LEDs 218, although it may also provide a varying voltage to LEDs 218 to provide a flickering light, which may mimic movement that some species of insects, including mosquitoes, may find attractive. For example, light flickering frequencies in the approximate range from 0.05 Hz (e.g., to mimic the breathing rate of large mammals), to 270 Hz (e.g., the highest flicker frequency to attract male houseflies), may be desirable and the lighting element may be configured to flicker within this range. Circuit board 252 may provide power to LEDs 218 to provide UV and/or visible and/or IR light although it may be configured to provide power to only UV LEDs 218, or to only visible light LEDs 218, or to only IR LEDs 218, or to provide variable power to produce combinations of flickering UV and/or visible and/or IR light. In some embodiments, circuit board 252 may also be configured to drive a transmitter or transceiver such as a piezoelectric speaker or other device that may be mounted in base portion 212 to emit an insect-attracting sound. In some embodiments, the transmitter or transceiver may emit recorded and/or generated insect sounds or vibrations to better attract insects such as mosquitoes, midges, moths and flies, and may include one or more of insect call, reply, courtship and copulatory songs. In some embodiments, the transmitter or transceiver may emit recorded and/or generated insect-attracting sounds or vibrations such as the heartbeat of a mammal. For example, the transmitter or transceiver may emit an insect-attracting sound or sounds having a frequency in the range of approximately 0.5 Hz (e.g., the heart rate of large mammals) to approximately 240 kHz (e.g., the highest frequency detectable by insects). In some embodiments, the frequency is in the range of approximately 5 Hz to 100 kHz. In some embodiments, the frequency is in the range of approximately 35 Hz to 50 Khz. It is desirable for such insect-attracting sound to be detectable by an insect within approximately a 2-meter distance from insect trap 210. It is desirable for such insect-attracting sound to be undetectable by a human beyond approximately a 1 meter distance from insect trap 210.

As shown, slot 224 in top surface 220 of base portion 212 and protrusions 226 on top surface 220 of base portion 212 engage with trap portion 214 to secure it in place during use, although any other form of attachment may be substituted that allows trap portion 214 to be securely but removably mounted on base portion 212.

In the operation of the insect trap 210, conductive prongs 216 are inserted into a wall electrical socket, and LEDs 218 emit light, represented by arrows, preferably UV and visible light. The light from LEDs 218 transmit through window 222, enter bottom surface 240 of light-conducting body 238 and repeatedly reflect off of front surface 254 and back surface 256. In some embodiments, light is not manipulated in base portion 212 and is emitted directly into trap portion 214. A portion of the reflected light transmits through front surface 254 of light-conducting body 238 to provide an evenly-distributed light onto and through adhesive layer 234 and into front enclosure 246. The light may be further evenly distributed by refractive and light-diffusing properties of adhesive layer 234 on front surface 254 of light-conducting body 238. A portion of the light entering front enclosure 246 continues through opening 230 in front housing 228 and is emitted into the surrounding area where insect trap 210 is installed. Insects are attracted to the light transmitted through adhesive layer 234 and through opening 230 in front housing 228, and fly or crawl through opening 230 and onto adhesive layer 234, where they become trapped in the adhesive. The user may observe trapped insects by looking through opening 230 in front housing 228. When a sufficient number of insects have been trapped, the user may easily remove and discard the entire used trap portion 214 without touching the trapped insects, insect debris or adhesive, which remain out of reach inside trap portion 214, and replace it with a new trap portion 214. New trap portion 214 has fresh adhesive-coated surfaces and light-directing surfaces, ensuring that insect trap 210 will continue to efficiently and effectively attract and trap insects.

In some embodiments, because trap portion 214 mounts on top of, and not in front of, base portion 212, insect trap 210 protrudes minimally from the wall when plugged into an ordinary household wall socket, and therefore intrudes minimally into the home environment. In some embodiments, insect trap 210 is configured such that when insect trap 210 is mounted to a wall, its overall depth, defined by the overall distance insect trap 210 protrudes from the wall, is smaller than its overall height and its overall width.

It should be appreciated that a benefit of insect trap 210 is the manipulation of light within trap portion 214. In some embodiments, light manipulation occurs solely within trap portion 214. Light manipulation may include reflection, refraction, polarization and/or diffusion and is achieved by engaging with a manipulative element or surface (e.g., light-conducting body 238, front surface 254, back surface 256, and adhesive layer 234). In some embodiments, light manipulation produces an even distribution of light on adhesive layer 234. In some embodiments, light is manipulated to produce a predetermined pattern on adhesive layer 234 or within trap portion 214, for example, an even distribution, an even distribution with hot spots of higher intensity, hot spot patterns, and/or combinations thereof.

Any suitable adhesive material may be used as part of an adhesive surface for trapping an insect. In some embodiments, pressure sensitive adhesives such as acrylics, butyl rubber, natural rubber, nitriles, silicones, styrene block copolymers, styrene-ethylene/propylene, styrene-isoprene-styrene, vinyl ethers may be used. Generally, the thickness of such adhesives will be in the range of approximately 0.01 mm to 1 mm. In some embodiments, the adhesive thickness is in the range of approximately 0.05 mm to 0.2 mm, with a thickness of approximately 0.1 mm being most often used.

Insect trap 210 of this configuration may accommodate a variety of different trap portions 214 that may be removably mounted to base portion 212, each trap portion 214 being uniquely configured to attract and trap a specific species or multiple species of insects. For example, the overall size and shape of trap portion 214, and the size, shape, location and orientation of opening 230 in front housing 228 of trap portion 214, may be uniquely configured to attract and trap a specific species or multiple species of insects. For example, in some embodiments, trap portion 214 is approximately 20 mm to 600 mm wide, 20 mm to 600 mm high and 5 mm to 150 mm deep. In some embodiments, trap portion 214 is approximately 20 mm to 200 mm wide, 20 mm to 200 mm high and 5 mm to 80 mm deep. In some embodiments, trap portion 214 is approximately 20 mm to 130 mm wide, 20 mm to 130 mm high and 5 mm to 50 mm deep.

In some embodiments, base portion 212 is approximately 20 mm to 600 mm wide, 10 mm to 150 mm high and 10 mm to 150 mm deep. In some embodiments, base portion 212 is 20 mm to 200 mm wide, 10 mm to 100 mm high and 10 mm to 80 mm deep. In some embodiments, base portion 212 is 20 mm to 130 mm wide, 10 mm to 50 mm high and 10 mm to 50 mm deep.

As provided herein, opening 230 may be a variety of shapes and/or sizes. For example, opening 230 may be circular, square, rectangular, polygonal and/or elliptical in shape. Alternatively, opening 230 may be slot shaped having a straight, curved or undulating shape or pattern. When opening 230 is circular, opening 230 may be approximately 0.5 mm to 30 mm in diameter. In some embodiments, circular opening 230 is approximately 0.5 mm to 20 mm in diameter. In some embodiments, circular opening 230 is approximately 0.5 mm to 15 mm in diameter. When opening 230 is slot shaped, opening 230 may be approximately 2 mm to 30 mm wide and 5 mm to 500 mm long. In some embodiments, slot shaped opening 230 is approximately 2 mm to 20 mm wide and 5 mm to 200 mm long. In some embodiments, slot shaped opening 230 is approximately 2 mm to 15 mm wide and 5 mm to 100 mm long.

In some embodiments, opening 230 covers all or a portion of front housing 228. For example, opening 230 may cover a range of approximately 1% to 75% of the surface area of front housing 228. In some embodiments, opening 230 covers approximately 5% to 50% of the surface area of front housing 228. In some embodiments, opening 230 covers approximately 10% to 30% of the surface area of front housing 228.

Figure 6:
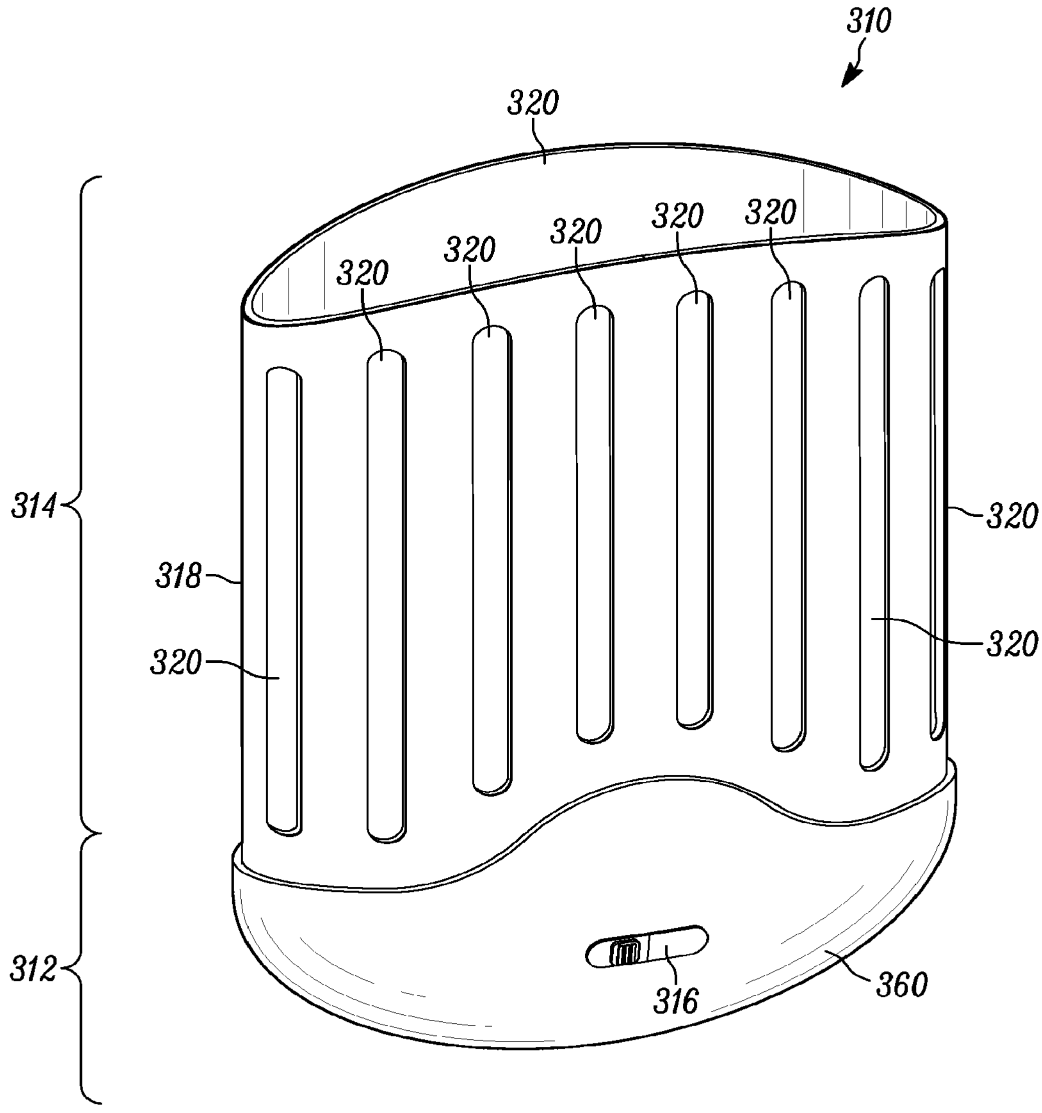
FIG. 6 is a front perspective view of a third embodiment of an insect trap in accordance with principles of the disclosure.

FIG. 6 is a front perspective view of a third embodiment of an insect trap, indicated generally at 310. Insect trap 310 may include a base portion 312 and a removable trap portion 314. In some embodiments, front surface 360 of base portion 312 includes a switch 316, configurable to enable insect trap 310 to be turned on or off by closing or opening switch 316 as desired by the user. Alternatively, switch 316 may be configured to control other features such as light intensity, combinations of light wavelengths, different flickering frequencies or modes, an automatic setting that turns on when the room gets dark, or a remote control setting, for example. Switch 316 may be manually operated, although switch 316 may also be operated electrically, optically, electro-mechanically, electro-optically, or by any method for opening or closing switch 316. Trap portion 314 may include a housing 318 with at least one opening 320. Opening 320 in housing 318 may be configured to admit a wide variety of insects into insect trap 310, or alternatively it may be configured to admit one or more specific insect species. Opening 320 may preferably be configured to prevent user's fingers from penetrating opening 320 and inadvertently touching trapped insects or adhesive when removing and replacing trap portion 314. Opening 320 may preferably have a size and shape such that a sphere 25 mm in diameter cannot pass through opening 320, and opening 320 may preferably have a size and shape such that a sphere 1 mm in diameter may pass through any portion of opening 320. Opening 320 may be of uniform or of varying width, shape and orientation, and if trap portion 314 has more than one opening 320, they may be of identical or of differing widths, shapes and orientations.

Figure 7:
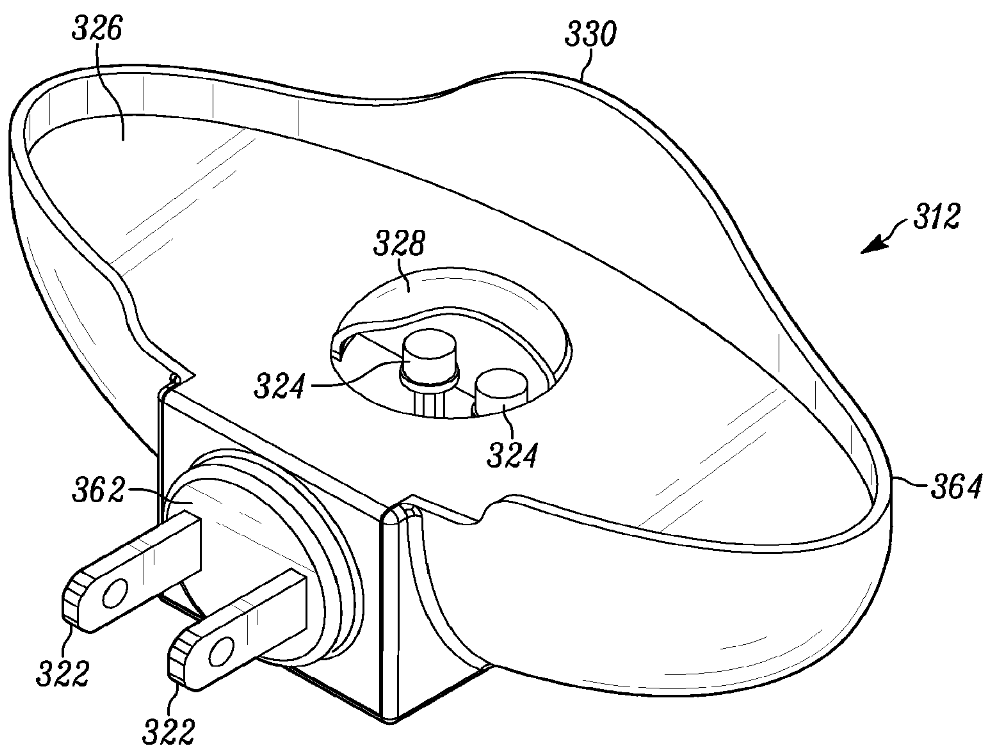
FIG. 7 is a rear perspective view of a base portion of the insect trap of FIG. 6.

FIG. 7 is a rear perspective view of base portion 312 of insect trap 310. Protruding from a rear surface 362 of base portion 312 are a plurality of electrically conductive prongs 322, adapted to mount insect trap 310 to a wall and provide power to insect trap 310 by inserting into a standard household electrical wall socket. Alternatively, base portion 312 may be configured to sit or hang wherever desired and receive power from batteries (not shown) mounted in base portion 312. While an electrical socket and batteries have been described as providing power to insect trap 310, any suitable power source may be used. Base portion 312 includes a lighting element such as one or more LEDs 324. In some embodiments, LEDs 324 include one that emits ultraviolet (UV) light and one that emits visible light. In some embodiments, LEDs 324 include at least one that emits UV light and at least one that emits blue light to better attract a wide variety of insect species. In some embodiments, the lighting element emits a combination of wavelengths to mimic sunlight. In some embodiments, LEDs 324 include at least one that emits infrared (IR) light to better attract certain species of insects such as mosquitos and fleas. Mounted in a top surface 326 of base portion 312 may be a transparent or translucent window 328, shown partially cut away to reveal LEDs 324. Window 328 protects LEDs 324 from dust and insect debris, and allows base portion 312 to be easily cleaned. Upwardly directed protrusions or a rim 330 protruding from the perimeter 364 of top surface 326 of base portion 312 may serve to secure trap portion 314 in place during use, although any other form of attachment may be substituted that allows trap portion 314 to be securely but removably mounted to base portion 312.

Figure 8:
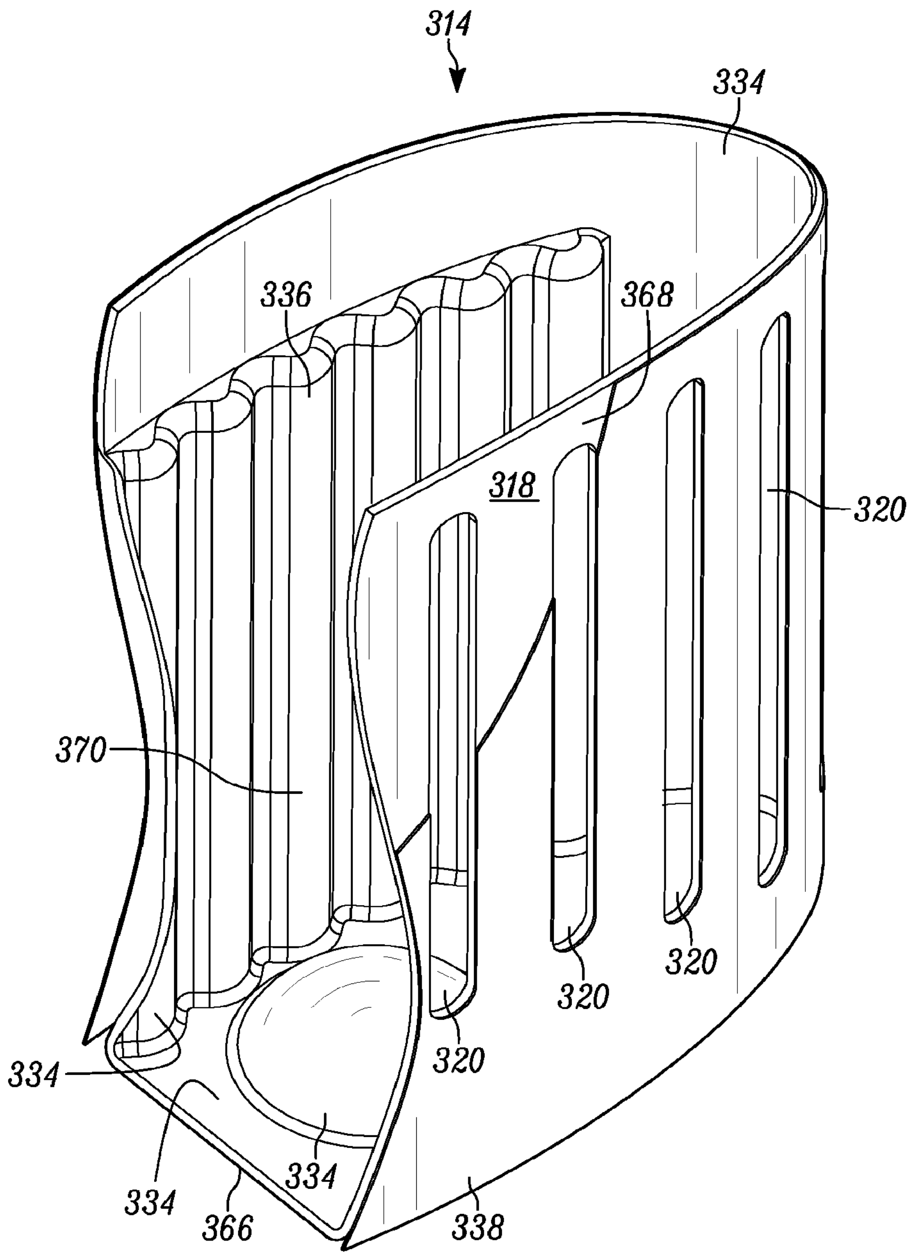
FIG. 8 is a front perspective view of a trap portion of the insect trap of FIG. 6.

FIG. 8 is a front perspective view of trap portion 314 of insect trap 310. Trap portion 314 includes housing 318, which forms an enclosure, and a transparent or translucent adhesive coating applied to one or more inside surfaces 334. In some embodiments, the material and thickness of housing 318 and the material and thickness of the adhesive coating are selected to transmit a substantial proportion of the UV and/or visible and/or IR light, for example greater than 60% of the light is transmitted through housing 318 and the adhesive coating. In some embodiments, housing 318 is thermoformed from opaque plastic sheet, although other opaque, transparent or translucent materials such as paper, paperboard, cardboard or paper pulp may also be used. In some embodiments, housing 318 is constructed by injection molding or by other suitable manufacturing techniques.

As shown, housing 318 includes ribs 336 or other features that increase the adhesive-coated surface area, produce alternating light/dark regions that some insect species find attractive, and enhance the transmission of insect-attracting light into an interior 370 of trap portion 314. A sleeve 338, configured to reduce the amount of light emitted by an outside surface 368 of housing 318, covers outside surface 368 of housing 318 except for a bottom surface 366 and at opening 320. In some embodiments, sleeve 338 is thermoformed from opaque sheet plastic, although other opaque, transparent or translucent materials such as paper, paperboard, cardboard or paper pulp may also be used. In some embodiments, sleeve 338 includes a reflective coating on one or more of its inside surfaces (not shown), allowing sleeve 338 to direct more light through inside surfaces 334 of housing 318 and further enhance the insect attracting and trapping efficiency and effectiveness. In some embodiments, sleeve 338 is replaced by a coating configured to reduce the amount of light emitted by outside surface 368 of housing 318, or by the coating applied over a reflective coating, applied to outside surface 368 of housing 318, except for bottom surface 366.

The materials of the trap portion 314 may also include one or more insect attractants. For example, trap portion 314 may be impregnated with sorbitol, coleopteran attractants including brevicomin, dominicalure, frontalin, grandlure, ipsdienol, ipsenol, japonilure, lineatin, megatomoic acid, multistriatin, oryctalure, sulcatol, and trunc-call, dipteran attractants including ceralure, cue-lure, latilure, medlure, moguchun, muscalure, and trimedlure, homopteran attractants including rescalure, lepidopteran attractants such as disparlure, straight chain lepidopteran pheromones including codlelure, gossyplure, hexalure, litlure, looplure, orfralure, and ostramone, and other insect attractants such as eugenol, methyl eugenol, and siglure, or other substances to provide a scent that increases the insect-attracting efficiency of insect trap 310. In such embodiments, the insect attractant is integral to trap portion 314. Alternatively, the insect attractants may be embedded in a separate piece (not shown) that mounts on inside surfaces 334 of housing 318 or through opening 320 in housing 318. It is desirable for such attractants to be detectable by an insect for approximately a 2-meter radius from insect trap 310.

Figure 9:
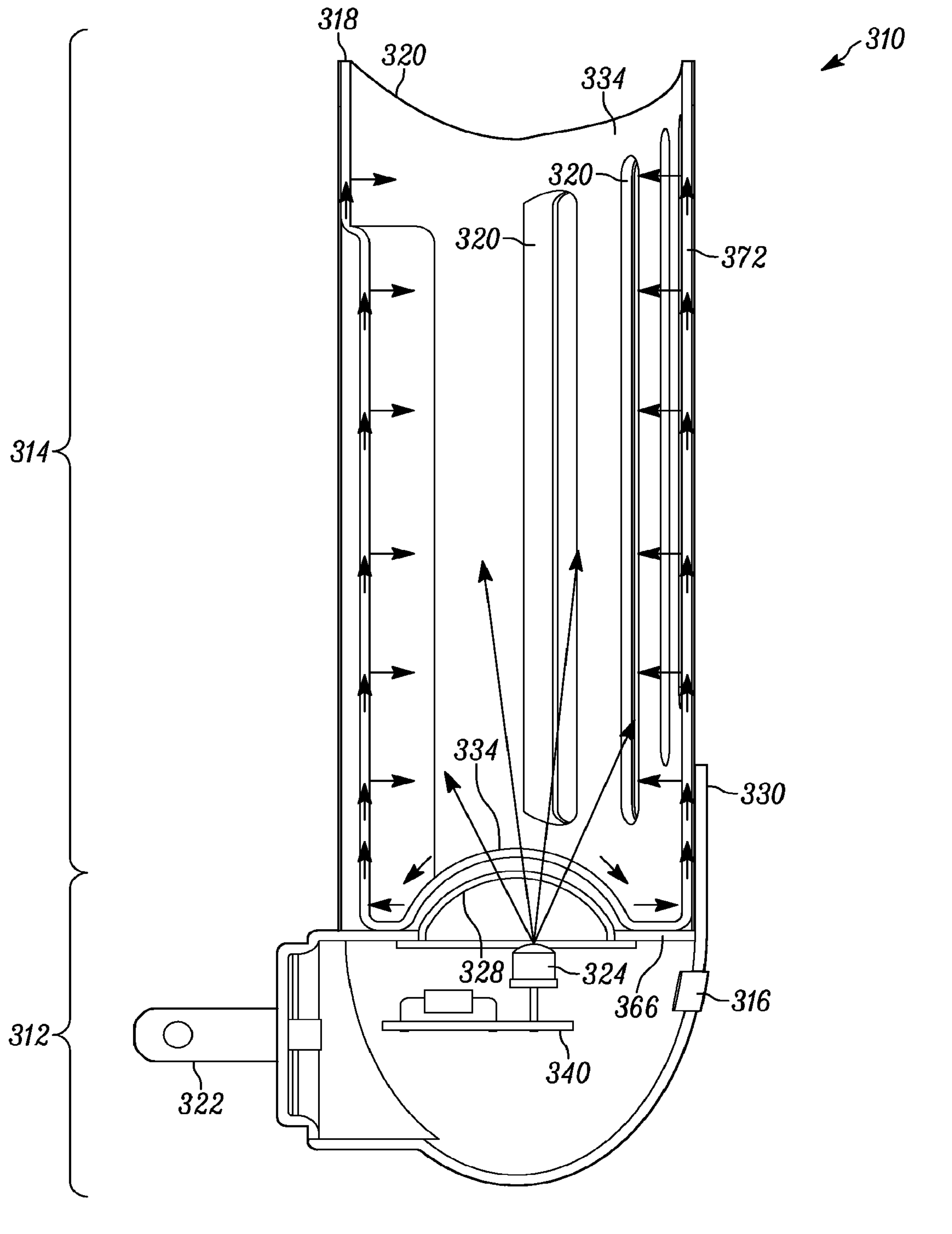
FIG. 9 is a cross-sectional view through the insect trap of FIG. 6.

FIG. 9 is a cross-sectional view through insect trap 310. In some embodiments, base portion 312 includes a circuit board 340 having a programmable processor or chip (not shown) for executing commands, electrically connected to conductive prongs 322, only one of which is shown, switch 316 and LEDs 324, only one of which is shown. For clarity, however, not all of the electrical connections are shown. Circuit board 340 may include electronic circuitry to receive ordinary household current from conductive prongs 322, respond to the position of switch 316 and provide power to illuminate LEDs 324. Circuit board 340 may include an energy stabilizer such as a full wave rectifier filter circuit or any other circuit that provides steady voltage to LEDs 324 when switch 316 is in a closed position, although it may also provide a varying voltage to LEDs 324 to provide a flickering light, which may mimic movement that some insect species, including mosquitoes, may find attractive. For example, light flickering frequencies in the approximate range of 0.05 Hz (e.g., to mimic the breathing rate of mammals) to 250 Hz (e.g., the highest flicker frequency attracting male houseflies), may be desirable and the lighting element may be configured to flicker within this range. Circuit board 340 may provide power to LEDs 324 to provide both UV and/or visible and/or IR light, although it could be configured to provide power to only the UV LEDs 324 or to only the visible light LEDs 324 or to only the IR LEDs 324, or to provide variable power to produce combinations of flickering UV and/or visible and/or IR light. In some embodiments, circuit board 340 may also be configured to drive a transmitter or transceiver such as a piezoelectric speaker or other device that may be mounted in base portion 312 to emit an insect-attracting sound. In some embodiments, the transmitter or transceiver may emit recorded and/or generated insect sounds or vibrations to better attract insects such as mosquitoes, midges, moths and flies, and may include one or more of insect call, reply, courtship and copulatory songs. In some embodiments, the transmitter or transceiver may emit recorded and/or generated insect-attracting sounds or vibrations such as the heartbeat of a mammal. For example, the transmitter or transceiver may emit an insect-attracting sound or sounds having a frequency in the range of approximately 0.5 Hz (e.g., the heart rate of large mammals) to approximately 240 kHz (e.g., the highest frequency detectable by insects). In some embodiments, the frequency is in the range of approximately 5 Hz to 100 kHz. In some embodiments, the frequency is in the range of approximately 35 Hz to 50 Khz. It is desirable for such insect-attracting sound to be detectable by an insect within approximately a 2-meter distance from trap 310. It is desirable for such insect-attracting sound to be undetectable by a human beyond approximately a 1-meter distance from insect trap 310.

In the operation of insect trap 310, conductive prongs 322 are inserted into a wall electrical socket and switch 316 is moved to a closed position. LEDs 324 emit light, represented by arrows, which transmits through window 328 in base portion 312 and through bottom surface 366 of housing 318. In some embodiments, light is not manipulated in base portion 312 and is emitted directly into trap portion 314. A portion of the light continues within the enclosure, up one or more sides 372 of housing 318, and out through inside surfaces 334. Another portion of the light continues through bottom surface 366 of housing 318 and into the enclosure, where it illuminates inside surfaces 334. A portion of the light entering housing 318 continues through opening 320 and is emitted into the surrounding area where the trap is installed. Insects in the area are attracted to the light transmitted through opening 320 and fly or crawl into opening 320 and onto inside surfaces 334, where they become stuck in the adhesive and are trapped. The user may observe trapped insects by looking through opening 320. When a sufficient number of insects have been trapped, the user may easily remove and discard the entire used trap portion 314 without touching trapped insects, insect debris or adhesive, which remain out of reach inside trap portion 314, and replace it with a new trap portion 314. New trap portion 314 has fresh adhesive-coated inside surfaces 334, housing 318 has a clean bottom surface 366 through which the light is transmitted into trap portion 314, and the transparent or translucent material of trap portion 314 has not been degraded by prolonged exposure to UV light from LEDs 324, thereby ensuring that insect trap 310 will continue to efficiently and effectively attract and trap insects.

In some embodiments, because trap portion 314 mounts on top of, and not in front of, base portion 312, insect trap 310 protrudes minimally from the wall when plugged into an ordinary household wall socket, and therefore intrudes minimally into the home environment. In some embodiments, insect trap 310 is configured such that when insect trap 310 is mounted to a wall, its overall depth, defined by the overall distance insect trap 310 protrudes from the wall, is smaller than its overall height and its overall width.

It should be appreciated that a benefit of insect trap 310 is the manipulation of light within trap portion 314. In some embodiments, light manipulation occurs solely within trap portion 314. Light manipulation may include reflection, refraction, polarization, dispersion and/or diffusion and is achieved by engaging with a manipulative element or surface (e.g., housing 318 and inside surfaces 334). In some embodiments, light manipulation produces an even distribution of light on an adhesive surface or adhesive coating. In some embodiments, light is manipulated to produce a predetermined pattern on the adhesive coating or within trap portion 314, for example, an even distribution, an even distribution with hot spots of higher intensity, hot spot patterns, and/or combinations thereof.

Any suitable adhesive material may be used as part of an adhesive surface for trapping an insect. In some embodiments, pressure sensitive adhesives such as acrylics, butyl rubber, natural rubber, nitriles, silicones, styrene block copolymers, styrene-ethylene/propylene, styrene-isoprene-styrene, vinyl ethers may be used. Generally, the thickness of such adhesives will be in the range of approximately 0.01 mm to 1 mm. In some embodiments, the adhesive thickness is in the range of approximately 0.05 mm to 0.2 mm, with a thickness of approximately 0.1 mm being most often used.

Insect trap 310 of this configuration may accommodate a variety of different trap portions 314 that may be removably mounted to base portion 312, each trap portion 314 being uniquely configured to attract and trap a specific species or multiple species of insects. For example, the overall size and shape of trap portion 314, and the size, shape, location and orientation of opening 320 in housing 318 of trap portion 314, may be uniquely configured to attract and trap a specific species or multiple species of insects. For example, in some embodiments, trap portion 314 is approximately 20 mm to 600 mm wide, 20 mm to 600 mm high and 5 mm to 150 mm deep. In some embodiments, trap portion 314 is approximately 20 mm to 200 mm wide, 20 mm to 200 mm high and 5 mm to 80 mm deep. In some embodiments, trap portion 314 is approximately 20 mm to 130 mm wide, 20 mm to 130 mm high and 5 mm to 50 mm deep.

In some embodiments, base portion 312 is approximately 20 mm to 600 mm wide, 10 mm to 150 mm high and 10 mm to 150 mm deep. In some embodiments, base portion 312 is 20 mm to 200 mm wide, 10 mm to 100 mm high and 10 mm to 80 mm deep. In some embodiments, base portion 312 is 20 mm to 130 mm wide, 10 mm to 50 mm high and 10 mm to 50 mm deep.

As provided herein, opening 320 may be a variety of shapes and/or sizes. For example, opening 320 may be circular, square, rectangular, polygonal and/or elliptical in shape. Alternatively, opening 320 may be slot shaped having a straight, curved or undulating shape or pattern. When opening 320 is circular, opening 320 may be approximately 0.5 mm to 30 mm in diameter. In some embodiments, circular opening 320 is approximately 0.5 mm to 20 mm in diameter. In some embodiments, circular opening 320 is approximately 0.5 mm to 15 mm in diameter. When opening 320 is slot shaped, opening 320 may be approximately 2 mm to 30 mm wide and 5 mm to 500 mm long. In some embodiments, slot shaped opening 320 is approximately 2 mm to 20 mm wide and 5 mm to 200 mm long. In some embodiments, slot shaped opening 320 is approximately 2 mm to 15 mm wide and 5 mm to 100 mm long.

In some embodiments, opening 320 covers all or a portion of trap portion 314. For example, opening 320 may cover a range of approximately 1% to 75% of the surface area of trap portion 314. In some embodiments, opening 320 covers approximately 5% to 50% of the surface area of trap portion 314. In some embodiments, opening 320 covers approximately 10% to 30% of the surface area of trap portion 314.

Although as shown in the embodiments of FIGS. 1-9, the trap portion mounts on a top surface of the base portion, other configurations are also contemplated. For example, FIGS. 10 and 11 show a fourth embodiment of an insect trap, where the trap portion mounts to the front of the base portion.

Figure 10:
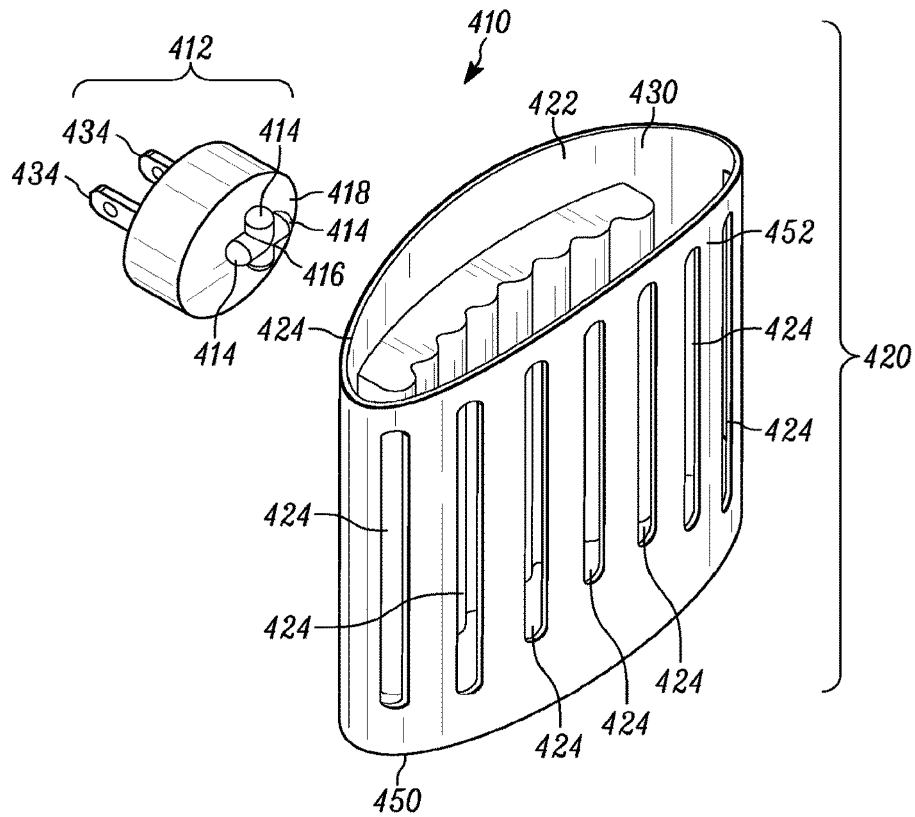
FIG. 10 is a front perspective view of a fourth embodiment of an insect trap in accordance with principles of the disclosure.
Figure 11:
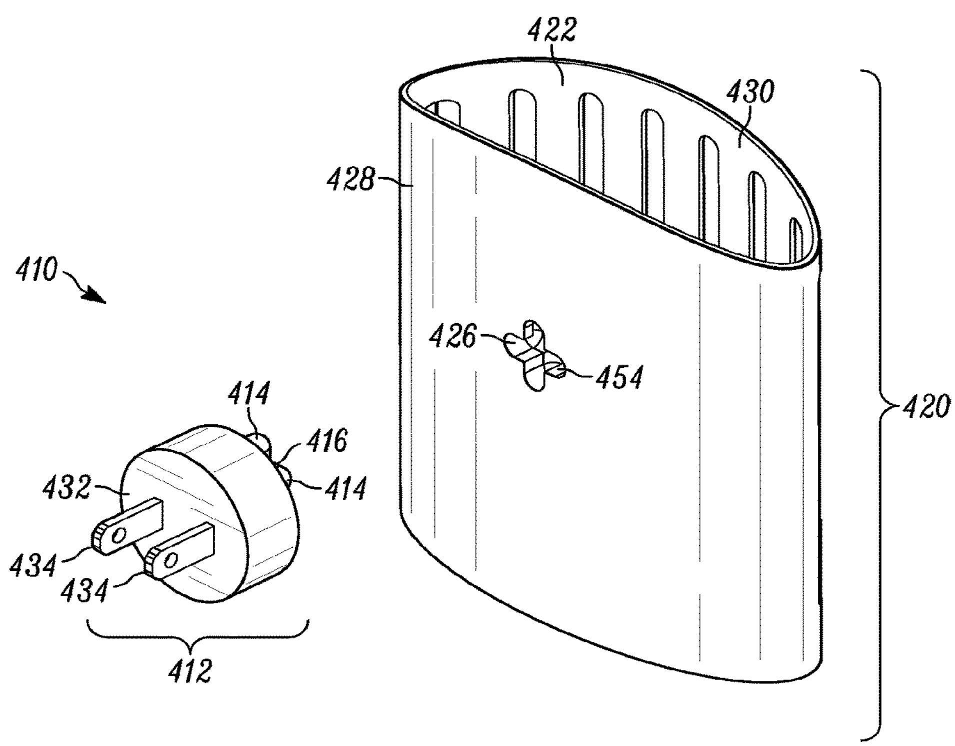
FIG. 11 is a rear perspective view of the insect trap of FIG. 10.

FIG. 10 is a front perspective view and FIG. 11 is a rear perspective view, both showing a fourth embodiment of an insect trap, indicated generally at 410. Insect trap 410 includes a base portion 412 and a removable trap portion 420. Trap portion 420 is shown removed from base portion 412 in both views. Protruding from a rear surface 432 of base portion 412 are a plurality of electrically conductive prongs 434, adapted to mount insect trap 410 to a wall and provide power to insect trap 410 by inserting into a standard household electrical wall socket. Alternatively, base portion 412 may be configured to sit or hang wherever desired and receive power from batteries (not shown) mounted in base portion 412. While an electrical socket and batteries have been described as providing power to insect trap 410, any suitable power source may be used. A lighting element such as one or more LEDs 414 may be mounted on a cross-shaped protrusion 416 protruding from a front surface 418 of base portion 412. Alternatively, LEDs 414 may form a protrusion themselves. While shown as a cross-shaped protrusion, the mounting surface and/or configuration of LEDs 414 may be any desired shape. In some embodiments, base portion 412 includes a circuit board (not shown) having a programmable processor or chip (not shown) for executing commands, electrically connected to conductive prongs 434 and LEDs 414. Trap portion 420 includes a housing 450 of translucent or transparent material with one or more adhesive-coated inside surfaces 422 and at least one opening 424. In some embodiments, the material and thickness of housing 450 and the material and thickness of the adhesive are selected to transmit a substantial proportion of the light, for example greater than 60% of the light is transmitted through housing 450 and the adhesive coating.

Opening 424 may be configured to admit a wide variety of insects into insect trap 410, or alternatively it may be configured to admit one or more specific insect species. Opening 424 may be configured to prevent user's fingers from penetrating opening 424 and inadvertently touching trapped insects or adhesive when removing and replacing trap portion 420. Opening 424 may preferably have a size and shape such that a sphere 25 mm in diameter cannot pass through the at least one opening 424, and opening 424 may preferably have a size and shape such that a sphere 1 mm in diameter may pass through any portion of opening 424. Opening 424 may be of uniform or of varying width, shape and orientation, and if trap portion 420 has more than one opening 424, they may be of identical or of differing widths, shapes and orientations. Trap portion 420 may include a coating (not shown) configured to reduce the amount of light emitted by its outside surfaces 452, on outside surfaces 452 except for at opening 424 and at a cross-shaped blind cavity 426 in its rear surface 428. As shown, blind cavity 426 is cross-shaped 454, but may be any desired shape. For example, cross-shaped protrusion 416 on front surface 418 of base portion 412 may engage with a recess in cross-shaped cavity 454 in rear surface 428 of trap portion 420 to removably attach trap portion 420 to base portion 412. In this configuration, therefore, trap portion 420 mounts in front of base portion 412.

In the operation of insect trap 410, base portion 412 is plugged into an electrical wall socket and trap portion 420 is mounted in front of base portion 412. Light from LEDs 414 transmit into cross-shaped cavity 454 in rear surface 428 of trap portion 420. In some embodiments, light is not manipulated in base portion 412 and is emitted directly into trap portion 420. A portion of the light continues within the translucent or transparent walls of trap portion 420, diffusing the light and spreading it evenly within trap portion 420 and through inside surfaces 422. Another portion of the light continues through the rear wall of trap portion 420 and into the interior 430 of trap portion 420, where it illuminates inside surfaces 422. A portion of the light entering trap portion 420 continues through opening 424 and into the room where insect trap 410 is installed. Insects in the room are attracted to the light transmitted through opening 424, and fly or crawl into opening 424 and onto inside surfaces 422, where they become stuck in the adhesive and are trapped. The user may observe trapped insects by looking through opening 424. When a sufficient number of insects have been trapped, the user may easily remove and discard the entire used trap portion 420 without touching the trapped insects, insect debris or adhesive, which remain out of reach inside trap portion 420, and replace it with a new trap portion 420. The new trap portion 420 has fresh adhesive-coated inside surfaces 422, a clean cross-shaped cavity 426 in rear surface 428 through which the light is transmitted into trap portion 420, and the transparent or translucent material of trap portion 420 has not been degraded by prolonged exposure to UV light from LEDs 414, thereby ensuring that insect trap 410 will continue to efficiently and effectively attract and trap insects.

It should be appreciated that a benefit of insect trap 410 is the manipulation of light within trap portion 420. In some embodiments, light manipulation occurs solely within trap portion 420. Light manipulation may include reflection, refraction, polarization, dispersion and/or diffusion and is achieved by engaging with a manipulative element or surface (e.g., trap portion 420 and inside surfaces 422). In some embodiments, light manipulation produces an even distribution of light on an adhesive surface or adhesive coating. In some embodiments, light is manipulated to produce a predetermined pattern on the adhesive coating or within trap portion 420, for example, an even distribution, an even distribution with hot spots of higher intensity, hot spot patterns, and/or combinations thereof.

Any suitable adhesive material may be used as part of an adhesive surface for trapping an insect. In some embodiments, pressure sensitive adhesives such as acrylics, butyl rubber, natural rubber, nitriles, silicones, styrene block copolymers, styrene-ethylene/propylene, styrene-isoprene-styrene, vinyl ethers may be used. Generally, the thickness of such adhesives will be in the range of approximately 0.01 mm to 1 mm. In some embodiments, the adhesive thickness is in the range of approximately 0.05 mm to 0.2 mm, with a thickness of approximately 0.1 mm being most often used.

An insect trap 410 of this configuration may accommodate a variety of different trap portions 420 that may be removably mounted to base portion 412, each trap portion 420 being uniquely configured to attract and trap a specific species or multiple species of insects. For example, the overall size and shape of trap portion 420, and the size, shape, location and orientation of opening 424 in trap portion 420, may be uniquely configured to attract and trap a specific species or multiple species of insects. For example, in some embodiments, trap portion 420 is approximately 20 mm to 600 mm wide, 20 mm to 600 mm high and 5 mm to 150 mm deep. In some embodiments, trap portion 420 is approximately 20 mm to 200 mm wide, 20 mm to 200 mm high and 5 mm to 80 mm deep. In some embodiments, trap portion 420 is approximately 20 mm to 130 mm wide, 20 mm to 130 mm high and 5 mm to 50 mm deep.

In some embodiments, base portion 412 is approximately 10 mm to 600 mm wide, 10 mm to 150 mm high and 10 mm to 150 mm deep. In some embodiments, base portion 412 is 10 mm to 200 mm wide, 10 mm to 100 mm high and 10 mm to 80 mm deep. In some embodiments, base portion 412 is 10 mm to 130 mm wide, 10 mm to 50 mm high and 10 mm to 50 mm deep.

As provided herein, opening 424 may be a variety of shapes and/or sizes. For example, opening 424 may be circular, square, rectangular, polygonal and/or elliptical in shape. Alternatively, opening 424 may be slot shaped having a straight, curved or undulating shape or pattern. When opening 424 is circular, opening 424 may be approximately 0.5 mm to 30 mm in diameter. In some embodiments, circular opening 424 is approximately 0.5 mm to 20 mm in diameter. In some embodiments, circular opening 424 is approximately 0.5 mm to 15 mm in diameter. When opening 424 is slot shaped, opening 424 may be approximately 2 mm to 30 mm wide and 5 mm to 500 mm long. In some embodiments, slot shaped opening 424 is approximately 2 mm to 20 mm wide and 5 mm to 200 mm long. In some embodiments, slot shaped opening 424 is approximately 2 mm to 15 mm wide and 5 mm to 100 mm long.

In some embodiments, opening 424 covers all or a portion of trap portion 420. For example, opening 424 may cover a range of approximately 1% to 75% of the surface area of trap portion 420. In some embodiments, opening 424 covers approximately 5% to 50% of the surface area of trap portion 420. In some embodiments, opening 424 covers approximately 10% to 30% of the surface area of trap portion 420.

Figure 12:
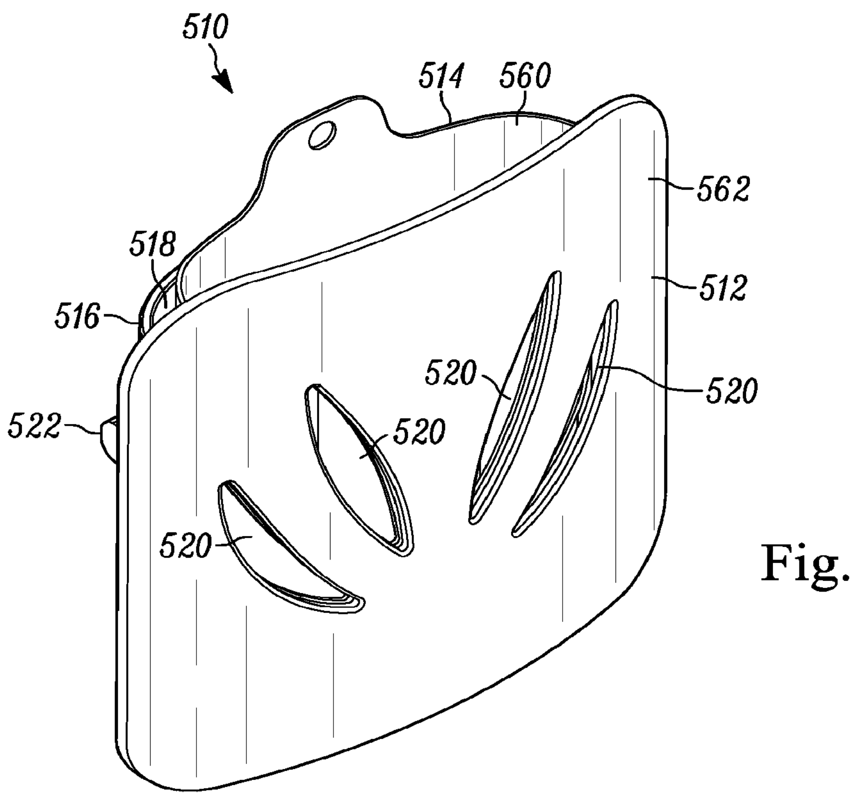
FIG. 12 is a front perspective view of a fifth embodiment of an insect trap in accordance with principles of the disclosure.
Figure 13:
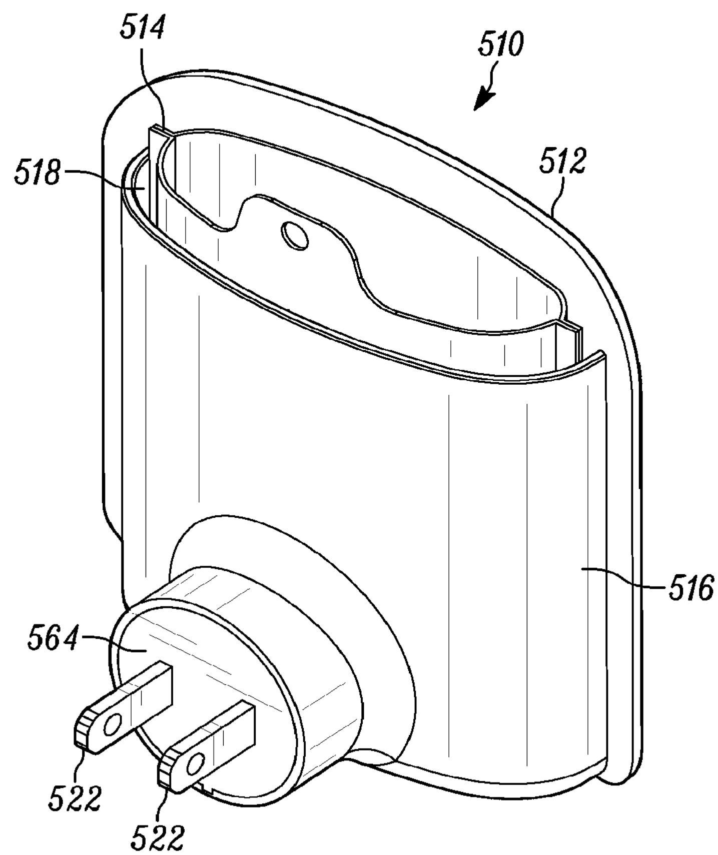
FIG. 13 is a rear perspective view of the insect trap of FIG. 12.

FIG. 12 is a front perspective view and FIG. 13 is a rear perspective view showing a fifth embodiment of an insect trap, indicated generally at 510. Insect trap 510 includes a base portion 512 and a removable trap portion 514. Base portion 512 includes a housing 516 with a top opening 518 on its top surface 560 to receive trap portion 514, at least one front opening 520 on its front surface 562, and a plurality of electrically conductive prongs 522 on its rear surface 564, adapted to mount insect trap 510 to a wall and provide power to insect trap 510 by inserting into a standard household electrical wall socket. Alternatively, base portion 512 may be configured to sit or hang wherever desired and receive power from batteries (not shown) mounted in base portion 512. While an electrical socket has been described as providing power to insect trap 510, any suitable power source may be used. Front opening 520 may be configured to admit a wide variety of insects into insect trap 510, or alternatively it may be configured to admit one or more specific insect species. Front opening 520 may be configured to prevent user's fingers from penetrating front opening 520 and inadvertently touching trapped insects or adhesive when removing and replacing trap portion 514. Front opening 520 may preferably have a size and shape such that a sphere 25 mm in diameter cannot pass through front opening 520, and front opening 520 may preferably have a size and shape such that a sphere 1 mm in diameter may pass through any portion of front opening 520. Front opening 520 may be of uniform or of varying width, shape and orientation, and if trap portion 514 has more than one front opening 520, they may be of identical or of differing widths, shapes and orientations. In some embodiments, base portion 512 is injection molded of opaque plastic, although other materials and construction techniques could also be used.

Figure 14:
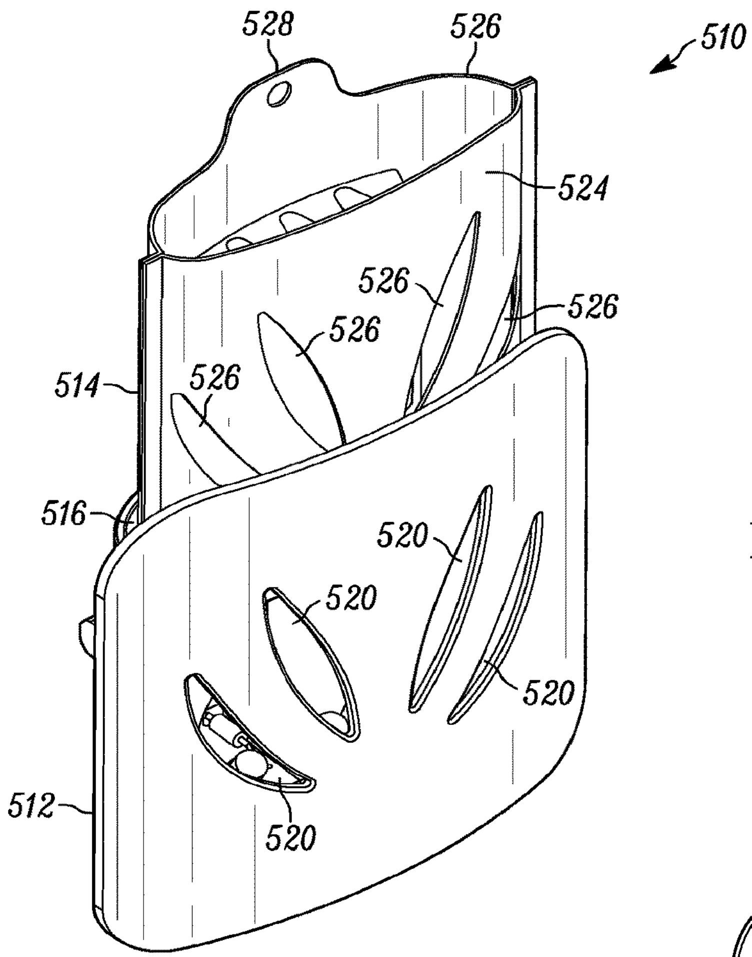
FIG. 14 is a front perspective view of the insect trap of FIG. 12.

FIG. 14 is a front perspective view of insect trap 510. Trap portion 514 is shown partially removed from base portion 512 in this view. Trap portion 514 may include a housing 524 with at least one opening 526 and a tab 528 adapted for removing and replacing trap portion 514. Trap portion 514 may be removed by grasping tab 528 and lifting trap portion 514 out of housing 516 of base portion 512. Opening 526 in trap portion 514 may correspond to front opening 520 in base portion 512 with respect to size, shape, orientation and location, so that they may align when trap portion 514 is mounted into base portion 512. In such embodiments, trap portion 514 may be viewed as an inner sleeve or pocket and base portion 512 may be viewed as an outer sleeve, where the inner sleeve can be dropped or inserted into the outer sleeve by a user.

Figure 15:
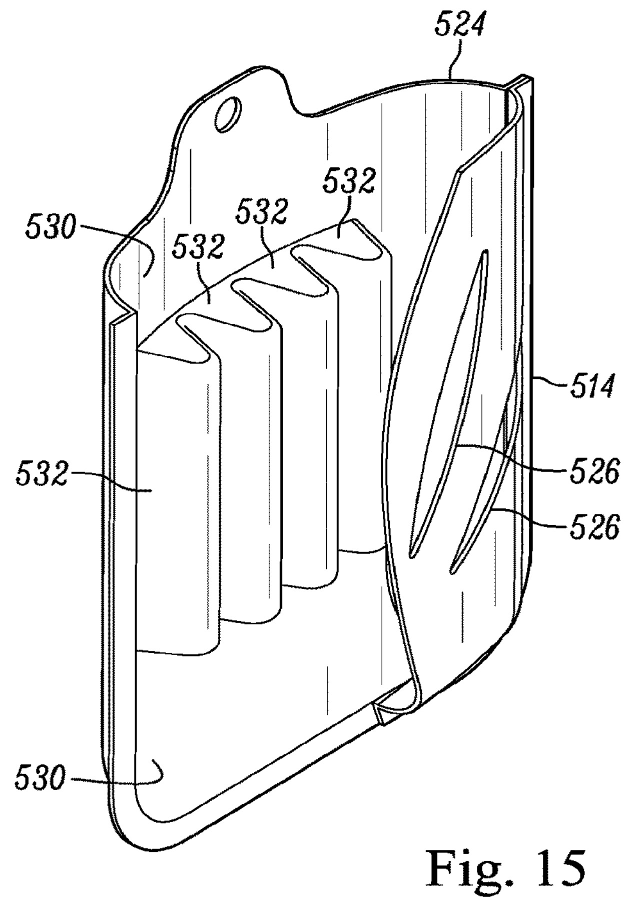
FIG. 15 is a front perspective view of a trap portion of the insect trap of FIG. 12.

FIG. 15 is a front perspective view of trap portion 514. Trap portion 514 is shown partially cut away in this view. Housing 524 may include inside surfaces 530 coated with translucent or transparent adhesive. As shown, housing 524 includes ribs 532 or other features that increase the adhesive-coated surface area, produce alternating light/dark regions that some insect species find attractive, and enhance the transmission of insect-attracting light into the interior of trap portion 514. In some embodiments, trap portion 514 is thermoformed of translucent or transparent sheet plastic, in two separate pieces, or in a 'clamshell' configuration, in which the two sides are joined at one side and folded together, although trap portion 514 could also be injection molded of translucent or transparent plastic or constructed of translucent paper or of other materials. In some embodiments, the material and thickness of trap portion 514 and the material and thickness of the adhesive are selected to transmit a substantial proportion of light, for example greater than 60% of light is transmitted through trap portion 514 and the adhesive coating. The materials of trap portion 514 may also include one or more insect attractants. For example, trap portion 514 may be impregnated with sorbitol, coleopteran attractants including brevicomin, dominicalure, frontalin, grandlure, ipsdienol, ipsenol, japonilure, lineatin, megatomoic acid, multistriatin, oryctalure, sulcatol, and trunc-call, dipteran attractants including ceralure, cue-lure, latilure, medlure, moguchun, muscalure, and trimedlure, homopteran attractants including rescalure, lepidopteran attractants such as disparlure, straight chain lepidopteran pheromones including codlelure, gossyplure, hexalure, litlure, looplure, orfralure, and ostramone, and other insect attractants such as eugenol, methyl eugenol, and siglure, or other substances to provide a scent that increases the insect-attracting efficiency of insect trap 510. In such embodiments, the insect attractant is integral to trap portion 514. Alternatively, the insect attractants may be embedded in a separate piece (not shown) that mounts on inside surfaces 530 of housing 524 or through opening 526 in housing 524. It is desirable for such attractants to be detectable by an insect for approximately a 2-meter radius from insect trap 510.

Figure 16:
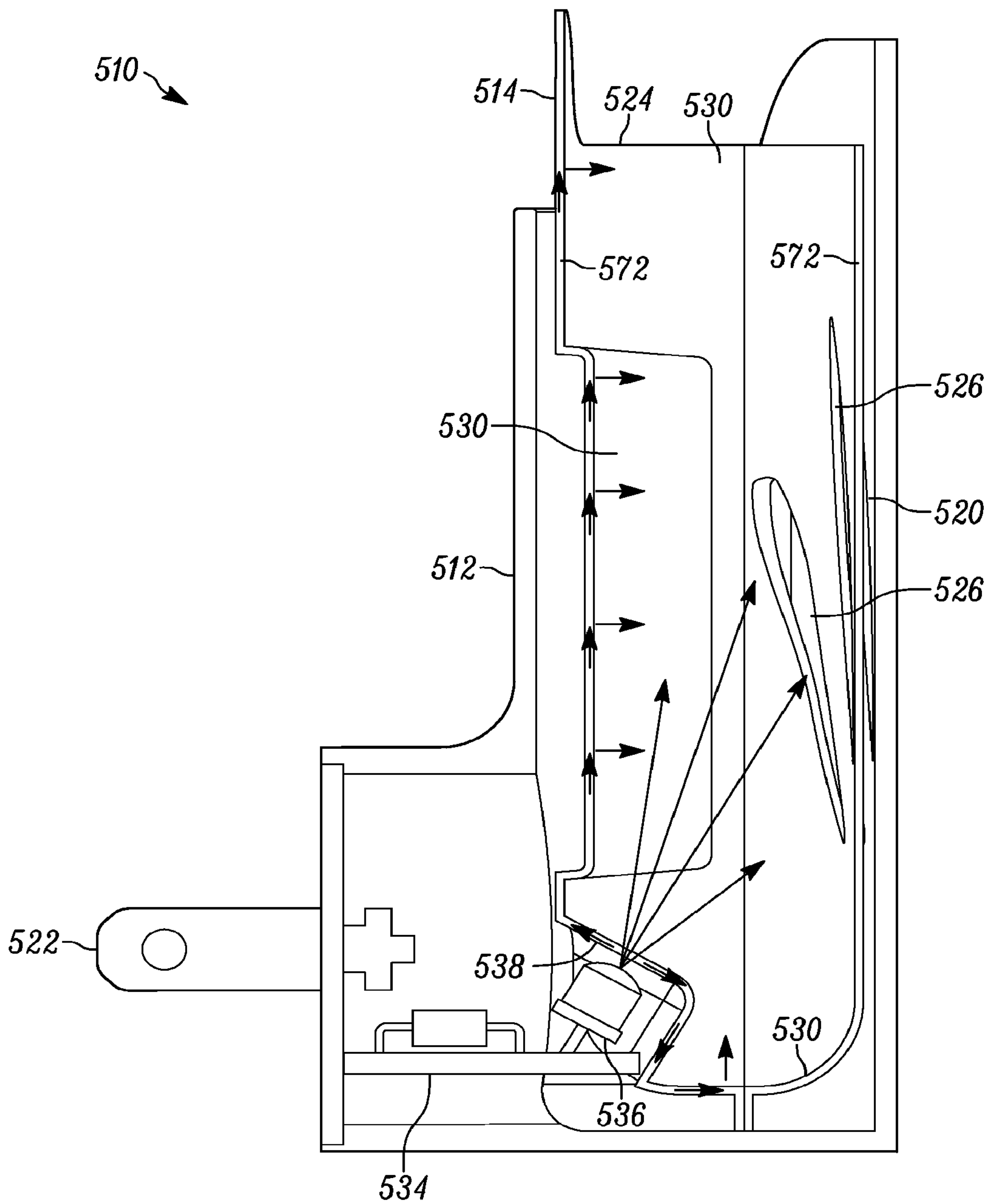
FIG. 16 is a cross-sectional view through the insect trap of FIG. 12.

FIG. 16 is a cross-sectional view through insect trap 510. In some embodiments, base portion 512 includes a circuit board 534 having a programmable processor or chip (not shown) for executing commands, electrically connected to conductive prongs 522, only one of which is shown, and a lighting element such as one or more LEDs 536, only one of which is shown. In some embodiments, LEDs 536 include one that emits ultraviolet (UV) light and one that emits visible light. In some embodiments, LEDs 536 include at least one that emits UV light and at least one that emits blue light to better attract a wide variety of insect species. In some embodiments, the lighting element emits a combination of wavelengths to mimic sunlight. In some embodiments, LEDs 536 include at least one that emits infrared (IR) light to better attract certain species of insects such as mosquitos and fleas. For clarity, not all of the electrical connections are shown. Circuit board 534 may include electronic circuitry to receive any household current from conductive prongs 522 and provide power to LEDs 536. Alternatively, circuit board 534 may be configured to receive power from batteries (not shown) mounted in base portion 512. While an electrical socket and batteries have been described as providing power to insect trap 510, any suitable power source may be used. Circuit board 534 may include a full wave rectifier circuit or any other circuit to provide steady voltage to LEDs 536, although it could also provide a varying voltage to LEDs 536 to provide a flickering light, which mimics movement that some insect species, including mosquitoes, may find attractive. For example, light flickering frequencies in the approximate range of 0.05 Hz (e.g., to mimic the breathing rate of mammals) to 270 Hz (e.g., the highest flicker frequency known to attract male houseflies), may be desirable and the lighting element may be configured to flicker within this range.

Circuit board 534 may provide power to LEDs 536 to provide UV and/or visible and/or IR light, although it could be configured to provide power to only the UV LEDs 536 or to only the visible light LEDs 536, or to provide variable power to produce combinations of flickering UV and/or visible and/or IR light. In some embodiments, circuit board 534 may also be configured to drive a transmitter or transceiver such as a piezoelectric speaker or other device that may be mounted in base portion 512 to emit an insect-attracting sound. In some embodiments, the transmitter or transceiver may emit recorded and/or generated insect sounds or vibrations to better attract insects such as mosquitoes, midges, moths and flies, and may include one or more of insect call, reply, courtship and copulatory songs. In some embodiments, the transmitter or transceiver may emit recorded and/or generated insect-attracting sounds or vibrations such as the heartbeat of a mammal. For example, the transmitter or transceiver may emit an insect-attracting sound or sounds having a frequency in the range of approximately 0.5 Hz (e.g., the heart rate of large mammals) to approximately 240 kHz (e.g., the highest frequency detectable by insects). In some embodiments, the frequency is in the range of approximately 5 Hz to 100 kHz. In some embodiments, the frequency is in the range of approximately 35 Hz to 50 Khz. It is desirable for such insect-attracting sound to be detectable by an insect within approximately a 2-meter distance from insect trap 510. It is desirable for such insect-attracting sound to be undetectable by a human beyond approximately a 1 meter distance from insect trap 510.

In the operation of insect trap 510, conductive prongs 522 are inserted into a wall electrical socket. LEDs 536 emit light, represented by arrows, preferably UV and visible light, which transmit though a rear surface 538 of housing 524 of trap portion 514. In some embodiments, light is not manipulated in base portion 512 and is emitted directly into trap portion 514. A portion of the light continues within the enclosure, up one or more sides 572 of housing 524, and out through inside surfaces 530. Another portion of the light continues through wall of housing 524 and into the enclosure, where it illuminates inside surfaces 530. A portion of the light entering the enclosure continues through opening 526 in trap portion 514 and corresponding front opening 520 in base portion and is emitted into the area where insect trap 510 is installed. Insects in the area are attracted to the light transmitted through opening 526 in trap portion 514 and front opening 520 in base portion 512, and fly or crawl into front opening 520 and onto the inside surfaces 530 of trap portion 514, where they become stuck in the adhesive and are trapped. The user may observe trapped insects by looking through front opening 520 and opening 526. When a sufficient number of insects have been trapped, the user may easily remove and discard the entire used trap portion 514 without touching trapped insects, insect debris or adhesive, which remain out of reach inside trap portion 514, and replace it with a new trap portion 514. New trap portion 514 has fresh adhesive coating inside surfaces 530, housing 524 has a clean rear surface 538, through which the light is transmitted into trap portion 514, and the transparent or translucent material of trap portion 514 has not been degraded by prolonged exposure to UV light from LEDs 536, thereby ensuring that insect trap 510 will continue to efficiently and effectively attract and trap insects.

In some embodiments, because trap portion 514 mounts on top of, and not in front of, base portion 512, insect trap 510 protrudes minimally from the wall when plugged into an ordinary household wall socket, and therefore intrudes minimally into the home environment. In some embodiments, insect trap 510 is configured such that when insect trap 510 is mounted to a wall, its overall depth, defined by the overall distance insect trap 510 protrudes from the wall, is smaller than its overall height and its overall width.

It should be appreciated that a benefit of insect trap 510 is the manipulation of light within trap portion 514. In some embodiments, light manipulation occurs solely within trap portion 514. Light manipulation may include reflection, refraction, polarization, dispersion and/or diffusion and is achieved by engaging with a manipulative element or surface (e.g., housing 516 and inside surfaces 530). In some embodiments, light manipulation produces an even distribution of light on an adhesive surface or adhesive coating. In some embodiments, light is manipulated to produce a predetermined pattern on the adhesive coating or within trap portion 514, for example, an even distribution, an even distribution with hot spots of higher intensity, hot spot patterns, and/or combinations thereof.

Any suitable adhesive material may be used as part of an adhesive surface for trapping an insect. In some embodiments, pressure sensitive adhesives such as acrylics, butyl rubber, natural rubber, nitriles, silicones, styrene block copolymers, styrene-ethylene/propylene, styrene-isoprene-styrene, vinyl ethers are used. Generally, the thickness of such adhesives will be in the range of approximately 0.01 mm to 1 mm. In some embodiments, the adhesive thickness is in the range of approximately 0.05 mm to 0.2 mm, with a thickness of approximately 0.1 mm being most often used.

In some embodiments, trap portion 514 is approximately 20 mm to 600 mm wide, 20 mm to 600 mm high and 5 mm to 150 mm deep. In some embodiments, trap portion 514 is approximately 20 mm to 200 mm wide, 20 mm to 200 mm high and 5 mm to 80 mm deep. In some embodiments, trap portion 514 is approximately 20 mm to 130 mm wide, 20 mm to 130 mm high and 5 mm to 50 mm deep.

In some embodiments, base portion 512 is approximately 20 mm to 600 mm wide, 10 mm to 150 mm high and 10 mm to 150 mm deep. In some embodiments, base portion 512 is 20 mm to 200 mm wide, 10 mm to 100 mm high and 10 mm to 80 mm deep. In some embodiments, base portion 512 is 20 mm to 130 mm wide, 10 mm to 50 mm high and 10 mm to 50 mm deep.

As provided herein, opening 526 and front opening 520 may be a variety of shapes and/or sizes. For example, opening 526 and front opening 520 may be circular, square, rectangular, polygonal and/or elliptical in shape. Alternatively, opening 526 and front opening 520 may be slots having straight, curved or undulating shapes or patterns. When opening 526 and front opening 520 are circular, opening 526 and front opening 520 may be approximately 0.5 mm to 30 mm in diameter. In some embodiments, circular opening 526 and circular front opening 520 are approximately 0.5 mm to 20 mm in diameter. In some embodiments, circular opening 526 and circular front opening 520 are approximately 0.5 mm to 15 mm in diameter. When opening 526 and front opening 520 are slot shaped, opening 526 and front opening 526 may be approximately 2 mm to 30 mm wide and 5 mm to 500 mm long. In some embodiments, slot shaped opening 526 and slot shaped front opening 520 are approximately 2 mm to 20 mm wide and 5 mm to 200 mm long. In some embodiments, slot shaped opening 526 and slot shaped front opening 520 are approximately 2 mm to 15 mm wide and 5 mm to 100 mm long.

In some embodiments, opening 526 covers all or a portion of front surface 562 of housing 516. For example, opening 526 may cover a range of approximately 1% to 75% of the surface area of front surface 562 of housing 516. In some embodiments, opening 526 covers approximately 5% to 50% of the surface area of front surface 562 of housing 516. In some embodiments, opening 526 covers approximately 10% to 30% of the surface area of front surface 562 of housing 516.

Figure 17:
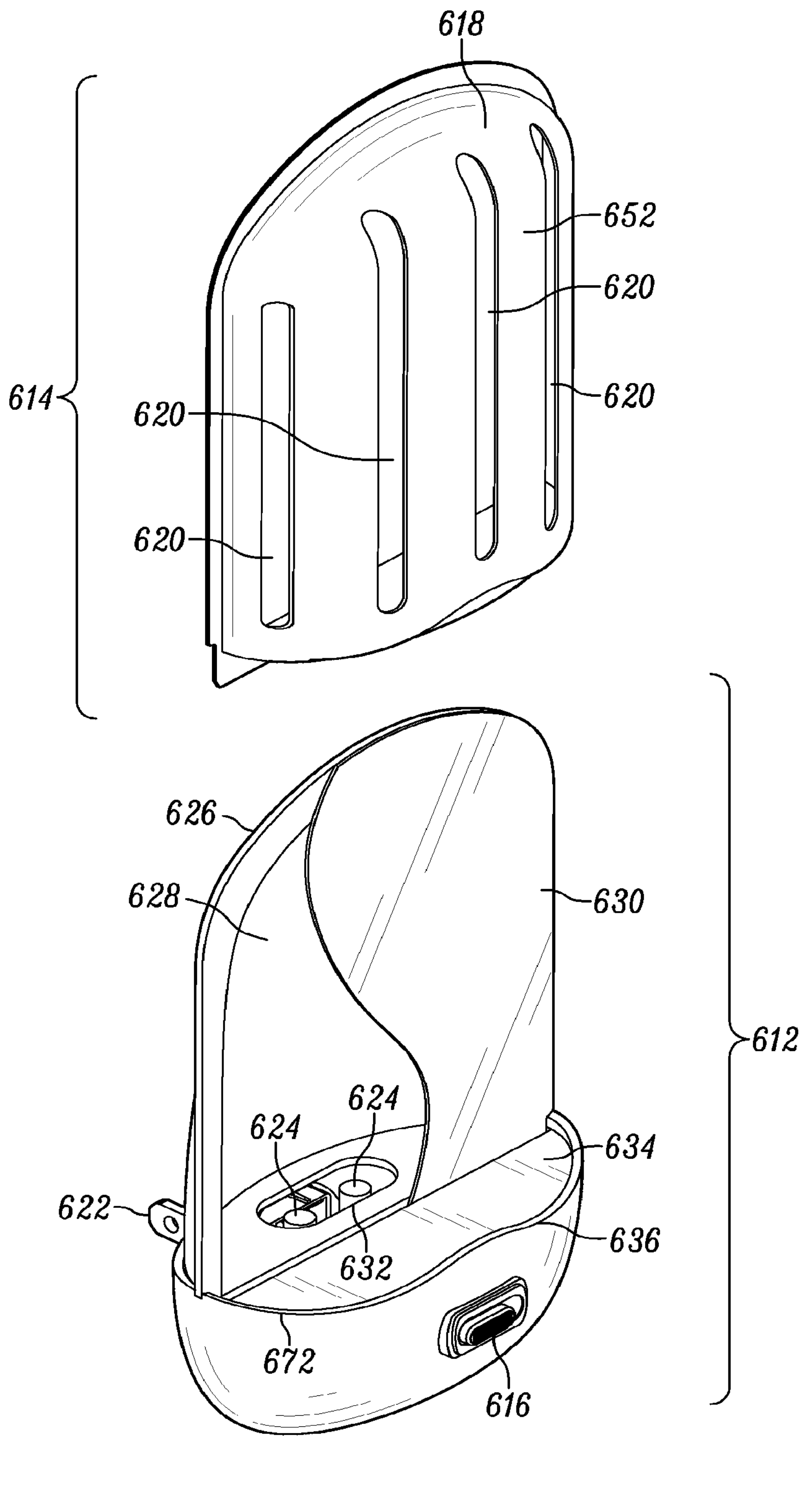
FIG. 17 is a front perspective view of a sixth embodiment of an insect trap in accordance with principles of the disclosure.

FIG. 17 is a front perspective view of a sixth embodiment of an insect trap, indicated generally at 610. Insect trap 610 includes a base portion 612 and a removable trap portion 614. Trap portion 614 is shown removed from base portion 612 in this view. In some embodiments, base portion 612 includes a switch 616, configurable to enable insect trap 610 to be turned on or off by closing or opening switch 616, as desired by the user. Alternatively, switch 616 may be configured to control other features such as light intensity, combinations of light wavelengths, different modes or frequencies of flickering light, an automatic setting that turns on when the room gets dark, or a remote control setting, for example. In some embodiments, switch 616 may be manually operated, although switch 616 may also be operated electrically, optically, electro-mechanically, electro-optically, or by any method for opening or closing switch 616. Trap portion 614 includes a front housing 618 with at least one opening 620 in a front surface 652. Opening 620 may be configured to admit a wide variety of insects into insect trap 610, or alternatively it may be configured to admit one or more specific insect species. Opening 620 may preferably be configured to prevent user's fingers from penetrating opening 620 and inadvertently touching trapped insects or adhesive when removing and replacing trap portion 614. Opening 620 may preferably have a size and shape such that a sphere 25 mm in diameter cannot pass through opening 620, and opening 620 may preferably have a size and shape such that a sphere 1 mm in diameter may pass through any portion of opening 620. Opening 620 may be of uniform or of varying width, shape and orientation, and if trap portion 614 has more than one opening 620, they may be of identical or of differing widths, shapes and orientations. Opening 620 may be configured to attract one or more individual insect species or a variety of insect species. Protruding from a rear surface 670 (shown in FIG. 18) of base portion 612 are a plurality of electrically conductive prongs 622, only one of which is shown, adapted to mount insect trap 610 to a wall and provide power to insect trap 610 by inserting conductive prongs 622 into a standard household electrical wall socket. Alternatively, base portion 612 may be configured to sit or hang wherever desired and receive power from batteries (not shown) mounted in base portion 612. While an electrical socket and batteries have been described as providing power to insect trap 610, any suitable power source may be used. Base portion 612 includes a lighting element such as one or more LEDs 624 and a rear housing 626, which includes a reflective-coated inside surface 628. In some embodiments, LEDs 624 include one that emits ultraviolet (UV) light and one that emits visible light. In some embodiments, LEDs 624 include at least one that emits UV light and at least one that emits blue light to better attract a wide variety of insect species. In some embodiments, the lighting element emits a combination of wavelengths to mimic sunlight. In some embodiments, LEDs 624 include at least one that emits infrared (IR) light to better attract certain species of insects such as mosquitos and fleas. In some embodiments, the material and surface finish of rear housing 626 may be configured to reflect and disperse UV and/or visible and/or IR light without a reflective coating. As shown, base portion 612 includes a transparent or translucent window 630, shown partially cut away to reveal LEDs 624. Window 630 protects inside surface 628 of rear housing 626 and LEDs 624 from dust and insect debris and allows base portion 612 to be easily cleaned. Window 630 may also be configured to polarize light transmitted through it in an orientation similar to that of daylight to further attract flying insects, a wide variety of which are known to detect polarized light. Window 630 may be attached at its perimeter (not shown) to rear housing 626 by any suitable manufacturing technique such as gluing or ultrasonic welding. In some embodiments, window 630 is removably attached to rear housing 626. Base portion 612 includes at least one opening 632. In some embodiments, on a perimeter 672 of a top surface 634 of base portion 612 is an upwardly directed rim or protrusions 636.

Figure 18:
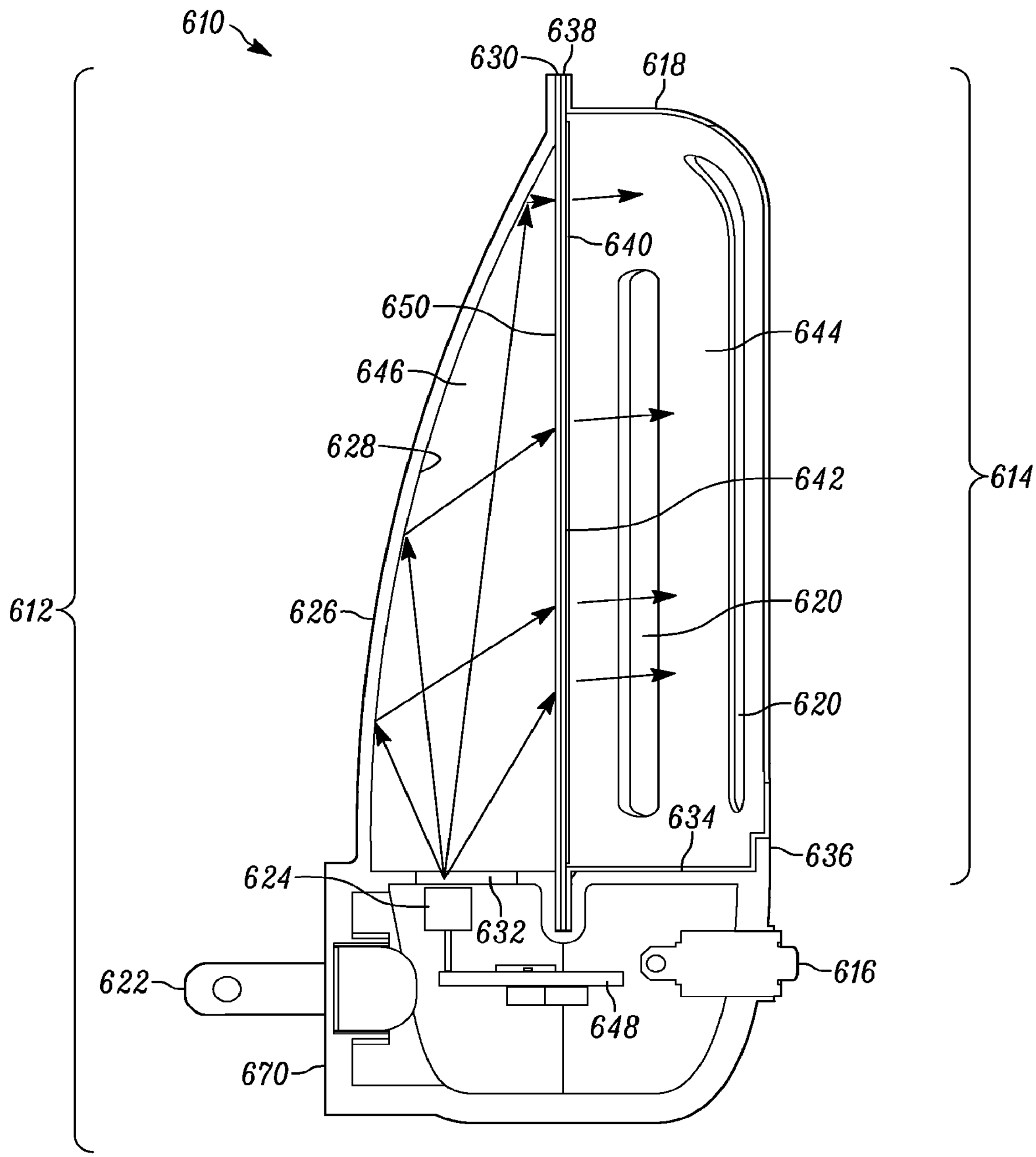
FIG. 18 is a cross-sectional view through the insect trap of FIG. 17.

FIG. 18 is a cross-sectional view of insect trap 610. Trap portion 614 includes front housing 618 with opening 620 and a back plate 638, which may be constructed of transparent or translucent material and coated with a transparent or translucent adhesive 640 on a front surface 642. In some embodiments, the material and thickness of back plate 638 and the material and thickness of adhesive 640 are selected to transmit a substantial proportion of the UV and/or visible and/or IR light, for example greater than 60% of the light is transmitted through back plate 638 and adhesive 640. In some embodiments, front housing 618 of trap portion 614 and rear housing 626 of base portion 612 are thermoformed from opaque plastic sheet, although other opaque, transparent or translucent materials such as paper, paperboard, cardboard or paper pulp may also be used. In some embodiments, front housing 618 and rear housing 626 are constructed by injection molding or by other suitable manufacturing techniques. Back plate 638 may also be configured to polarize light transmitted through it in an orientation similar to that of daylight to further attract flying insects, a wide variety of which are known to detect polarized light. Back plate 638 may have a rear surface (not shown), and may be substantially planar, although it may be formed into a convex, concave or saddle-shaped contour, or a combination of contours to optimize the even distribution of light. Alternatively, back plate 638 may have ribs or other features that increase the adhesive-coated surface area, produce alternating light/dark regions that some insect species find attractive, and enhance the transmission of insect-attracting light into trap portion 614. In some embodiments, front housing 618 is coated with transparent, translucent or opaque adhesive on an inside surface to provide additional insect trapping efficiency and capacity. In addition, front housing 618 may also have a reflective coating (not shown) underneath the adhesive coating on its inside surface to enhance its attraction to insects and further improve the insect trapping efficiency and effectiveness. Front housing 618 and back plate 638 may be joined together where they engage with adhesive, although they may also be joined by other commonly used packaging assembly techniques such as ultrasonic welding or RF sealing, or any other suitable assembly method. The materials of trap portion 614 may also include one or more insect attractants. For example, trap portion 614 may be impregnated with sorbitol, coleopteran attractants including brevicomin, dominicalure, frontalin, grandlure, ipsdienol, ipsenol, japonilure, lineatin, megatomoic acid, multistriatin, oryctalure, sulcatol, and trunc-call, dipteran attractants including ceralure, cue-lure, latilure, medlure, moguchun, muscalure, and trimedlure, homopteran attractants including rescalure, lepidopteran attractants such as disparlure, straight chain lepidopteran pheromones including codlelure, gossyplure, hexalure, litlure, looplure, orfralure, and ostramone, and other insect attractants such as eugenol, methyl eugenol, and siglure, or other substances to provide a scent that increases the insect-attracting efficiency of insect trap 610. In such embodiments, the insect attractant is integral to trap portion 610. Alternatively, the insect attractants may be embedded in a separate piece (not shown) that mounts on inside surface of front housing 618 or through opening 620 in front housing 618 or on front surface 642 of back plate 638. It is desirable for such attractants to be detectable by an insect for approximately a 2-meter radius from insect trap 610.

As shown, front housing 618 and back plate 638 form a front enclosure 644 in trap portion 614, and rear housing 626 and window 630 form a rear enclosure 646 in base portion 612. In some embodiments, base portion 612 includes a circuit board 648 having a programmable processor or chip (not shown) for executing commands, electrically connected to conductive prongs 622, switch 616 and LEDs 624, only one of which is shown. For clarity, however, not all of the electrical connections are shown. Circuit board 648 may include electronic circuitry to receive ordinary household current from conductive prongs 622, only one of which is shown, respond to the position of switch 616 and provide power to illuminate LEDs 624. Circuit board 648 may include a full wave rectifier circuit or any other circuit to provide steady voltage to LEDs 624, although it could also provide a varying voltage to LEDs 624 to provide a flickering light, which mimics movement that some insect species, including mosquitoes, may find attractive. For example, light flickering frequencies in the approximate range of 0.05 Hz (e.g., to mimic the breathing rate of mammals) to 270 Hz (e.g., the highest flicker frequency to attract male houseflies), may be desirable and the lighting element may be configured to flicker within this range. Circuit board 648 may provide power to LEDs 624 to provide both UV and visible light, although it could be configured to provide power to only UV LEDs 624 or to only visible light LEDs 624, or to only IR light LEDs 624, or to provide variable power to produce combinations of flickering UV and/or visible and/or IR light. In some embodiments, circuit board 648 may also be configured to drive a transmitter or transceiver such as a piezoelectric speaker or other device that may be mounted in base portion 612 to emit an insect-attracting sound. In some embodiments, the transmitter or transceiver may emit recorded and/or generated insect sounds or vibrations to better attract insects such as mosquitoes, midges, moths and flies, and may include one or more of insect call, reply, courtship and copulatory songs.

In some embodiments, the transmitter or transceiver may emit recorded and/or generated insect-attracting sounds or vibrations such as the heartbeat of a mammal. For example, the transmitter or transceiver may emit an insect-attracting sound or sounds having a frequency in the range of approximately 0.5 Hz (e.g., the heart rate of large mammals) to approximately 240 kHz (e.g., the highest frequency detectable by insects). In some embodiments, the frequency is in the range of approximately 5 Hz to 100 kHz. In some embodiments, the frequency is in the range of approximately 35 Hz to 50 Khz. It is desirable for such insect-attracting sound to be detectable by an insect within approximately a 2-meter distance from insect trap 610. It is desirable for such insect-attracting sound to be undetectable by a human beyond approximately a 1-meter distance from insect trap 610.

As shown, rim or protrusions 636 on top surface 634 of base portion 612 engage with trap portion 614 to secure it in place during use, although any other form of attachment may be substituted that allows trap portion 614 to be securely but removably mounted to base portion 612.

In the operation of insect trap 610, conductive prongs 622 are inserted into a wall electrical socket, and switch 616 is moved to a closed position. LEDs 624 emit light, preferably UV and visible light, represented by arrows, which transmit through opening 632 in base portion 612, into rear enclosure 646, and onto inside surface 628 of rear housing 626 and rear surface 650 of window 630. In some embodiments, light is not manipulated in base portion 612 and is emitted directly into trap portion 614. Inside surface 628 of rear housing 626 may include a concave shape and may be configured to reflect and disperse the light from LEDs 624 to distribute the light evenly onto rear surface 650 of window 630, although inside surface 628 of rear housing 626 may have a convex shape or a saddle shape or a combination of shapes, or may also have ribs or other features to more evenly distribute the light. Alternatively, an optical enhancer such as an anamorphic lens (not shown) or any other lens or combination of lenses configured to distribute light (e.g., evenly, according to specific patterns, at a focal point, etc.) onto rear surface 650 of window 630, may be mounted to base portion 612 at or near opening 632 in base portion 612, and may replace or augment the role of inside surface 628 of rear housing 626. Alternatively, the light from LEDs 624 may directly strike rear surface 650 of window 630 at an oblique angle (e.g., an acute angle from approximately 0° to 90°) and be spread across and through window 630 of base portion 612 and onto back plate 638 of trap portion 614, and may replace or augment the role of inside surface 628 of rear housing 626 or of the lens or lenses mounted to base portion 612. The light transmits through back plate 638 and adhesive 640 on front surface 642, and into front enclosure 644. The light may be further evenly distributed by light-diffusing properties of window 630 of base portion 612, back plate 638 of trap portion 614, adhesive 640 on front surface 642 of back plate 638, or any combination of window 630, back plate 638 and adhesive 640. A portion of the light entering front enclosure 644 continues through opening 620 in front housing 618 and is emitted into the area where insect trap 610 is installed. Insects are attracted to the light transmitted through adhesive 640 and through opening 620 in front housing 618, and fly or crawl through opening 620 and onto adhesive 640, where they become trapped. The user may observe trapped insects by looking through opening 620 in front housing 618. When a sufficient number of insects have been trapped, the user may easily remove and discard the entire used trap portion 614 without touching trapped insects, insect debris or adhesive, which remain out of reach inside trap portion 614, and replace it with a new trap portion 614. The new trap portion 614 has fresh adhesive-coated surfaces, ensuring that insect trap 610 will continue to efficiently and effectively attract and trap insects.

In some embodiments, because trap portion 614 mounts on top of, and not in front of, base portion 612, insect trap 610 protrudes minimally from the wall when plugged into an ordinary household wall socket, and therefore intrudes minimally into the home environment. In some embodiments, insect trap 610 is configured such that when insect trap 610 is mounted to a wall, its overall depth, defined by the overall distance insect trap 610 protrudes from the wall, is smaller than its overall height and its overall width.

It should be appreciated that a benefit of insect trap 610 is the manipulation of light within trap portion 614. In some embodiments, light manipulation occurs solely within trap portion 614. Light manipulation may include reflection, refraction, polarization, dispersion and/or diffusion and is achieved by engaging with a manipulative element or surface (e.g., inside surface 628, window 630, back plate 638 and adhesive 640). In some embodiments, light manipulation produces an even distribution of light on adhesive 640. In some embodiments, light is manipulated to produce a predetermined pattern on adhesive 640 or within trap portion 614, for example, an even distribution, an even distribution with hot spots of higher intensity, hot spot patterns, and/or combinations thereof.

Any suitable adhesive material may be used as part of an adhesive surface for trapping an insect. In some embodiments, pressure sensitive adhesives such as acrylics, butyl rubber, natural rubber, nitriles, silicones, styrene block copolymers, styrene-ethylene/propylene, styrene-isoprene-styrene, vinyl ethers may be used. Generally, the thickness of such adhesives will be in the range of approximately 0.01 mm to 1 mm. In some embodiments, the adhesive thickness is in the range of approximately 0.05 mm to 0.2 mm, with a thickness of approximately 0.1 mm being most often used.

Insect trap 610 of this configuration may accommodate a variety of different trap portions 614 that may be removably mounted to base portion 612, each trap portion 614 being uniquely configured to attract and trap a specific species or multiple species of insects. For example, the overall size and shape of trap portion 614, and the size, shape, location and orientation of opening 620 in front housing 618 of trap portion 614, may be uniquely configured to attract and trap a specific species or multiple species of insects. For example, in some embodiments, trap portion 614 is approximately 20 mm to 600 mm wide, 20 mm to 600 mm high and 5 mm to 150 mm deep. In some embodiments, trap portion 614 is approximately 20 mm to 200 mm wide, 20 mm to 200 mm high and 5 mm to 80 mm deep. In some embodiments, trap portion 614 is approximately 20 mm to 130 mm wide, 20 mm to 130 mm high and 5 mm to 50 mm deep.

In some embodiments, base portion 612 is approximately 20 mm to 600 mm wide, 10 mm to 150 mm high and 10 mm to 150 mm deep. In some embodiments, base portion 612 is 20 mm to 200 mm wide, 10 mm to 100 mm high and 10 mm to 80 mm deep. In some embodiments, base portion 612 is 20 mm to 130 mm wide, 10 mm to 50 mm high and 10 mm to 50 mm deep.

As provided herein, opening 620 may be a variety of shapes and/or sizes. For example, opening 620 may be circular, square, rectangular, polygonal and/or elliptical in shape. Alternatively, opening 620 may be a slot having straight, curved or undulating shapes or patterns. When opening 620 is circular, opening 620 may be approximately 0.5 mm to 30 mm in diameter. In some embodiments, circular opening 620 is approximately 0.5 mm to 20 mm in diameter. In some embodiments, circular opening 620 is approximately 0.5 mm to 15 mm in diameter. When opening 620 is slot shaped, opening 620 may be approximately 2 mm to 30 mm wide and 5 mm to 500 mm long. In some embodiments, slot shaped opening 620 is approximately 2 mm to 20 mm wide and 5 mm to 200 mm long. In some embodiments, slot shaped opening 620 is approximately 2 mm to 15 mm wide and 5 mm to 100 mm long.

In some embodiments, opening 620 covers all or a portion of front housing 618. For example, opening 620 may cover a range of approximately 1% to 75% of the surface area of front housing 618. In some embodiments, opening 620 covers approximately 5% to 50% of the surface area of front housing 618. In some embodiments, opening 620 covers approximately 10% to 30% of the surface area of front housing 618.

Figure 19:
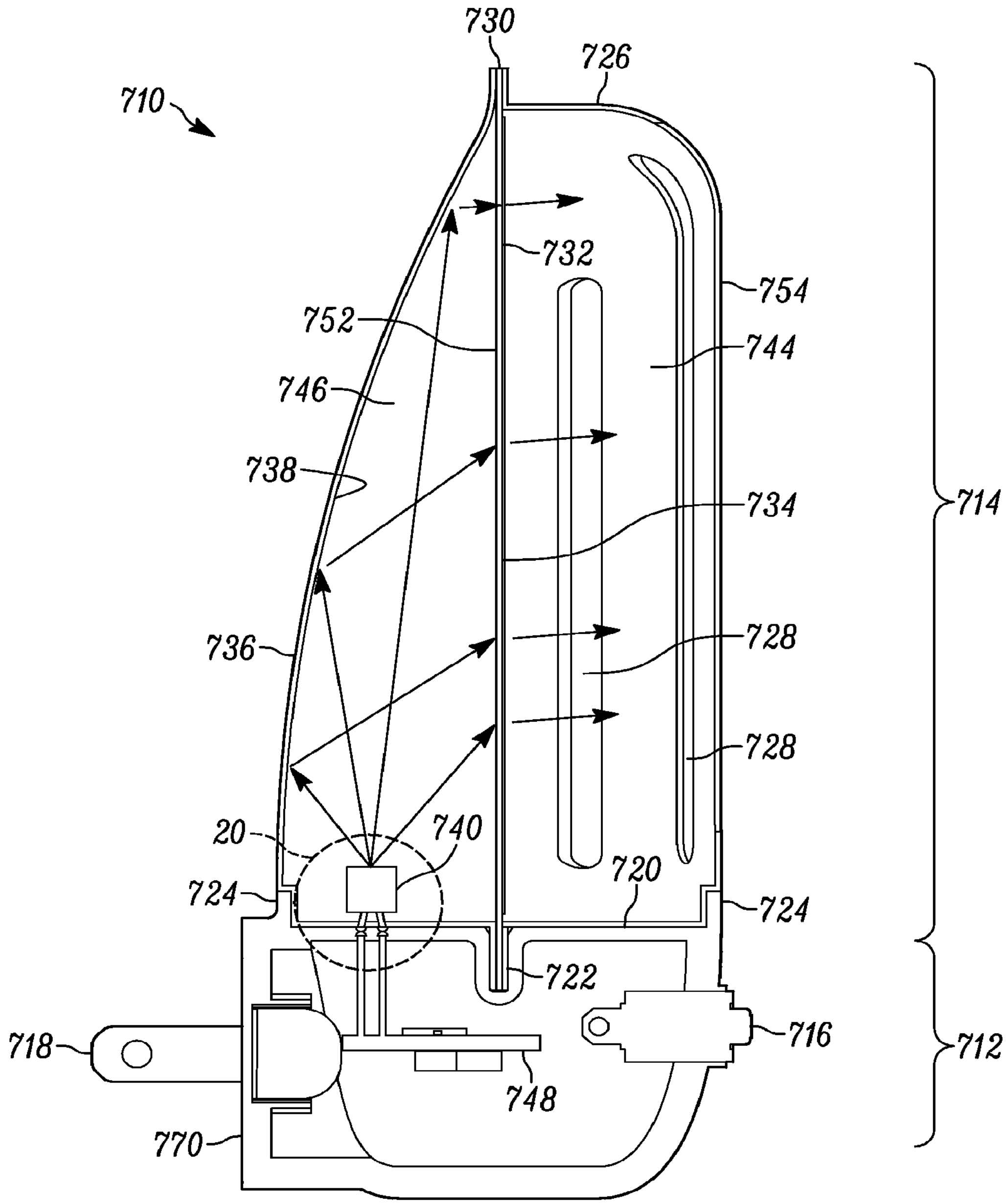
FIG. 19 is a cross-sectional view through a seventh embodiment of an insect trap in accordance with principles of the disclosure.
Figure 20:
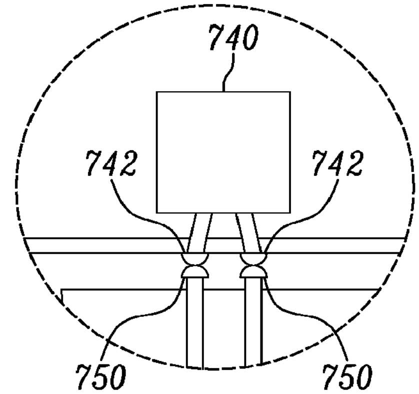
FIG. 20 is an enlarged view of a portion of FIG. 19.

FIG. 19 is a cross-sectional view of a seventh embodiment of an insect trap, indicated generally at 710, and FIG. 20 is an enlarged view of a portion of FIG. 19. Insect trap 710 includes a base portion 712 and a removable trap portion 714. As shown, base portion 712 includes a switch 716, configurable to enable insect trap 710 to be turned on or off by closing or opening switch 716, as desired by the user. Alternatively, switch 716 may be configured to control other features such as light intensity, combinations of light wavelengths, different modes or frequencies of flickering light, an automatic setting that turns on when the room gets dark, or a remote control setting, for example. Switch 716 may be manually operated, although switch 716 may also be operated electrically, optically, electro-mechanically, electro-optically, or by any method for opening or closing switch 716. Protruding from a rear surface 770 of base portion 712 are a plurality of electrically conductive prongs 718 (only one of which is shown in this view) adapted to mount insect trap 710 to a wall and provide power to insect trap 710 by inserting conductive prongs 718 into a standard household electrical wall socket. Alternatively, base portion 712 may be configured to sit or hang wherever desired and receive power from batteries (not shown) mounted in base portion 712. While an electrical socket and batteries have been described as providing power to insect trap 710, any suitable power source may be used. In some embodiments, a slot 722 is located in a top surface 720 of base portion 712, and an upwardly directed rim or protrusions 724 are located on a perimeter of top surface 720.

Trap portion 714 includes a front housing 726 with at least one opening 728 in a front surface 754, a divider 730, a rear housing 736, a lighting element such as one or more LEDs 740 (only one of which is shown), and electrical trap contacts 742. Opening 728 in front housing 726 may be configured to admit a wide variety of insects into insect trap 710, or alternatively it may be configured to admit one or more specific insect species. Opening 728 may preferably be configured to prevent user's fingers from penetrating opening 728 and inadvertently touching trapped insects or adhesive when removing and replacing trap portion 714. Opening 728 may preferably have a size and shape such that a sphere 25 mm in diameter cannot pass through opening 728. Opening 728 may preferably have a size and shape such that a sphere 1 mm in diameter may pass through any portion of opening 728. Opening 728 may be of uniform or of varying width, shape and orientation, and if trap portion 714 has more than one opening 728, they may be of identical or of differing widths, shapes and orientations. Opening 728 may be configured to attract one or more individual species or a variety of insect species. In some embodiments, divider 730 is constructed from transparent or translucent material and is coated with a transparent or translucent adhesive 732 on a front surface 734. In some embodiments, the material and thickness of divider 730 and the material and thickness of adhesive 732 are selected to transmit a substantial proportion of light, for example greater than 60% of the light is transmitted through divider 730 and adhesive 732. Divider 730 may also be configured to polarize light transmitted through it in an orientation similar to that of daylight to further attract flying insects, a wide variety of which are known to detect polarized light. In some embodiments, LEDs 740 include one that emits ultraviolet (UV) light and one that emits visible light. In some embodiments, LEDs 740 include at least one that emits UV light and at least one that emits blue light to better attract a wide variety of insect species. In some embodiments, the lighting element emits a combination of wavelengths to mimic sunlight. In some embodiments, LEDs 740 include at least one that emits infrared (IR) light to better attract certain species of insects such as mosquitos and fleas. As shown, there are two trap contacts 742 for each of LEDs 740. Thus, trap contacts 742 are electrically connected to their respective LEDs 740. While two trap contacts 742 are shown for each of LEDs 740, any suitable number may be used.

In some embodiments, rear housing 736 includes a reflective-coated inside surface 738. The material and surface finish of rear housing 736 may alternatively be configured to reflect and disperse UV and/or visible and/or IR light without a reflective coating. In some embodiments, front housing 726 and rear housing 736 are thermoformed from opaque sheet plastic, although other opaque, transparent or translucent materials such as paper, paperboard, cardboard or paper pulp may also be used. In some embodiments, front housing 726 and rear housing 736 are constructed by injection molding or by other suitable manufacturing techniques.

As shown, divider 730 may be substantially planar, and may be configured to be parallel to, or at an angle to the primary direction of the light produced by LEDs 740, although divider 730 may be formed into a convex, concave or saddle-shaped contour, or a combination of contours to optimize the even distribution of light. Alternatively, divider 730 may include ribs or other features that increase the adhesive-coated surface area, produce alternating light/dark regions that some insect species find attractive, and enhance the transmission of insect-attracting light into interior of trap portion 714. In some embodiments, front housing 726 is coated with transparent, translucent or opaque adhesive on an inside surface to provide additional insect trapping efficiency and capacity. In addition, front housing 726 may include a reflective coating underneath the adhesive coating on an inside surface to enhance its attraction to insects and further improve the insect trapping efficiency and effectiveness. Front housing 726, divider 730 and rear housing 736 may be joined together where they intersect or engage with adhesive, although they may also be joined by other commonly used packaging assembly techniques such as ultrasonic welding or RF sealing, or any other suitable assembly method. The materials of trap portion 714 may also include one or more insect attractants. For example, trap portion 714 may be impregnated with sorbitol, coleopteran attractants including brevicomin, dominicalure, frontalin, grandlure, ipsdienol, ipsenol, japonilure, lineatin, megatomoic acid, multistriatin, oryctalure, sulcatol, and trunc-call, dipteran attractants including ceralure, cue-lure, latilure, medlure, moguchun, muscalure, and trimedlure, homopteran attractants including rescalure, lepidopteran attractants such as disparlure, straight chain lepidopteran pheromones including codlelure, gossyplure, hexalure, litlure, looplure, orfralure, and ostramone, and other insect attractants such as eugenol, methyl eugenol, and siglure, or other substances to provide a scent that increases the insect-attracting efficiency of insect trap 710. In such embodiments, the insect attractant is integral to trap portion 714. Alternatively, the insect attractants may be embedded in a separate piece (not shown) that mounts on an inside surface of front housing 726 or through opening 728 in front housing 726 or on front surface 734 of divider 730. It is desirable for such attractants to be detectable by an insect for approximately a 2-meter radius from insect trap 710. As shown, divider 730 has a rear surface 752, and separates trap portion 714 into a front enclosure 744 and a rear enclosure 746.

In some embodiments, base portion 712 includes electrical base contacts 750 and a circuit board 748 having a programmable processor or chip (not shown) for executing commands, electrically connected to conductive prongs 718, switch 716, and base contacts 750. For clarity, however, not all of the electrical connections are shown. While two base contacts 750 are shown in base portion 712 for each of LEDs 740 in trap portion 714, any suitable number may be used. Base contacts 750 may be configured to provide an electrical connection with trap contacts 742 when trap portion 714 is removably mounted to base portion 712. Circuit board 748 may include electronic circuitry to receive ordinary household current from conductive prongs 718, respond to the position of switch 716 and provide power to base contacts 750, which, in turn, provide power to trap contacts 742 and illuminate LEDs 740 in trap portion 714 when trap portion 714 is mounted to base portion 712. In some embodiments, circuit board 748 includes an energy stabilizer such as a full wave rectifier circuit or any other circuit to provide steady voltage to LEDs 740, although it could also provide a varying voltage to LEDs 740 to provide a flickering light, which mimics movement that some insect species, including mosquitoes, may find attractive. For example, light flickering frequencies in the approximate range of 0.05 Hz (e.g., to mimic the breathing rate of mammals) to 270 Hz (e.g., the highest flicker frequency to attract male houseflies), may be desirable and the lighting element may be configured to flicker within this range. Circuit board 748 may provide power to LEDs 740 to provide UV and/or visible and/or IR light, although it could be configured to provide power to only UV LEDs 740 or to only visible light LEDs 740 or to only IR LEDs 740, or to provide variable power to produce combinations of flickering UV and/or visible and/or IR light. In some embodiments, circuit board 748 may also be configured to drive a transmitter or transceiver such as a piezoelectric speaker or other device that may be mounted in base portion 712 to emit an insect-attracting sound. In some embodiments, the transmitter or transceiver may emit recorded and/or generated insect sounds or vibrations to better attract insects such as mosquitoes, midges, moths and flies, and may include one or more of insect call, reply, courtship and copulatory songs. In some embodiments, the transmitter or transceiver may emit recorded and/or generated insect-attracting sounds or vibrations such as the heartbeat of a mammal. For example, the transmitter or transceiver may emit an insect-attracting sound or sounds having a frequency in the range of approximately 0.5 Hz (e.g., the heart rate of large mammals) to approximately 240 kHz (e.g., the highest frequency detectable by insects). In some embodiments, the frequency is in the range of approximately 5 Hz to 100 kHz. In some embodiments, the frequency is in the range of approximately 35 Hz to 50 Khz. It is desirable for such insect-attracting sound to be detectable by an insect within approximately a 2-meter distance from insect trap 710. It is desirable for such insect-attracting sound to be undetectable by a human beyond approximately a 1-meter distance from insect trap 710.

Slot 722 and protrusions 724 in top surface 720 of base portion 712 are configured to engage with trap portion 714 to secure it in place during use, although any other form of attachment may be substituted that allows trap portion 714 to be securely but removably mounted to base portion 712.

In the operation of insect trap 710, conductive prongs 718 are inserted into a wall electrical socket, switch 716 is moved to a closed position, and trap portion 714 is mounted to base portion 712. LEDs 740 emit light, represented by arrows, which transmit light into rear enclosure 746, and onto inside surface 738 of rear housing 736 and rear surface 752 of divider 730. In some embodiments, light is not manipulated in base portion 712 and is emitted directly into trap portion 714. Inside surface 738 of rear housing 736 may be a concave shape and configured to reflect and disperse light from LEDs 740 to distribute the light evenly onto rear surface 752 of divider 730, although the shape of inside surface 738 of rear housing 736 may have a convex shape or a saddle shape or a combination of shapes, or may also have ribs (not shown) or other features to more evenly distribute the light. Alternatively, an optical enhancer such as an anamorphic lens (not shown) or any other lens or combination of lenses configured to distribute light (e.g., evenly, according to specific patterns, at a focal point, etc.) onto rear surface 752 of divider 730, may be mounted to rear housing 736 proximate to or above LEDs 740 or may be mounted to LEDs 740, and may replace or augment the role of inside surface 738 of rear housing 736. Alternatively, the light from LEDs 740 may directly strike rear surface 752 of divider 730 at an oblique angle (e.g., an acute angle from approximately 0° to 90°) and may be spread across divider 730, and may replace or augment the role of inside surface 738 of rear housing 736, or of the lens or lenses mounted to rear housing 736 or to LEDs 740. The light may transmit through divider 730 and adhesive 732 on front surface 734, and into front enclosure 744. The light may be further evenly distributed by the light-diffusing properties of divider 730, adhesive 732 on front surface 734, or both. A portion of the light entering front enclosure 744 continues through opening 728 in front housing 726 and is emitted into the area where insect trap 710 is installed. Insects are attracted to the light transmitted through adhesive 732 and through opening 728 in front housing 726, and fly or crawl into opening 728 and onto adhesive 732, where they become trapped. The user may observe trapped insects by looking through opening 728 in front housing 726. When a sufficient number of insects have been trapped, the user may easily remove and discard the entire used trap portion 714 without touching trapped insects, insect debris or adhesive, which remain out of reach inside trap portion 714, and replace it with a new trap portion 714. The new trap portion 714 has fresh adhesive-coated surfaces and light-directing surfaces, ensuring that insect trap 710 will continue to efficiently and effectively attract and trap insects.

In some embodiments, because trap portion 714 mounts on top of, and not in front of, base portion 712, insect trap 710 protrudes minimally from the wall when plugged into an ordinary household wall socket, and therefore intrudes minimally into the home environment. In some embodiments, insect trap 710 is configured such that when insect trap 710 is mounted to a wall, its overall depth, defined by the overall distance insect trap 710 protrudes from the wall, is smaller than its overall height and its overall width.

It should be appreciated that a benefit of insect trap 710 is the manipulation of light within trap portion 714. In some embodiments, light manipulation occurs solely within trap portion 714. Light manipulation may include reflection, refraction, polarization, dispersion and/or diffusion and is achieved by engaging with a manipulative element or surface (e.g., inside surface 738, divider 730 and adhesive 732). In some embodiments, light manipulation produces an even distribution of light on an adhesive surface or adhesive coating. In some embodiments, light is manipulated to produce a predetermined pattern on the adhesive coating or within trap portion 714, for example, an even distribution, an even distribution with hot spots of higher intensity, hot spot patterns, and/or combinations thereof.

Any suitable adhesive material may be used as part of an adhesive surface for trapping an insect. In some embodiments, pressure sensitive adhesives such as acrylics, butyl rubber, natural rubber, nitriles, silicones, styrene block copolymers, styrene-ethylene/propylene, styrene-isoprene-styrene, vinyl ethers may be used. Generally, the thickness of such adhesives will be in the range of approximately 0.01 mm to 1 mm. In some embodiments, the adhesive thickness is in the range of approximately 0.05 mm to 0.2 mm, with a thickness of approximately 0.1 mm being most often used.

An insect trap 710 of this configuration may accommodate a variety of different trap portions 714 that may be removably mounted to base portion 712, each trap portion 714 being uniquely configured to attract and trap a specific species or multiple species of insects. For example, the overall size and shape of trap portion 714, the size, shape, location and orientation of opening 728 in front housing 726 of trap portion 714, and the wavelength and intensity of LEDs 740 may be uniquely configured to attract and trap a specific species or multiple species of insects. For example, in some embodiments, trap portion 714 is approximately 20 mm to 600 mm wide, 20 mm to 600 mm high and 5 mm to 150 mm deep. In some embodiments, trap portion 714 is approximately 20 mm to 200 mm wide, 20 mm to 200 mm high and 5 mm to 80 mm deep. In some embodiments, trap portion 714 is approximately 20 mm to 130 mm wide, 20 mm to 130 mm high and 5 mm to 50 mm deep.

In some embodiments, base portion 712 is approximately 20 mm to 600 mm wide, 10 mm to 150 mm high and 10 mm to 150 mm deep. In some embodiments, base portion 712 is 20 mm to 200 mm wide, 10 mm to 100 mm high and 10 mm to 80 mm deep. In some embodiments, base portion 712 is 20 mm to 130 mm wide, 10 mm to 50 mm high and 10 mm to 50 mm deep.

As provided herein, opening 728 may be a variety of shapes and/or sizes. For example, opening 728 may be circular, square, rectangular, polygonal and/or elliptical in shape. Alternatively, opening 728 may be slot shaped having straight, curved or undulating shapes or patterns. When opening 728 is circular, opening 728 may be approximately 0.5 mm to 30 mm in diameter. In some embodiments, circular opening 728 is approximately 0.5 mm to 20 mm in diameter. In some embodiments, circular opening 728 is approximately 0.5 mm to 15 mm in diameter. When opening 728 is slot shaped, opening 728 may be approximately 2 mm to 30 mm wide and 5 mm to 500 mm long. In some embodiments, slot shaped opening 728 is approximately 2 mm to 20 mm wide and 5 mm to 200 mm long. In some embodiments, slot shaped opening 728 is approximately 2 mm to 15 mm wide and 5 mm to 100 mm long.

In some embodiments, opening 728 covers all or a portion of front housing 726. For example, opening 728 may cover a range of approximately 1% to 75% of the surface area of front housing 726. In some embodiments, opening 728 covers approximately 5% to 50% of the surface area of front housing 726. In some embodiments, opening 728 covers approximately 10% to 30% of the surface area of front housing 726.

Figure 21:
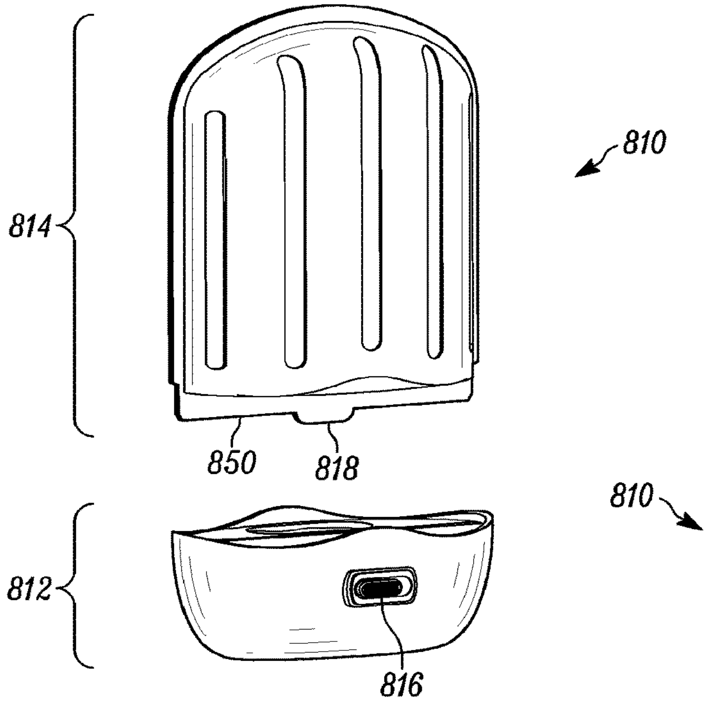
FIG. 21 is a front perspective view of an eighth embodiment of an insect trap in accordance with principles of the disclosure.

FIG. 21 is a front perspective view of an eighth embodiment of an insect trap, indicated generally at 810. Insect trap 810 includes a trap portion 814 and a base portion 812. Trap portion 814 is shown removed from base portion 812 in this view. In some embodiments, trap portion 814 includes an engageable portion 818 protruding downward from a bottom surface 850. However, engageable portion 818 does not need to protrude from trap portion 814. Engageable portion 818 may be a non-protruding portion of a flush bottom surface of trap portion 814 that engages at least partially with base portion 812. Base portion 812 may have a corresponding opening 824 (shown in FIG. 23) to receive engageable portion 818 when trap portion 814 is mounted to base portion 812. Opening 824 may preferably be configured such that the user's finger cannot pass through opening 824. Opening 824 may preferably be configured such that a sphere 10 mm in diameter cannot pass through opening 824. As shown, base portion 812 includes a switch 816.

Figure 22:
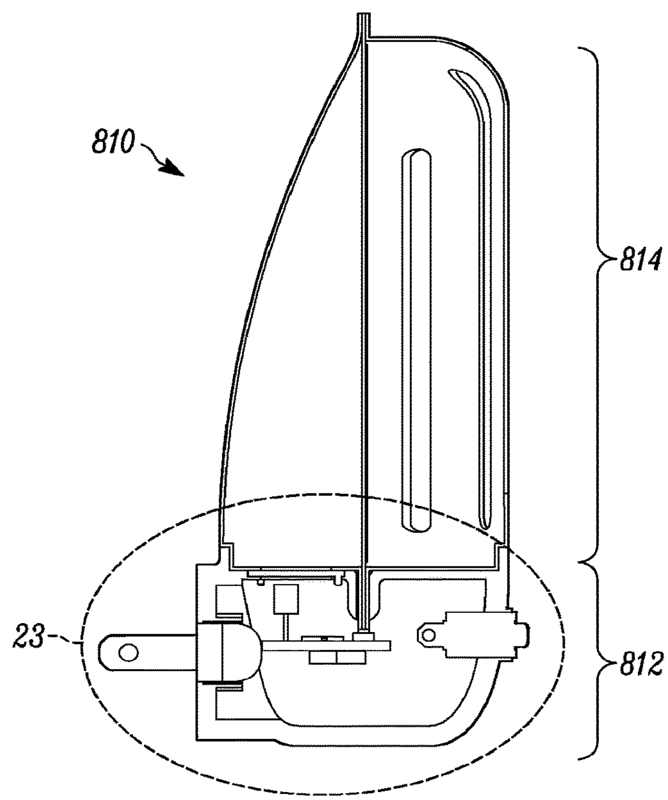
FIG. 22 is a cross sectional view of the insect trap of FIG. 21.
Figure 23:
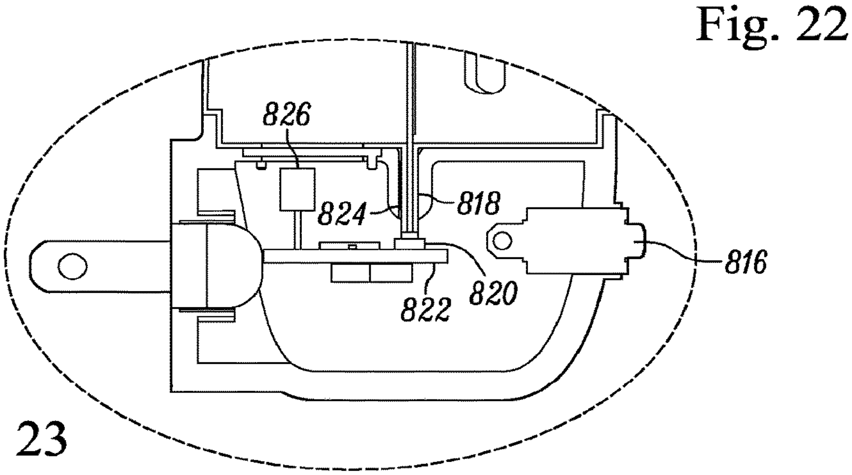
FIG. 23 is an enlarged view of a portion of FIG. 22.

FIG. 22 is a cross sectional view of insect trap 810 and FIG. 23 is an enlarged view of a portion of FIG. 22. Base portion 812 may include a circuit board 822, a docking switch 820, and one or more LEDs 826, only one of which is shown. Although docking switch 820 is shown mounted on circuit board 822, docking switch 820 may also be mounted directly to base portion 812. In some embodiments, LEDs 826 may include one or more that emits ultraviolet (UV) light and one or more that emits visible light to better attract a wide variety of insect species. In some embodiments, the lighting element emits a combination of wavelengths to mimic sunlight. In some embodiments, one or more of LEDs 826 may emit infrared (IR) light to better attract certain types of insects such as mosquitos and fleas. In some embodiments, circuit board 822 has a programmable processor or chip (not shown) for executing commands, and is configured to provide power and instructions to desired components (e.g., switch 816, LEDs 826, etc.). For clarity, however, not all of the electrical connections are shown. In some embodiments, circuit board 822 includes a docking switch 820 mounted thereon.

Engageable portion 818 of trap portion 814 engages docking switch 820 when trap portion 814 is mounted to base portion 812. Docking switch 820 may be configured to close when engageable portion 818 of trap portion 814 engages with it, as when trap portion 814 is mounted to base portion 812, and may be configured to open when engageable portion 818 of trap portion 814 is lifted from docking switch 820, as when trap portion 814 is removed from base portion 812. Docking switch 820 may be configured to activate in response to force or pressure from engageable portion 818 on trap portion 814. Alternatively, docking switch 820 may be configured to activate in response to displacement by engageable portion 818 on trap portion 814. Alternatively, docking switch 820 may be configured as an optical switch to close when a light beam is broken by the engageable portion 818 of trap portion 814, or may be configured as a Hall effect sensor to close when in proximity to a magnet on trap portion 814, or may be configured as any other switch or sensor that opens or closes when trap portion 814 is mounted or removed from base portion 812. Docking switch 820 may be electrically connected to circuit board 822 and/or switch 816 to deactivate UV and/or visible light and/or IR LEDs 826 when trap portion 814 is removed from base portion 812, thereby preventing the user from looking directly at the UV and/or visible and/or IR light from LEDs 826 as well as reducing energy consumption. Alternatively, docking switch 820 may be electrically connected to circuit board 822 and/or switch 816 to deactivate only UV LEDs 826 and/or IR LEDs 826 and/or visible light LEDs 826 when trap portion 814 is removed from base portion 812.

Figure 24:
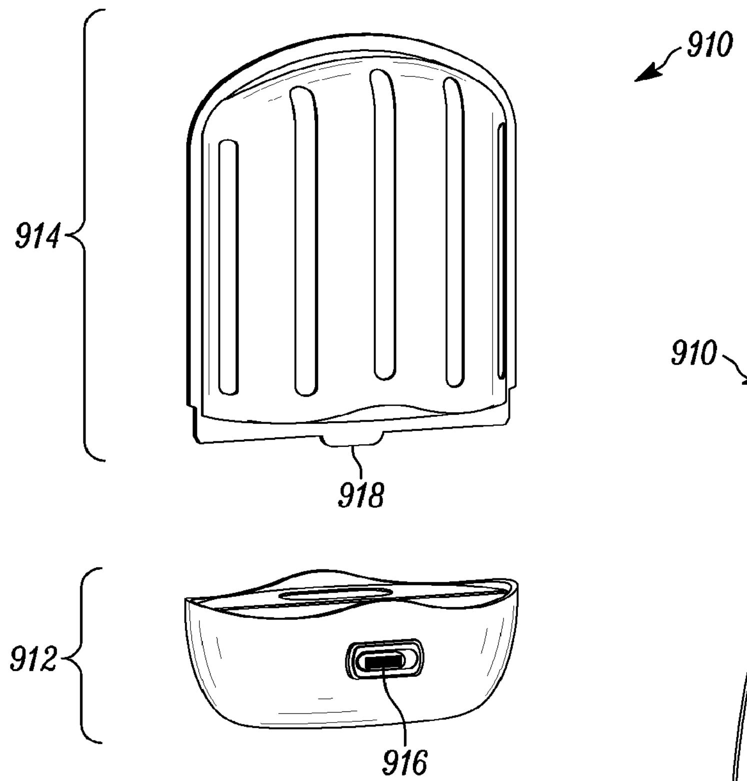
FIG. 24 is a front perspective view of a ninth embodiment of an insect trap in accordance with principles of the disclosure.

FIG. 24 is a front perspective view of a ninth embodiment of an insect trap, indicated generally at 910. Insect trap 910 includes a trap portion 914 and a base portion 912. Trap portion 914 is shown removed from base portion 912 in this view. In some embodiments, trap portion 914 includes an engageable portion 918 protruding downward from a bottom surface (not shown). However, engageable portion 918 does not need to protrude from trap portion 914. Engageable portion 918 may be a non-protruding portion of a flush bottom surface of trap portion 914 that engages at least partially with base portion 912. Base portion 912 may have a corresponding opening 924 (shown in FIG. 26), to receive engageable portion 918 when trap portion 914 is mounted to base portion 912. Opening 924 may preferably be configured such that a user's finger cannot pass through opening 924. Opening 924 may preferably be configured such that a sphere 10 mm in diameter cannot pass through opening 924. As shown, base portion 912 may also have a switch 916.

Figure 25:
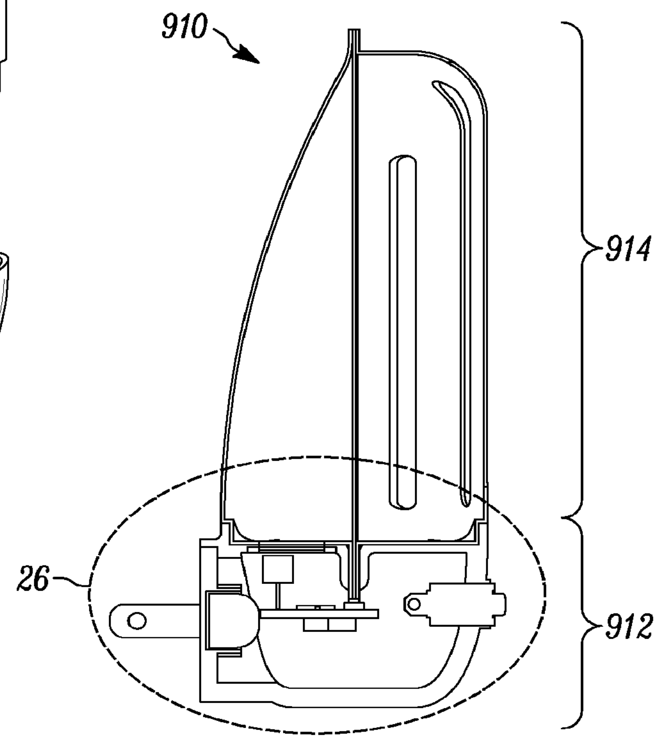
FIG. 25 is a cross sectional view of the insect trap of FIG. 24.
Figure 26:
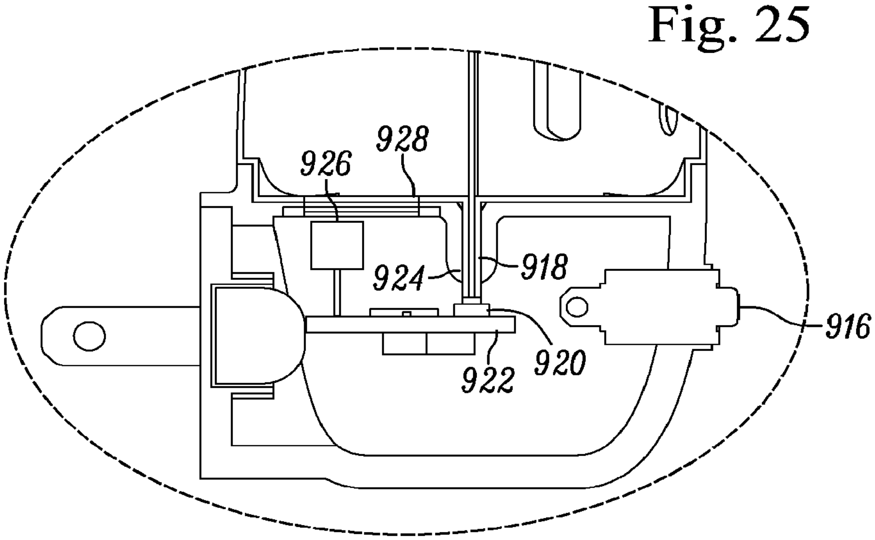
FIG. 26 is an enlarged view of a portion of FIG. 25.

FIG. 25 is a cross sectional view of insect trap 910 and FIG. 26 is an enlarged view of a portion of FIG. 25. Base portion 912 may include a circuit board 922, a docking switch 920, and one or more LEDs 926, only one of which is shown. Although docking switch 920 is shown mounted on circuit board 922, docking switch 920 may also be mounted directly to base portion 912. In some embodiments, LEDs 926 may include one or more that emits ultraviolet (UV) light and one or more that emits visible light, preferably blue light to better attract a wide variety of insect species. In some embodiments, the lighting element emits a combination of wavelengths to mimic sunlight. In some embodiments, one or more of LEDs 926 may emit infrared (IR) light to better attract certain types of insects such as mosquitos and fleas. In some embodiments, circuit board 922 has a programmable processor or chip (not shown) for executing commands, and is configured to provide power and instructions to desired components (e.g., switch 916, LEDs 926, etc.). For clarity, however, not all of the electrical connections are shown. Base portion 912 may include a screen 928. Engageable portion 918 on trap portion 914 engages docking switch 920 when trap portion 914 is mounted to base portion 912. Docking switch 920 may be configured to close when engageable portion 918 on trap portion 914 engages with it, as when trap portion 914 is mounted to base portion 912, and may be configured to open when engageable portion 918 of trap portion 914 is lifted from docking switch 920, as when trap portion 914 is removed from base portion 912. Docking switch 920 may be configured to activate in response to force or pressure from engageable portion 918 on trap portion 914. Alternatively, docking switch 920 may be configured to activate in response to displacement by engageable portion 918 on trap portion 914. Alternatively, docking switch 920 may be configured as an optical switch to close when a light beam is broken by engageable portion 918 of trap portion 914, or may be configured as a Hall effect sensor to close when in proximity to a magnet on trap portion 914, or may be configured as any other switch or sensor that opens or closes when trap portion 914 is mounted or removed from base portion 912. Docking switch 920 may be electrically connected to circuit board 922 and/or switch 916. Circuit board 922 may be electrically connected to one or more UV and/or visible light and/or IR LEDs 926, only one of which is shown, and may also be electrically connected to screen 928, and may activate screen 928 when docking switch 920 is closed. In some embodiments, screen 928 may use liquid crystal (LC) technology and be configured to block all or a portion of the light from UV and/or visible and/or IR light LEDs 926 when screen 928 is activated, thereby preventing the user from looking directly at the UV and/or visible and/or IR light from LEDs 926 as well as reducing energy consumption. In some embodiments, when activated, screen 928 may be configured to block all or a portion of the light from only UV LEDs 926, or all or a portion of the light from only visible light LEDs 926, or all or a portion of the light from only IR LEDs 926, or any combination of UV, visible light, and IR LEDs 926. In some embodiments, screen 928 may use an electric motor, or a solenoid, or a magnetostrictive actuator, or a piezoelectric actuator, or one or more of a variety of electromechanical methods to close a shutter and block all or a portion of the light from UV LEDs 926, or the light from visible light LEDs 926, or the light from IR LEDs 926, or the light from any combination of UV, visible light, and IR LEDs 926. Alternatively, screen 928 may be configured to be actuated mechanically by engageable portion 918 of trap portion 914 to close a shutter in screen 928 and block all or a portion of the light from UV and/or visible light and/or IR LEDs 926 when trap portion 914 is removed from base portion 912.

Figure 27:
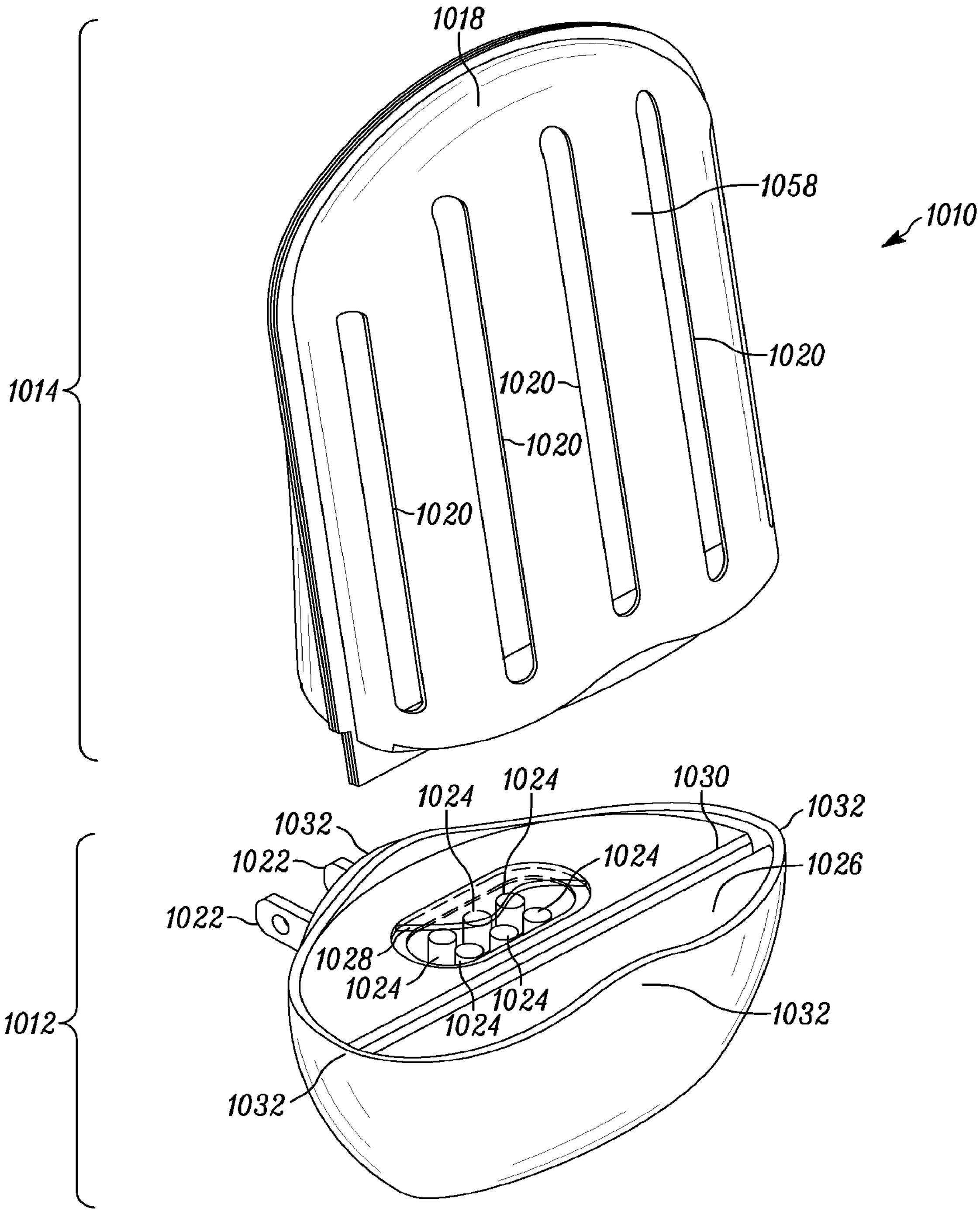
FIG. 27 is a front perspective view of a tenth embodiment of an insect trap in accordance with principles of the disclosure.

FIG. 27 is a front perspective view of a tenth embodiment of an insect trap, indicated generally at 1010. Insect trap 1010 includes a base portion 1012 and a removable trap portion 1014. Trap portion 1014 is shown removed from base portion 1012 in this view. Trap portion 1014 includes a front housing 1018 with at least one opening 1020 in a front surface 1058. Opening 1020 in front housing 1018 may be configured to admit a wide variety of insects into insect trap 1010, or alternatively it may be configured to admit one or more specific insect species. In some embodiments, opening 1020 is configured to prevent the user's fingers from penetrating opening 1020 and inadvertently touching trapped insects or adhesive when removing and replacing trap portion 1014. In some embodiments, opening 1020 has a size and shape such that a sphere 25 mm in diameter cannot pass through opening 1020, and has a size and shape such that a sphere 1 mm in diameter can pass through any portion of opening 1020. Opening 1020 may be of uniform or of varying width, shape and orientation, and if trap portion 1014 has more than one opening 1020, they may be of identical or of differing widths, shapes and orientations. Opening 1020 may be configured to attract one or more individual insect species or a variety of insect species.

Protruding from a rear surface 1060 (shown in FIG. 28) of base portion 1012 are a plurality of electrically conductive prongs 1022, adapted to mount insect trap 1010 to a wall and provide power to insect trap 1010 by inserting conductive prongs 1022 into a standard household electrical wall socket. Alternatively, base portion 1012 may be configured to sit or hang wherever desired and receive power from batteries (not shown) mounted in base portion 1012. While an electrical socket and batteries have been described as providing power to insect trap 1010, any suitable power source may be used. Base portion 1012 includes a lighting element such as one or more LEDs 1024. In some embodiments, base portion 1012 includes an array of LEDs 1024. As shown, LEDs 1024 are configured in a 2 by 3 array of blue and UV LEDS 1024, although different array configurations with different numbers and arrangements (e.g., a 3 by 2 array or a 4 by 3 array or a 1 by 2 array, for example) of LEDs 1024, LEDs 1024 emitting different wavelengths of light, and different combinations of LEDs 1024 emitting different wavelengths of light, could also be used. In some embodiments, LEDs 1024 include at least one that emits UV light and at least one that emits visible light. In some embodiments, LEDs 1024 include at least one that emits UV light and at least one that emits blue light to better attract a wide variety of insect species. In some embodiments, the lighting element emits a combination of wavelengths to mimic sunlight. In some embodiments, LEDs 1024 include at least one that emits infrared (IR) light to better attract certain species of insects including mosquitos. Mounted in a top surface 1026 of base portion 1012 may be a transparent or translucent window 1028, shown partially cut away to reveal LEDs 1024. Window 1028 protects LEDs 1024 from dust and insect debris, and allows base portion 1012 to be easily cleaned. In top surface 1026 may be a slot 1030, and on the perimeter of top surface 1026 is a rim or upwardly directed protrusions 1032.

Figure 28:
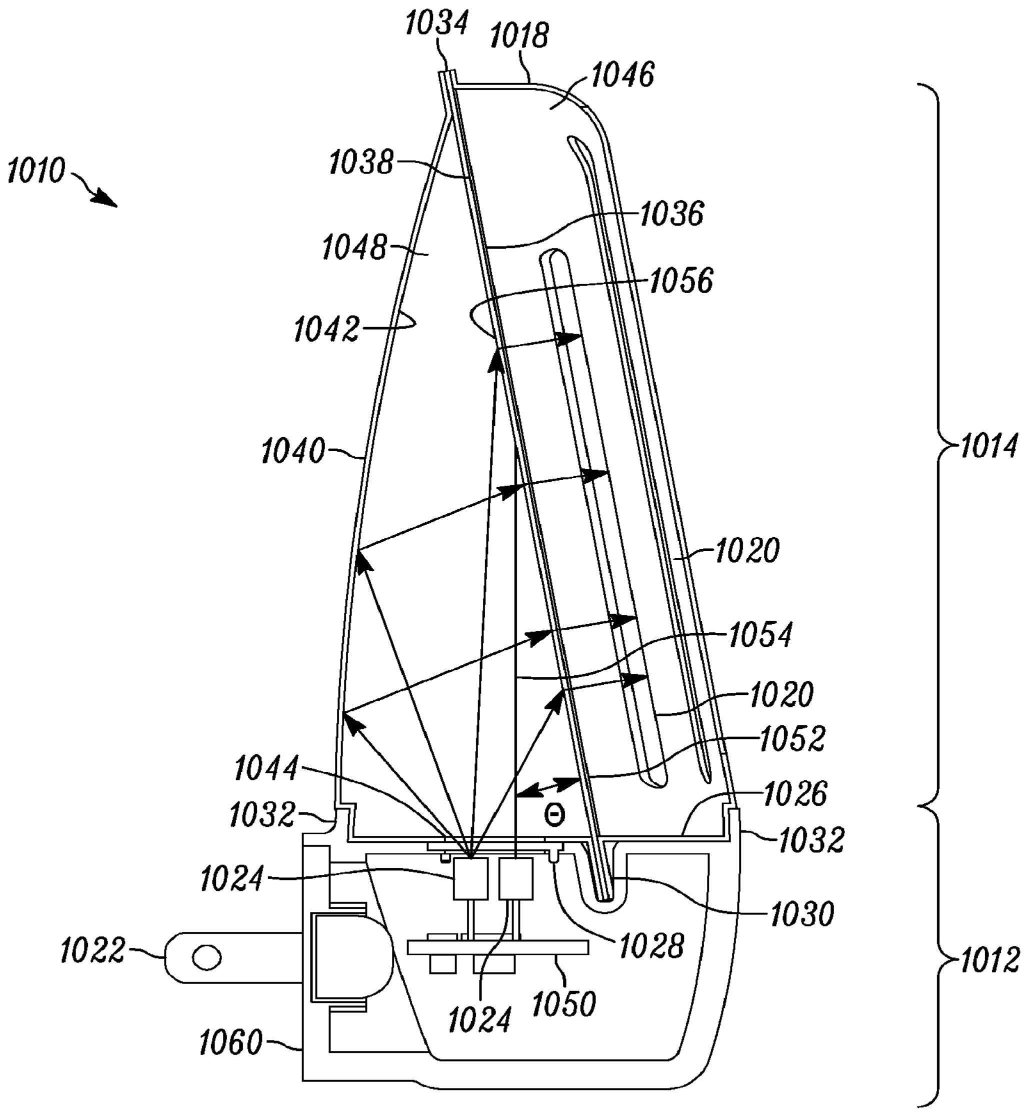
FIG. 28 is a cross-sectional view through the insect trap of FIG. 27.

FIG. 28 is a cross-sectional view through insect trap 1010. In some embodiments, the light emitted from each of LEDs 1024 has a primary direction 1054. Trap portion 1014 includes a divider 1034 with a front surface 1038, and a rear housing 1040. In some embodiments, divider 1034 is constructed from or includes a transparent or translucent material and may be coated with a transparent or translucent adhesive 1036 on front surface 1038. In some embodiments, divider 1034 is configured to polarize light transmitted through it in an orientation similar to that of daylight to further attract flying insects, a wide variety of which are known to detect polarized light. In some embodiments, the material and thickness of divider 1034 and the material and thickness of adhesive 1036 are selected to transmit a substantial proportion of the UV and/or visible and/or IR light, for example greater than 60% of the light is transmitted through divider 1034 and adhesive 1036. In some embodiments, rear housing 1040 includes a reflective-coated inside surface 1042. Alternatively, the material and surface finish of rear housing 1040 may be configured to reflect and disperse UV and/or visible and/or IR light without a reflective coating. Rear housing 1040 may include an opening 1044 on its bottom surface, or alternatively opening 1044 may be replaced by a transparent or translucent window (not shown).

In some embodiments, front housing 1018 and rear housing 1040 are thermoformed from opaque sheet plastic, creating a clean and aesthetically pleasing shape while maintaining low cost and disposability. Alternatively, other opaque, transparent or translucent materials such as paper, paperboard, cardboard or paper pulp may also be used. In some embodiments, front housing 1018 and rear housing 1040 are constructed by injection molding, casting or by other suitable manufacturing techniques. As shown, divider 1034 is substantially planar, and may be configured to be parallel to, or at an angle 1052 to the primary direction 1054 of the light produced by one or more of LEDs 1024. Angle 1052 may be an acute angle, and may preferably be from 0° to 45° such that when insect trap 1010 is mounted to a wall, the top end or distal end of divider 1034 (e.g., the end farther from base portion 1012) is closer to the wall than its bottom or proximal end. In some embodiments, divider 1034 may be formed into a convex, concave or saddle-shaped contour, or a combination of contours to optimize the even distribution of light. In some embodiments, divider 1034 may have ribs or other features that increase adhesive surface area and create regions of light/dark contrast, which are highly visible to a wide variety of insects and may be more attractive to them.

In some embodiments, front housing 1018 may be coated with transparent, translucent or opaque adhesive on its inside surface to provide additional insect trapping efficiency and capacity. In addition, front housing 1018 may also have a reflective coating (not shown) underneath the adhesive coating on its inside surface to enhance its attraction to insects and further improve the insect trapping efficiency and effectiveness.

In some embodiments, front housing 1018, divider 1034 and rear housing 1040 are joined together at where they intersect or engage by ultrasonic welding or high frequency (HF) welding, although they may also be permanently or removably joined together by gluing or by any other suitable assembly method. The materials of trap portion 1014 may also include one or more insect attractants. For example, trap portion 1014 may be impregnated with sorbitol, coleopteran attractants including brevicomin, dominicalure, frontalin, grandlure, ipsdienol, ipsenol, japonilure, lineatin, megatomoic acid, multistriatin, oryctalure, sulcatol, and trunc-call, dipteran attractants including ceralure, cue-lure, latilure, medlure, moguchun, muscalure, and trimedlure, homopteran attractants including rescalure, lepidopteran attractants such as disparlure, straight chain lepidopteran pheromones including codlelure, gossyplure, hexalure, litlure, looplure, orfralure, and ostramone, and other insect attractants such as eugenol, methyl eugenol, and siglure, or other substances to provide a scent that further increases the insect-attracting efficiency of insect trap 1010. In such embodiments, the insect attractant is integral to trap portion 1014. Alternatively, the insect attractants may be embedded in a separate piece (not shown) that mounts on an inside surface of front housing 1018 or through opening 1020 in front housing 1018 or on front surface 1038 of divider 1034. It is desirable for such attractants to be detectable by an insect for approximately a 2-meter radius from insect trap 1010. Divider 1034 separates trap portion 1014 into a front enclosure 1046 and a rear enclosure 1048. In some embodiments, base portion 1012 includes a circuit board 1050 having a programmable processor or chip (not shown) for executing commands, electrically connected to conductive prongs 1022, only one of which is shown, and LEDs 1024, only one of which is shown. For clarity, however, not all of the electrical connections are shown. Circuit board 1050 may include electronic circuitry to receive ordinary household current from conductive prongs 1022 and provide power to illuminate LEDs 1024. Circuit board 1050 may include an energy stabilizer such as a full wave rectifier circuit or any other circuit that provides steady voltage to LEDs 1024, although it may also provide a varying voltage to LEDs 1024 to provide a flickering light that mimics movement that some insect species, including mosquitoes, may find attractive. For example, light flickering frequencies in the approximate range of 0.05 Hz (e.g., to mimic the breathing rate of large mammals) to 250 Hz (e.g., the highest flicker frequency to attract male houseflies), may be desirable and the lighting element may be configured to flicker within this range. Circuit board 1050 may provide power to LEDs 1024 to provide UV and/or visible and/or IR light, although it may be configured to provide power to only UV LEDs 1024 or to only visible light LEDs 1024 or to only IR LEDs 1024, or to provide variable power to produce combinations of flickering UV and/or visible and/or IR light. Circuit board 1050 may also be configured to drive a transmitter or transceiver such as a piezoelectric speaker (not shown) or other device that may be mounted in base portion 1012 to emit an insect-attracting sound. In some embodiments, the transmitter or transceiver may emit recorded and/or generated insect sounds or vibrations to better attract insects such as mosquitoes, midges, moths and flies, and may include one or more of insect call, reply, courtship and copulatory songs. In some embodiments, the transmitter or transceiver may emit recorded and/or generated insect-attracting sounds or vibrations such as the heartbeat of a mammal. For example, the transmitter or transceiver may emit an insect-attracting sound or sounds having a frequency in the range of approximately 0.5 Hz (e.g., the heart rate of large mammals) to approximately 240 kHz (e.g., the highest frequency detectable by insects). In some embodiments, the frequency is in the range of approximately 5 Hz to 100 kHz. In some embodiments, the frequency is in the range of approximately 35 Hz to 50 Khz. It is desirable for such insect-attracting sound to be detectable by an insect within approximately a 2-meter distance from insect trap 1010. It is desirable for such insect-attracting sound to be undetectable by a human beyond approximately a 1-meter distance from insect trap 1010.

As shown, slot 1030 in top surface 1026 of base portion 1012 and protrusions 1032 on top surface 1026 of base portion 1012 engage with trap portion 1014 to secure it in place during use, although any other form of attachment may be substituted that allows trap portion 1014 to be securely but removably mounted to base portion 1012.

In the operation of insect trap 1010, conductive prongs 1022 are inserted into a wall electrical socket. LEDs 1024 emit light, represented by arrows, preferably UV and visible light, which is transmitted through window 1028 in base portion 1012, through opening 1044 in rear housing 1040 of trap portion 1014, into rear enclosure 1048, and directly onto inside surface 1042 of rear housing 1040 and a rear surface 1056 of divider 1034. For clarity, arrows representing the light are only shown emitted from one of LEDs 1024. In some embodiments, light is not manipulated in base portion 1012 and is emitted directly into trap portion 1014. Inside surface 1042 of rear housing 1040 may include a concave shape and may be configured to reflect and disperse the light from LEDs 1024 to distribute the light evenly onto rear surface 1056 of divider 1034, although inside surface 1042 of rear housing 1040 may have a convex shape or a saddle shape or a combination of shapes, or may also have ribs or other features to more evenly distribute the light. Alternatively, an optical enhancer such as an anamorphic lens (not shown) or any other lens or combination of lenses configured to distribute the light (e.g., evenly, according to specific patterns, at a focal point, etc.) onto rear surface 1056 of divider 1034, may be mounted to rear housing 1040 at or near opening 1044 or to base portion 1012 at or near window 1028, and may replace or augment the role of inside surface 1042 of rear housing 1040. In some embodiments, the light from LEDs 1024 may directly strike rear surface 1056 of divider 1034 at an oblique angle (e.g., an acute angle from approximately 0° to 90°) and be spread across divider 1034, and may replace or augment the role of inside surface 1042 of rear housing 1040 or of the lens or lenses mounted to rear housing 1040.

Thereafter, light transmits through divider 1034 and adhesive 1036 on front surface 1038, and into front enclosure 1046. Light may be further evenly distributed by the light-diffusing properties of divider 1034, adhesive 1036 on front surface 1038, or both. A portion of the light entering front enclosure 1046 continues through opening 1020 in front housing 1018 and is emitted into the surrounding area where insect trap 1010 is installed. Insects are attracted to the light emitted through adhesive 1036 and through opening 1020 in front housing 1018, and fly or crawl into opening 1020 and onto adhesive 1036, where they become trapped. A user may observe trapped insects by looking through opening 1020 in front housing 1018. When a sufficient number of insects have been trapped, the user may easily remove and discard the entire used trap portion 1014 without touching the trapped insects, insect debris or adhesive, which remain out of reach inside trap portion 1014, and replace it with a new trap portion 1014. New trap portion 1014 has fresh adhesive-coated surfaces and light-directing surfaces, ensuring that insect trap 1010 will continue to efficiently and effectively attract and trap insects.

In some embodiments, because trap portion 1014 mounts on top of, and not in front of, base portion 1012, insect trap 1010 protrudes minimally from the wall when plugged into an ordinary household wall socket, and therefore intrudes minimally into the home environment. In some embodiments, insect trap 1010 is configured such that when insect trap 1010 is mounted to a wall, its overall depth, defined by the overall distance insect trap 1010 protrudes from the wall, is smaller than its overall height and its overall width.

It should be appreciated that a benefit of insect trap 1010 is the manipulation of light within trap portion 1014. In some embodiments, light manipulation occurs solely within trap portion 1014. Light manipulation may include reflection, refraction, polarization, dispersion and/or diffusion and is achieved by engaging with a manipulative element or surface (e.g., inside surface 1042, divider 1034 and adhesive 1036). In some embodiments, light manipulation produces an even distribution of light on adhesive 1036. In some embodiments, light is manipulated to produce a predetermined pattern on adhesive 1036 or within trap portion 1014, for example, an even distribution, an even distribution with hot spots of higher intensity, hot spot patterns, and/or combinations thereof.

Any suitable adhesive material may be used as part of an adhesive surface for trapping an insect. In some embodiments, pressure sensitive adhesives such as acrylics, butyl rubber, natural rubber, nitriles, silicones, styrene block copolymers, styrene-ethylene/propylene, styrene-isoprene-styrene, vinyl ethers may be used. Generally, the thickness of such adhesives will be in the range of approximately 0.01 mm to 1 mm. In some embodiments, the adhesive thickness is in the range of approximately 0.05 mm to 0.2 mm, with a thickness of approximately 0.1 mm being most often used.

Insect trap 1010 of this configuration may accommodate a variety of different trap portions 1014 that may be removably mounted to base portion 1012, each trap portion 1014 being uniquely configured to attract and trap a specific species or multiple species of flying or non-flying insect. For example, the overall size and shape of trap portion 1014, and the size, shape, location and orientation of opening 1020 in front housing 1018 of trap portion 1014, may be uniquely configured to attract and trap a specific species or multiple species of flying insect.

For example, in some embodiments, trap portion 1014 is approximately 20 mm to 600 mm wide, 20 mm to 600 mm high and 5 mm to 150 mm deep. In some embodiments, trap portion 1014 is approximately 20 mm to 200 mm wide, 20 mm to 200 mm high and 5 mm to 80 mm deep. In some embodiments, trap portion 1014 is approximately 20 mm to 130 mm wide, 20 mm to 130 mm high and 5 mm to 50 mm deep.

In some embodiments, base portion 1012 is approximately 20 mm to 600 mm wide, 10 mm to 150 mm high and 10 mm to 150 mm deep. In some embodiments, base portion 1012 is 20 mm to 200 mm wide, 10 mm to 100 mm high and 10 mm to 80 mm deep. In some embodiments, base portion 1012 is 20 mm to 130 mm wide, 10 mm to 50 mm high and 10 mm to 50 mm deep.

As provided herein, opening 1020 may be a variety of shapes and/or sizes. For example, opening 1020 may be circular, square, rectangular, polygonal and/or elliptical in shape. Alternatively, opening 1020 may be slot shaped having a straight, curved or undulating shape or pattern. When opening 1020 is circular, opening 1020 may be approximately 0.5 mm to 30 mm in diameter. In some embodiments, circular opening 1020 is approximately 0.5 mm to 20 mm in diameter. In some embodiments, circular opening 1020 is approximately 0.5 mm to 15 mm in diameter. When opening 1020 is slot shaped, opening 1020 may be approximately 2 mm to 30 mm wide and 5 mm to 500 mm long. In some embodiments, slot shaped opening 1020 is approximately 2 mm to 20 mm wide and 5 mm to 200 mm long. In some embodiments, slot shaped opening 1020 is approximately 2 mm to 15 mm wide and 5 mm to 100 mm long.

In some embodiments, opening 1020 covers all or a portion of front housing 1018. For example, opening 1020 may cover a range of approximately 1% to 75% of the surface area of front housing 1018. In some embodiments, opening 1020 covers approximately 5% to 50% of the surface area of front housing 1018. In some embodiments, opening 1020 covers approximately 10% to 30% of the surface area of front housing 1018.

Figure 29:
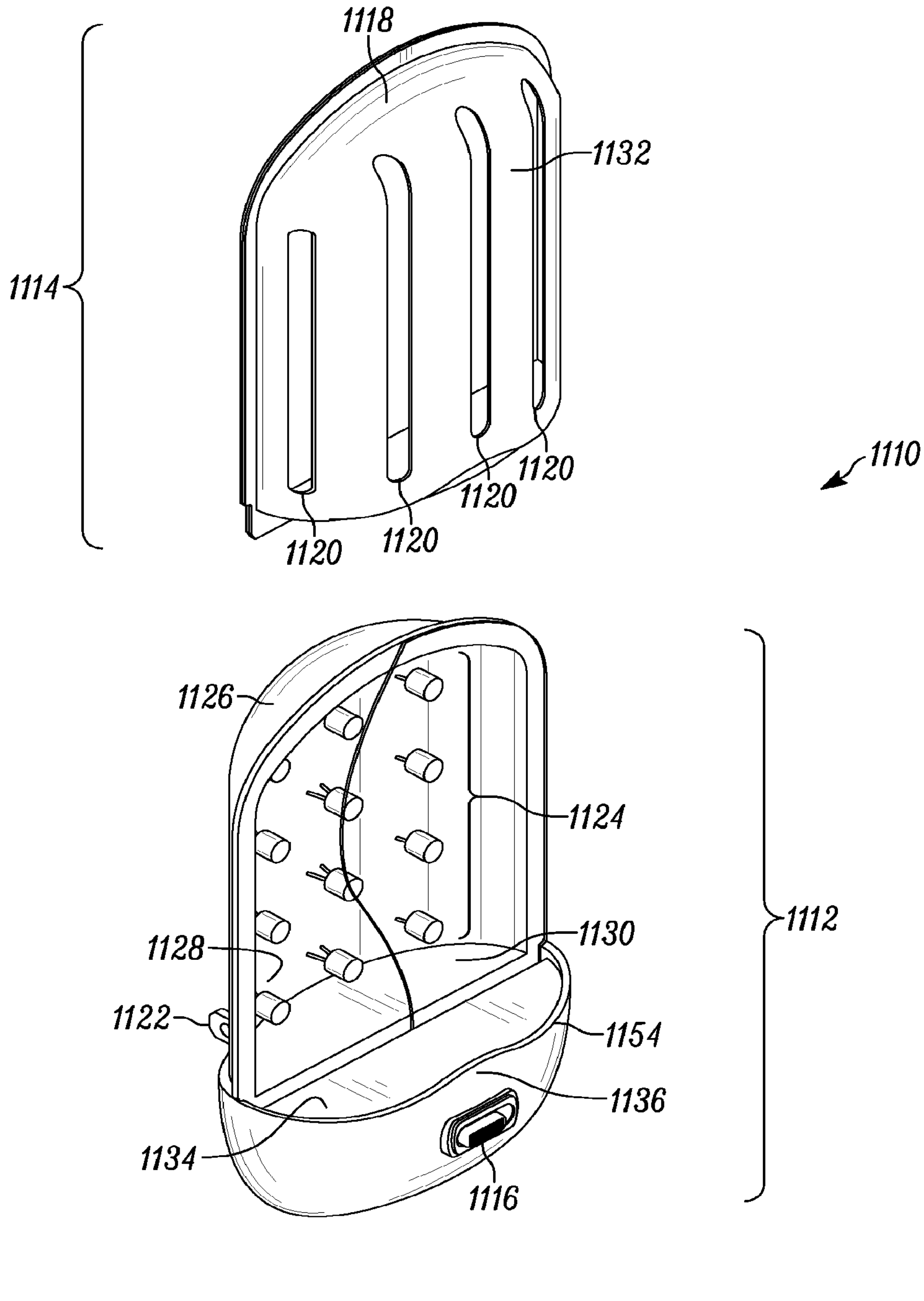
FIG. 29 is a front perspective view of an eleventh embodiment of an insect trap in accordance with principles of the disclosure.

FIG. 29 is a front perspective view of an eleventh embodiment of an insect trap, indicated generally at 1110. Insect trap 1110 includes a base portion 1112 and a removable trap portion 1114. Trap portion 1114 is shown removed from base portion 1112 in this view. In some embodiments, base portion 1112 includes a switch 1116, configurable to enable insect trap 1110 to be turned on or off by closing or opening switch 1116 as desired by the user. Alternatively, switch 1116 may be configured to control other features such as light intensity, combinations of light wavelengths, different modes or frequencies of flickering light, an automatic setting that turns on insect trap 1110 when the room gets dark, or a remote control setting, for example. In some embodiments, switch 1116 may be manually operated, although switch 1116 may also be operated electrically, optically, electro-mechanically, electro-optically, or by any method for opening or closing switch 1116. Trap portion 1114 may include a front housing 1118 with at least one opening 1120 in a front surface 1132. Opening 1120 may be configured to admit a wide variety of insects into insect trap 1110, or alternatively it may be configured to admit one or more specific insect species. Opening 1120 may preferably be configured to prevent user's fingers from penetrating opening 1120 and inadvertently touching trapped insects or adhesive when removing and replacing trap portion 1114. Opening 1120 may preferably have a size and shape such that a sphere 25 mm in diameter cannot pass through opening 1120, and opening 1120 may preferably have a size and shape such that a sphere 1 mm in diameter can pass through any portion of opening 1120. Opening 1120 may be of uniform or of varying width, shape and orientation, and if trap portion 1114 has more than one opening 1120, they may be of identical or of differing widths, shapes and orientations. Opening 1120 may be configured to attract one or more individual insect species or a variety of insect species. Protruding from a rear surface 1152 (shown in FIG. 30) of base portion 1112 are a plurality of electrically conductive prongs 1122, only one of which is shown, adapted to mount insect trap 1110 to a wall and provide power to insect trap 1110 by inserting conductive prongs 1122 into a standard household electrical wall socket. Alternatively, base portion 1112 may be configured to sit or hang wherever desired and receive power from batteries (not shown) mounted in base portion 1112. While an electrical socket and batteries have been described as providing power to insect trap 1110, any suitable power source may be used. Base portion 1112 includes a top surface 1134, and a rear housing 1126, which includes a reflective-coated inside surface 1128. In some embodiments, the material and surface finish of rear housing 1126 may be configured to reflect and disperse UV and/or visible light without a reflective coating. Mounted in rear housing 1126 of base portion 1112 is a lighting element such as one or more LEDs 1124. In some embodiments, the lighting element includes an array of LEDs 1124, including at least one that emits UV light and at least one that emits visible light. In some embodiments, LEDs 1124 include at least one that emits UV light and at least one that emits blue light to better attract a wide variety of insect species. In some embodiments, the lighting element emits a combination of wavelengths to mimic sunlight. In some embodiments, LEDs 1124 include at least one that emits infrared (IR) light to better attract certain species of insects such as mosquitos and fleas.

As shown, base portion 1112 includes a transparent or translucent window 1130, shown partially cut away to reveal LEDs 1124. Window 1130 has a rear surface 1150 (shown in FIG. 30), and protects inside surface 1128 of rear housing 1126 and LEDs 1124 from dust and insect debris and may allow base portion 1112 to be easily cleaned. Window 1130 may also be configured to polarize light transmitted through it in an orientation similar to that of daylight to further attract flying insects, a wide variety of which are known to detect polarized light. Window 1130 may be attached at its perimeter to rear housing 1126 by any suitable manufacturing technique such as gluing or ultrasonic welding. In some embodiments, window 1130 is removably attached to rear housing 1126. In some embodiments, on a perimeter 1154 of top surface 1134 of base portion 1112 is an upwardly directed rim or protrusions 1136.

Figure 30:
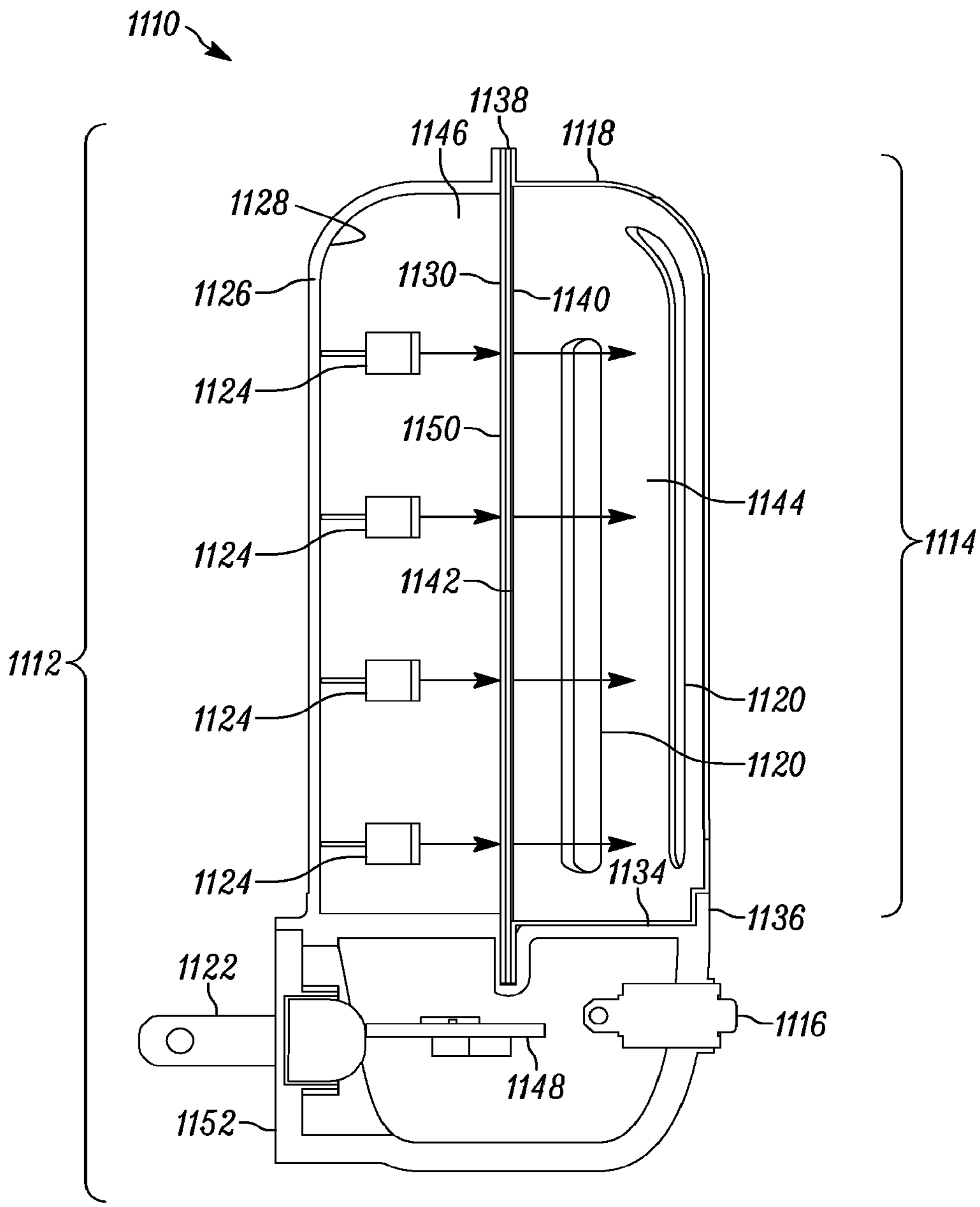
FIG. 30 is a cross-sectional view of the insect trap of FIG. 29.

FIG. 30 is a cross-sectional view of insect trap 1110. Trap portion 1114 includes a back plate 1138 with a front surface 1142. Back plate 1138 may be constructed of transparent or translucent material and coated with a transparent or translucent adhesive 1140 on front surface 1142. Back plate 1138 may also be configured to polarize light transmitted through it in an orientation similar to that of daylight to further attract flying insects. In some embodiments, the material and thickness of back plate 1138 and the material and thickness of adhesive 1140 are selected to transmit a substantial proportion of the UV and/or visible and/or IR light, for example greater than 60% of the light is transmitted through back plate 1138 and adhesive 1140. In some embodiments, front housing 1118 of trap portion 1114 and rear housing 1126 of base portion 1112 are thermoformed from opaque sheet plastic, although other opaque, transparent or translucent materials such as paper, paperboard, cardboard or paper pulp may also be used. In some embodiments, front housing 1118 and rear housing 1126 are constructed by injection molding or by other suitable manufacturing techniques.

Back plate 1138 may be substantially planar, although it may be formed into a convex, concave or saddle-shaped contour, or a combination of contours to optimize the even distribution of light. Alternatively, back plate 1138 may have ribs or other features that increase the adhesive-coated surface area, produce alternating light/dark regions that some insect species find attractive, and enhance the transmission of insect-attracting light into trap portion 1114. In some embodiments, front housing 1118 is coated with transparent, translucent or opaque adhesive on an inside surface to provide additional insect trapping efficiency and capacity. In addition, front housing 1118 may also have a reflective coating (not shown) underneath the adhesive coating on its inside surface to enhance its attraction to insects and further improve the insect trapping efficiency and effectiveness.

Front housing 1118 and back plate 1138 may be joined together where they engage with adhesive, although they may also be joined by other commonly used packaging assembly techniques such as ultrasonic welding or RF sealing, or any other suitable assembly method. The materials of trap portion 1114 may also include one or more insect attractants. For example, trap portion 1114 may be impregnated with sorbitol, coleopteran attractants including brevicomin, dominicalure, frontalin, grandlure, ipsdienol, ipsenol, japonilure, lineatin, megatomoic acid, multistriatin, oryctalure, sulcatol, and trunc-call, dipteran attractants including ceralure, cue-lure, latilure, medlure, moguchun, muscalure, and trimedlure, homopteran attractants including rescalure, lepidopteran attractants such as disparlure, straight chain lepidopteran pheromones including codlelure, gossyplure, hexalure, litlure, looplure, orfralure, and ostramone, and other insect attractants such as eugenol, methyl eugenol, and siglure, or other substances to provide a scent that may further increase the insect-attracting efficiency of insect trap 1110. In such embodiments, the insect attractant is integral to trap portion 1114. Alternatively, the insect attractants may be embedded in a separate piece (not shown) that mounts on an inside surface of front housing 1118 or through opening 1120 in front housing 1118 or on front surface 1142 of back plate 1138. It is desirable for such attractants to be detectable by an insect for approximately a 2-meter radius from insect trap 1110.

As shown, front housing 1118 and back plate 1138 form a front enclosure 1144 in trap portion 1114, and rear housing 1126 and window 1130 form a rear enclosure 1146 in base portion 1112. In some embodiments, base portion 1112 includes a circuit board 1148, having a programmable processor or chip (not shown) for executing commands, electrically connected to conductive prongs 1122, switch 1116 and LEDs 1124 (only one of which is shown). For clarity, however, not all of the electrical connections are shown. Circuit board 1148 may include electronic circuitry to receive ordinary household current from conductive prongs 1122, only one of which is shown, respond to the position of switch 1116 and provide power to illuminate LEDs 1124. Circuit board 1148 may include an energy stabilizer such as a full wave rectifier circuit or any other circuit to provide steady voltage to LEDs 1124 when switch 1116 is in the closed position, although it could also provide a varying voltage to LEDs 1124 to provide a flickering light which mimics movement that some insect species, including mosquitoes, may find attractive. For example, light flickering frequencies in the approximate range of 0.05 Hz (e.g., to mimic the breathing rate of mammals) to 270 Hz (e.g., the highest flicker frequency to attract male houseflies), may be desirable and the lighting element may be configured to flicker within this range. Circuit board 1148 may provide power to LEDs 1124 to provide both UV and visible light, although it could be configured to provide power only UV LEDs 1124 or to only visible light LEDs 1124 or to only IR LEDs 1124, or to provide variable power to produce combinations of flickering UV and/or visible and/or IR light. In some embodiments, circuit board 1148 may also be configured to drive a transmitter or transceiver such as a piezoelectric speaker (not shown) or other device that may be mounted in base portion 1112 to emit an insect-attracting sound. In some embodiments, the transmitter or transceiver may emit recorded and/or generated insect sounds or vibrations to better attract insects, and may include one or more of mosquitoes, midges, moths and flies, and may include one or more of insect call, reply, courtship and copulatory songs. In some embodiments, the transmitter or transceiver may emit recorded and/or generated insect-attracting sounds or vibrations such as the heartbeat of a mammal. For example, the transmitter or transceiver may emit an insect-attracting sound or sounds having a frequency in the range of approximately 0.5 Hz (e.g., the heart rate of large mammals) to approximately 240 kHz (e.g., the highest frequency detectable by insects). In some embodiments, the frequency is in the range of approximately 5 Hz to 100 kHz. In some embodiments, the frequency is in the range of approximately 35 Hz to 50 Khz. It is desirable for such insect-attracting sound to be detectable by an insect within approximately a 2-meter distance from insect trap 1110. It is desirable for such insect-attracting sound to be undetectable by a human beyond approximately a 1-meter distance from insect trap 1110.

As shown, rim or protrusions 1136 on top surface 1134 of base portion 1112 and window 1130 engage with trap portion 1114 to secure it in place during use, although any other form of attachment may be substituted that may allow trap portion 1114 to be securely but removably mounted on base portion 1112.

In the operation of insect trap 1110, conductive prongs 1122 are inserted into a wall electrical socket, and switch 1116 is moved to a closed position. LEDs 1124 emit light, represented by arrows, which transmits directly onto rear surface 1150 of window 1130. In some embodiments, light is not manipulated in base portion 1112 and is emitted directly into trap portion 1114. Inside surface 1128 of rear housing 1126 may include a concave shape and may be configured to reflect and disperse the UV and visible light from LEDs 1124 to distribute the light evenly onto rear surface 1150 of window 1130, although inside surface 1128 of rear housing 1126 may have a convex shape or a saddle shape or a combination of shapes, or may also have ribs or other features to more evenly distribute the light. In some embodiments, LEDs 1124 are substantially perpendicular (e.g., configured so that their primary direction of light is substantially perpendicular) to window 1130. The light transmits through back plate 1138 and adhesive 1140 on front surface 1142, and into front enclosure 1144. The light may be further evenly distributed by the light-diffusing properties of window 1130 of base portion 1112, back plate 1138 of trap portion 1114, adhesive 1140 on front surface 1142 of back plate 1138, or any combination of window 1130, back plate 1138 and adhesive 1140. In some embodiments, a portion of the light entering front enclosure 1144 continues through opening 1120 in front housing 1118 and is emitted into the area where insect trap 1110 is installed. Insects are attracted to the UV and/or visible light transmitted through adhesive 1140 and through opening 1120 in front housing 1118, and fly or crawl through opening 1120 and onto adhesive 1140, where they become trapped. The user may observe trapped insects by looking through opening 1120 in front housing 1118. When a sufficient number of insects have been trapped, the user may easily remove and discard the entire used trap portion 1114 without touching the trapped insects, insect debris or adhesive, which remain out of reach inside trap portion 1114, and replace it with a new trap portion 1114. New trap portion 1114 has fresh adhesive-coated surfaces, ensuring that insect trap 1110 will continue to efficiently and effectively attract and trap insects.

In some embodiments, because trap portion 1114 mounts on top of, and not in front of, base portion 1112, insect trap 1110 protrudes minimally from the wall when plugged into an ordinary household wall socket, and therefore intrudes minimally into the home environment. In some embodiments, insect trap 1110 is configured such that when insect trap 1110 is mounted to a wall, its overall depth, defined by the overall distance insect trap 1110 protrudes from the wall, is smaller than its overall height and overall width.

It should be appreciated that a benefit of insect trap 1110 is the manipulation of light within trap portion 1114. In some embodiments, light manipulation occurs solely within trap portion 1114. Light manipulation may include reflection, refraction, polarization, dispersion and/or diffusion and is achieved by engaging with a manipulative element or surface (e.g., inside surface 1128, window 1130, back plate 1138 and adhesive 1140). In some embodiments, light manipulation produces an even distribution of light on adhesive 1140. In some embodiments, light is manipulated to produce a predetermined pattern on adhesive 1140 or within trap portion 1114, for example, an even distribution, an even distribution with hot spots of higher intensity, hot spot patterns, and/or combinations thereof.

Any suitable adhesive material may be used as part of an adhesive surface for trapping an insect. In some embodiments, pressure sensitive adhesives such as acrylics, butyl rubber, natural rubber, nitriles, silicones, styrene block copolymers, styrene-ethylene/propylene, styrene-isoprene-styrene, vinyl ethers may be used. Generally, the thickness of such adhesives will be in the range of approximately 0.01 mm to 1 mm. In some embodiments, the adhesive thickness is in the range of approximately 0.05 mm to 0.2 mm, with a thickness of approximately 0.1 mm being most often used.

Insect trap 1110 of this configuration may accommodate a variety of different trap portions 1114 that may be removably mounted to base portion 1112, each trap portion 1114 being uniquely configured to attract and trap a specific species or multiple species of insects. For example, the overall size and shape of trap portion 1114, and the size, shape, location and orientation of opening 1120 in front housing 1118 of trap portion 1114, may be uniquely configured to attract and trap a specific species or multiple species of insects. For example, in some embodiments, trap portion 1114 is approximately 20 mm to 600 mm wide, 20 mm to 600 mm high and 5 mm to 150 mm deep. In some embodiments, trap portion 1114 is approximately 20 mm to 200 mm wide, 20 mm to 200 mm high and 5 mm to 80 mm deep. In some embodiments, trap portion 1114 is approximately 20 mm to 130 mm wide, 20 mm to 130 mm high and 5 mm to 50 mm deep.

In some embodiments, base portion 1112 is approximately 20 mm to 600 mm wide, 10 mm to 150 mm high and 10 mm to 150 mm deep. In some embodiments, base portion 1112 is 20 mm to 200 mm wide, 10 mm to 100 mm high and 10 mm to 80 mm deep. In some embodiments, base portion 1112 is 20 mm to 130 mm wide, 10 mm to 50 mm high and 10 mm to 50 mm deep.

As provided herein, opening 1120 may be a variety of shapes and/or sizes. For example, opening 1120 may be circular, square, rectangular, polygonal and/or elliptical in shape. Alternatively, opening 1120 may be a slot having straight, curved or undulating shapes or patterns. When opening 1120 is circular, opening 1120 may be approximately 0.5 mm to 30 mm in diameter. In some embodiments, circular opening 1120 is approximately 0.5 mm to 20 mm in diameter. In some embodiments, circular opening 1120 is approximately 0.5 mm to 15 mm in diameter. When opening 1120 is slot shaped, opening 1120 may be approximately 2 mm to 30 mm wide and 5 mm to 500 mm long. In some embodiments, slot shaped opening 1120 is approximately 2 mm to 20 mm wide and 5 mm to 200 mm long. In some embodiments, slot shaped opening 1120 is approximately 2 mm to 15 mm wide and 5 mm to 100 mm long.

In some embodiments, opening 1120 covers all or a portion of front housing 1118. For example, opening 1120 may cover a range of approximately 1% to 75% of the surface area of front housing 1118. In some embodiments, opening 1120 covers approximately 5% to 50% of the surface area of front housing 1118. In some embodiments, opening 1120 covers approximately 10% to 30% of the surface area of front housing 1118.

Figure 31:
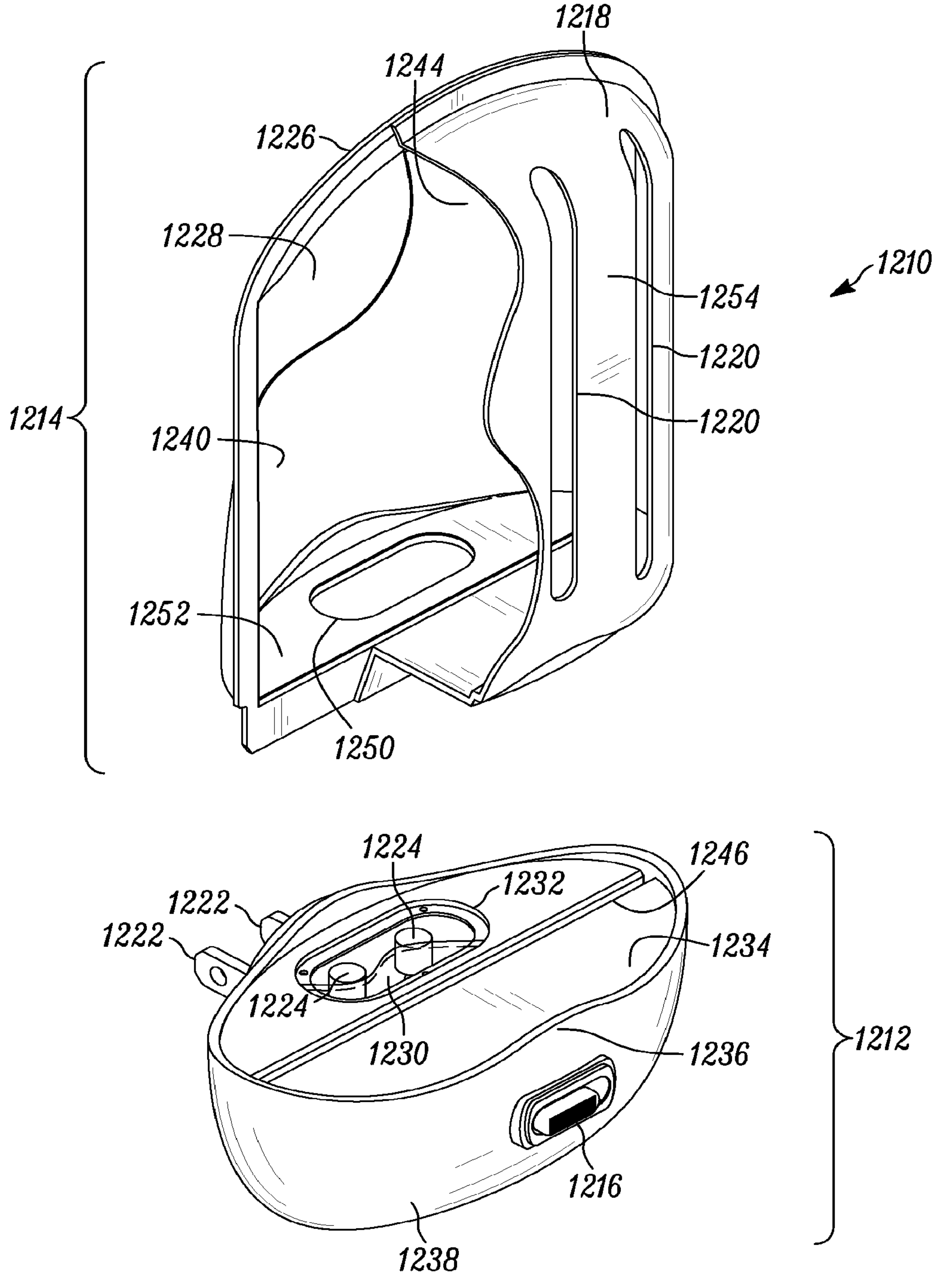
FIG. 31 is a front perspective view of a twelfth embodiment of an insect trap in accordance with principles of the disclosure.

FIG. 31 is a front perspective view of a twelfth embodiment of an insect trap, indicated generally at 1210. Insect trap 1210 includes a base portion 1212 and a removable trap portion 1214. Trap portion 1214 is shown partially cut away and removed from base portion 1212 in this view. A front surface 1238 of base portion 1212 may include a switch 1216, configurable to enable insect trap 1210 to be turned on or off by closing or opening switch 1216 as desired by the user. Alternatively, switch 1216 may be configured to control other features such as light intensity, combinations of light wavelengths, different modes or frequencies of flickering light, an automatic setting that turns on insect trap 1210 when the room gets dark, or a remote control setting, for example. Switch 1216 may preferably be manually operated, although switch 1216 may also be operated electrically, optically, electro-mechanically, electro-optically, or by any method for opening or closing switch 1216. Protruding from a rear surface 1242 (shown in FIG. 32) of base portion 1212 are a plurality of electrically conductive prongs 1222, adapted to mount insect trap 1210 to a wall and provide power to insect trap 1210 by inserting conductive prongs 1222 into a standard household electrical wall socket. Alternatively, base portion 1212 may be configured to sit or hang wherever desired and receive power from batteries (not shown) mounted in base portion 1212. While an electrical socket and batteries have been described as providing power to insect trap 1210, any suitable power source may be used. Base portion 1212 includes a lighting element such as one or more LEDs 1224. In some embodiments, LEDs 1224 include at least one that emits UV light and at least one that emits visible light. In some embodiments, LEDs 1224 include at least one that emits UV light and at least one that emits blue light to better attract a wide variety of insect species. In some embodiments, the lighting element emits a combination of wavelengths to mimic sunlight. In some embodiments, LEDs 1224 include at least one that emits IR light to better attract certain species of insects including mosquitos and fleas. In a top surface 1234 of base portion 1212 may be at least one opening 1232, and mounted in opening 1232 may be a transparent or translucent window 1230, shown partially cut away to reveal LEDs 1224. Window 1230 protects LEDs 1224 from dust and insect debris and allows base portion 1212 to be easily cleaned. Also in top surface 1234 may be a slot 1246, and on the perimeter of top surface 1234 may be an upwardly directed rim or protrusions 1236. Trap portion 1214 includes a front housing 1218 with at least one opening 1220 in a front surface 1254, and a rear housing 1226. Opening 1220 in front housing 1218 may be configured to admit a wide variety of insects into insect trap 1210, or alternatively it may be configured to admit one or more specific insect species. In some embodiments, opening 1220 is configured to prevent a user's fingers from penetrating opening 1220 and inadvertently touching trapped insects or adhesive when removing and replacing trap portion 1214. In some embodiments, opening 1220 has a size and shape such that a sphere 25 mm in diameter cannot pass through opening 1220, and has a size and shape such that a sphere 1 mm in diameter can pass through any portion of opening 1220. Opening 1220 may be of uniform or of varying width, shape and orientation, and if trap portion 1214 has more than one opening 1220, they may be of identical or of differing widths, shapes and orientations. Opening 1220 may be configured to attract one or more individual insect species or a variety of insect species. Front housing 1218 and rear housing 1226 of trap portion 1214 form an enclosure 1244. Rear housing 1226 includes an inside surface 1228 that may be coated with a transparent, translucent or opaque adhesive 1240. In some embodiments, inside surface 1228 of rear housing 1226 also has a reflective coating (not shown) under adhesive 1240. Alternatively, the material and surface finish of rear housing 1226 may be configured to reflect and disperse UV and/or visible and/or IR light without a reflective coating. Alternatively, adhesive 1240 may also be configured to reflect UV and/or visible and/or IR light. Inside surface 1228 of rear housing 1226 may also be configured of material that may polarize light reflecting from it in an orientation similar to that of daylight to further attract flying insects, a wide variety of which are known to detect polarized light. Rear housing 1226 may include an opening 1250 on its bottom surface 1252, or alternatively opening 1250 may be replaced by a transparent or translucent window (not shown). In some embodiments, front housing 1218 may be coated with transparent, translucent or opaque adhesive on its inside surface (not shown) to provide additional insect trapping efficiency and capacity. Front housing 1218 may also have a reflective coating (not shown) underneath the adhesive coating on its inside surface to enhance its attraction to insects and further improve the insect trapping efficiency and effectiveness. In some embodiments, front housing 1218 and rear housing 1226 are thermoformed from opaque sheet plastic, creating a clean and aesthetically pleasing shape while maintaining low cost and disposability. Alternatively, other opaque, transparent or translucent materials such as paper, paperboard, cardboard or paper pulp may also be used. In some embodiments, front housing 1218 and rear housing 1226 are constructed by injection molding or by other suitable manufacturing techniques. In some embodiments, front housing 1218 and rear housing 1226 are joined together where they intersect or engage with an adhesive, although they may also be joined by other commonly used packaging assembly techniques such as ultrasonic welding or RF sealing, or any other suitable assembly method. The materials of trap portion 1214 may also include one or more insect attractants. For example, trap portion 1214 may be impregnated sorbitol, coleopteran attractants including brevicomin, dominicalure, frontalin, grandlure, ipsdienol, ipsenol, japonilure, lineatin, megatomoic acid, multistriatin, oryctalure, sulcatol, and trunc-call, dipteran attractants including ceralure, cuelure, latilure, medlure, moguchun, muscalure, and trimedlure, homopteran attractants including rescalure, lepidopteran attractants such as disparlure, straight chain lepidopteran pheromones including codlelure, gossyplure, hexalure, litlure, looplure, orfralure, and ostramone, and other insect attractants such as eugenol, methyl eugenol, and siglure, or other substances to provide a scent that may further increase the insect-attracting efficiency of insect trap 1210. In such embodiments, the insect attractant is integral to trap portion 1214. Alternatively, the insect attractants may be embedded in a separate piece (not shown) that may mount on an inside surface of enclosure 1244 or through an opening in front housing 1218 or rear housing 1226. It is desirable for such attractants to be detectable by an insect for approximately a 2-meter radius from insect trap 1210.

Figure 32:
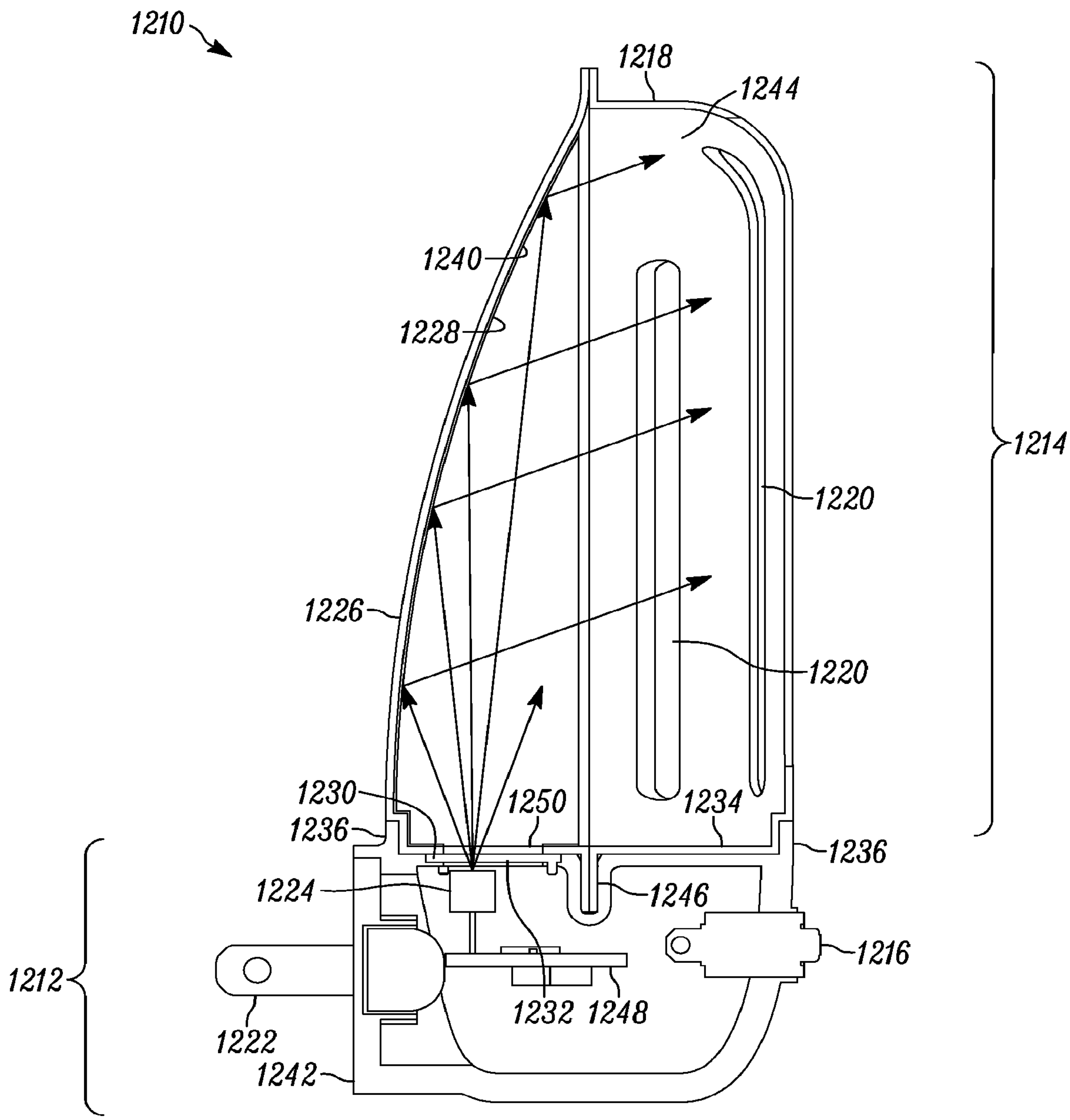
FIG. 32 is a cross-sectional view of the insect trap of FIG. 31.

FIG. 32 is a cross-sectional, cut-away view through insect trap 1210. In some embodiments, base portion 1212 includes a circuit board 1248 having a programmable processor or chip (not shown) for executing commands, electrically connected to conductive prongs 1222 (only one of which is shown), switch 1216 and LEDs 1224 (only one of which is shown). For clarity, however, not all of the electrical connections are shown. Circuit board 1248 may include electronic circuitry to receive ordinary household current from conductive prongs 1222, respond to the position of switch 1216 and provide power to illuminate LEDs 1224. Circuit board 1248 may include an energy stabilizer such as a full wave rectifier circuit or any other circuit that may provide steady voltage to LEDs 1224 when switch 1216 is in the closed position, although it may also provide a varying voltage to LEDs 1224 to provide a flickering light which mimics movement that some insect species, including mosquitoes, may find attractive. For example, light flickering frequencies in the approximate range of 0.05 Hz (e.g., to mimic the breathing rate of large mammals) to 250 Hz (e.g., the highest flicker frequency to attract male houseflies), may be desirable and the lighting element may be configured to flicker within this range. Circuit board 1248 may provide power to LEDs 1224 to provide both UV and/or visible and/or IR light, although it may be configured to provide power to only UV LEDs 1224 or to only visible light LEDs 1224 or to only IR LEDs 1224, or to provide variable power to produce combinations of flickering UV and/or visible and/or IR light. Circuit board 1248 may also be configured to drive a transmitter or transceiver such as a piezoelectric speaker (not shown) or other device that may be mounted in base portion 1212 to emit an insect-attracting sound. In some embodiments, the transmitter or transceiver may emit recorded and/or generated insect sounds or vibrations to better attract insects such as mosquitoes, midges, moths and flies, and may include one or more of insect call, reply, courtship and copulatory songs. In some embodiments, the transmitter or transceiver may emit recorded and/or generated insect-attracting sounds or vibrations such as the heartbeat of a mammal. For example, the transmitter or transceiver may emit an insect-attracting sound or sounds having a frequency in the range of approximately 0.5 Hz (e.g., the heart rate of large mammals) to 240 kHz (e.g., the highest frequency detectable by insects). In some embodiments, the frequency is in the range of approximately 5 Hz to 100 kHz. In some embodiments, the frequency is in the range of approximately 35 Hz to 50 Khz. It is desirable for such insect-attracting sound to be detectable by an insect within approximately a 2-meter distance from insect trap 1210. It is desirable for such insect-attracting sound to be undetectable by a human beyond approximately a 1-meter distance from insect trap 1210.

As shown, slot 1246 in top surface 1234 of base portion 1212 and rim or protrusions 1236 on top surface 1234 engage with trap portion 1214 to secure it in place during use, although any other form of attachment may be substituted that allows trap portion 1214 to be securely but removably mounted on base portion 1212.

In the operation of insect trap 1210, conductive prongs 1222 are inserted into a wall electrical socket, and switch 1216 may be moved to the closed position. LEDs 1224 emit light, represented by arrows, which transmits through opening 1232 in base portion 1212 and into enclosure 1244, and directly onto adhesive 1240 coating inside surface 1228 of rear housing 1226. In some embodiments, light is not manipulated in base portion 1212 and is emitted directly into trap portion 1214.

Inside surface 1228 of rear housing 1226 may include a concave shape and may be configured to reflect light from LEDs 1224 to distribute the light evenly through enclosure 1244, although inside surface 1228 of rear housing 1226 may have a convex shape or a saddle shape or a combination of shapes, or may also have ribs or other features to more evenly distribute the light. Alternatively, an optical enhancer such as an anamorphic lens (not shown) or any other lens or combination of lenses configured to distribute the light (e.g., evenly, according to specific patterns, at a focal point, etc.) onto inside surface 1228 of rear housing 1226, may be mounted to base portion 1212 at or near opening 1232 or to trap portion 1214 at or near opening 1250, and may replace or augment the light-distributing role of inside surface 1228 of rear housing 1226. In some embodiments, the light from LEDs 1224 may directly strike inside surface 1228 of rear housing 1226 at an oblique angle (e.g., an acute angle from approximately 0° to 90°) and be spread across inside surface 1228, and may replace or augment the light-distributing role of inside surface 1228 the lens or lenses mounted to trap portion 1214 or to base portion 1212. Light may be further evenly distributed by the light-diffusing properties of window 1230 in base portion 1212, by adhesive 1240 on inside surface 1228 of rear housing 1226, or by a combination of the two.

Thereafter, a portion of the light continues through opening 1220 in front housing 1218 and into the surrounding area where the trap is installed. Insects are attracted to the UV and/or visible light transmitted through opening 1220, and fly or crawl into opening 1220 and onto adhesive 1240, where they become trapped. A user may observe trapped insects by looking through opening 1220 in front housing 1218. When a sufficient number of insects have been trapped, the user may easily remove and discard the entire used trap portion 1214 without touching the trapped insects, insect debris or adhesive, which remain out of reach inside trap portion 1214, and replace it with a new trap portion 1214. New trap portion 1214 has fresh adhesive-coated surfaces, ensuring that insect trap 1210 will continue to efficiently and effectively attract and trap insects.

In some embodiments, because trap portion 1214 mounts on top of, and not in front of, base portion 1212, insect trap 1210 protrudes minimally from the wall when plugged into an ordinary household wall socket, and therefore intrudes minimally into the home environment. In some embodiments, insect trap 1210 is configured such that when insect trap 1210 is mounted to a wall, its overall depth, defined by the overall distance insect trap 1210 protrudes from the wall, is smaller than its overall height and its overall width.

It should be appreciated that a benefit of insect trap 1210 is the manipulation of light within trap portion 1214. In some embodiments, light manipulation occurs solely within trap portion 1214. Light manipulation may include reflection, refraction, polarization, dispersion and/or diffusion and is achieved by engaging with a manipulative element or surface (e.g., inside surface 1228 and adhesive 1240). In some embodiments, light manipulation produces an even distribution of light on adhesive 1240. In some embodiments, light is manipulated to produce a predetermined pattern on adhesive 1240 or within trap portion 1214, for example, an even distribution, an even distribution with hot spots of higher intensity, hot spot patterns, and/or combinations thereof.

Any suitable adhesive material may be used as part of an adhesive surface for trapping an insect. In some embodiments, pressure sensitive adhesives such as acrylics, butyl rubber, natural rubber, nitriles, silicones, styrene block copolymers, styrene-ethylene/propylene, styrene-isoprene-styrene, vinyl ethers may be used. Generally, the thickness of such adhesives will be in the range of approximately 0.01 mm to 1 mm. In some embodiments, the adhesive thickness is in the range of approximately 0.05 mm to 0.2 mm, with a thickness of approximately 0.1 mm being most often used.

Insect trap 1210 of this configuration may accommodate a variety of different trap portions 1214 that may be removably mounted to base portion 1212, each trap portion 1214 being uniquely configured to attract and trap a specific species or multiple species of insects. For example, the overall size and shape of trap portion 1214, and the size, shape, location and orientation of opening 1220 in front housing 1218 of trap portion 1214, may be uniquely configured to attract and trap a specific species or multiple species of flying insect. For example, in some embodiments, trap portion 1214 is approximately 20 mm to 600 mm wide, 20 mm to 600 mm high and 5 mm to 150 mm deep. In some embodiments, trap portion 1214 is approximately 20 mm to 200 mm wide, 20 mm to 200 mm high and 5 mm to 80 mm deep. In some embodiments, trap portion 1214 is approximately 20 mm to 130 mm wide, 20 mm to 130 mm high and 5 mm to 50 mm deep.

In some embodiments, base portion 1212 is approximately 20 mm to 600 mm wide, 10 mm to 150 mm high and 10 mm to 150 mm deep. In some embodiments, base portion 1212 is 20 mm to 200 mm wide, 10 mm to 100 mm high and 10 mm to 80 mm deep. In some embodiments, base portion 1212 is 20 mm to 130 mm wide, 10 mm to 50 mm high and 10 mm to 50 mm deep.

As provided herein, opening 1220 may be a variety of shapes and/or sizes. For example, opening 1220 may be circular, square, rectangular, polygonal and/or elliptical in shape. Alternatively, opening 1220 may be slot shaped having a straight, curved or undulating shape or pattern. When opening 1220 is circular, opening 1220 may be approximately 0.5 mm to 30 mm in diameter. In some embodiments, circular opening 1220 is approximately 0.5 mm to 20 mm in diameter. In some embodiments, circular opening 1220 is approximately 0.5 mm to 15 mm in diameter. When opening 1220 is slot shaped, opening 1220 may be approximately 2 mm to 30 mm wide and 5 mm to 500 mm long. In some embodiments, slot shaped opening 1220 is approximately 2 mm to 20 mm wide and 5 mm to 200 mm long. In some embodiments, slot shaped opening 1220 is approximately 2 mm to 15 mm wide and 5 mm to 100 mm long.

In some embodiments, opening 1220 covers all or a portion of front housing 1218. For example, opening 1220 may cover a range of approximately 1% to 75% of the surface area of front housing 1218. In some embodiments, opening 1220 covers approximately 5% to 50% of the surface area of front housing 1218. In some embodiments, opening 1220 covers approximately 10% to 30% of the surface area of front housing 1218.

Figure 33:
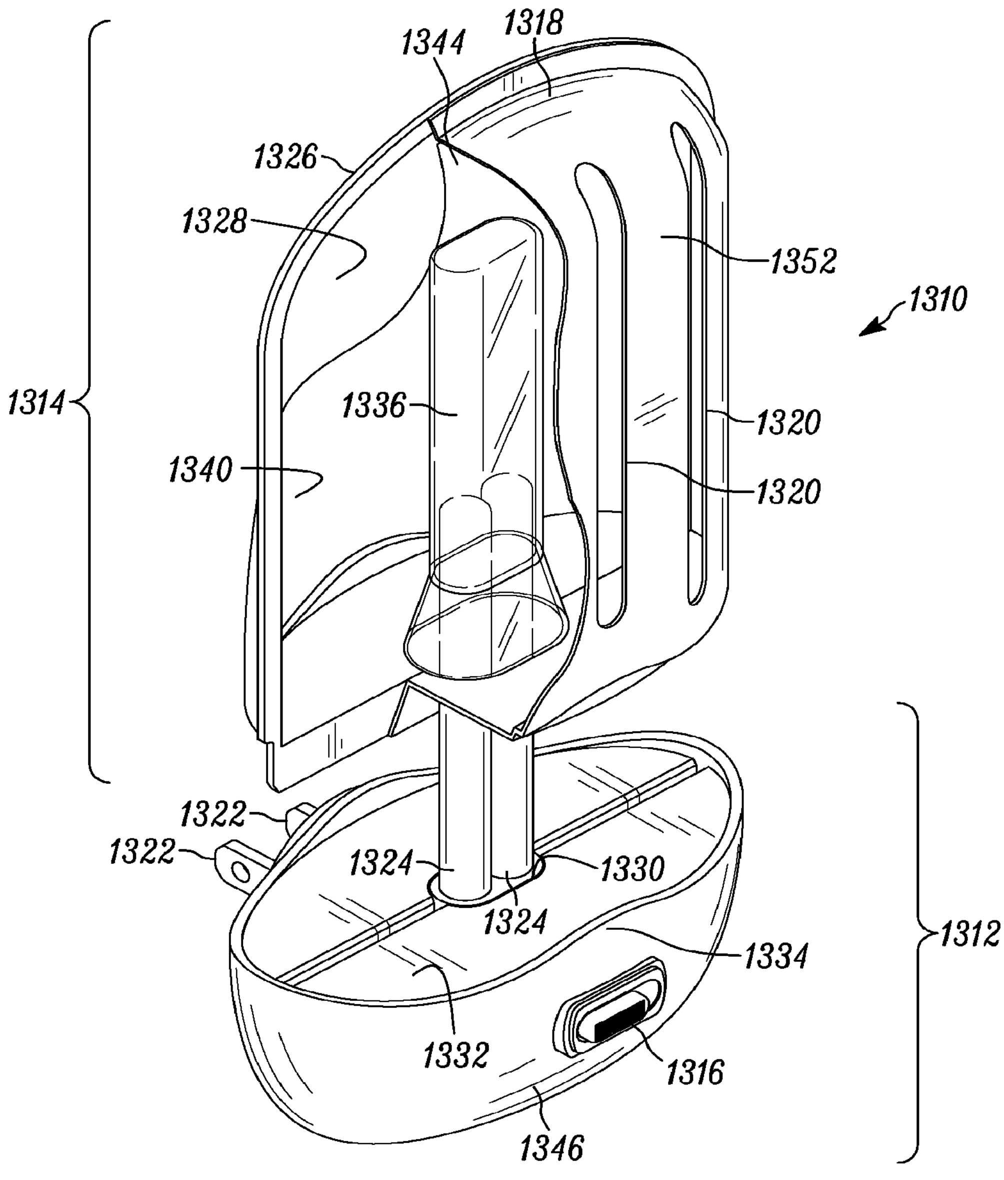
FIG. 33 is a front perspective view of a thirteenth embodiment of an insect trap in accordance with principles of the disclosure.

FIG. 33 is a front perspective view of a thirteenth embodiment of an insect trap, indicated generally at 1310. Insect trap 1310 includes a base portion 1312 and a removable trap portion 1314. Trap portion 1314 is shown partly cut away and partially removed from base portion 1312 in this view. A front surface 1346 of base portion 1312 may include a switch 1316, configurable to enable insect trap 1310 to be turned on or off by closing or opening switch 1316 as desired by the user. Alternatively, switch 1316 may be configured to control other features such as light intensity, combinations of light wavelengths, different modes or frequencies of flickering light, an automatic setting that turns on insect trap 1310 when the room gets dark, or a remote control setting for example. Switch 1316 may be manually operated, although switch 1316 may also be operated electrically, optically, electro-mechanically, electro-optically, or by any method for opening or closing switch 1316. Protruding from a rear surface 1350 (shown in FIG. 34) of base portion 1312 are a plurality of electrically conductive prongs 1322, adapted to mount insect trap 1310 to a wall and provide power to insect trap 1310 by inserting conductive prongs 1322 into a standard household electrical wall socket. Alternatively, base portion 1312 may be configured to sit or hang wherever desired and receive power from batteries (not shown) mounted in base portion 1312. While an electrical socket and batteries have been described as providing power to insect trap 1310, any suitable power source may be used. Base portion 1312 includes a top surface 1332 and one or more light sources 1324. Light sources 1324 may use fluorescent, incandescent, LED, or any other lighting technology or combination of lighting technologies. In some embodiments, light sources 1324 emit both UV and visible light. In some embodiments, one or more of light sources 1324 emit UV light and one or more of light sources 1324 emit blue light to better attract a wide variety of insect species. In some embodiments, light sources 1324 emit a combination of wavelengths to mimic sunlight. In some embodiments, one or more of light sources 1324 may emit infrared (IR) light to better attract certain species of insects including mosquitos and fleas. In some embodiments, light sources 1324 may at least partially protrude from top surface 1332 of base portion 1312. In top surface 1332 of base portion 1312 may be at least one opening 1330, which may receive light sources 1324. On the perimeter of top surface 1332 may be an upwardly directed rim or protrusions 1334. Trap portion 1314 includes a front housing 1318 with at least one opening 1320 in a front surface 1352, and a rear housing 1326 with an inside surface 1328. Opening 1320 in front housing 1318 may be configured to admit a wide variety of insects into insect trap 1310, or alternatively it may be configured to admit one or more specific insect species. In some embodiments, opening 1320 is configured to prevent a user's fingers from penetrating opening 1320 and inadvertently touching trapped insects or adhesive when removing and replacing trap portion 1314. In some embodiments, opening 1320 has a size and shape such that a sphere 25 mm in diameter cannot pass through opening 1320, and has a size and shape such that a sphere 1 mm in diameter can pass through any portion of opening 1320. Opening 1320 may be of uniform or of varying width, shape and orientation, and if trap portion 1314 has more than one opening 1320, they may be of identical or of differing widths, shapes and orientations. Opening 1320 may be configured to attract one or more individual insect species or a variety of insect species. Front housing 1318 and rear housing 1326 of trap portion 1314 form an enclosure 1344. Inside surface 1328 of rear housing 1326 may be coated with a transparent, translucent or opaque adhesive. In some embodiments, inside surface 1328 of rear housing 1326 also has a reflective coating (not shown) under adhesive 1340. Alternatively, the material and surface finish of rear housing 1326 may be configured to reflect and disperse UV and/or visible and/or IR light without a reflective coating. Alternatively, adhesive 1340 may also be configured to reflect and disperse UV and/or visible and/or IR light. Inside surface 1328 of rear housing 1326 may also be configured of material that may polarize light reflecting from it in an orientation similar to that of daylight to further attract flying insects, a wide variety of which are known to detect polarized light. In some embodiments, front housing 1318 may be coated with transparent, translucent or opaque adhesive on its inside surface (not shown) to provide additional insect trapping efficiency and capacity. Front housing 1318 may also have a reflective coating (not shown) underneath the adhesive coating on its inside surface to enhance its attraction to insects and may further improve the insect trapping efficiency and effectiveness. In some embodiments, front housing 1318 and rear housing 1326 of trap portion 1314 are thermoformed from opaque sheet plastic, creating a clean and aesthetically pleasing shape while maintaining low cost and disposability. Alternatively, other opaque, transparent or translucent materials such as paper, paperboard, cardboard or paper pulp may also be used. In some embodiments, front housing 1318 and rear housing 1326 are constructed by injection molding or by other suitable manufacturing techniques. In some embodiments, front housing 1318 and rear housing 1326 are joined together where they intersect or engage with an adhesive, although they may also be joined by other commonly used packaging assembly techniques such as ultrasonic welding or RF sealing, or any other suitable assembly method. The materials of trap portion 1314 may also include one or more insect attractants. For example, trap portion 1314 may be impregnated with sorbitol, coleopteran attractants including brevicomin, dominicalure, frontalin, grandlure, ipsdienol, ipsenol, japonilure, lineatin, megatomoic acid, multistriatin, oryctalure, sulcatol, and trunc-call, dipteran attractants including ceralure, cue-lure, latilure, medlure, moguchun, muscalure, and trimedlure, homopteran attractants including rescalure, lepidopteran attractants such as disparlure, straight chain lepidopteran pheromones including codlelure, gossyplure, hexalure, litlure, looplure, orfralure, and ostramone, and other insect attractants such as eugenol, methyl eugenol, and siglure, or other substances to provide a scent that may further increase the insect-attracting efficiency of insect trap 1310. In such embodiments, the insect attractant is integral to trap portion 1314. Alternatively, the insect attractants may be embedded in a separate piece (not shown) that mounts on an inside surface of enclosure 1344 or through an opening in front housing 1318 or rear housing 1326. It is desirable for such attractants to be detectable by an insect for approximately a 2-meter radius from insect trap 1310. In some embodiments, trap portion 1314 also includes at least one transparent or translucent sleeve 1336 that receive and protect light sources 1324 when trap portion 1314 is mounted on base portion 1312. In some embodiments, the material and thickness of sleeve 1336 is selected to transmit a substantial proportion of the UV and/or visible and/or IR light, for example greater than 60% of the light is transmitted through sleeve 1336.

Figure 34:
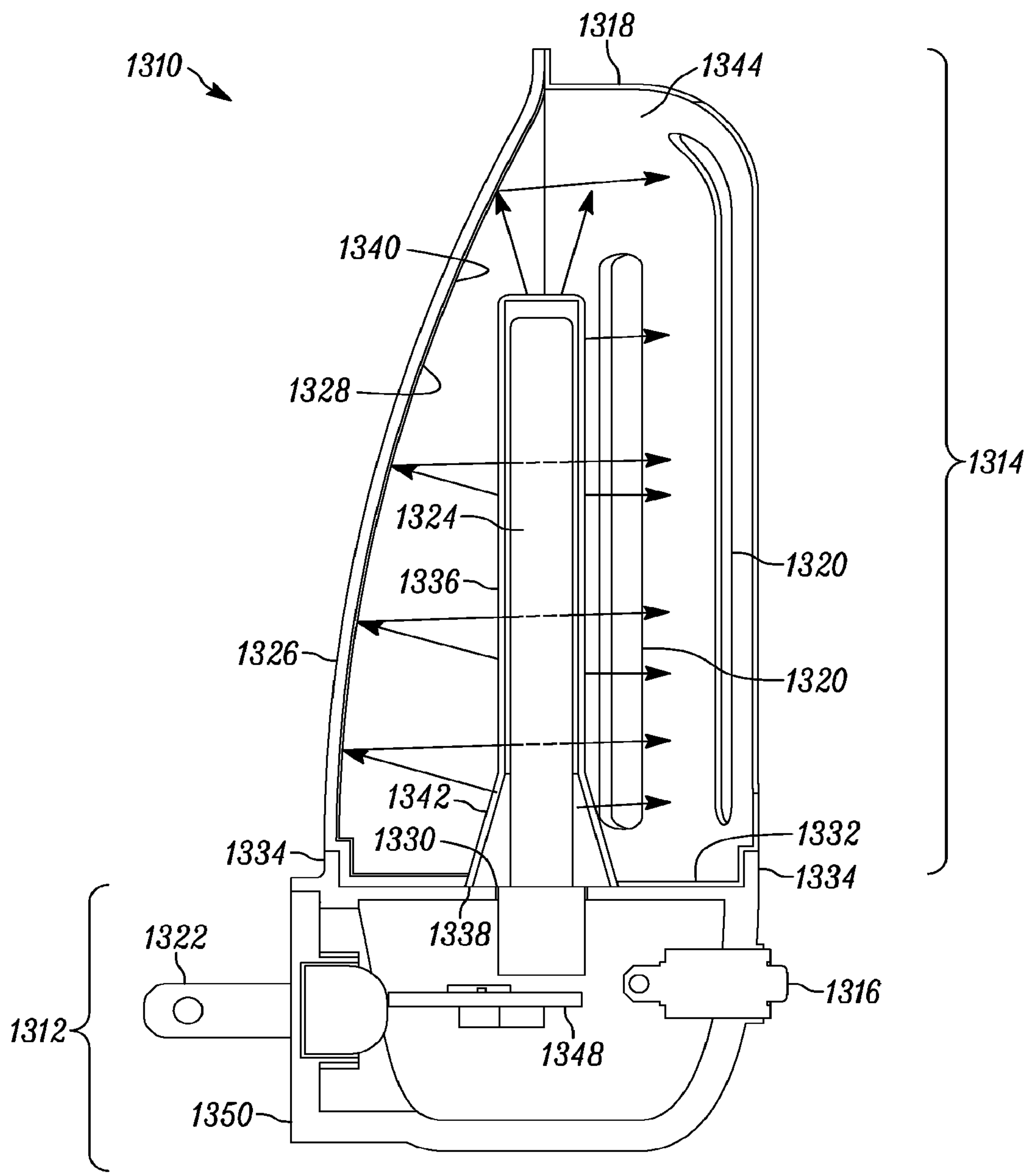
FIG. 34 is a cross-sectional view of the insect trap of FIG. 33.

FIG. 34 is a cross-sectional view through insect trap 1310. In some embodiments, base portion 1312 includes a circuit board 1348 having a programmable processor or chip (not shown) for executing commands, electrically connected to conductive prongs 1322 (only one of which is shown), switch 1316 and light sources 1324 (only one of which is shown). For clarity, however, not all of the electrical connections are shown. Circuit board 1348 may include electronic circuitry to receive ordinary household current from conductive prongs 1322, respond to the position of switch 1316 and provide power to illuminate light sources 1324. Circuit board 1348 may include an energy stabilizer such as a full wave rectifier circuit or any other circuit that provides steady voltage to light sources 1324 when switch 1316 is in the closed position, although it may also provide a varying voltage to light sources 1324 to provide a flickering light which mimics movement that some insect species, including mosquitoes, may find attractive. For example, light flickering frequencies in the approximate range of 0.05 Hz (e.g., to mimic the breathing rate of large mammals) to 250 Hz (e.g., the highest flicker frequency to attract male houseflies), may be desirable and the lighting element may be configured to flicker within this range. Circuit board 1348 may provide power to light sources 1324 to provide UV and/or visible and/or IR light, although it may be configured to provide power to only light sources 1324 that produce UV light or to only light sources 1324 that produce visible light or to only light sources 1324 that produce IR light, or to provide variable power to produce combinations of flickering UV and/or visible and/or IR light. Circuit board 1348 may also be configured to drive a transmitter or transceiver such as a piezoelectric speaker (not shown) or other device that may be mounted in base portion 1312 to emit an insect-attracting sound. In some embodiments, the transmitter or transceiver may emit recorded and/or generated insect sounds or vibrations to better attract insects such as mosquitoes, midges, moths and flies, and may include one or more of insect call, reply, courtship and copulatory songs. In some embodiments, the transmitter or transceiver may emit recorded and/or generated insect-attracting sounds or vibrations such as the heartbeat of a mammal. For example, the transmitter or transceiver may emit an insect-attracting sound or sounds having a frequency in the range of approximately 0.5 Hz (e.g., the heart rate of large mammals) to approximately 240 kHz (e.g., the highest frequency detectable by insects). In some embodiments, the frequency is in the range of approximately 5 Hz to 100 kHz. In some embodiments, the frequency is in the range of approximately 35 Hz to 50 Khz. It is desirable for such insect-attracting sound to be detectable by an insect within approximately a 2-meter distance from insect trap 1310. It is desirable for such insect-attracting sound to be undetectable by a human beyond approximately a 1-meter distance from insect trap 1310.

Trap portion 1314 may have at least one opening 1338. Sleeve 1336 of trap portion 1314 may be mounted with its open end adjacent to opening 1338 and may include a tapered section 1342 adjacent to opening 1338 configured to guide light sources 1324 into sleeve 1336 when trap portion 1314 is mounted to base portion 1312. Alternatively, sleeve 1336 of trap portion 1314 may be made of an opaque material and include one or more openings (not shown) to allow light from light sources 1324 to transmit into enclosure 1344. Alternatively, sleeve 1336 may have an opaque coating (not shown) on its outside surface adjacent to front housing 1318 of trap portion 1314 to prevent light from transmitting directly from light sources 1324 through enclosure 1344 and out through opening 1320 of front housing 1318. Alternatively, sleeve 1336 may be configured of plastic or metal wire mesh (not shown) or any configuration that guides light sources 1324 into trap portion 1314, protects light sources 1324 from touching adhesive 1340, and allows light from light sources 1324 to enter enclosure 1344.

As shown, rim or protrusions 1334 on top surface 1332 of base portion 1312 engage with trap portion 1314 to secure it in place during use, although any other form of attachment may be substituted that allows trap portion 1314 to be securely but removably mounted on base portion 1312.

In the operation of insect trap 1310, conductive prongs 1322 are inserted into a wall electrical socket, and switch 1316 is moved to the closed position. Light sources 1324 emit light, represented by arrows, which transmits through sleeve 1336 in trap portion 1314, into enclosure 1344, and directly onto adhesive 1340 coating inside surface 1328 of rear housing 1326. In some embodiments, light is not manipulated in base portion 1312 and is emitted directly into trap portion 1314.

Inside surface 1328 of rear housing 1326 may include a concave shape and may be configured to reflect and disperse light from light sources 1324 to project the light evenly through enclosure 1344 and out through openings 1320 of front housing 1318, although inside surface 1328 of rear housing 1326 may have a convex shape or a saddle shape or a combination of shapes, or may also have ribs or other features to more evenly distribute the light. The light may be further evenly distributed by the light-diffusing properties of sleeve 1336, by adhesive 1340 on inside surface 1328 of rear housing 1326, or by a combination of the two.

Thereafter, a portion of the light entering enclosure 1344 continues through opening 1320 in front housing 1318 and into the surrounding area where insect trap 1310 is installed. Insects are attracted to the light transmitted through opening 1320 in front housing 1318, and fly or crawl into opening 1320 and onto adhesive 1340, where they become trapped. A user may observe trapped insects by looking through openings 1320 in front housing 1318. When a sufficient number of insects have been trapped, the user may easily remove and discard the entire trap portion 1314 without touching trapped insects, insect debris or adhesive, which remain out of reach inside trap portion 1314, and replace it with a new trap portion 1314. New trap portion 1314 has fresh adhesive-coated surfaces, ensuring that insect trap 1310 will continue to efficiently and effectively attract and trap insects. Because sleeve 1336 protects light sources 1324 from contacting insects, insect debris and adhesive 1340, light sources 1324 remain clean and maintain their light-producing efficiency.

In some embodiments, because trap portion 1314 mounts on top of, and not in front of, base portion 1312, insect trap 1310 protrudes minimally from the wall when plugged into an ordinary household wall socket, and therefore intrudes minimally into the home environment. In some embodiments, insect trap 1310 is configured such that when insect trap 1310 is mounted to a wall, its overall depth, defined by the overall distance insect trap 1310 protrudes from the wall, is smaller than its overall height and its overall width.

It should be appreciated that a benefit of insect trap 1310 is the manipulation of light within trap portion 1314. In some embodiments, light manipulation occurs solely within trap portion 1314. Light manipulation may include reflection, refraction, polarization, dispersion and/or diffusion and is achieved by engaging with a manipulative element or surface (e.g., inside surface 1328 and adhesive 1340). In some embodiments, light manipulation produces an even distribution of light on adhesive 1340. In some embodiments, light is manipulated to produce a predetermined pattern on adhesive 1340 or within trap portion 1314, for example, an even distribution, an even distribution with hot spots of higher intensity, hot spot patterns, and/or combinations thereof.

Any suitable adhesive material may be used as part of an adhesive surface for trapping an insect. In some embodiments, pressure sensitive adhesives such as acrylics, butyl rubber, natural rubber, nitriles, silicones, styrene block copolymers, styrene-ethylene/propylene, styrene-isoprene-styrene, vinyl ethers may be used. Generally, the thickness of such adhesives will be in the range of approximately 0.01 mm to 1 mm. In some embodiments, the adhesive thickness is in the range of approximately 0.05 mm to 0.2 mm, with a thickness of approximately 0.1 mm being most often used.

Insect trap 1310 of this configuration may accommodate a variety of different trap portions 1314 that may be removably mounted to base portion 1312, each trap portion 1314 being uniquely configured to attract and trap a specific species or multiple species of insects. For example, the overall size and shape of trap portion 1314, and the size, shape, location and orientation of opening 1320 in front housing 1318 of trap portion 1314, may be uniquely configured to attract and trap a specific species or multiple species of flying insect. For example, in some embodiments, trap portion 1314 is approximately 20 mm to 600 mm wide, 20 mm to 600 mm high and 5 mm to 150 mm deep. In some embodiments, trap portion 1314 is approximately 20 mm to 200 mm wide, 20 mm to 200 mm high and 5 mm to 80 mm deep. In some embodiments, trap portion 1314 is approximately 20 mm to 130 mm wide, 20 mm to 130 mm high and 5 mm to 50 mm deep.

In some embodiments, base portion 1312 is approximately 20 mm to 600 mm wide, 10 mm to 150 mm high and 10 mm to 150 mm deep. In some embodiments, base portion 1312 is 20 mm to 200 mm wide, 10 mm to 100 mm high and 10 mm to 80 mm deep. In some embodiments, base portion 1312 is 20 mm to 130 mm wide, 10 mm to 50 mm high and 10 mm to 50 mm deep.

As provided herein, opening 1320 may be a variety of shapes and/or sizes. For example, opening 1320 may be circular, square, rectangular, polygonal and/or elliptical in shape. Alternatively, opening 1320 may be slot shaped having a straight, curved or undulating shape or pattern. When opening 1320 is circular, opening 1320 may be approximately 0.5 mm to 30 mm in diameter. In some embodiments, circular opening 1320 is approximately 0.5 mm to 20 mm in diameter. In some embodiments, circular opening 1320 is approximately 0.5 mm to 15 mm in diameter. When opening 1320 is slot shaped, opening 1320 may be approximately 2 mm to 30 mm wide and 5 mm to 500 mm long. In some embodiments, slot shaped opening 1320 is approximately 2 mm to 20 mm wide and 5 mm to 200 mm long. In some embodiments, slot shaped opening 1320 is approximately 2 mm to 15 mm wide and 5 mm to 100 mm long.

In some embodiments, opening 1320 covers all or a portion of front housing 1318. For example, opening 1320 may cover a range of approximately 1% to 75% of the surface area of front housing 1318. In some embodiments, opening 1320 covers approximately 5% to 50% of the surface area of front housing 1318. In some embodiments, opening 1320 covers approximately 10% to 30% of the surface area of front housing 1318.

Figure 35:
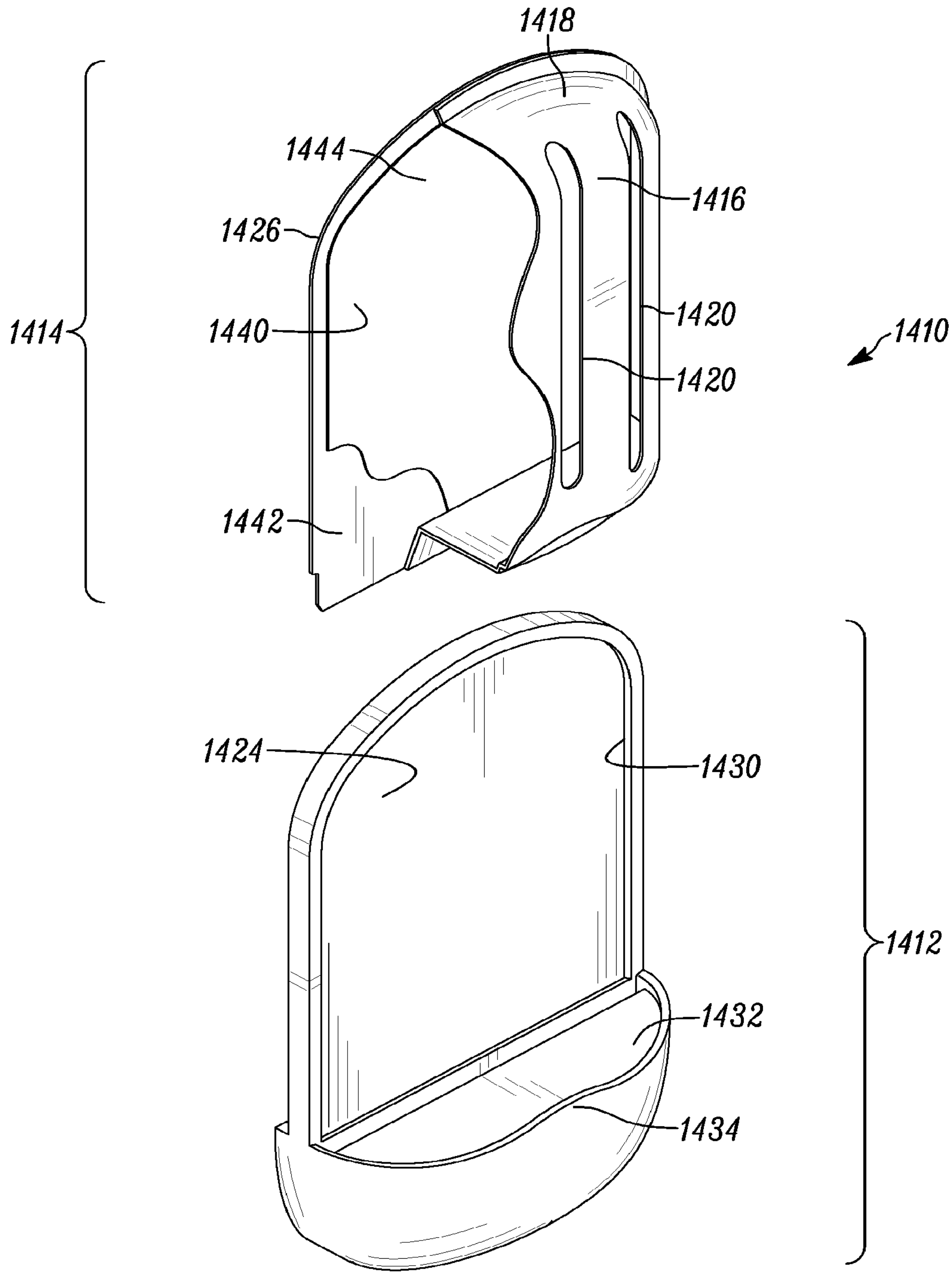
FIG. 35 is a front perspective view of a fourteenth embodiment of an insect trap in accordance with principles of the disclosure.

FIG. 35 is a front perspective view of a fourteenth embodiment of an insect trap, indicated generally at 1410. Insect trap 1410 includes a base portion 1412 and a removable trap portion 1414. Trap portion 1414 is shown partially cut away and removed from base portion 1412 in this view. Base portion 1412 includes a top surface 1432, at least one light source 1424 and at least one opening 1430, through which light source 1424 is exposed.

In some embodiments, light source 1424 uses electroluminescent (EL) technology, although other lighting technologies or combination of lighting technologies may be adapted for use. In some embodiments, light source 1424 emits both UV and visible light. In some embodiments, light source 1424 emits both UV and blue light to better attract a wide variety of insect species. In some embodiments, light source 1424 emits a combination of wavelengths to mimic sunlight. In some embodiments, light source 1424 emits infrared (IR) light to better attract certain species of insects including mosquitos and fleas. On the perimeter of top surface 1432 may be an upwardly directed rim or protrusions 1434. Trap portion 1414 includes a front housing 1418 with at least one opening 1420 in a front surface 1416, and a transparent or translucent back plate 1426. Opening 1420 in front housing 1418 may be configured to admit a wide variety of insects into insect trap 1410, or alternatively it may be configured to admit one or more specific insect species. In some embodiments, opening 1420 is configured to prevent a user's fingers from penetrating opening 1420 and inadvertently touching trapped insects or adhesive when removing and replacing trap portion 1414. In some embodiments, opening 1420 has a size and shape such that a sphere 25 mm in diameter cannot pass through opening 1420, and has a size and shape such that a sphere 1 mm in diameter can pass through any portion of opening 1420. Opening 1420 may be of uniform or of varying width, shape and orientation, and if trap portion 1414 has more than one opening 1420, they may be of identical or of differing widths, shapes and orientations. Opening 1420 may be configured to attract one or more individual insect species or a variety of insect species. Front housing 1418 and back plate 1426 form an enclosure 1444. As shown, back plate 1426 is substantially planar, although it may have ribs or other features (not shown) that increase adhesive surface area and create regions of light/dark contrast, which are highly visible to a wide variety of insects and may be more attractive to them.

Back plate 1426 includes a front surface 1442, which may be coated with a transparent or translucent adhesive 1440. Back plate 1426 may also be configured to polarize light transmitted through it in an orientation similar to that of daylight to further attract flying insects, a wide variety of which are known to detect polarized light. In some embodiments, front housing 1418 is coated with transparent, translucent or opaque adhesive (not shown) on its inside surface (not shown) to provide additional insect trapping efficiency and capacity. In some embodiments, front housing 1418 may also have a reflective coating (not shown) underneath the adhesive coating on its inside surface to enhance its attraction to insects and further improve the insect trapping efficiency and effectiveness. In some embodiments, front housing 1418 and back plate 1426 are thermoformed from opaque sheet plastic, creating a clean and aesthetically pleasing shape while maintaining low cost and disposability. Alternatively, other opaque, transparent or translucent materials such as paper, paperboard, cardboard or paper pulp may also be used. In some embodiments, front housing 1418 and back plate 1426 are constructed by injection molding or by other suitable manufacturing techniques.

In some embodiments, front housing 1418 and back plate 1426 are joined together where they intersect or engage with an adhesive, although they may also be joined together by other commonly used packaging assembly techniques such as ultrasonic welding or RF sealing, or any other suitable assembly method. The materials of trap portion 1414 may also be impregnated with one or more insect attractants. For example, trap portion 1414 may be impregnated with sorbitol, coleopteran attractants including brevicomin, dominicalure, frontalin, grandlure, ipsdienol, ipsenol, japonilure, lineatin, megatomoic acid, multistriatin, oryctalure, sulcatol, and trunc-call, dipteran attractants including ceralure, cuelure, latilure, medlure, moguchun, muscalure, and trimedlure, homopteran attractants including rescalure, lepidopteran attractants such as disparlure, straight chain lepidopteran pheromones including codlelure, gossyplure, hexalure, litlure, looplure, orfralure, and ostramone, and other insect attractants such as eugenol, methyl eugenol, and siglure, or other substances to provide a scent that may further increase the insect-attracting efficiency of insect trap 1410. Alternatively, the insect attractants may be embedded in a separate piece (not shown) that may mount on an inside surface of enclosure 1444 or through an opening in front housing 1418 or back plate 1426. It is desirable for such attractants to be detectable by an insect for approximately a 2-meter radius from insect trap 1410.

Figure 36:
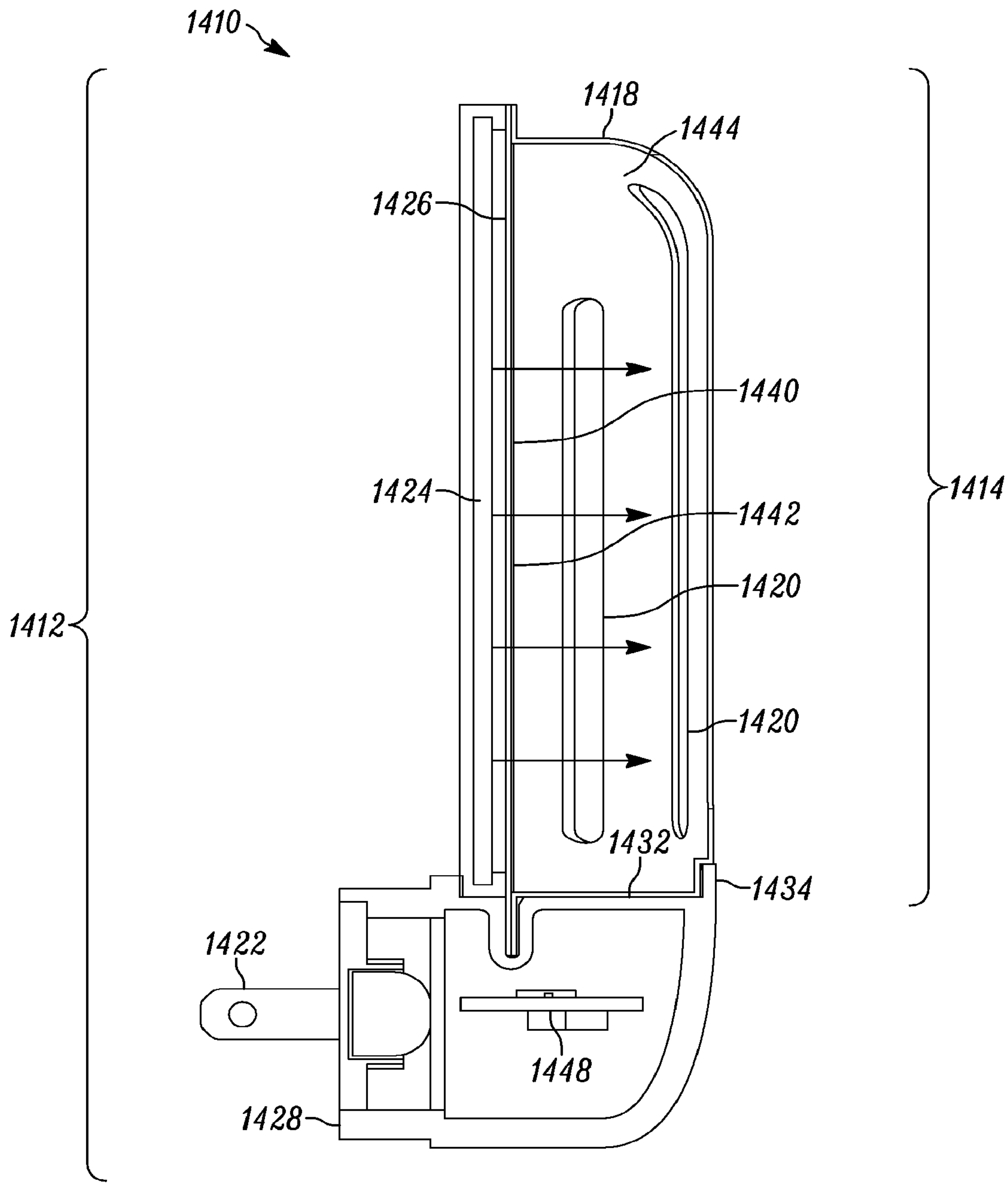
FIG. 36 is a cross-sectional view of the insect trap of FIG. 35.

FIG. 36 is a cross-sectional view through insect trap 1410. Protruding from a rear surface 1428 of base portion 1412 are a plurality of electrically conductive prongs 1422 (only one of which is shown), adapted to mount insect trap 1410 to a wall and provide power to insect trap 1410 by inserting conductive prongs 1422 into a standard household electrical wall socket. Alternatively, base portion 1412 may be configured to sit or hang wherever desired and receive power from batteries (not shown) mounted in base portion 1412. While an electrical socket and batteries have been described as providing power to insect trap 1410, any suitable power source may be used. In some embodiments, base portion 1412 includes a circuit board 1448 having a programmable processor or chip (not shown) for executing commands, electrically connected to conductive prongs 1422 (only one of which is shown) and light source 1424. For clarity, however, not all of the electrical connections are shown. Circuit board 1448 may include electronic circuitry to receive ordinary household current from conductive prongs 1422 and provide power to illuminate light source 1424. Circuit board 1448 may include an energy stabilizer such as a full wave rectifier circuit or any other circuit that provides steady voltage to light source 1424, although it may also provide a varying voltage to light source 1424 to provide a flickering light which mimics movement that some insect species, including mosquitoes, may find attractive. For example, light flickering frequencies in the approximate range of 0.05 Hz (e.g., to mimic the breathing rate of large mammals) to 250 Hz (e.g., the highest flicker frequency to attract male houseflies), may be desirable and the lighting element may be configured to flicker within this range. Circuit board 1448 may provide power to light source 1424 to provide both UV and/or visible and/or IR light, although it may be configured to provide power to only the UV light source 1424 or to only the visible light source 1424 or to only the IR light source, or to provide variable power to produce combinations of flickering UV and/or visible and/or IR light. Circuit board 1448 may also be configured to drive a transmitter or transceiver such as a piezoelectric speaker (not shown) or other device that may be mounted in base portion 1412 to emit an insect-attracting sound. In some embodiments, the transmitter of transceiver may emit recorded and/or generated insect sounds or vibrations to better attract insects such as mosquitoes, midges, moths and flies, and may include one or more of insect call, reply, courtship and copulatory songs. In some embodiments, the transmitter or transceiver may emit recorded and/or generated insect-attracting sounds or vibrations such as the heartbeat of a mammal. For example, the transmitter or transceiver may emit an insect-attracting sound or sounds having a frequency in the range of approximately 0.5 Hz (e.g., the heart rate of large mammals) to approximately 240 kHz (e.g., the highest frequency detectable by insects). In some embodiments, the frequency is in the range of approximately 5 Hz to 100 kHz. In some embodiments, the frequency is in the range of approximately 35 Hz to 50 Khz. It is desirable for such insect-attracting sound to be detectable by an insect within approximately a 2-meter distance from insect trap 1410. It is desirable for such insect-attracting sound to be undetectable by a human beyond approximately a 1-meter distance from insect trap 1410.

As shown, rim or protrusions 1434 on top surface 1432 of base portion 1412 engage with trap portion 1414 to secure it in place during use, although any other form of attachment may be substituted that allows trap portion 1414 to be securely but removably mounted on base portion 1412.

In the operation of insect trap 1410, conductive prongs 1422 are inserted into a wall electrical socket, circuit board 1448 may provide current to light source 1424, and light source 1424 emits light, represented by arrows, which transmit directly onto and through back plate 1426, through adhesive 1440 on front surface 1442, and into enclosure 1444. In some embodiments, light is not manipulated in base portion 1412 and is emitted directly into trap portion 1414. In some embodiments, the light is further evenly distributed by the light-diffusing properties of back plate 1426, or adhesive 1440, or by a combination of the two.

Thereafter, a portion of the light entering enclosure 1444 continues through opening 1420 in front housing 1418 and into the surrounding area where insect trap 1410 is installed. Insects are attracted to the light transmitted through adhesive 1440 and through opening 1420, and fly or crawl into opening 1420 and onto adhesive 1440, where they become trapped. A user may observe trapped insects by looking through opening 1420 in front housing 1418. When a sufficient number of insects have been trapped, the user may easily remove and discard the entire trap portion 1414 without touching trapped insects, insect debris or adhesive, which remain out of reach inside trap portion 1414, and replace it with a new trap portion 1414. The new trap portion 1414 has fresh adhesive-coated surfaces, ensuring that insect trap 1410 will continue to efficiently and effectively attract and trap insects.

In some embodiments, insect trap 1410 is configured such that when insect trap 1410 is mounted to a wall, its overall depth, defined by the overall distance insect trap 1410 protrudes from the wall, is smaller than its overall height and its overall width.

Any suitable adhesive material may be used as part of an adhesive surface for trapping an insect. In some embodiments, pressure sensitive adhesives such as acrylics, butyl rubber, natural rubber, nitriles, silicones, styrene block copolymers, styrene-ethylene/propylene, styrene-isoprene-styrene, vinyl ethers may be used. Generally, the thickness of such adhesives will be in the range of approximately 0.01 mm to 1 mm. In some embodiments, the adhesive thickness is in the range of approximately 0.05 mm to 0.2 mm, with a thickness of approximately 0.1 mm being most often used.

Insect trap 1410 of this configuration may accommodate a variety of different trap portions 1414 that may be removably mounted to base portion 1412, each trap portion 1414 being uniquely configured to attract and trap a specific species or multiple species of insects. For example, the overall size and shape of trap portion 1414, and the size, shape, location and orientation of opening 1420 in front housing 1418 of trap portion 1414, may be uniquely configured to attract and trap a specific species or multiple species of flying insect. For example, in some embodiments, trap portion 1414 is approximately 20 mm to 600 mm wide, 20 mm to 600 mm high and 5 mm to 150 mm deep. In some embodiments, trap portion 1414 is approximately 20 mm to 200 mm wide, 20 mm to 200 mm high and 5 mm to 80 mm deep. In some embodiments, trap portion 1414 is approximately 20 mm to 130 mm wide, 20 mm to 130 mm high and 5 mm to 50 mm deep.

In some embodiments, base portion 1412 is approximately 20 mm to 600 mm wide, 10 mm to 150 mm high and 10 mm to 150 mm deep. In some embodiments, base portion 1412 is 20 mm to 200 mm wide, 10 mm to 100 mm high and 10 mm to 80 mm deep. In some embodiments, base portion 1412 is 20 mm to 130 mm wide, 10 mm to 50 mm high and 10 mm to 50 mm deep.

As provided herein, opening 1420 may be a variety of shapes and/or sizes. For example, opening 1420 may be circular, square, rectangular, polygonal and/or elliptical in shape. Alternatively, opening 1420 may be slot shaped having a straight, curved or undulating shape or pattern. When opening 1420 is circular, opening 1420 may be approximately 0.5 mm to 30 mm in diameter. In some embodiments, circular opening 1420 is approximately 0.5 mm to 20 mm in diameter. In some embodiments, circular opening 1420 is approximately 0.5 mm to 15 mm in diameter. When opening 1420 is slot shaped, opening 1420 may be approximately 2 mm to 30 mm wide and 5 mm to 500 mm long. In some embodiments, slot shaped opening 1420 is approximately 2 mm to 20 mm wide and 5 mm to 200 mm long. In some embodiments, slot shaped opening 1420 is approximately 2 mm to 15 mm wide and 5 mm to 100 mm long.

In some embodiments, opening 1420 covers all or a portion of front housing 1418. For example, opening 1420 may cover a range of approximately 1% to 75% of the surface area of front housing 1418. In some embodiments, opening 1420 covers approximately 5% to 50% of the surface area of front housing 1418. In some embodiments, opening 1420 covers approximately 10% to 30% of the surface area of front housing 1418.

Figure 37:
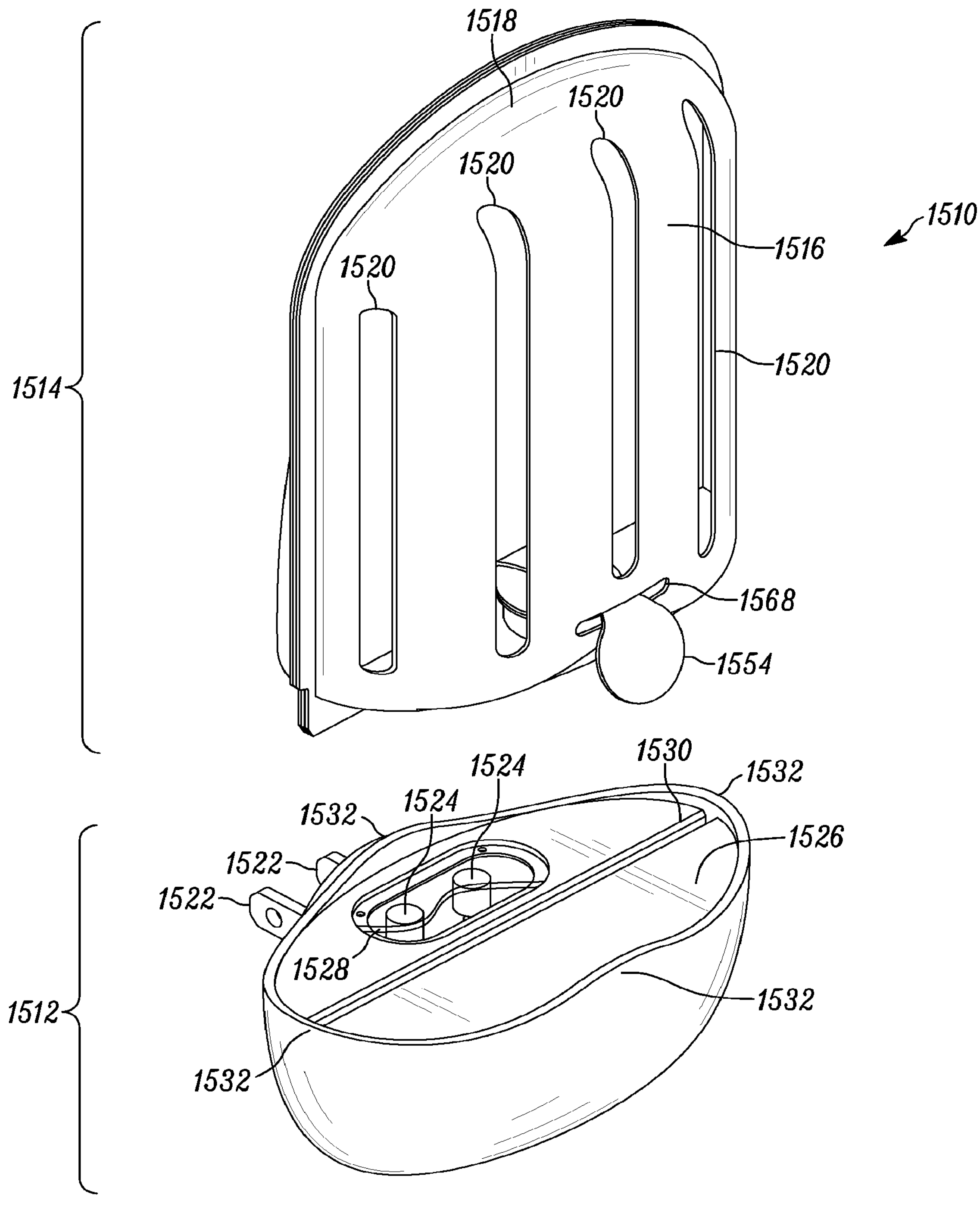
FIG. 37 is a front perspective view of a fifteenth embodiment of an insect trap in accordance with principles of the disclosure.

FIG. 37 is a front perspective view of a fifteenth embodiment of an insect trap, indicated generally at 1510. Insect trap 1510 includes a base portion 1512 and a removable trap portion 1514. Trap portion 1514 is shown removed from base portion 1512 in this view. Trap portion 1514 includes a front housing 1518 with a tab slot 1568 and at least one opening 1520 in a front surface 1516. Opening 1520 in front housing 1518 may be configured to admit a wide variety of insects into insect trap 1510, or alternatively it may be configured to admit one or more specific insect species. In some embodiments, opening 1520 is configured to prevent user's fingers from penetrating opening 1520 and inadvertently touching trapped insects or adhesive when removing and replacing trap portion 1514. In some embodiments, opening 1520 has a size and shape such that a sphere 25 mm in diameter cannot pass through opening 1520, and has a size and shape such that a sphere 1 mm in diameter can pass through any portion of opening 1520. Opening 1520 may be of uniform or of varying width, shape and orientation, and if trap portion 1514 has more than one opening 1520, they may be of identical or of differing widths, shapes and orientations. Opening 1520 may be configured to attract one or more individual insect species or a variety of insect species. As shown, protruding from tab slot 1568 in front housing 1518 in trap portion 1514 is a grip end 1562 of a removable tab 1554. Protruding from a rear surface 1572 (shown in FIG. 40) of base portion 1512 are a plurality of electrically conductive prongs 1522, adapted to mount insect trap 1510 to a wall and provide power to insect trap 1510 by inserting conductive prongs 1522 into a standard household electrical wall socket. Alternatively, base portion 1512 may be configured to sit or hang wherever desired and receive power from batteries (not shown) mounted in base portion 1512. While an electrical socket and batteries have been described as providing power to insect trap 1510, any suitable power source may be used. Base portion 1512 includes a top surface 1526 and at least one LED 1524. In some embodiments, LED 1524 includes at least one that emits ultraviolet (UV) light and at least one that emits visible light. In some embodiments, LED 1524 includes at least one that emits UV light and at least one that emits blue light to better attract a wide variety of insect species. In some embodiments, the lighting element emits a combination of wavelengths to mimic sunlight. In some embodiments, LEDs 1524 include at least one that emits IR light to better attract certain species of insects including mosquitos and fleas. Mounted in top surface 1526 of base portion 1512 may be a transparent or translucent window 1528, shown partially cut away to reveal LED 1524. Window 1528 protects LED 1524 from dust and insect debris, and allows base portion 1512 to be easily cleaned. In top surface 1526 may be a slot 1530, and on the perimeter of the top surface 1526 is a rim or upwardly directed protrusions 1532.

Figure 38:
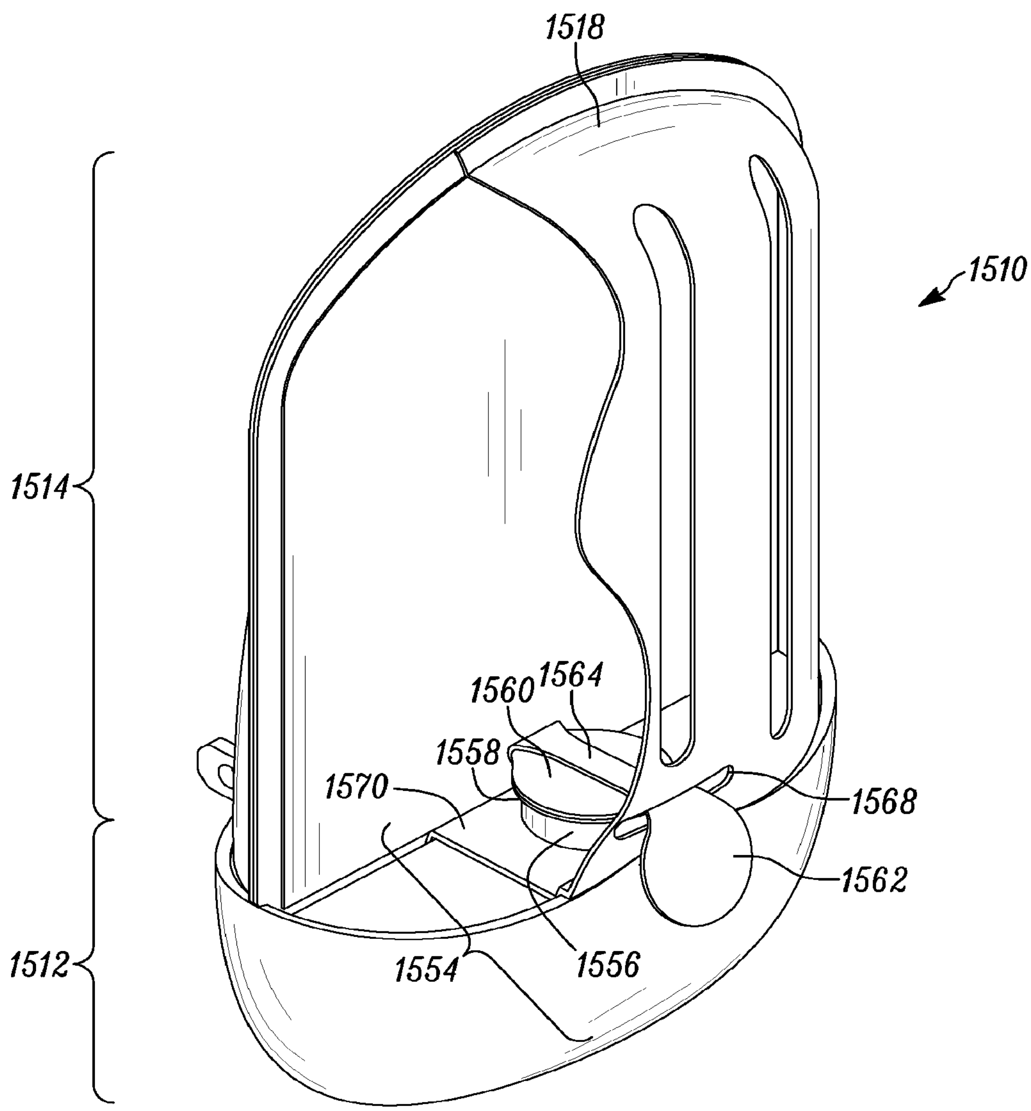
FIG. 38 is a front perspective view of the insect trap of FIG. 37.

FIG. 38 is a front perspective view of insect trap 1510. Insect trap 1510 is shown partially cut away in this view. As shown, an upwardly-facing cup 1556 is mounted on a bottom inside surface 1570 of front housing 1518. Cup 1556 may have a lip 1558 protruding from the perimeter of its open end. Cup 1556 may be constructed of any material or combination of materials that act as a barrier to any of the insect-attracting substances mentioned herein. Removable tab 1554 may have a sealing end 1560 and a web 1564 between grip end 1562 and sealing end 1560, and may be constructed of any flexible and durable material or combination of materials that act as a barrier to any of the insect-attracting substances mentioned herein. As shown, sealing end 1560 is configured to cover the open end of cup 1556, and may be affixed to lip 1558 with an adhesive to create an airtight seal, thereby maintaining the freshness of any insect-attracting substances (not shown) inside cup 1556, as well as holding removable tab 1554 in place until it is removed by a user. Web 1564 may be folded over sealing end 1560 of removable tab 1554 and extend to tab slot 1568 of front housing 1518. Grip end 1562 of removable tab 1554 protrudes through tab slot 1568 and may be folded downwards over an outside portion of front housing 1518.

Figure 39:
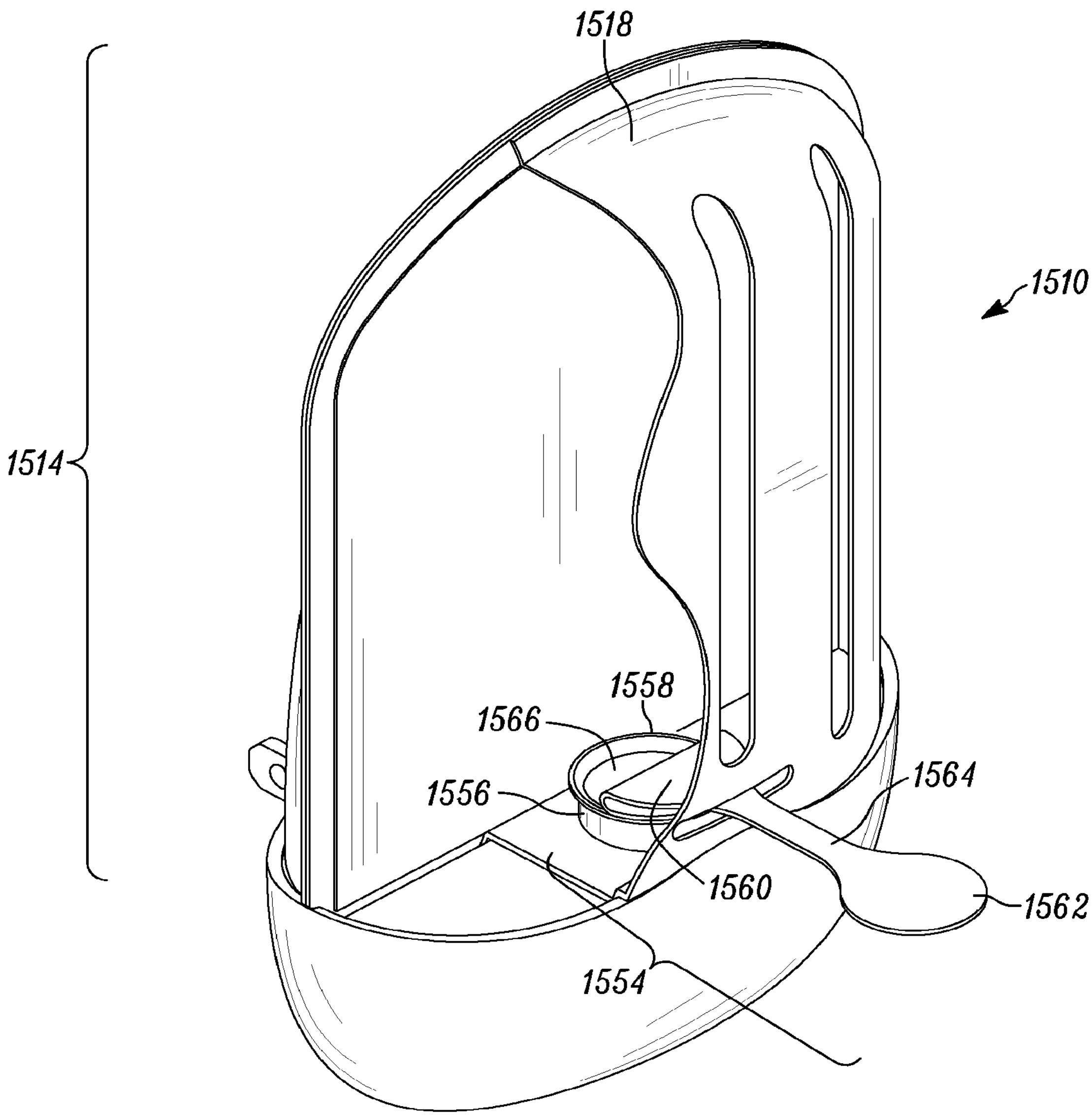
FIG. 39 is a front perspective view of the insect trap of FIG. 37.

FIG. 39 is a front perspective view of insect trap 1510. Trap portion 1514 is shown partially cut away and removable tab 1554 partially removed in this view. A user may grasp removable tab 1554 at grip end 1562 and pull removable tab 1554 away from trap portion 1514, and thereby breaking the seal between lip 1558 of cup 1556 and sealing end 1560 of removable tab 1554. Inside cup 1556 is a carrier material 1566 impregnated with one or more insect-attracting substances. For example, carrier material 1566 may be impregnated with sorbitol, coleopteran attractants including brevicomin, dominicalure, frontalin, grandlure, ipsdienol, ipsenol, japonilure, lineatin, megatomoic acid, multistriatin, oryctalure, sulcatol, and trunc-call, dipteran attractants including ceralure, cue-lure, latilure, medlure, moguchun, muscalure, and trimedlure, homopteran attractants including rescalure, lepidopteran attractants such as disparlure, straight chain lepidopteran pheromones including codlelure, gossyplure, hexalure, litlure, looplure, orfralure, and ostramone, and other insect attractants such as eugenol, methyl eugenol, and siglure, or other substances to provide a scent that may further increase the insect-attracting efficiency of the insect trap. Breaking the seal between cup 1556 and sealing end 1560 of removable tab 1554 releases the insect-attracting scent or scents through opening 1520 of front housing 1518 and into the surrounding area where insect trap 1510 is installed. It is desirable for such attractants to be detectable by an insect for approximately a 2-meter radius from insect trap 1510.

Figure 40:
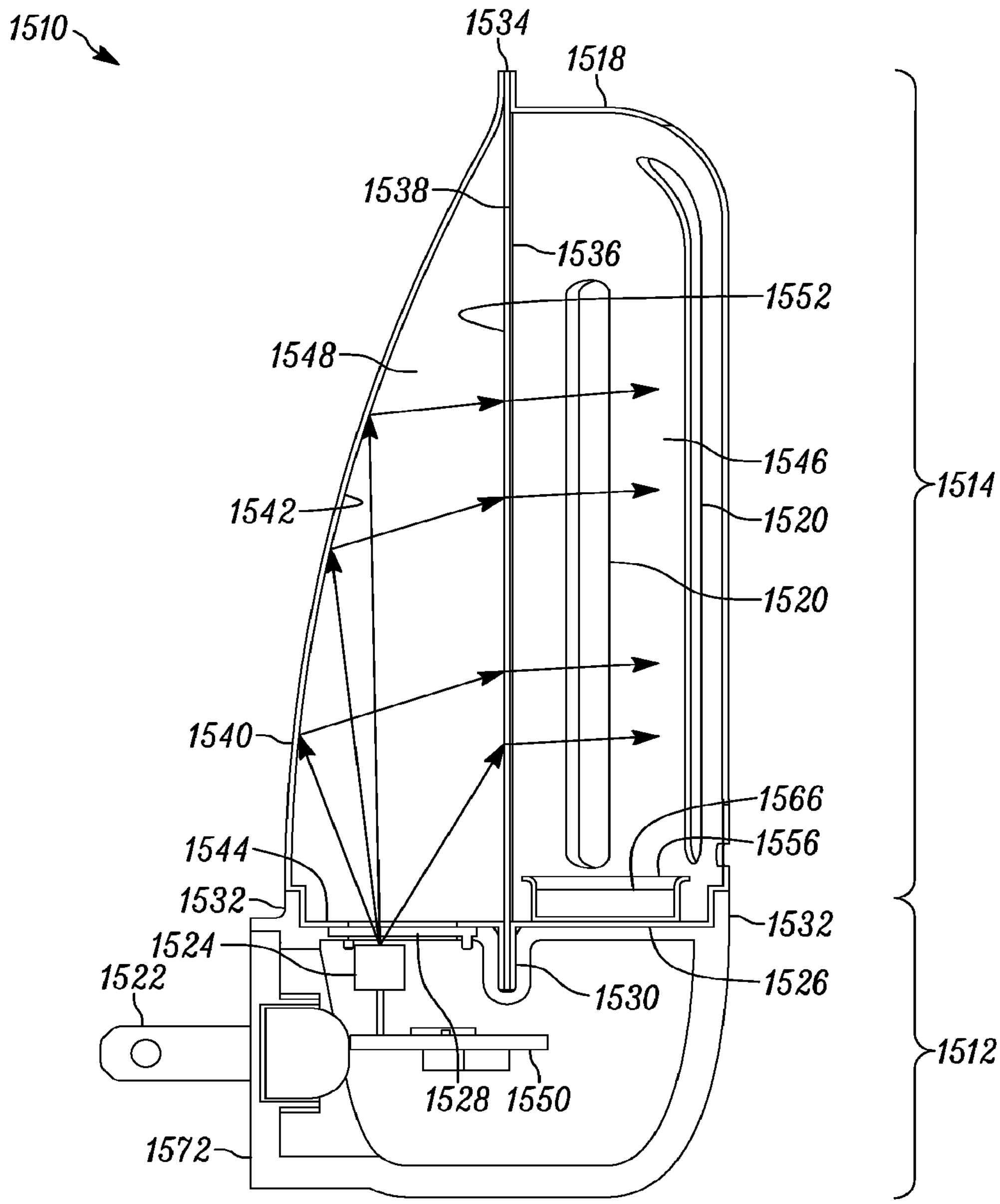
FIG. 40 is a cross-sectional view through the insect trap of FIG. 37.

FIG. 40 is a cross-sectional view through insect trap. Removable tab 1554 (not shown) has been completely removed in this view. Trap portion 1514 includes a divider 1534 with a front surface 1538, and a rear housing 1540 with an inside surface 1542. In some embodiments, divider 1534 is constructed from or includes a transparent or translucent material and may be coated with a transparent or translucent adhesive 1536 on front surface 1538. In some embodiments, divider 1534 may also be configured to polarize light transmitted through it in an orientation similar to that of daylight to further attract flying insects, a wide variety of which are known to detect polarized light. In some embodiments, the material and thickness of divider 1534 and the material and thickness of adhesive 1536 are selected to transmit a substantial proportion of the UV and/or visible and/or IR light, for example greater than 60% of the light is transmitted through divider 1534 and adhesive 1536. In some embodiments, inside surface 1542 of rear housing 1540 has a reflective coating. Alternatively, the material and surface finish of rear housing 1540 may be configured to reflect and disperse UV and/or visible light without a reflective coating. Rear housing 1540 may include an opening 1544 on its bottom surface, or alternatively opening 1544 may be replaced by a transparent or translucent window (not shown).

In some embodiments, front housing 1518 and rear housing 1540 are thermoformed from opaque sheet plastic, creating a clean and aesthetically pleasing shape while maintaining low cost and disposability. Alternatively, other opaque, transparent or translucent materials such as paper, paperboard, cardboard or paper pulp may also be used. In some embodiments, front housing 1518 and rear housing 1540 are constructed by injection molding or by other suitable manufacturing techniques. As shown, divider 1534 has a rear surface 1552, and may be substantially planar, and may be configured to be parallel to, or at an angle to, the primary direction (not shown) of the light produced by LED 1524. In some embodiments, divider 1534 may be formed into a convex, concave or saddle-shaped contour (not shown), or a combination of contours to optimize the even distribution of light. In some embodiments, divider 1534 may have ribs or other features (not shown) that increase adhesive surface area and create regions of light/dark contrast, which are highly visible to a wide variety of insects and may be more attractive to them.

In some embodiments, front housing 1518 is coated with transparent, translucent or opaque adhesive (not shown) on its inside surface to provide additional insect trapping efficiency and capacity. In addition, front housing 1518 may also have a reflective coating (not shown) underneath the adhesive coating on its inside surface to enhance its attraction to insects and further improve the insect trapping efficiency and effectiveness. In some embodiments, front housing 1518, divider 1534 and rear housing 1540 are joined together at where they intersect or engage by ultrasonic welding or high frequency (HF) welding, although they may also be permanently or removably joined together by gluing or by any other suitable assembly method. The materials of trap portion 1514 (e.g., front housing 1518, rear housing 1540, divider 1534 and adhesive 1536) may also be impregnated with one or more insect attractants. Divider 1534 separates trap portion 1514 into a front enclosure 1546 and a rear enclosure 1548.

In some embodiments, base portion 1512 includes a circuit board 1550 having a programmable processor or chip (not shown) for executing commands, electrically connected to conductive prongs 1522 (only one of which is shown) and LED 1524. For clarity, however, not all of the electrical connections are shown. Circuit board 1550 may include electronic circuitry to receive ordinary household current from conductive prongs 1522 and provide power to illuminate LED 1524. Circuit board 1550 may include an energy stabilizer such as a full wave rectifier circuit or any other circuit that provides steady voltage to LED 1524, although it may also provide a varying voltage to LED 1524 to provide a flickering light that mimics movement that some insect species, including mosquitoes, may find attractive. For example, light flickering frequencies in the approximate range of 0.05 Hz (e.g., to mimic the breathing rate of large mammals) to 250 Hz (e.g., the highest flicker frequency to attract male houseflies), may be desirable and the lighting element may be configured to flicker within this range. Circuit board 1550 may provide power to LED 1524 to provide UV and/or visible and/or IR light although it may be configured to provide power to only UV LED 1524 or to only visible light LED 1524 or to only IR LED 1524, or to provide variable power to produce combinations of flickering UV and/or visible and/or IR light. Circuit board 1550 may also be configured to drive a transmitter or transceiver such as a piezoelectric speaker (not shown) or other device that may be mounted in base portion 1512 to emit an insect-attracting sound. In some embodiments, the transmitter or transceiver may emit recorded and/or generated insect sounds or vibrations to better attract insects such as mosquitoes, midges, moths and flies, and may include one or more of insect call, reply, courtship and copulatory songs. In some embodiments, the transmitter or transceiver may emit recorded and/or generated insect-attracting sounds or vibrations such as the heartbeat of a mammal. For example, the transmitter or transceiver may emit an insect-attracting sound or sounds having a frequency in the range of approximately 0.5 Hz (e.g., the heart rate of large mammals) to approximately 240 kHz (e.g., the highest frequency detectable by insects). In some embodiments, the frequency is in the range of approximately 5 Hz to 100 kHz. In some embodiments, the frequency is in the range of approximately 35 Hz to 50 Khz. It is desirable for such insect-attracting sound to be detectable by an insect within approximately a 2-meter distance from insect trap 1510. It is desirable for such insect-attracting sound to be undetectable by a human beyond approximately a 1-meter distance from insect trap 1510.

As shown, slot 1530 in top surface 1526 of base portion 1512 and rim or protrusions 1532 on top surface 1526 of base portion 1512 engage with trap portion 1514 to secure it in place during use, although any other form of attachment may be substituted that may allow trap portion 1514 to be securely but removably mounted on base portion 1512.

In the operation of insect trap 1510, conductive prongs 1522 (only one of which is shown) are inserted into a wall electrical socket, and removable tab 1554 (not shown) is pulled from trap portion 1514 and removed, thereby breaking the seal between cup 1556 and removable tab 1554 and exposing carrier material 1566 and insect-attracting substance or substances to the air and releasing an insect-attracting scent or scents into trap portion 1514 and into the surrounding area where insect trap 1510 is installed. Cup 1556, carrier material 1566 and the insect-attracting substance or substances may be configured to release an insect-attracting scent or scents for a predetermined amount of time to correspond with the expected useful life of trap portion 1514, which may be e.g., a week, a month or three months. Alternatively, cup 1556, carrier material 1566 and the insect-attracting substance or substances may be configured to preferentially release one insect-attracting scent or group of scents earlier in the useful life of trap portion 1514 and another insect-attracting scent or group of scents later in the useful life of trap portion 1514 to attract more insects or a wider variety of insects with a changing scent, or to provide a stronger scent later in the useful life of trap portion 1514, to compensate for the reduced light emitted from trap portion 1514 when many insects are caught in adhesive 1536. Alternatively, cup 1556 and carrier material 1566 may be configured to release additional scents that may mask the insect-attracting scent or scents or mask or eliminate components of the insect-attracting scent or scents that humans may find objectionable, or that children or non-intended animals (e.g., pets) may find attractive, without substantially reducing their attractiveness to insects. LED 1524 emits light, represented by arrows, which transmits through window 1528 in base portion 1512, through opening 1544 in rear housing 1540 of trap portion 1514, into rear enclosure 1548, and directly onto inside surface 1542 of rear housing 1540 and rear surface 1552 of divider 1534. In some embodiments, light is not manipulated in base portion 1512 and is emitted directly into trap portion 1514. Inside surface 1542 of rear housing 1540 may include a concave shape and may be configured to reflect and disperse the UV and visible light from LED 1524 to distribute the light evenly onto rear surface 1552 of divider 1534, although inside surface 1542 of rear housing 1540 may have a convex shape or a saddle shape or a combination of shapes, or may also have ribs or other features (not shown) to more evenly distribute the light. Alternatively, an optical enhancer such as an anamorphic lens (not shown) or any other lens or combination of lenses configured to distribute the light (e.g., evenly, according to specific patterns, at a focal point, etc.) onto rear surface 1552 of divider 1534, may be mounted to rear housing 1540 at or near opening 1544 or to base portion 1512 at or near window 1528, and may replace or augment the role of inside surface 1542 of rear housing 1540. In some embodiments, the light from LED 1524 may directly strike rear surface 1552 of divider 1534 at an oblique angle (e.g., an acute angle from approximately 0° to 90°) and be spread across divider 1534, and may replace or augment the role of inside surface 1542 of rear housing 1540 or of the lens or lenses mounted to rear housing 1540.

Thereafter, light transmits through divider 1534 and adhesive 1536 on front surface 1538, and into front enclosure 1546. Light may be further evenly distributed by the light-diffusing properties of divider 1534, adhesive 1536 on front surface 1538, or both. A portion of the light entering front enclosure 1546 continues through opening 1520 in front housing 1518 and is emitted into the surrounding area where insect trap 1510 is installed. Insects are attracted to the light emitted through adhesive 1536 and through opening 1520 in front housing 1518. Insects are also attracted to the scents and/or pheromones released from carrier material 1566 in cup 1556. In addition, heat generated by circuit board 1550 may warm carrier material 1566, and may thereby increase the release of insect-attracting scents and/or pheromones. Insects fly or crawl into opening 1520 and onto adhesive 1536, where they become trapped. A user may observe trapped insects by looking through opening 1520 in front housing 1518. When a sufficient number of insects have been trapped, the user may easily remove and discard the entire used trap portion 1514 without touching trapped insects, insect debris or adhesive, which remain out of reach inside trap portion 1514, and replace it with a new trap portion 1514. The new trap portion 1514 has fresh adhesive-coated surfaces and light-directing surfaces, ensuring that insect trap 1510 will continue to efficiently and effectively attract and trap insects.

In some embodiments, because trap portion 1514 mounts on top of, and not in front of, base portion 1512, insect trap 1510 protrudes minimally from the wall when plugged into an ordinary household wall socket, and therefore intrudes minimally into the home environment. In some embodiments, insect trap 1510 is configured such that when insect trap 1510 is mounted to a wall, its overall depth, defined by the overall distance insect trap 1510 protrudes from the wall, is smaller than its overall height and its overall width.

It should be appreciated that a benefit of insect trap 1510 is the manipulation of light within trap portion 1514. In some embodiments, light manipulation occurs solely within trap portion 1514. Light manipulation may include reflection, refraction, polarization, dispersion and/or diffusion and is achieved by engaging with a manipulative element or surface (e.g., inside surface 1542, divider 1534 and adhesive 1536). In some embodiments, light manipulation produces an even distribution of light on adhesive 1536. In some embodiments, light is manipulated to produce a predetermined pattern on adhesive 1536 or within trap portion 1514, for example, an even distribution, an even distribution with hot spots of higher intensity, hot spot patterns, and/or combinations thereof.

Any suitable adhesive material may be used as part of an adhesive surface for trapping an insect. In some embodiments, pressure sensitive adhesives such as acrylics, butyl rubber, natural rubber, nitriles, silicones, styrene block copolymers, styrene-ethylene/propylene, styrene-isoprene-styrene, vinyl ethers may be used. Generally, the thickness of such adhesives will be in the range of approximately 0.01 mm to 1 mm. In some embodiments, the adhesive thickness is in the range of approximately 0.05 mm to 0.2 mm, with a thickness of approximately 0.1 mm being most often used.

Insect trap 1510 of this configuration may accommodate a variety of different trap portions 1514 that may be removably mounted to base portion 1512, each trap portion 1514 being uniquely configured to attract and trap a specific species or multiple species of flying or non-flying insect. For example, the overall size and shape of trap portion 1514, the size, shape, location and orientation of opening 1520 in front housing 1518 of trap portion 1514, and the scent or scents impregnated in carrier material 1566, front housing 1518, divider 1534, adhesive 1536 or rear housing 1540, may be uniquely configured to attract and trap a specific species or multiple species of flying insect.

For example, in some embodiments, trap portion 1514 is approximately 20 mm to 600 mm wide, 20 mm to 600 mm high and 5 mm to 150 mm deep. In some embodiments, trap portion 1514 is approximately 20 mm to 200 mm wide, 20 mm to 200 mm high and 5 mm to 80 mm deep. In some embodiments, trap portion 1514 is approximately 20 mm to 130 mm wide, 20 mm to 130 mm high and 5 mm to 50 mm deep.

In some embodiments, base portion 1512 is approximately 20 mm to 600 mm wide, 10 mm to 150 mm high and 10 mm to 150 mm deep. In some embodiments, base portion 1512 is 20 mm to 200 mm wide, 10 mm to 100 mm high and 10 mm to 80 mm deep. In some embodiments, base portion 1512 is 20 mm to 130 mm wide, 10 mm to 50 mm high and 10 mm to 50 mm deep.

As provided herein, opening 1520 may be a variety of shapes and/or sizes. For example, opening 1520 may be circular, square, rectangular, polygonal and/or elliptical in shape. Alternatively, opening 1520 may be slot shaped having a straight, curved or undulating shape or pattern. When opening 1520 is circular, opening 1520 may be approximately 0.5 mm to 30 mm in diameter. In some embodiments, circular opening 1520 is approximately 0.5 mm to 20 mm in diameter. In some embodiments, circular opening 1520 is approximately 0.5 mm to 15 mm in diameter. When opening 1520 is slot shaped, opening 1520 may be approximately 2 mm to 30 mm wide and 5 mm to 500 mm long. In some embodiments, slot shaped opening 1520 is approximately 2 mm to 20 mm wide and 5 mm to 200 mm long. In some embodiments, slot shaped opening 1520 is approximately 2 mm to 15 mm wide and 5 mm to 100 mm long.

In some embodiments, opening 1520 covers all or a portion of front housing 1518. For example, opening 1520 may cover a range of approximately 1% to 75% of the surface area of front housing 1518. In some embodiments, opening 1520 covers 5 approximately 5% to 50% of the surface area of front housing 1518. In some embodiments, opening 1520 covers approximately 10% to 30% of the surface area of front housing 1518.

Figure 41:
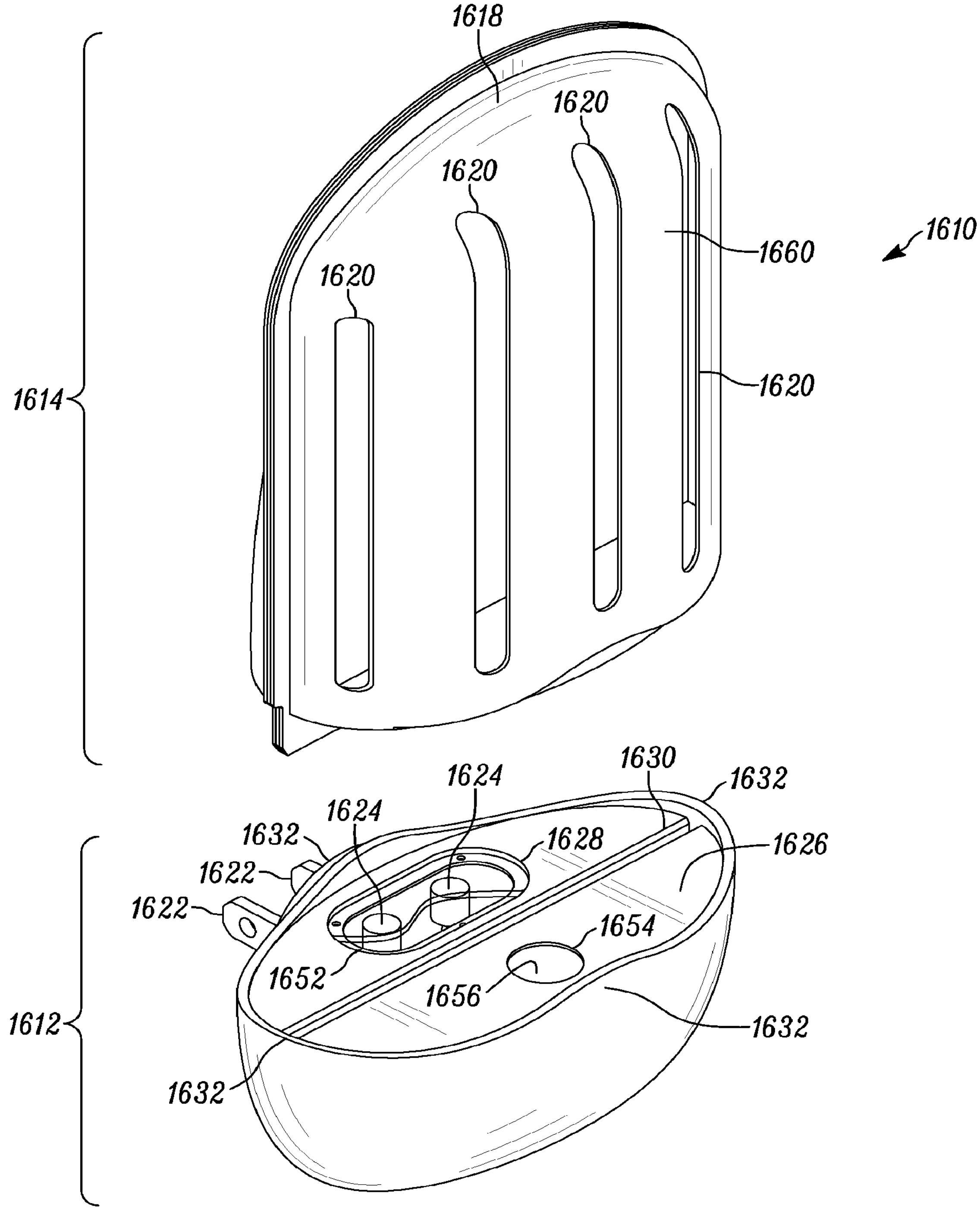
FIG. 41 is a front perspective view of a sixteenth embodiment of an insect trap in accordance with principles of the disclosure.

FIG. 41 is a front perspective view of a sixteenth embodiment of an insect trap, indicated generally at 1610. Insect trap 1610 includes a base portion 1612 and a removable trap portion 1614. Trap portion 1614 is shown removed from the base portion 1612 in this view. Trap portion 1614 includes a front housing 1618 with at least one opening 1620 in a front surface 1660. Opening 1620 in front housing 1618 may be configured to admit a wide variety of insects into insect trap 1610, or alternatively it may be configured to admit one or more specific insect species. In some embodiments, opening 1620 is configured to prevent user's fingers from penetrating opening 1620 and inadvertently touching trapped insects or adhesive when removing and replacing trap portion 1614. In some embodiments, opening 1620 has a size and shape such that a sphere 25 mm in diameter cannot pass through opening 1620, and has a size and shape such that a sphere 1 mm in diameter can pass through any portion of opening 1620. Opening 1620 may be of uniform or of varying width, shape and orientation, and if trap portion 1614 has more than one opening 1620, they may be of identical or of differing widths, shapes and orientations. Opening 1620 may be configured to attract one or more individual insect species or a variety of insect species. Protruding from a rear surface 1662 (shown in FIG. 42) of base portion 1612 may be a plurality of electrically conductive prongs 1622, adapted to mount insect trap 1610 to a wall and provide power to insect trap 1610 by inserting conductive prongs 1622 into a standard household electrical wall socket. Alternatively, base portion 1612 may be configured to sit or hang wherever desired and receive power from batteries (not shown) mounted in base portion 1612. While an electrical socket and batteries have been described as providing power to insect trap 1610, any suitable power source may be used. Base portion 1612 includes a lighting element such as one or more LEDs 1624. In some embodiments, LEDs 1624 include at least one that emits UV light and at least one that emits visible light. In some embodiments, LEDs 1624 include at least one that emits UV light and at least one that emits blue light to better attract a wide variety of insect species. In some embodiments, the lighting element emits a combination of wavelengths to mimic sunlight. In some embodiments, LEDs 1624 include at least one that emits IR light to better attract certain species of insects including mosquitos and fleas. In a top surface 1626 of base portion 1612 is an opening 1652, which may be covered by a transparent or translucent window 1628, shown partially cut away to reveal LEDs 1624. Window 1628 protects LEDs 1624 from dust and insect debris, and allows base portion 1612 to be easily cleaned. Mounted in a second opening 1654 in top surface 1626 is an electromechanical actuator 1656, preferably a transmitter or transceiver such as a piezoelectric speaker. Also in top surface 1626 may be a slot 1630, and on the perimeter of top surface 1626 is a rim or upwardly directed protrusions 1632.

Figure 42:
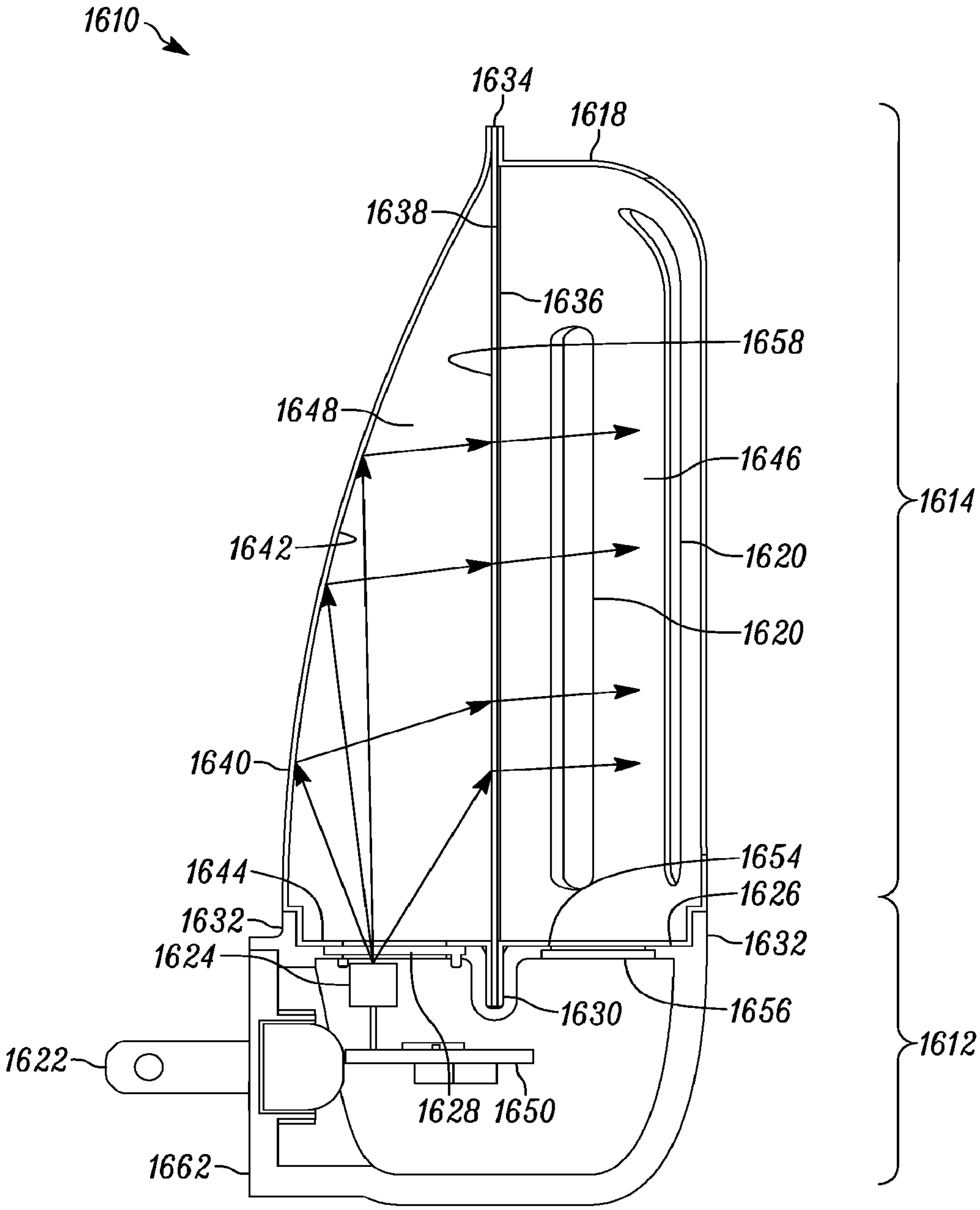
FIG. 42 is a cross-sectional view through the insect trap of FIG. 41.

FIG. 42 is a cross-sectional view through insect trap 1610. Trap portion 1614 includes a divider 1634 with a front surface 1638, and a rear housing 1640 with an inside surface 1642. In some embodiments, divider 1634 is constructed from or includes a transparent or translucent material and may be coated with a transparent or translucent adhesive 1636 on front surface 1638. In some embodiments, divider 1634 is configured to polarize light transmitted through it in an orientation similar to that of daylight to further attract flying insects, a wide variety of which are known to detect polarized light. In some embodiments, inside surface 1642 of rear housing 1640 is coated with a reflective material. In some embodiments, the material and surface finish of rear housing 1640 may be configured to reflect and disperse UV and/or visible light without a reflective coating. In some embodiments, the material and thickness of divider 1634 and the material and thickness of adhesive 1636 are selected to transmit a substantial proportion of the UV and/or visible and/or IR light, for example greater than 60% of the light is transmitted through divider 1634 and adhesive 1636. Rear housing 1640 may include an opening 1644 on its bottom surface, or alternatively opening 1644 may be replaced by a transparent or translucent window.

In some embodiments, front housing 1618 and rear housing 1640 are thermoformed from opaque sheet plastic, creating a clean and aesthetically pleasing shape while maintaining low cost and disposability. Alternatively, other opaque, transparent or translucent materials such as paper, paperboard, cardboard or paper pulp may also be used. In some embodiments, front housing 1618 and rear housing 1640 are constructed by injection molding or by other suitable manufacturing techniques. As shown, divider 1634 may be substantially planar, and may be configured to be parallel to, or at an angle to the primary direction of the light (not shown) produced by LEDs 1624. Alternatively, divider 1634 may be formed into a convex, concave or saddle-shaped contour (not shown), or a combination of contours to optimize the even distribution of light. In some embodiments, divider 1634 has ribs or other features (not shown) that increase adhesive surface area and create regions of light/dark contrast, which are highly visible to a wide variety of insects and may be more attractive to them.

In some embodiments, front housing 1618 is coated with transparent, translucent or opaque adhesive (not shown) on an inside surface to provide additional insect trapping efficiency and capacity. In addition, front housing 1618 may also have a reflective coating (not shown) underneath the adhesive coating on its inside surface to enhance its attraction to insects and further improve the insect trapping efficiency and effectiveness.

In some embodiments, front housing 1618, divider 1634 and rear housing 1640 are joined together where they intersect or engage with an adhesive, although they may also be joined by other commonly used packaging assembly techniques such as ultrasonic welding or RF sealing, or any other suitable assembly method. As shown, divider 1634 separates the trap portion 1614 into a front enclosure 1646 and a rear enclosure 1648.

In some embodiments, base portion 1612 includes a circuit board 1650 having a programmable processor or chip (not shown) for executing commands, electrically connected to conductive prongs 1622, only one of which is shown, and LEDs 1624. For clarity, however, not all of the electrical connections are shown. Circuit board 1650 may include electronic circuitry to receive ordinary household current from conductive prongs 1622 and provide power to illuminate LEDs 1624. Circuit board 1650 may include an energy stabilizer such as a full wave rectifier circuit or any other circuit that provides steady voltage to LEDs 1624, although it may also provide a varying voltage to LEDs 1624 to provide a flickering light, which mimics movement that some insect species, including mosquitoes, may find attractive. For example, light flickering frequencies in the approximate range of 0.05 Hz (e.g., to mimic the breathing rate of large mammals) to 250 Hz (e.g., the highest flicker frequency to attract male houseflies), may be desirable and the lighting element may be configured to flicker within this range. Circuit board 1650 may provide power to LEDs 1624 to provide UV and/or visible and/or IR light, although it may be configured to provide power to only UV LEDs 1624 or to only visible light LEDs 1624 or to only IR light LEDs 1624, or to provide variable power to produce combinations of flickering UV and/or visible and/or IR light. Circuit board 1650 may also be configured to drive actuator 1656, mounted in opening 1654 in base portion 1612, to emit an insect-attracting sound. In some embodiments, actuator 1656 emits recorded and/or generated insect sounds or vibrations to better attract insects such as mosquitoes, midges, moths and flies, and may include one or more of insect call, reply, courtship and copulatory songs. In some embodiments, the transmitter or transceiver may emit recorded and/or generated insect-attracting sounds or vibrations such as the heartbeat of a mammal. For example, the transmitter or transceiver may emit an insect-attracting sound or sounds having a frequency in the range of approximately 0.5 Hz (e.g., the heart rate of large mammals) to 240 kHz (e.g., the highest frequency detectable by insects). In some embodiments, the frequency is in the range of approximately 5 Hz to 100 kHz. In some embodiments, the frequency is in the range of approximately 35 Hz to 50 Khz. It is desirable for such insect-attracting sound to be detectable by an insect within approximately a 2-meter distance from insect trap 1610. It is desirable for such insect-attracting sound to be undetectable by a human beyond approximately a 1-meter distance from insect trap 1610.

As shown, slot 1630 in top surface 1626 of base portion 1612 and rim or protrusions 1632 on top surface 1626 of base portion 1612 engage with trap portion 1614 to secure it in place during use, although any other form of attachment may be substituted that may allow trap portion 1614 to be securely but removably mounted on base portion 1612.

In the operation of insect trap 1610, conductive prongs 1622, only one of which is shown, are inserted into a wall electrical socket. Circuit board 1650 provides power to LEDs 1624 and to actuator 1656. LEDs 1624 emit light, represented by arrows, which transmits through window 1628 in base portion 1612, through opening 1644 in rear housing 1640 of trap portion 1614, into rear enclosure 1648, and directly onto inside surface 1642 of rear housing 1640 and onto a rear surface 1658 of divider 1634. In some embodiments, light is not manipulated in base portion 1612 and is emitted directly into trap portion 1614. Inside surface 1642 of rear housing 1640 may include a concave shape and may be configured to reflect and disperse the light from LEDs 1624 to distribute the light evenly onto rear surface 1658 of divider 1634, although inside surface 1642 of rear housing 1640 may have a convex shape or a saddle shape or a combination of shapes, or may also have ribs or other features (not shown) to more evenly distribute the light. Alternatively, an optical enhancer such as an anamorphic lens (not shown) or any other lens or combination of lenses configured to distribute the UV and visible light (e.g., evenly, according to specific patterns, at a focal point, etc.) onto rear surface 1658 of divider 1634, may be mounted to rear housing 1640 at or near opening 1644 or to base portion 1612 at or near window 1628, and may replace or augment the role of inside surface 1642 of rear housing 1640. In some embodiments, the light from LEDs 1624 may directly strike rear surface 1658 of divider 1634 at an oblique angle (e.g., an acute angle from approximately 0° to 90°) and be spread across divider 1634, and may replace or augment the role of inside surface 1642 of rear housing 1640 or of the lens or lenses mounted to rear housing 1640.

Thereafter, light transmits through divider 1634 and adhesive 1636 on front surface 1638, and into front enclosure 1646. Light may be further evenly distributed by the light-diffusing properties of divider 1634, adhesive 1636, or both. A portion of the light entering front enclosure 1646 continues through opening 1620 in front housing 1618 and is emitted into the surrounding area where insect trap 1610 is installed. Actuator 1656 produces insect-attracting vibrations which travel through front housing 1618 of trap portion 1614, into front enclosure 1646 of trap portion 1614, and out through opening 1620 of trap portion 1614. In addition, actuator 1656 may induce front housing 1618 of trap portion 1614 to vibrate and project insect-attracting sounds or vibrations into the room. Insects are attracted to the light transmitted through adhesive 1636 and through opening 1620 in front housing 1618. Insects are also attracted to the sounds or vibrations produced by actuator 1656 in base portion 1612 and traveling through front housing 1618 in trap portion 1614. Insects fly or crawl into opening 1620 and onto adhesive 1636, where they become trapped. A user may observe trapped insects by looking through opening 1620 in front housing 1618. When a sufficient number of insects have been trapped, the user may easily remove and discard the entire used trap portion 1614 without touching trapped insects, insect debris or adhesive, which remain out of reach inside trap portion 1614, and replace it with a new trap portion 1614. New trap portion 1614 has fresh adhesive-coated surfaces and light-directing surfaces, ensuring that insect trap 1610 will continue to efficiently and effectively attract and trap insects.

In some embodiments, because trap portion 1614 mounts on top of, and not in front of, base portion 1612, insect trap 1610 protrudes minimally from the wall when plugged into an ordinary household wall socket, and therefore intrudes minimally into the home environment. In some embodiments, insect trap 1610 is configured such that when insect trap 1610 is mounted to a wall, its overall depth, defined by the overall distance insect trap 1610 protrudes from the wall, is smaller than its overall height and its overall width.

It should be appreciated that a benefit of insect trap 1610 is the manipulation of light within trap portion 1614. In some embodiments, light manipulation occurs solely within trap portion 1614. Light manipulation may include reflection, refraction, polarization, dispersion and/or diffusion and is achieved by engaging with a manipulative element or surface (e.g., inside surface 1642, divider 1634 and adhesive 1636). In some embodiments, light manipulation produces an even distribution of light on adhesive 1636. In some embodiments, light is manipulated to produce a predetermined pattern on adhesive 1636 or within trap portion 1614, for example, an even distribution, an even distribution with hot spots of higher intensity, hot spot patterns, and/or combinations thereof.

Any suitable adhesive material may be used as part of an adhesive surface for trapping an insect. In some embodiments, pressure sensitive adhesives such as acrylics, butyl rubber, natural rubber, nitriles, silicones, styrene block copolymers, styrene-ethylene/propylene, styrene-isoprene-styrene, vinyl ethers may be used. Generally, the thickness of such adhesives will be in the range of approximately 0.01 mm to 1 mm. In some embodiments, the adhesive thickness is in the range of approximately 0.05 mm to 0.2 mm, with a thickness of approximately 0.1 mm being most often used.

Insect trap 1610 of this configuration may accommodate a variety of different trap portions 1614 that may be removably mounted to base portion 1612, each trap portion 1614 being uniquely configured to attract and trap a specific species or multiple species of flying or non-flying insect. For example, the overall size and shape of trap portion 1614, the size, shape, location and orientation of opening 1620 in front housing 1618 of trap portion 1614, and the natural frequency and sound amplifying properties of trap portion 1614 may be uniquely configured to attract and trap a specific species or multiple species of flying or non-flying insect. For example, in some embodiments, trap portion 1614 is approximately 20 mm to 600 mm wide, 20 mm to 600 mm high and 5 mm to 150 mm deep. In some embodiments, trap portion 1614 is approximately 20 mm to 200 mm wide, 20 mm to 200 mm high and 5 mm to 80 mm deep. In some embodiments, trap portion 1614 is approximately 20 mm to 130 mm wide, 20 mm to 130 mm high and 5 mm to 50 mm deep.

In some embodiments, base portion 1612 is approximately 20 mm to 600 mm wide, 10 mm to 150 mm high and 10 mm to 150 mm deep. In some embodiments, base portion 1612 is 20 mm to 200 mm wide, 10 mm to 100 mm high and 10 mm to 80 mm deep. In some embodiments, base portion 1612 is 20 mm to 130 mm wide, 10 mm to 50 mm high and 10 mm to 50 mm deep.

As provided herein, opening 1620 may be a variety of shapes and/or sizes. For example, opening 120 may be circular, square, rectangular, polygonal and/or elliptical in shape. Alternatively, opening 1620 may be slot shaped having a straight, curved or undulating shape or pattern. When opening 1620 is circular, opening 1620 may be approximately 0.5 mm to 30 mm in diameter. In some embodiments, circular opening 1620 is approximately 0.5 mm to 20 mm in diameter. In some embodiments, circular opening 1620 is approximately 0.5 mm to 15 mm in diameter. When opening 1620 is slot shaped, opening 1620 may be approximately 2 mm to 30 mm wide and 5 mm to 500 mm long. In some embodiments, slot shaped opening 1620 is approximately 2 mm to 20 mm wide and 5 mm to 200 mm long. In some embodiments, slot shaped opening 1620 is approximately 2 mm to 15 mm wide and 5 mm to 100 mm long.

In some embodiments, opening 1620 covers all or a portion of front housing 1618. For example, opening 1620 may cover a range of approximately 1% to 75% of the surface area of front housing 1618. In some embodiments, opening 1620 covers approximately 5% to 50% of the surface area of front housing 1618. In some embodiments, opening 1620 covers approximately 10% to 30% of the surface area of front housing 1618.

Figure 43:
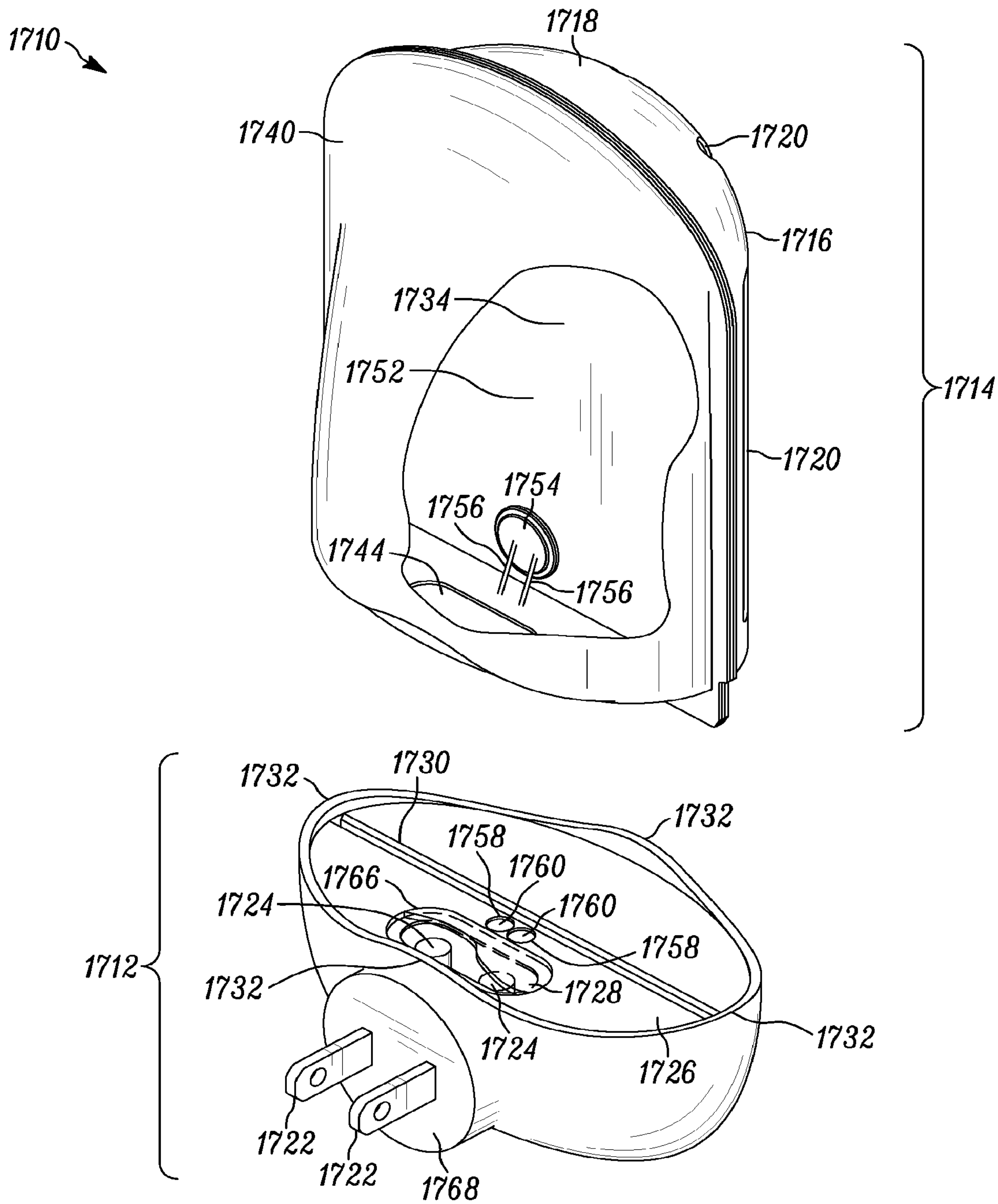
FIG. 43 is a rear perspective view of a seventeenth embodiment of an insect trap in accordance with principles of the disclosure.

FIG. 43 is a rear perspective view of a seventeenth embodiment of an insect trap, indicated generally at 1710. Insect trap 1710 includes a base portion 1712 and a removable trap portion 1714. Trap portion 1714 is shown partially cut away and removed from base portion 1712 in this view. Trap portion 1714 includes a front housing 1718 with at least one opening 1720 in a front surface 1716, a rear housing 1740, and a divider 1734 with a rear surface 1752. Opening 1720 in front housing 1718 may be configured to admit a wide variety of insects into insect trap 1710, or alternatively it may be configured to admit one or more specific insect species. In some embodiments, opening 1720 is configured to prevent user's fingers from penetrating opening 1720 and inadvertently touching trapped insects or adhesive when removing and replacing trap portion 1714. In some embodiments, opening 1720 has a size and shape such that a sphere 25 mm in diameter cannot pass through opening 1720, and has a size and shape such that a sphere 1 mm in diameter may pass through any portion of opening 1720. Opening 1720 may be of uniform or of varying width, shape and orientation, and if trap portion 1714 has more than one opening 1720, they may be of identical or of differing widths, shapes and orientations. Opening 1720 may be configured to attract one or more individual insect species or a variety of insect species. Affixed to rear surface 1752 of divider 1734 is an electromechanical actuator 1754, preferably a transmitter or transceiver such as a piezoelectric actuator. Attached to actuator 1754 are electric trap wires 1756. While two trap wires 1756 are shown attached to actuator 1754, any suitable number may be used. Rear housing 1740 may include an opening 1744 on its bottom surface, or alternatively opening 1744 may be replaced by a transparent or translucent window (not shown).

Protruding from a rear surface 1768 of base portion 1712 are a plurality of electrically conductive prongs 1722, adapted to mount insect trap 1710 to a wall and provide power to insect trap 1710 by inserting conductive prongs 1722 into a standard household electrical wall socket. Alternatively, base portion 1712 may be configured to sit or hang wherever desired and receive power from batteries (not shown) mounted in base portion 1712. While an electrical socket and batteries have been described as providing power to insect trap 1710, any suitable power source may be used. Base portion 1712 includes a lighting element such as one or more LEDs 1724. In some embodiments, LEDs 1724 include at least one that emits UV light and at least one that emits visible light. In some embodiments, LEDs 1724 include at least one that emits UV light and at least one that emits blue light to better attract a wide variety of insect species. In some embodiments, the lighting element emits a combination of wavelengths to mimic sunlight. In some embodiments, LEDs 1724 include at least one that emits infrared (IR) to better attract certain species of insects including mosquitos. A top surface 1726 of base portion 1712 includes an opening 1766, which may be covered by a transparent or translucent window 1728, shown partially cut away to reveal LEDs 1724. Window 1728 protects LEDs 1724 from dust and insect debris, and allows base portion 1712 to be easily cleaned. Mounted in one or more additional openings 1758 in top surface 1726 of base portion 1712 are a plurality of electrical base contacts 1760. While two base contacts 1760 are shown, any suitable number may be used. In top surface 1726 may be a slot 1730, and on the perimeter of top surface 1726 is a rim or upwardly directed protrusions 1732.

Figure 44:
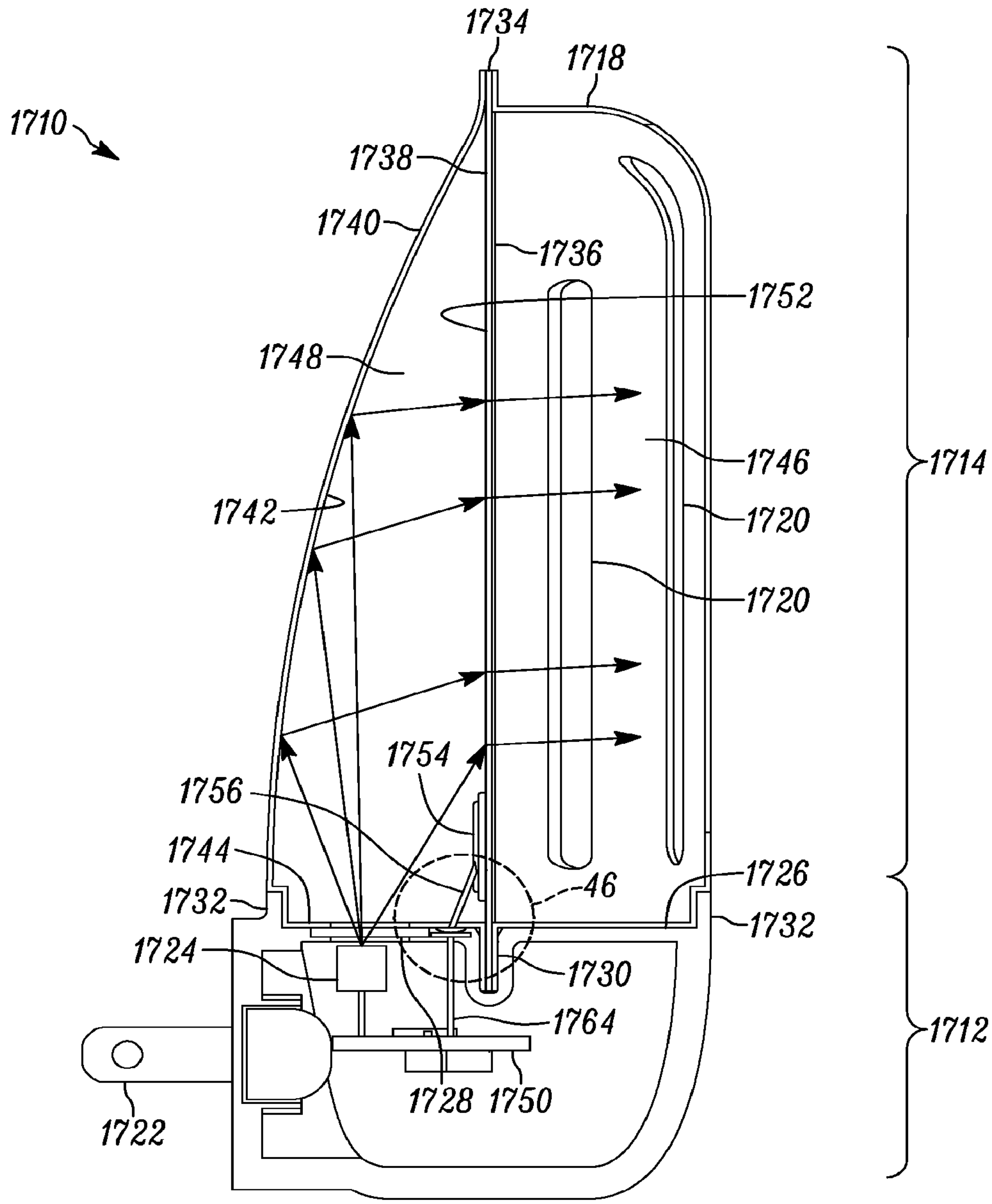
FIG. 44 is a cross-sectional view through the insect trap of FIG. 43.
Figure 45:
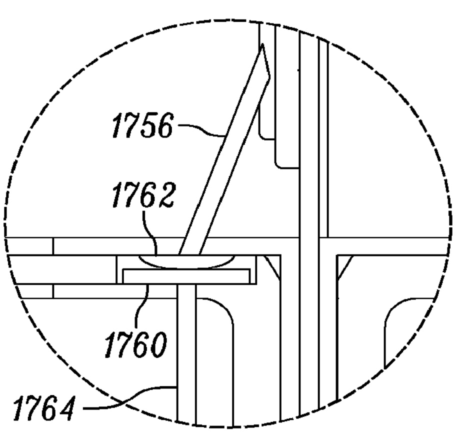
FIG. 45 is an enlarged view of a portion of FIG. 44

FIG. 44 is a cross-sectional, cut-away view through insect trap 1710 showing the interiors of base portion 1712 and trap portion 1714, and FIG. 45 is an enlarged view of a portion of FIG. 44. In some embodiments, rear housing 1740 includes a reflective-coated inside surface 1742.

Alternatively, the material and surface finish of rear housing 1740 may be configured to reflect UV and/or visible and/or IR light without a reflective coating. In some embodiments, divider 1734 is constructed from or includes a transparent or translucent material and may be coated with a transparent or translucent adhesive 1736 on its front surface 1738. In some embodiments, divider 1734 is configured to polarize light transmitted through it in an orientation similar to that of daylight to further attract flying insects, a wide variety of which are known to detect polarized light. In some embodiments, the material and thickness of divider 1734 and the material and thickness of adhesive 1736 are selected to transmit a substantial proportion of the UV and/or visible and/or IR light, for example greater than 60% of the light is transmitted through divider 1734 and adhesive 1736.

In some embodiments, front housing 1718 and rear housing 1740 are thermoformed from opaque sheet plastic, creating a clean and aesthetically pleasing shape while maintaining low cost and disposability. Alternatively, other opaque, transparent or translucent materials such as paper, paperboard, cardboard or paper pulp may also be used. In some embodiments, front housing 1718 and rear housing 1740 are constructed by injection molding or by other suitable manufacturing techniques. As shown, divider 1734 is substantially planar, and may be configured to be parallel to, or at an angle to the primary direction of the light produced by LEDs 1724. In some embodiments, divider 1734 may be formed into a convex, concave or saddle-shaped contour, or a combination of contours to optimize the even distribution of light. In some embodiments, divider 1734 may have ribs or other features (not shown) that increase adhesive surface area and create regions of light/dark contrast, which are highly visible to a wide variety of insects and may be more attractive to them.

In some embodiments, front housing 1718 may also be coated with transparent, translucent or opaque adhesive on its inside surface to provide additional insect trapping efficiency and capacity. In addition, front housing 1718 may also have a reflective coating (not shown) underneath the adhesive coating on its inside surface to enhance its attraction to insects and further improve the insect trapping efficiency and effectiveness.

In some embodiments, front housing 1718, divider 1734 and rear housing 1740 are joined together at where they intersect or engage by ultrasonic welding or high frequency (HF) welding, although they may also be permanently or removably joined together by gluing or by any other suitable assembly method. The materials of trap portion 1714 may also include one or more insect attractants. For example, trap portion 1714 may be impregnated with sorbitol, coleopteran attractants including brevicomin, dominicalure, frontalin, grandlure, ipsdienol, ipsenol, japonilure, lineatin, megatomoic acid, multistriatin, oryctalure, sulcatol, and trunc-call, dipteran attractants including ceralure, cue-lure, latilure, medlure, moguchun, muscalure, and trimedlure, homopteran attractants including rescalure, lepidopteran attractants such as disparlure, straight chain lepidopteran pheromones including codlelure, gossyplure, hexalure, litlure, looplure, orfralure, and ostramone, and other insect attractants such as eugenol, methyl eugenol, and siglure, or other substances to provide a scent that further increases the insect-attracting efficiency of insect trap 1710. In such embodiments, the insect attractant is integral to trap portion 1714. Alternatively, the insect attractants may be embedded in a separate piece (not shown) that mounts on an inside surface of front housing 1718 or through opening 1720 in front housing 1718 or on front surface 1738 of divider 1734. It is desirable for such attractants to be detectable by an insect for approximately a 2-meter radius from insect trap 1710. Divider 1734 separates trap portion 1714 into a front enclosure 1746 and a rear enclosure 1748. Rear housing 1740 includes a plurality of electrical trap contacts 1762 (only one of which is shown) that correspond to base contacts 1760 in base portion 1712. Trap contacts 1762 are electrically connected to trap wires 1756 and are configured to create an electrical contact with base contacts 1760 (only one of which is shown), when trap portion 1714 is mounted to base portion 1712. In some embodiments, base portion 1712 includes a circuit board 1750, having a programmable processor or chip (not shown) for executing commands, electrically connected to conductive prongs 1722 (only one of which is shown), LEDs 1724 (only one of which is shown), and a plurality of electric base wires 1764 (only one of which is shown), that correspond to base contacts 1760. Circuit board 1750 may be electrically connected to conductive prongs 1722 (only one of which is shown), LEDs 1724 (only one of which is shown), and base wires 1764, which, in turn, may be electrically connected to their corresponding base contacts 1760. Accordingly, actuator 1754, mounted on rear surface 1752 of divider 1734, may be electrically connected to circuit board 1750 when trap portion 1714 is mounted to base portion 1712. For clarity, however, not all of the electrical connections are shown. Circuit board 1750 may include electronic circuitry to receive ordinary household current from conductive prongs 1722 and provide power to illuminate LEDs 1724. Circuit board 1750 may include an energy stabilizer such as a full wave rectifier circuit or any other circuit that provides steady voltage to LEDs 1724, although it may also provide a varying voltage to LEDs 1724 to provide a flickering light that mimics movement that some insect species, including mosquitoes, may find attractive. For example, light flickering frequencies in the approximate range of 0.05 Hz (e.g., to mimic the breathing rate of large mammals) to 250 Hz (e.g., the highest flicker frequency to attract male houseflies), may be desirable and the lighting element may be configured to flicker within this range. Circuit board 1750 may provide power to LEDs 1724 to provide both UV and visible light, although it may be configured to provide power to only UV LEDs 1724 or to only visible light LEDs 1724, or to only IR LEDs 1724, or to provide variable power to produce combinations of flickering UV and/or visible and/or IR light. Circuit board 1750 may also be configured to power actuator 1754 to emit an insect-attracting sound. In some embodiments, the transmitter or transceiver may emit recorded and/or generated insect sounds or vibrations to better attract insects such as mosquitoes, midges, moths and flies, and may include one or more of insect call, reply, courtship and copulatory songs. In some embodiments, the transmitter or transceiver may emit recorded and/or generated insect-attracting sounds or vibrations such as the heartbeat of a mammal. For example, the transmitter or transceiver may emit an insect-attracting sound or sounds having a frequency in the range of approximately 0.5 Hz (e.g., the heart rate of large mammals) to approximately 240 kHz (e.g., the highest frequency detectable by insects). In some embodiments, the frequency is in the range of approximately 5 Hz to 100 kHz. In some embodiments, the frequency is in the range of approximately 35 Hz to 50 Khz. It is desirable for such insect-attracting sound to be detectable by an insect within approximately a 2-meter distance from insect trap 1710. It is desirable for such insect-attracting sound to be undetectable by a human beyond approximately a 1-meter distance from insect trap 1710.

As shown, slot 1730 in top surface 1726 of base portion 1712 and rim or protrusions 1732 on top surface 1726 of base portion 1712 engage with trap portion 1714 to secure it in place during use, although any other form of attachment may be substituted that allows trap portion 1714 to be securely but removably mounted on base portion 1712.

In the operation of insect trap 1710, conductive prongs 1722 are inserted into a wall electrical socket, and circuit board 1750 provides power to LEDs 1724 and to actuator 1754. LEDs 1724 emit light, represented by arrows, which transmits through window 1728 in base portion 1712, through opening 1744 in rear housing 1740 of trap portion 1714, into rear enclosure 1748, and directly onto inside surface 1742 of rear housing 1740 and rear surface 1752 of divider 1734. In some embodiments, light is not manipulated in base portion 1712 and is emitted directly into trap portion 1714. Inside surface 1742 of rear housing 1740 may include a concave shape and may be configured to light from LEDs 1724 to distribute the light evenly onto rear surface 1752 of divider 1734, although the shape of inside surface 1742 of rear housing 1740 may have a convex shape or a saddle shape or a combination of shapes, or may also have ribs or other features (not shown) to more evenly distribute the light. Alternatively, an optical enhancer such as an anamorphic lens or any other lens or combination of lenses (not shown) configured to distribute the light (e.g., evenly, according to specific patterns, at a focal point, etc.) onto rear surface 1752 of divider 1734, may be mounted to rear housing 1740 at or near opening 1744 or to base portion 1712 at or near opening 1766, and may replace or augment the role of inside surface 1742 of rear housing 1740. In some embodiments, the light from LEDs 1724 may directly strike rear surface 1752 of divider 1734 at an oblique angle (e.g., an acute angle from approximately 0° to 90°) and be spread across divider 1734, and may replace or augment the role of inside surface 1742 of rear housing 1740 or of the lens or lenses mounted to rear housing 1740.

Thereafter, light transmits through divider 1734 and adhesive 1736 on front surface 1738, and into front enclosure 1746. The light may be further evenly distributed by the light-diffusing properties of divider 1734, adhesive 1736 on front surface 1738, or both. A portion of the light entering front enclosure 1746 continues through opening 1720 in front housing 1718 and emits into the surrounding area where the trap is installed. Actuator 1754 produces insect-attracting vibrations which are amplified by divider 1734, and transmit through front enclosure 1746 of trap portion 1714, and out through opening 1720 of trap portion 1714. Insects are attracted to the light transmitted through adhesive 1736 and through opening 1720 in front housing 1718. Insects are also attracted to the insect-attracting vibrations produced by actuator 1754. Insects fly or crawl into opening 1720 and onto adhesive 1736, where they become trapped. A user may observe trapped insects by looking through opening 1720 in front housing 1718. When a sufficient number of insects have been trapped, the user may easily remove and discard the entire used trap portion 1714 without touching trapped insects, insect debris or adhesive, which remain out of reach inside trap portion 1714, and replace it with a new trap portion 1714. New trap portion 1714 has fresh adhesive-coated surfaces and light-directing surfaces, ensuring that insect trap 1710 will continue to efficiently and effectively attract and trap insects.

In some embodiments, because trap portion 1714 mounts on top of, and not in front of, base portion 1712, insect trap 1710 protrudes minimally from the wall when plugged into an ordinary household wall socket, and therefore intrudes minimally into the home environment. In some embodiments, insect trap 1710 is configured such that when insect trap 1710 is mounted to a wall, its overall depth, defined by the overall distance insect trap 1710 protrudes from the wall, is smaller than its overall height and its overall width.

It should be appreciated that a benefit of insect trap 1710 is the manipulation of light within trap portion 1714. In some embodiments, light manipulation occurs solely within trap portion 1714. Light manipulation may include reflection, refraction, polarization, dispersion and/or diffusion and is achieved by engaging with a manipulative element or surface (e.g., inside surface 1742, divider 1734 and adhesive 1736). In some embodiments, light manipulation produces an even distribution of light on adhesive 1736. In some embodiments, light is manipulated to produce a predetermined pattern on adhesive 1736 or within trap portion 1714, for example, an even distribution, an even distribution with hot spots of higher intensity, hot spot patterns, and/or combinations thereof.

Any suitable adhesive material may be used as part of an adhesive surface for trapping an insect. In some embodiments, pressure sensitive adhesives such as acrylics, butyl rubber, natural rubber, nitriles, silicones, styrene block copolymers, styrene-ethylene/propylene, styrene-isoprene-styrene, vinyl ethers may be used. Generally, the thickness of such adhesives will be in the range of approximately 0.01 mm to 1 mm. In some embodiments, the adhesive thickness is in the range of approximately 0.05 mm to 0.2 mm, with a thickness of approximately 0.1 mm being most often used.

Insect trap 1710 of this configuration may accommodate a variety of different trap portions 1714 that may be removably mounted to base portion 1712, each trap portion 1714 being uniquely configured to attract and trap a specific species or multiple species of flying insect. For example, the overall size and shape of trap portion 1714, the size, shape, location and orientation of openings 1720 in front housing 1718 of trap portion 1714, the vibration-producing properties of actuator 1754, and the natural frequency and sound amplifying properties of trap portion 1714 may be uniquely configured to attract and trap a specific species or multiple species of flying insect.

For example, in some embodiments, trap portion 1714 is approximately 20 mm to 600 mm wide, 20 mm to 600 mm high and 5 mm to 150 mm deep. In some embodiments, trap portion 1714 is approximately 20 mm to 200 mm wide, 20 mm to 200 mm high and 5 mm to 80 mm deep. In some embodiments, trap portion 1714 is approximately 20 mm to 130 mm wide, 20 mm to 130 mm high and 5 mm to 50 mm deep.

In some embodiments, base portion 1712 is approximately 20 mm to 600 mm wide, 10 mm to 150 mm high and 10 mm to 150 mm deep. In some embodiments, base portion 1712 is 20 mm to 200 mm wide, 10 mm to 100 mm high and 10 mm to 80 mm deep. In some embodiments, base portion 1712 is 20 mm to 130 mm wide, 10 mm to 50 mm high and 10 mm to 50 mm deep.

As provided herein, opening 1720 may be a variety of shapes and/or sizes. For example, opening 1720 may be circular, square, rectangular, polygonal and/or elliptical in shape. Alternatively, opening 1720 may be slot shaped having a straight, curved or undulating shape or pattern. When opening 1720 is circular, opening 1720 may be approximately 0.5 mm to 30 mm in diameter. In some embodiments, circular opening 1720 is approximately 0.5 mm to 20 mm in diameter. In some embodiments, circular opening 1720 is approximately 0.5 mm to 15 mm in diameter. When opening 1720 is slot shaped, opening 1720 may be approximately 2 mm to 30 mm wide and 5 mm to 500 mm long. In some embodiments, slot shaped opening 1720 is approximately 2 mm to 20 mm wide and 5 mm to 200 mm long. In some embodiments, slot shaped opening 1720 is approximately 2 mm to 15 mm wide and 5 mm to 100 mm long.

In some embodiments, opening 1720 covers all or a portion of front housing 1718. For example, opening 1720 may cover a range of approximately 1% to 75% of the surface area of front housing 1718. In some embodiments, opening 1720 covers approximately 5% to 50% of the surface area of front housing 1718. In some embodiments, opening 1720 covers approximately 10% to 30% of the surface area of front housing 1718.

Figure 46:
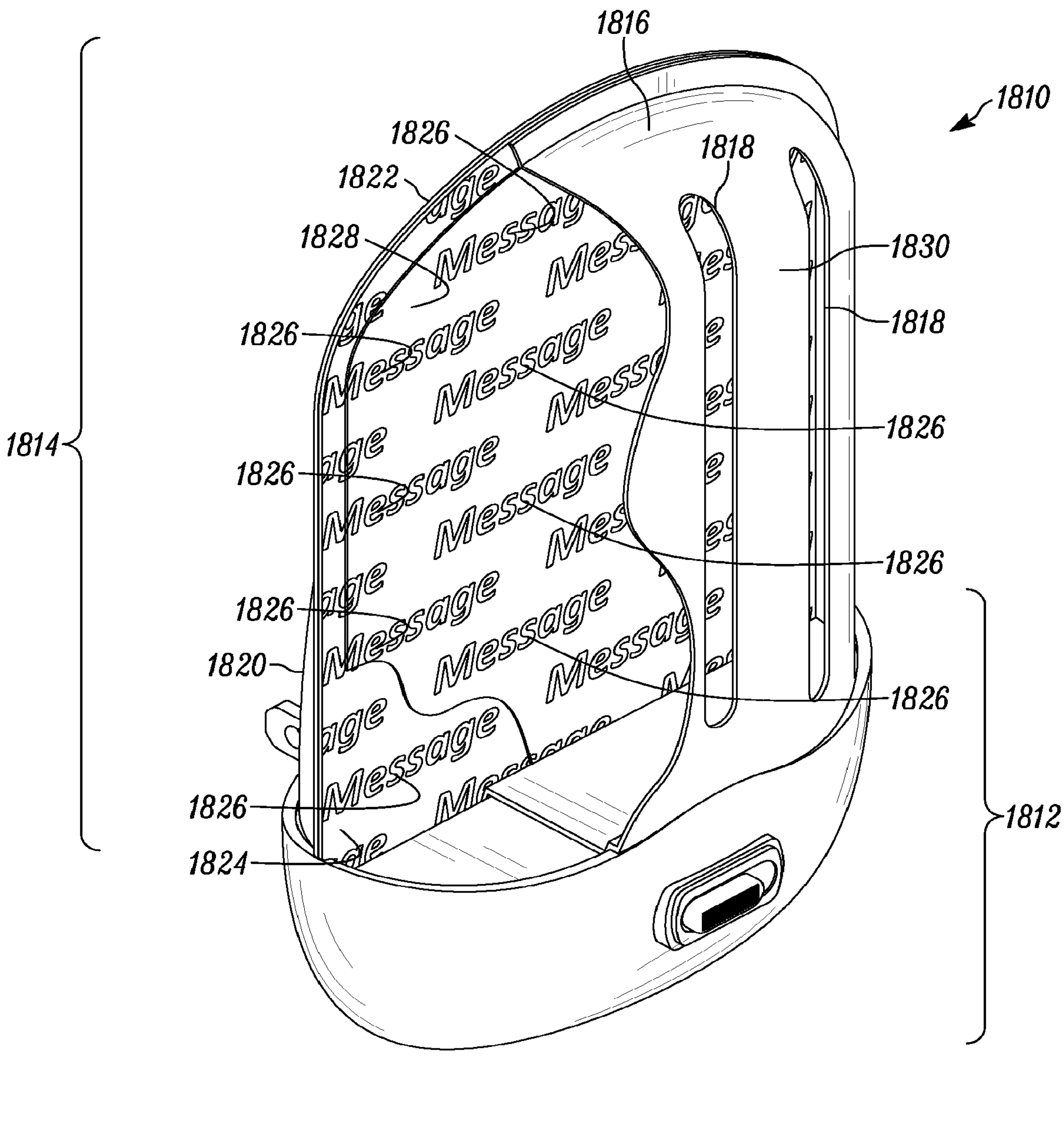
FIG. 46 is a front perspective view of an eighteenth embodiment of an insect trap in accordance with principles of the disclosure.

FIG. 46 is a front perspective view of an eighteenth embodiment of an insect trap, indicated generally at 1810. Trap portion 1814 is shown partially cut away in this view. Insect trap 1810 includes a base portion 1812 and a removable trap portion 1814. Base portion 1812 may be identical or similar to the base portions of other embodiments described previously. Trap portion 1814 may have a front housing 1816 with at least one opening 1818 in a front surface 1830, a rear housing 1820, and a transparent or translucent divider 1822 with a front surface 1824. Opening 1818 in front housing 1816 may be configured to admit a wide variety of insects into insect trap 1810, or alternatively it may be configured to admit one or more specific insect species. In some embodiments, opening 1818 is configured to prevent user's fingers from penetrating opening 1820 and inadvertently touching trapped insects or adhesive when removing and replacing trap portion 1814. In some embodiments, opening 1818 has a size and shape such that a sphere 25 mm in diameter cannot pass through opening 1818, and has a size and shape such that a sphere 1 mm in diameter can pass through any portion of opening 1820. Opening 1818 may be of uniform or of varying width, shape and orientation, and if trap portion 1814 has more than one opening 1818, they may be of identical or of differing widths, shapes and orientations. Opening 1818 may be configured to attract one or more individual insect species or a variety of insect species. In some embodiments, divider 1822 is configured to polarize light transmitted through it in an orientation similar to that of daylight to further attract flying insects, a wide variety of which are known to detect polarized light. In some embodiments, a text or graphics 1826 is applied to front surface 1824 of divider 1822, although text or graphics 1826 may be applied instead to the rear surface (not shown) of divider 1822, or it may be applied to both sides of divider 1822. Text or graphics 1826 may be applied by traditional printing, hot stamping, silk screening, inkjet printing, or any method or process by which text or graphics 1826 may be applied to front surface 1824 and/or rear surface (not shown) of divider 1822. Alternatively, a thin transparent or translucent film with the text or graphics applied to its front or rear surface or to both surfaces may be affixed to front surface 1824 of divider 1822. Alternatively, text or graphics 1826 may be embossed or raised on front surface 1824 or the rear surface (not shown) of divider 1822 by embossing, engraving or molding, such that text or graphics 1826 appears darker or lighter than the surrounding area when light is transmitted through divider 1822. A transparent or translucent coating of adhesive 1828 is applied over front surface 1824 of divider 1822 and over text or graphics 1826. Text or graphics 1826 may be visible through adhesive 1828 either in ordinary ambient light or when illuminated from behind or both. Alternatively, text or graphics 1826 may be applied in fluorescent pigments, which appear to glow when illuminated by ultraviolet light. Text or graphics 1826 may be in the form of a repeated message or brand name or company logo such that text or graphics 1826 may appear repeatedly on front surface 1824 of divider 1822, thereby eliminating alignment and printing registration issues during manufacture. Because text or graphics 1826 is visible through opening 1818 in front housing 1816, text or graphics 1826 may not be fully visible or legible unless it is viewed from a short distance, such as when a user may look closely through opening 1818 to observe insects trapped in adhesive 1828, or when the user may remove trap portion 1814 from base portion 1812 for disposal and replacement, both of which may be opportunities to remind the user of the brand name and/or logo of the insect trap, of use or disposal instructions, or of any other message or messages. Because text or graphics 1826 may not be fully visible or legible when viewed from a distance, text or graphics 1826 may not affect the appearance of the room in which insect trap 1810 is installed. When insect trap 1810 is in operation, divider 1822 and text or graphics 1826 are illuminated from behind, and text or graphics 1826 may appear as sharp light/dark contrast areas, which are highly visible to a wide variety of insects and may be more attractive to them. Text or graphics 1826 applied to front surface 1824 of divider 1822 may be visible when illuminated from behind as well as when not illuminated from behind, whereas text or graphics 1826 applied to the rear surface of divider 1822 may only be visible when illuminated from behind. Accordingly, when text or graphics 1826 are applied to both sides of divider 1822, different messages or graphics or combinations of messages or graphics may be displayed when insect trap 1810 is in operation and divider 1822 is illuminated from behind and when insect trap 1810 is not in operation.

Figure 47:
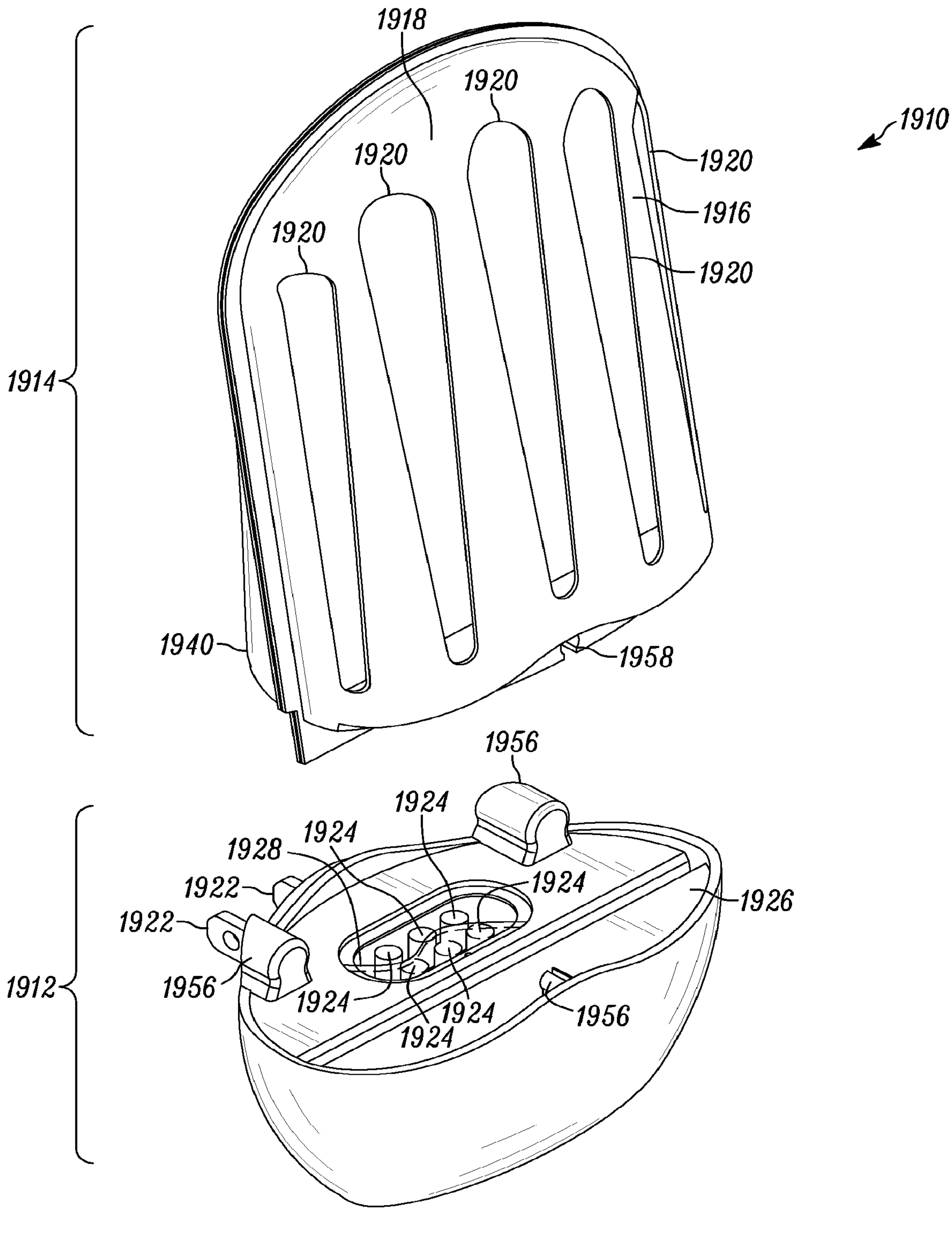
FIG. 47 is a front perspective view of a nineteenth embodiment of an insect trap in accordance with principles of the disclosure.
Figure 48:
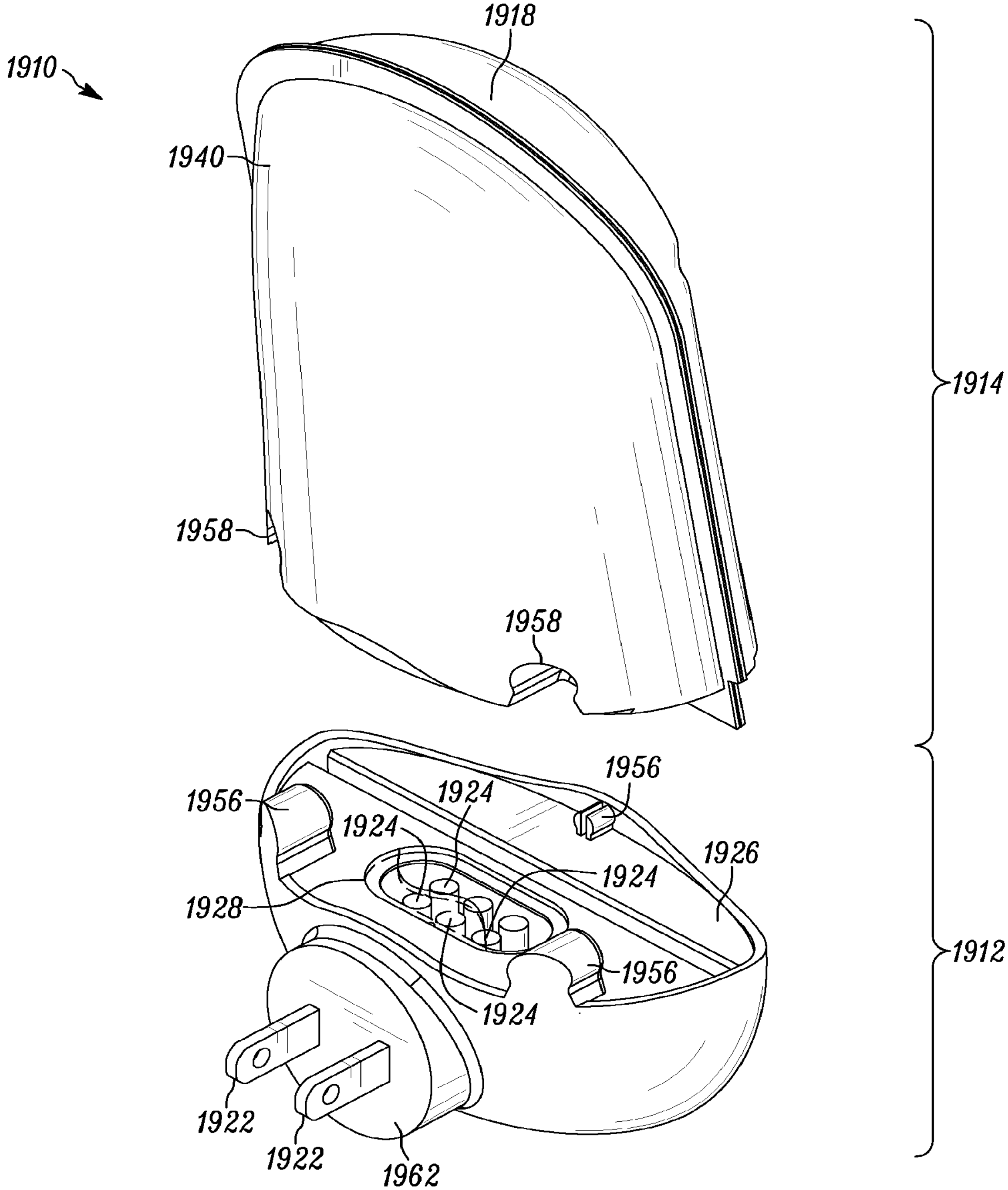
FIG. 48 is a rear perspective view of the insect trap of FIG. 47.

FIG. 47 is a front perspective view and FIG. 48 is a rear perspective view of a nineteenth embodiment of an insect trap, indicated generally at 1910. Insect trap 1910 includes a base portion 1912 and a removable trap portion 1914. Trap portion 1914 is shown removed from base portion 1912 in both views. Trap portion 1914 and base portion 1912 is configured such that trap portion 1914 engages with a top surface 1926 of base portion 1912 when trap portion 1914 is mounted to base portion 1912. Trap portion 1914 includes a front housing 1918 with at least one opening 1920 in a front surface 1916, and a rear housing 1940. Opening 1920 in front housing 1918 may be configured to admit a wide variety of insects into insect trap 1910, or alternatively it may be configured to admit one or more specific insect species. In some embodiments, opening 1920 is configured to prevent the user's fingers from penetrating opening 1920 and inadvertently touching trapped insects or adhesive when removing and replacing trap portion 1914. In some embodiments, opening 1920 has a size and shape such that a sphere 25 mm in diameter cannot pass through opening 1920, and has a size and shape such that a sphere 1 mm in diameter can pass through any portion of opening 1920. Opening 1920 may be of uniform or of varying width, shape and orientation, and if trap portion 1914 has more than one opening 1920, they may be of identical or of differing widths, shapes and orientations. Opening 1920 may be configured to attract one or more individual insect species or a variety of insect species. In some embodiments, front housing 1918 has one or more ribs or other relief features (not shown) to provide increased stiffness and strength, particularly around opening 1920.

In some embodiments, base portion 1912 may have a flat surface (not shown) or one or more protrusions (not shown) on its bottom surface to enable insect trap 1910 to remain upright when insect trap 1910 placed on a flat, horizontal surface such as the floor or on a shelf for storage. Protruding from a rear surface 1962 (shown in FIG. 48) of base portion 1912 are a plurality of electrically conductive prongs 1922, adapted to mount insect trap 1910 to a wall and provide power to insect trap 1910 by inserting conductive prongs 1922 into a standard household electrical wall socket. Alternatively, base portion 1912 may be configured to sit or hang wherever desired and receive power from batteries (not shown) mounted in base portion 1912. While an electrical socket and batteries have been described as providing power to insect trap 1910, any suitable power source may be used. Base portion 1912 includes a top surface 1926 and a lighting element such as one or more LEDs 1924. In some embodiments, base portion 1912 includes an array of LEDs 1924. As shown, LEDs 1924 are configured in a 2 by 3 array of blue and UV LEDS 1924, although different array configurations with different numbers and arrangements (e.g., a 3 by 2 array or a 4 by 3 array or a 1 by 2 array, for example) of LEDs 1924, LEDs 1924 emitting different wavelengths of light, and different combinations of LEDs 1924 emitting different wavelengths of light, could also be used. In some embodiments, LEDs 1924 include at least one that emits UV light and at least one that emits visible light. In some embodiments, LEDs 1924 include at least one that emits UV light and at least one that emits blue light to better attract a wide variety of insect species. In some embodiments, the lighting element emits a combination of wavelengths to mimic sunlight. In some embodiments, LEDs 1924 include at least one that emits IR light to better attract certain species of insects including mosquitos. Mounted in top surface 1926 of base portion 1912 may be a transparent or translucent window 1928, shown partially cut away to reveal LEDs 1924. Window 1928 protects LEDs 1924 from dust and insect debris, and allows base portion 1912 to be easily cleaned. In some embodiments, top surface 1926 has one or more snap protrusions 1956, preferably on the front and rear portions of top surface 1926, although snap protrusions 1956 may be located anywhere on top surface 1926. In some embodiments, snap protrusions 1956 are configured such that at least a portion of their distal portions are larger in width and/or depth than at least a portion of their proximal portions, thereby creating features known as undercuts. Front housing 1918 and/or rear housing 1940 of trap portion 1914 may have one or more snap recesses 1958 that correspond in size, shape and location to snap protrusions 1956 on base portion 1912, except that the undercuts on snap recesses 1958 may be configured such that at least a portion of their proximal portions are larger in width and/or depth than at least a portion of their distal portions. When trap portion 1914 is mounted to base portion 1912, the undercuts on snap protrusions 1956 and the undercuts on snap recesses 1958 engage to create a secure but removable attachment known as a snap fit. The snap fit between base portion 1912 and trap portion 1914 may provide a positive tactile and audible cue to reassure a user that trap portion 1914 is properly engaged with base portion 1912. The snap fit between base portion 1912 and trap portion 1914 may allow trap portion 1914 to be securely but removably mounted to base portion 1912 when insect trap 1910 is in use, and may allow the user to easily remove trap portion 1914 from base portion 1912 without damaging trap portion 1914 or base portion 1912 and without the user contacting trapped insects. In some embodiments, the snap fit between base portion 1912 and trap portion 1914 is configured to allow the user to easily remove and replace trap portion 1914 from base portion 1912 using only one hand, while base portion 1912 remains securely but removably plugged into an electrical wall socket. In some embodiments, the snap fit between base portion 1912 and trap portion 1914 is configured to allow trap portion 1914 to be mounted to base portion 1912 with a downward force of not greater than e.g., 50 Newtons, and to allow trap portion 1914 to be removed from base portion 1912 with an upward force of not greater than e.g., 50 Newtons. Although a snap fit may be preferred, other features or combinations of features may be contemplated to securely but removably attach trap portion 1914 to base portion 1912.

Figure 49:
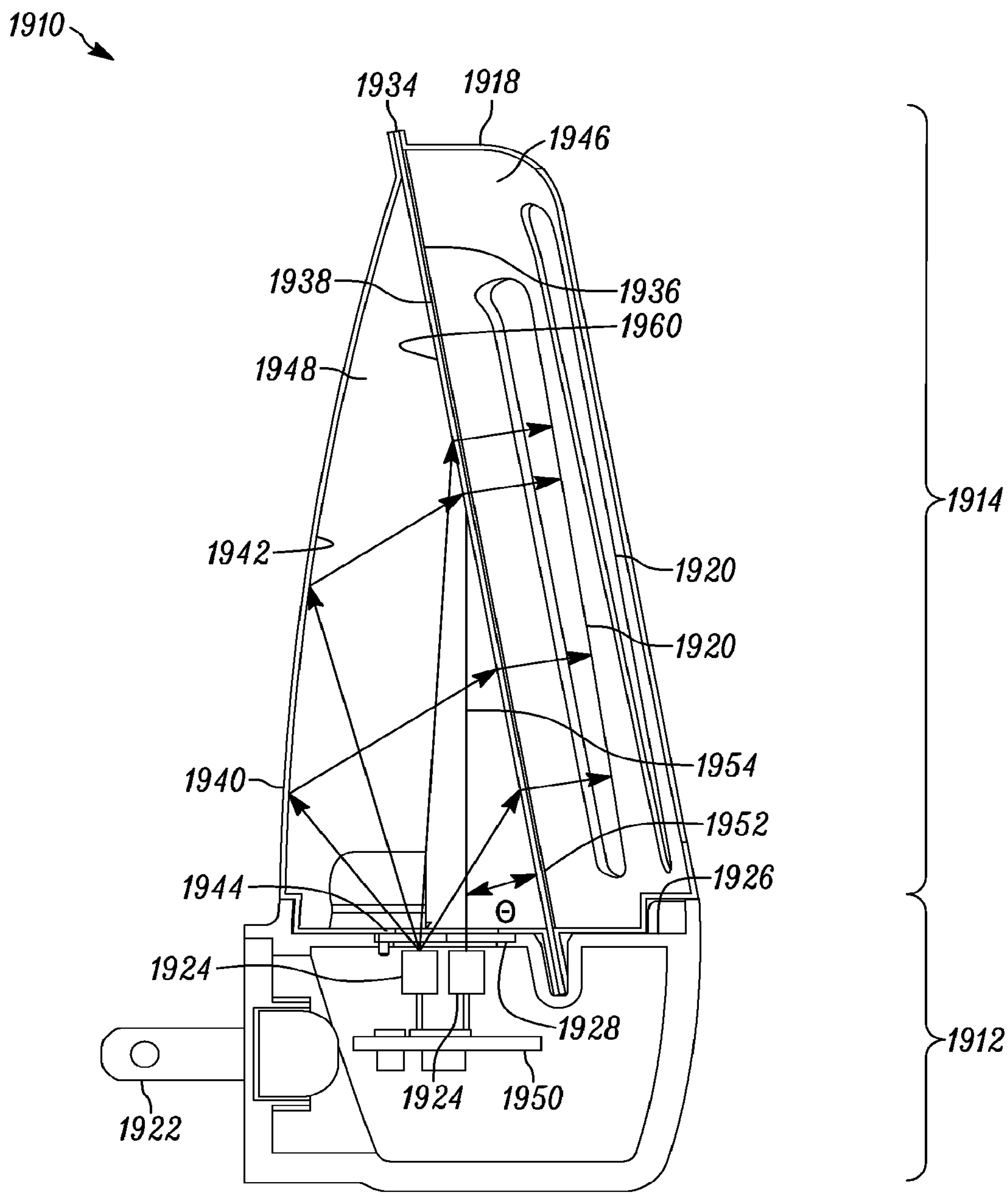
FIG. 49 is a cross-sectional view through the insect of FIG. 47.

FIG. 49 is a cross-sectional, view through insect trap 1910. In some embodiments, the light emitted from each of LEDs 1924 has a primary direction 1954. Trap portion 1914 includes a divider 1934 with a front surface 1938. In some embodiments, divider 1934 is constructed from or includes a transparent or translucent material and may be coated with a transparent or translucent adhesive 1936 on front surface 1938. In some embodiments, divider 1934 is configured to polarize light transmitted through it in an orientation similar to that of daylight to further attract flying insects, a wide variety of which are known to detect polarized light. In some embodiments, the material and thickness of divider 1934 and the material and thickness of adhesive 1936 are selected to transmit a substantial proportion of the UV and/or visible and/or IR light, for example greater than 60% of the light is transmitted through divider 1934 and adhesive 1936. In some embodiments, rear housing 1940 includes a reflective-coated inside surface 1942. Alternatively, the material and surface finish of rear housing 1940 may be configured to reflect and disperse UV and/or visible and/or IR light without a reflective coating. Rear housing 1940 may include an opening 1944 on its bottom surface, or alternatively opening 1944 may be replaced by a transparent or translucent window (not shown).

In some embodiments, front housing 1918 and rear housing 1940 are thermoformed from opaque sheet plastic, creating a clean and aesthetically pleasing shape while maintaining low cost and disposability. Alternatively, other opaque, transparent or translucent materials such as paper, paperboard, cardboard or paper pulp may also be used. In some embodiments, front housing 1918 and rear housing 1940 are constructed by injection molding or by other suitable manufacturing techniques. As shown, divider 1934 is substantially planar, and may be configured to be parallel to, or at an angle 1952 to primary direction 1954 of the light produced by LEDs 1924. Angle 1952 may preferably be an acute angle to assist in distributing the light evenly over divider 1934, and may preferably be from 0° to 45°. In some embodiments, divider 1934 may be formed into a convex, concave or saddle-shaped contour, or a combination of contours to optimize the even distribution of light. In some embodiments, divider 1934 may have ribs or other features (not shown) that increase adhesive surface area and create regions of light/dark contrast, which are highly visible to a wide variety of insects and may be more attractive to them.

In some embodiments, front housing 1918 may also be coated with transparent, translucent or opaque adhesive (not shown) on its inside surface to provide additional insect trapping efficiency and capacity. In addition, front housing 1918 may also have a reflective coating (not shown) underneath the adhesive coating on its inside surface to enhance its attraction to insects and further improve the insect trapping efficiency and effectiveness.

In some embodiments, front housing 1918, divider 1934 and rear housing 1940 are joined together where they intersect or engage by ultrasonic welding or high frequency (HF) welding, although they may also be permanently or removably joined together by gluing or any other suitable assembly method. The materials of trap portion 1914 may also include one or more insect attractants. For example, trap portion 1914 may be impregnated with one or more of insect-attracting substances known in the art, including sorbitol, coleopteran attractants including brevicomin, dominicalure, frontalin, grandlure, ipsdienol, ipsenol, japonilure, lineatin, megatomoic acid, multistriatin, oryctalure, sulcatol, and trunc-call, dipteran attractants including ceralure, cue-lure, latilure, medlure, moguchun, muscalure, and trimedlure, homopteran attractants including rescalure, lepidopteran attractants such as disparlure, straight chain lepidopteran pheromones including codlelure, gossyplure, hexalure, litlure, looplure, orfralure, and ostramone, and other insect attractants such as eugenol, methyl eugenol, and siglure, or other substances to provide a scent that may further increase the insect-attracting efficiency of insect trap 1910. In such embodiments, the insect attractant is integral to trap portion 1014. Alternatively, the insect attractants may be embedded in a separate piece (not shown) that mounts on an inside surface of front housing 1918 or through an opening in front housing 1918 or on front surface 1938 of divider 1934. It is desirable for such attractants to be detectable by an insect for approximately a 2-meter radius from insect trap 1910. Divider 1934 separates trap portion 1914 into a front enclosure 1946 and a rear enclosure 1948. In some embodiments, base portion 1912 includes a circuit board 1950 having a programmable processor or chip (not shown) for executing commands, electrically connected to conductive prongs 1922, only one of which is shown, and LEDs 1924, only one of which is shown. For clarity, however, not all of the electrical connections are shown. Circuit board 1950 may include electronic circuitry to receive ordinary household current from conductive prongs 1922 and provide power to illuminate LEDs 1924. Circuit board 1950 may include an energy stabilizer such as a full wave rectifier circuit or any other circuit that provides steady voltage to LEDs 1924, although it may also provide a varying voltage to LEDs 1924 to provide a flickering light that mimics movement that some insect species, including mosquitoes, may find attractive. For example, light flickering frequencies in the approximate range of 0.05 Hz (e.g., to mimic the breathing rate of large mammals) to 250 Hz (e.g., the highest flicker frequency to attract male houseflies), may be desirable and the lighting element may be configured to flicker within this range. Circuit board 1950 may provide power to LEDs 1924 to provide UV and/or visible and/or IR light, although it may be configured to provide power to only UV LEDs 1924 or to only visible light LEDs 1924 or to only IR LEDs 1924, or to provide variable power to produce combinations of flickering UV and/or visible and/or IR light. Circuit board 1950 may also be configured to drive a transmitter or transceiver such as a piezoelectric speaker (not shown) or other device that may be mounted in base portion 1912 to emit an insect-attracting sound. In some embodiments, the transmitter or transceiver may emit recorded and/or generated insect sounds or vibrations to better attract insects such as mosquitoes, midges, moths and flies, and may include one or more of insect call, reply, courtship and copulatory songs. In some embodiments, the transmitter or transceiver may emit recorded and/or generated insect-attracting sounds or vibrations such as the heartbeat of a mammal. For example, the transmitter or transceiver may emit an insect-attracting sound or sounds having a frequency in the range of approximately 0.5 Hz (e.g., the heart rate of large mammals) to approximately 240 kHz (e.g., the highest frequency detectable by insects). In some embodiments, the frequency is in the range of approximately 5 Hz to 100 kHz. In some embodiments, the frequency is in the range of approximately 35 Hz to 50 Khz. It is desirable for such insect-attracting sound to be detectable by an insect within approximately a 2-meter distance from insect trap 1910. It is desirable for such insect-attracting sound to be undetectable by a human beyond approximately a 1-meter distance from insect trap 1910.

In the operation of insect trap 1910, conductive prongs 1922 are inserted into a wall electrical socket, and trap portion 1914 is mounted to base portion 1912 by engaging snap recesses 1958 (not shown) of trap portion 1914 with their corresponding snap protrusions 1956 (not shown) on base portion 1912. LEDs 1924 emit light, represented by arrows, which transmit through window 1928 in base portion 1912, through opening 1944 in rear housing 1940 of trap portion 1914, into rear enclosure 1948, and directly onto inside surface 1942 of rear housing 1940 and onto a rear surface 1960 of divider 1934. For clarity, the arrows representing the light are only shown emitted from one of LEDs 1924. In some embodiments, light is not manipulated in base portion 1912 and is emitted directly into trap portion 1914. Inside surface 1942 of rear housing 1940 may include a concave shape and may be configured to reflect and disperse the UV and visible light from LEDs 1924 to distribute the light evenly onto rear surface 1960 of divider 1934, although the shape of inside surface 1942 of rear housing 1940 may have a convex shape or a saddle shape or a combination of shapes (not shown), or may also have ribs or other features to more evenly distribute the light. Alternatively, an optical enhancer such as an anamorphic lens (not shown) or any other lens or combination of lenses configured to distribute the UV and visible light (e.g., evenly, according to specific patterns, at a focal point, etc.) onto rear surface 1960 of divider 1934, may be mounted to rear housing 1940 at or near opening 1944 or to base portion 1912 at or near window 1928, and may replace or augment the role of inside surface 1942 of rear housing 1940. In some embodiments, the light from LEDs 1924 may directly strike rear surface 1960 of divider 1934 at an oblique angle (e.g., an acute angle from approximately 0° to 90°) and may be spread across divider 1934, and may replace or augment the role of inside surface 1942 of rear housing 1940 or of the lens or lenses mounted to rear housing 1940.

Thereafter, light transmits through divider 1934 and adhesive 1936 on front surface 1938, and into front enclosure 1946. The light may be further evenly distributed by the light-diffusing properties of divider 1934, adhesive 1936 on front surface 1938, or both. A portion of the light entering front enclosure 1946 continues through opening 1920 in front housing 1918 and into the area where the trap is installed. Insects are attracted to the UV and/or visible light transmitted through adhesive 1936 and through opening 1920 in front housing 1918, and fly or crawl into opening 1920 and onto adhesive 1936, where they become trapped. A user may observe trapped insects by looking through opening 1920 in front housing 1918. When a sufficient number of insects have been trapped, the user may easily remove and discard the entire used trap portion 1914 without touching the trapped insects, insect debris or adhesive, which remain out of reach inside trap portion 1914, and replace it with a new trap portion 1914. New trap portion 1914 has fresh adhesive-coated surfaces and light-directing surfaces, ensuring that insect trap 1910 will continue to efficiently and effectively attract and trap insects.

In some embodiments, because trap portion 1914 mounts on top of, and not in front of, base portion 1912, insect trap 1910 protrudes minimally from the wall when plugged into an ordinary household wall socket, and therefore intrudes minimally into the home environment. In some embodiments, insect trap 1910 is configured such that when insect trap 1910 is mounted to a wall, its overall depth, defined by the overall distance insect trap 1910 protrudes from the wall, is smaller than its overall height and its overall width.

It should be appreciated that a benefit of insect trap 1910 is the manipulation of light within trap portion 1914. In some embodiments, light manipulation occurs solely within trap portion 1914. Light manipulation may include reflection, refraction, polarization, dispersion and/or diffusion and is achieved by engaging with a manipulative element or surface (e.g., inside surface 1942, divider 1934 and adhesive 1936). In some embodiments, light manipulation produces an even distribution of light on adhesive 1936. In some embodiments, light is manipulated to produce a predetermined pattern on adhesive 1936 or within trap portion 1914, for example, an even distribution, an even distribution with hot spots of higher intensity, hot spot patterns, and/or combinations thereof.

Any suitable adhesive material may be used as part of an adhesive surface for trapping an insect. In some embodiments, pressure sensitive adhesives such as acrylics, butyl rubber, natural rubber, nitriles, silicones, styrene block copolymers, styrene-ethylene/propylene, styrene-isoprene-styrene, vinyl ethers may be used. Generally, the thickness of such adhesives will be in the range of approximately 0.01 mm to 1 mm. In some embodiments, the adhesive thickness is in the range of approximately 0.05 mm to 0.2 mm, with a thickness of approximately 0.1 mm being most often used.

Insect trap 1910 of this configuration may accommodate a variety of different trap portions 1914 that may be removably mounted to base portion 1912, each trap portion 1914 being uniquely configured to attract and trap a specific species or multiple species of flying or non-flying insect. For example, the overall size and shape of trap portion 1914, and the size, shape, location and orientation of openings 1920 in front housing 1918 of trap portion 1914, may be uniquely configured to attract and trap a specific species or multiple species of flying or non-flying insect.

For example, in some embodiments, trap portion 1914 is approximately 20 mm to 600 mm wide, 20 mm to 600 mm high and 5 mm to 150 mm deep. In some embodiments, trap portion 1914 is approximately 20 mm to 200 mm wide, 20 mm to 200 mm high and 5 mm to 80 mm deep. In some embodiments, trap portion 1914 is approximately 20 mm to 130 mm wide, 20 mm to 130 mm high and 5 mm to 50 mm deep.

In some embodiments, base portion 1912 is approximately 20 mm to 600 mm wide, 10 mm to 150 mm high and 10 mm to 150 mm deep. In some embodiments, base portion 1912 is 20 mm to 200 mm wide, 10 mm to 100 mm high and 10 mm to 80 mm deep. In some embodiments, base portion 1912 is 20 mm to 130 mm wide, 10 mm to 50 mm high and 10 mm to 50 mm deep.

As provided herein, opening 1920 may be a variety of shapes and/or sizes. For example, opening 1920 may be circular, square, rectangular, polygonal and/or elliptical in shape. Alternatively, opening 1920 may be slot shaped having a straight, curved or undulating shape or pattern. When opening 1920 is circular, opening 1920 may be approximately 0.5 mm to 30 mm in diameter. In some embodiments, circular opening 1920 is approximately 0.5 mm to 20 mm in diameter. In some embodiments, circular opening 1920 is approximately 0.5 mm to 15 mm in diameter. When opening 1920 is slot shaped, opening 1920 may be approximately 2 mm to 30 mm wide and 5 mm to 500 mm long. In some embodiments, slot shaped opening 1920 is approximately 2 mm to 20 mm wide and 5 mm to 200 mm long. In some embodiments, slot shaped opening 1920 is approximately 2 mm to 15 mm wide and 5 mm to 100 mm long.

In some embodiments, opening 1920 covers all or a portion of front housing 1918. For example, opening 1920 may cover a range of approximately 1% to 75% of the surface area of front housing 1918. In some embodiments, opening 1920 covers approximately 5% to 50% of the surface area of front housing 1918. In some embodiments, opening 1920 covers approximately 10% to 30% of the surface area of front housing 1918.

Figure 50:
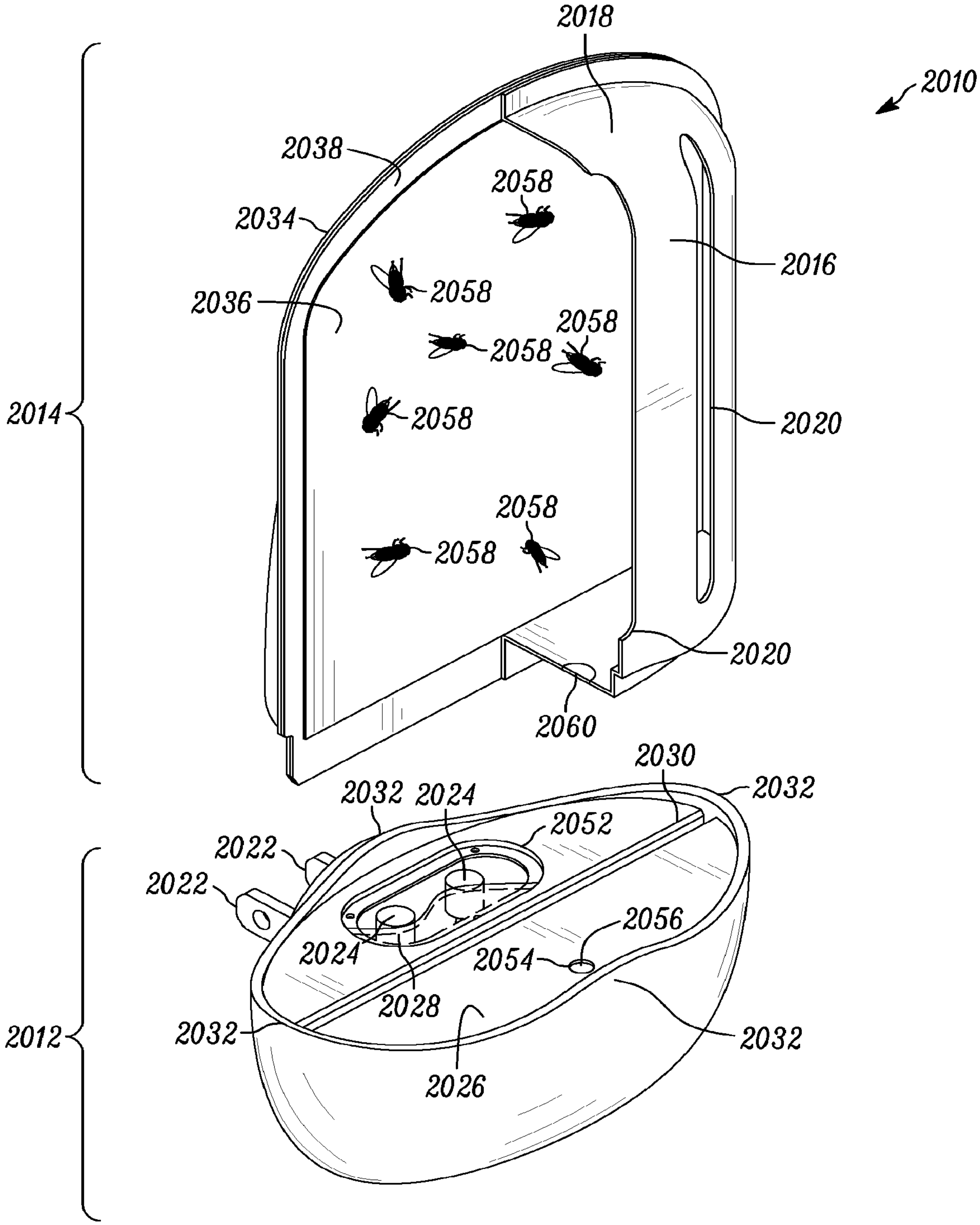
FIG. 50 is a front perspective view of a twentieth embodiment of an insect trap in accordance with principles of the disclosure.

FIG. 50 is a front perspective view of a twentieth embodiment of an insect trap, indicated generally at 2010. Insect trap 2010 may include a base portion 2012 and a removable trap portion 2014. Trap portion 2014 is shown partially cut away and removed from base portion 2012 in this view. Trap portion 2014 includes a divider 2034 and a front housing 2018 with at least one opening 2020 in a front surface 2016. Opening 2020 in front housing 2018 may be configured to admit a wide variety of insects into insect trap 2010, or alternatively it may be configured to admit one or more specific insect species. In some embodiments, opening 2020 is configured to prevent user's fingers from penetrating opening 2020 and inadvertently touching trapped insects or adhesive when removing and replacing trap portion 2014. In some embodiments, opening 2020 may preferably have a size and shape such that a sphere 25 mm in diameter cannot pass through opening 2020, and has a size and shape such that a sphere 1 mm in diameter can pass through any portion of opening 2020. Opening 2020 may be of uniform or of varying width, shape and orientation, and if trap portion 2014 has more than one opening 2020, they may be of identical or of differing widths, shapes and orientations. Opening 2020 may be configured to attract one or more individual insect species or a variety of insect species. The front housing 2018 may also include a window 2060, although an opening may take the place of window 2060. In some embodiments, divider 2034 is constructed from or includes a transparent or translucent material and may be coated with a transparent or translucent adhesive 2036 on a front surface 2038. During use, one or more trapped insects 2058 may adhere to adhesive 2036 on front surface 2038 of divider 2034. In some embodiments, divider 2034 may also be configured to polarize light transmitted through it in an orientation similar to that of daylight to further attract flying insects, a wide variety of which are known to detect polarized light. Protruding from a rear surface 2064 (shown in FIG. 51) of base portion 2012 may be a plurality of electrically conductive prongs 2022, adapted to mount insect trap 2010 to a wall and provide power to insect trap 2010 by inserting conductive prongs 2022 into a standard household electrical wall socket. Alternatively, base portion 2012 may be configured to sit or hang wherever desired and receive power from batteries (not shown) mounted in base portion 2012. While an electrical socket and batteries have been described as providing power to insect trap 2010, any suitable power source may be used. Base portion 2012 includes a lighting element such as one or more LEDs 2024. In some embodiments, LEDs 2024 include at least one that emits UV light and at least one that emits visible light. In some embodiments, LEDs 2024 include at least one that emits UV light and at least one that emits blue light to better attract a wide variety of insect species. In some embodiments, the lighting element emits a combination of wavelengths to mimic sunlight. In some embodiments, LEDs 2024 include at least one that emits IR light to better attract certain species of insects including mosquitos and fleas. In a top surface 2026 of base portion 2012 is an opening 2052, which may be covered by a transparent or translucent window 2028, shown partially cut away to reveal LEDs 2024. One of ordinary skill in the art would realize that openings and windows (e.g., 2052 and 2028) as described herein or depicted in the accompanying drawings may vary in size and/or positioning, without departing from the scope of the disclosure. Window 2028 protects LEDs 2024 from dust and insect debris, and may allow base portion 2012 to be easily cleaned. In some embodiments, at least a portion of window 2028 and at least a portion of LEDs 2024 protrude from top surface 2026 of base portion 2012 and into trap portion 2014 when trap portion 2014 is mounted to base portion 2012. In some embodiments, base portion does not include window 2028, and at least a portion of LEDs 2024 protrude from top surface 2026 of base portion 2012 and into trap portion 2014 when trap portion 2014 is mounted to base portion 2012. In some embodiments, mounted in an opening 2054 of top surface 2026 is a photosensor 2056, preferably a photoresistor, although a photovoltaic cell, a photodiode, a phototransistor, or any sensor that detects light and responds by changing its electrical characteristics may be used. Also in top surface 2026 may be a slot 2030, and on the perimeter of top surface 2026 is a rim or upwardly directed protrusions 2032.

Figure 51:
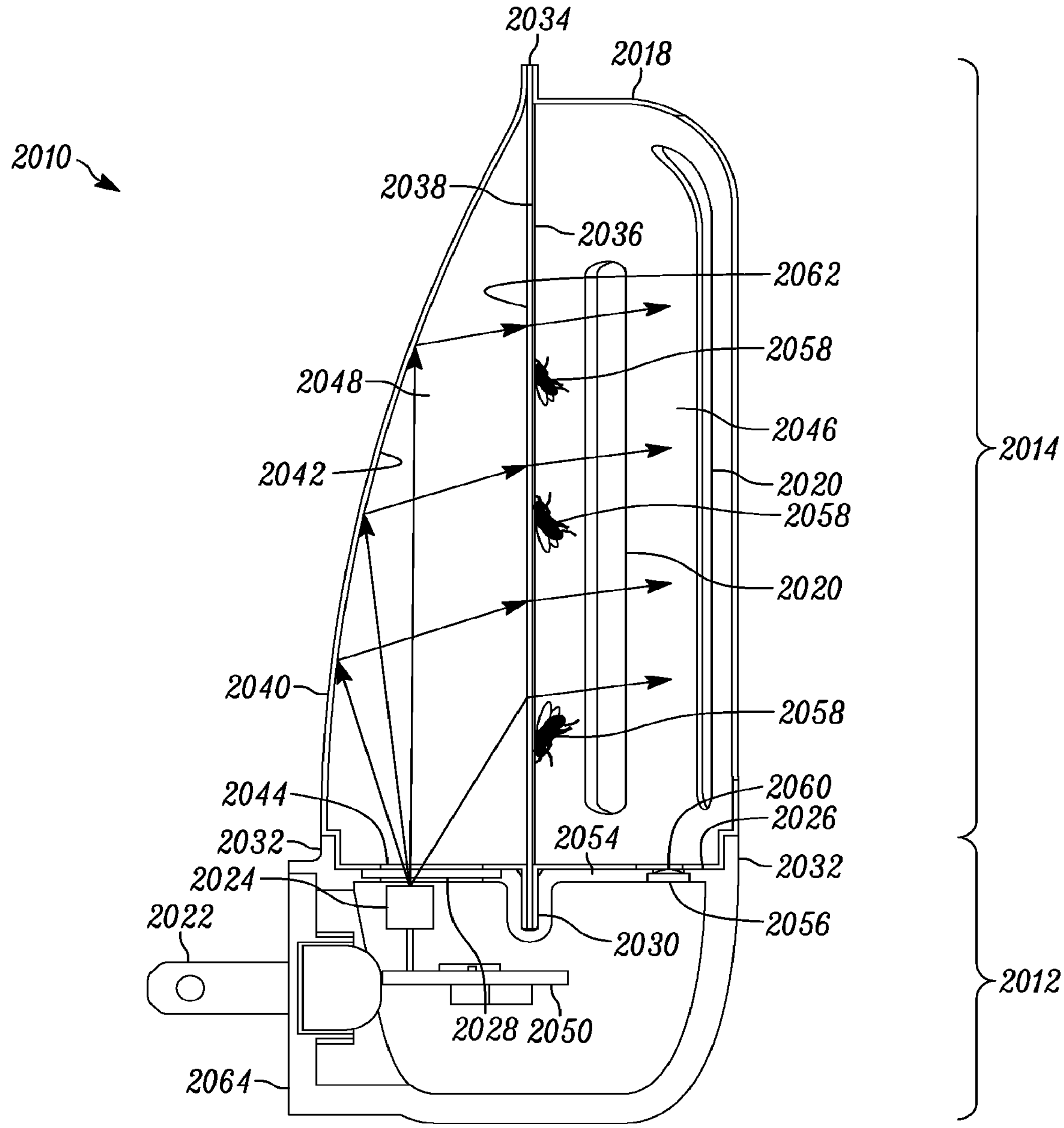
FIG. 51 is a cross-sectional view through the insect trap of FIG. 50.

FIG. 51 is a cross-sectional view through insect trap 2010. Trap portion 2014 includes a rear housing 2040 with an inside surface 2042. In some embodiments, inside surface 2042 has a reflective coating. In some embodiments, the material and surface finish of rear housing 2040 may be configured to reflect and disperse UV and/or visible and/or IR light without a reflective coating. In some embodiments, the material and thickness of divider 2034 and the material and thickness of adhesive 2036 are selected to transmit a substantial proportion of the UV and/or visible and/or IR light, for example greater than 60% of the light is transmitted through divider 2034 and adhesive 2036. Rear housing 2040 may include an opening 2044 on its bottom face, or alternatively opening 2044 may be replaced by a transparent or translucent window (not shown).

In some embodiments, front housing 2018 and rear housing 2040 are thermoformed from opaque sheet plastic, creating a clean and aesthetically pleasing shape while maintaining low cost and disposability. Alternatively, other opaque, transparent or translucent materials such as paper, paperboard, cardboard or paper pulp may also be used. In some embodiments, front housing 2018 and rear housing 2040 are constructed by injection molding or by other suitable manufacturing techniques. As shown, divider 2034 is substantially planar, and may be configured to be parallel to, or at an angle to the primary direction of the light (not shown) produced by LEDs 2024. Alternatively, divider 2034 may be formed into a convex, concave or saddle-shaped contour (not shown), or a combination of contours to optimize the even distribution of light. In some embodiments, divider 2034 has ribs or other features (not shown) that increase adhesive surface area and create regions of light/dark contrast, which are highly visible to a wide variety of insects and may be more attractive to them.

In some embodiments, front housing 2018 is coated with transparent, translucent or opaque adhesive (not shown) on its inside surface to provide additional insect trapping efficiency and capacity. In addition, front housing 2018 may also have a reflective coating (not shown) underneath the adhesive coating on its inside surface to enhance its attraction to insects and further improve the insect trapping efficiency and effectiveness.

In some embodiments, front housing 2018, divider 2034 and rear housing 2040 are joined together where they intersect or engage with an adhesive, although they may also be joined by other commonly used packaging assembly techniques such as ultrasonic welding or RF sealing, or any other suitable assembly method. As shown, divider 2034 may separate trap portion 2014 into a front enclosure 2046 and a rear enclosure 2048. In some embodiments, base portion 2012 includes a circuit board 2050 having a programmable processor or chip (not shown) for executing commands, electrically connected to conductive prongs 2022, only one of which is shown, and LEDs 2024. For clarity, however, not all of the electrical connections are shown. Circuit board 2050 may include electronic circuitry to receive ordinary household current, for example, from conductive prongs 2022 and provide power to illuminate LEDs 2024. Circuit board 2050 may include an energy stabilizer such as a full wave rectifier circuit or any other circuit that provides steady voltage to LEDs 2024, although it may also provide a varying voltage to LEDs 2024 to provide a flickering light which mimics movement that some insect species, including mosquitoes, may find attractive. For example, light flickering frequencies in the approximate range of 0.05 Hz (e.g., to mimic the breathing rate of large mammals) to 250 Hz (e.g., the highest flicker frequency to attract male houseflies), may be desirable and the lighting element may be configured to flicker within this range. Circuit board 2050 may provide power to LEDs 2024 to provide UV and/or visible and/or IR light, although it may be configured to provide power to only the UV LEDs 2024 or to only the visible light LEDs 2024 or to only the IR LEDs 2024, or to provide variable power to produce combinations of flickering UV and/or visible and/or IR light. Circuit board 2050 may also be configured to drive a transmitter or transceiver such as a piezoelectric speaker (not shown) or other device that may be mounted in base portion 2012 to emit an insect-attracting sound. In some embodiments, the transmitter or transceiver may emit recorded and/or generated insect sounds or vibrations to better attract insects such as mosquitoes, midges, moths and flies, and may include one or more of insect call, reply, courtship and copulatory songs. In some embodiments, the transmitter or transceiver may emit recorded and/or generated insect-attracting sounds or vibrations such as the heartbeat of a mammal. For example, the transmitter or transceiver may emit an insect-attracting sound or sounds having a frequency in the range of approximately 0.5 Hz (e.g., the heart rate of large mammals) to approximately 240 kHz (e.g., the highest frequency detectable by insects). In some embodiments, the frequency is in the range of approximately 5 Hz to 100 kHz. In some embodiments, the frequency is in the range of approximately 35 Hz to 50 Khz. It is desirable for such insect-attracting sound to be detectable by an insect within approximately a 2-meter distance from insect trap 2010. It is desirable for such insect-attracting sound to be undetectable by a human beyond approximately a 1-meter distance from insect trap 2010.

As shown, slot 2030 in top surface 2026 of base portion 2012 and rim or protrusions 2032 on top surface 2026 of base portion 2012 engage with trap portion 2014 to secure it in place during use, although any other form of attachment may be substituted that may allow trap portion 2014 to be securely but removably mounted on base portion 2012.

In the operation of insect trap 2010, conductive prongs 2022, only one of which is shown, are inserted into a wall electrical socket. Circuit board 2050 provides power to LEDs 2024 and to photosensor 2056. LEDs 2024 emit light, represented by arrows, which transmits through window 2028 in base portion 2012, through opening 2044 in rear housing 2040 of trap portion 2014, into rear enclosure 2048, and directly onto inside surface 2042 of rear housing 2040 and a rear surface 2062 of divider 2034. In some embodiments, light is not manipulated in base portion 2012 and is emitted directly into trap portion 2014. Inside surface 2042 of rear housing 2040 may include a concave shape and may be configured to reflect and disperse the UV and visible light from LEDs 2024 to distribute the light evenly onto rear surface 2062 of divider 2034, although the shape of inside surface 2042 of rear housing 2040 may have a convex shape or a saddle shape or a combination of shapes, or may also have ribs or other features (not shown) to more evenly distribute the light. Alternatively, an optical enhancer such as an anamorphic lens (not shown) or any other lens or combination of lenses configured to distribute the UV and visible light (e.g., evenly, according to specific patterns, at a focal point, etc.) onto rear surface 2062 of divider 2034, may be mounted to rear housing 2040 at or near opening 2044 or to base portion 2012 at or near opening 2052, and may replace or augment the role of inside surface 2042 of rear housing 2040. In some embodiments, the light from LEDs 2024 may directly strike rear surface 2062 of divider 2034 at an oblique angle (e.g., an acute angle from approximately 0° to 90°) and may be spread across divider 2034, and may replace or augment the role of inside surface 2042 of rear housing 2040 or of the lens or lenses mounted to rear housing 2040.

Thereafter, the light transmits through divider 2034 and adhesive 2036 on front surface 2038, and into front enclosure 2046. The light-diffusing properties of divider 2034, adhesive 2036, or both may further evenly distribute the light. A portion of the light entering front enclosure 2046 continues through opening 2020 in front housing 2018 and emits into the surrounding area where insect trap 2010 is installed. Insects are attracted to the UV and/or visible light transmitted through adhesive 2036 and through opening 2020 in front housing 2018, and fly or crawl into opening 2020 and onto adhesive 2036, where they become trapped. Trapped insects 2058 reduce the amount light transmitted into front enclosure 2046. Photosensor 2056 detects this reduction in light and responds by changing its electrical properties. Circuit board 2050 responds to changes in electrical properties that exceed a predetermined threshold by causing LEDs 2024 to blink on and off, thereby providing an indicator feature signaling that trap portion 2014 may need to be replaced. Alternatively, other visual indicator features, such as a change in the color of the light (e.g., to yellow, orange or red) or an audible indicator feature such as a tone, chime or voice, may augment or replace the blinking light indicator feature. In some embodiments, circuit board 2050 is configured to avoid responding inadvertently to changes in the ambient light levels by periodically pulsing or varying the light emitting from LEDs 2024, preferably at a faster rate than is distinguishable by the human eye, detecting the changes in electrical properties of photosensor 2056 resulting from the periodic pulses of light, and responding to the changes that exceed a predetermined threshold by causing LEDs 2024 to blink on and off. A user may notice the blinking light emitting from insect trap 2010 and observe trapped insects 2058 by looking through opening 2020 in front housing 2018. The user may easily remove and discard the entire used trap portion 2014 without touching trapped insects, insect debris or adhesive, which remain out of reach inside trap portion 2014, and replace it with a new trap portion 2014. The new trap portion 2014 has fresh adhesive-coated surfaces and light-directing surfaces, ensuring that insect trap 2010 will continue to efficiently and effectively attract and trap insects.

In some embodiments, because trap portion 2014 mounts on top of, and not in front of, base portion 2012, insect trap 2010 protrudes minimally from the wall when plugged into an ordinary household wall socket, and therefore intrudes minimally into the home environment. In some embodiments, insect trap 2010 is configured such that when insect trap 2010 is mounted to a wall, its overall depth, defined by the overall distance insect trap 2010 protrudes from the wall, is smaller than its overall height and its overall width.

It should be appreciated that a benefit of insect trap 2010 is the manipulation of light within trap portion 2014. In some embodiments, light manipulation occurs solely within trap portion 2014. Light manipulation may include reflection, refraction, polarization, dispersion and/or diffusion and is achieved by engaging with a manipulative element or surface (e.g., inside surface 2042, divider 2034 and adhesive 2036). In some embodiments, light manipulation produces an even distribution of light on adhesive 2036. In some embodiments, light is manipulated to produce a predetermined pattern on the adhesive 2036 or within trap portion 2014, for example, an even distribution, an even distribution with hot spots of higher intensity, hot spot patterns, and/or combinations thereof.

Any suitable adhesive material may be used as part of an adhesive surface for trapping an insect. In some embodiments, pressure sensitive adhesives such as acrylics, butyl rubber, natural rubber, nitriles, silicones, styrene block copolymers, styrene-ethylene/propylene, styrene-isoprene-styrene, vinyl ethers may be used. Generally, the thickness of such adhesives will be in the range of approximately 0.01 mm to 1 mm. In some embodiments, the adhesive thickness is in the range of approximately 0.05 mm to 0.2 mm, with a thickness of approximately 0.1 mm being most often used.

An insect trap 2010 of this configuration may accommodate a variety of different trap portions 2014 that may be removably mounted to base portion 2012, each trap portion 2014 being uniquely configured to attract and trap a specific species or multiple species of flying or non-flying insect. For example, the overall size and shape of trap portion 2014, the size, shape, location and orientation of opening 2020 in front housing 2018 of trap portion 2014, and the natural frequency and sound amplifying properties of trap portion 2014 may be uniquely configured to attract and trap a specific species or multiple species of flying insect. For example, in some embodiments, trap portion 2014 is approximately 20 mm to 600 mm wide, 20 mm to 600 mm high and 5 mm to 150 mm deep. In some embodiments, trap portion 2014 is approximately 20 mm to 200 mm wide, 20 mm to 200 mm high and 5 mm to 80 mm deep. In some embodiments, trap portion 2014 is approximately 20 mm to 130 mm wide, 20 mm to 130 mm high and 5 mm to 50 mm deep.

In some embodiments, base portion 2012 is approximately 20 mm to 600 mm wide, 10 mm to 150 mm high and 10 mm to 150 mm deep. In some embodiments, base portion 2012 is 20 mm to 200 mm wide, 10 mm to 100 mm high and 10 mm to 80 mm deep. In some embodiments, base portion 2012 is 20 mm to 130 mm wide, 10 mm to 50 mm high and 10 mm to 50 mm deep.

As provided herein, opening 2020 may be a variety of shapes and/or sizes. For example, opening 2020 may be circular, square, rectangular, polygonal and/or elliptical in shape. Alternatively, opening 2020 may be slot shaped having a straight, curved or undulating shape or pattern. When opening 2020 is circular, opening 2020 may be approximately 0.5 mm to 30 mm in diameter. In some embodiments, circular opening 2020 is approximately 0.5 mm to 20 mm in diameter. In some embodiments, circular opening 2020 is approximately 0.5 mm to 15 mm in diameter. When opening 2020 is slot shaped, opening 2020 may be approximately 2 mm to 30 mm wide and 5 mm to 500 mm long. In some embodiments, slot shaped opening 2020 is approximately 2 mm to 20 mm wide and 5 mm to 200 mm long. In some embodiments, slot shaped opening 2020 is approximately 2 mm to 15 mm wide and 5 mm to 100 mm long.

In some embodiments, opening 2020 covers all or a portion of front housing 2018. For example, opening 2020 may cover a range of approximately 1% to 75% of the surface area of front housing 2018. In some embodiments, opening 2020 covers approximately 5% to 50% of the surface area of front housing 2018. In some embodiments, opening 2020 covers approximately 10% to 30% of the surface area of front housing 2018.

Figure 52:
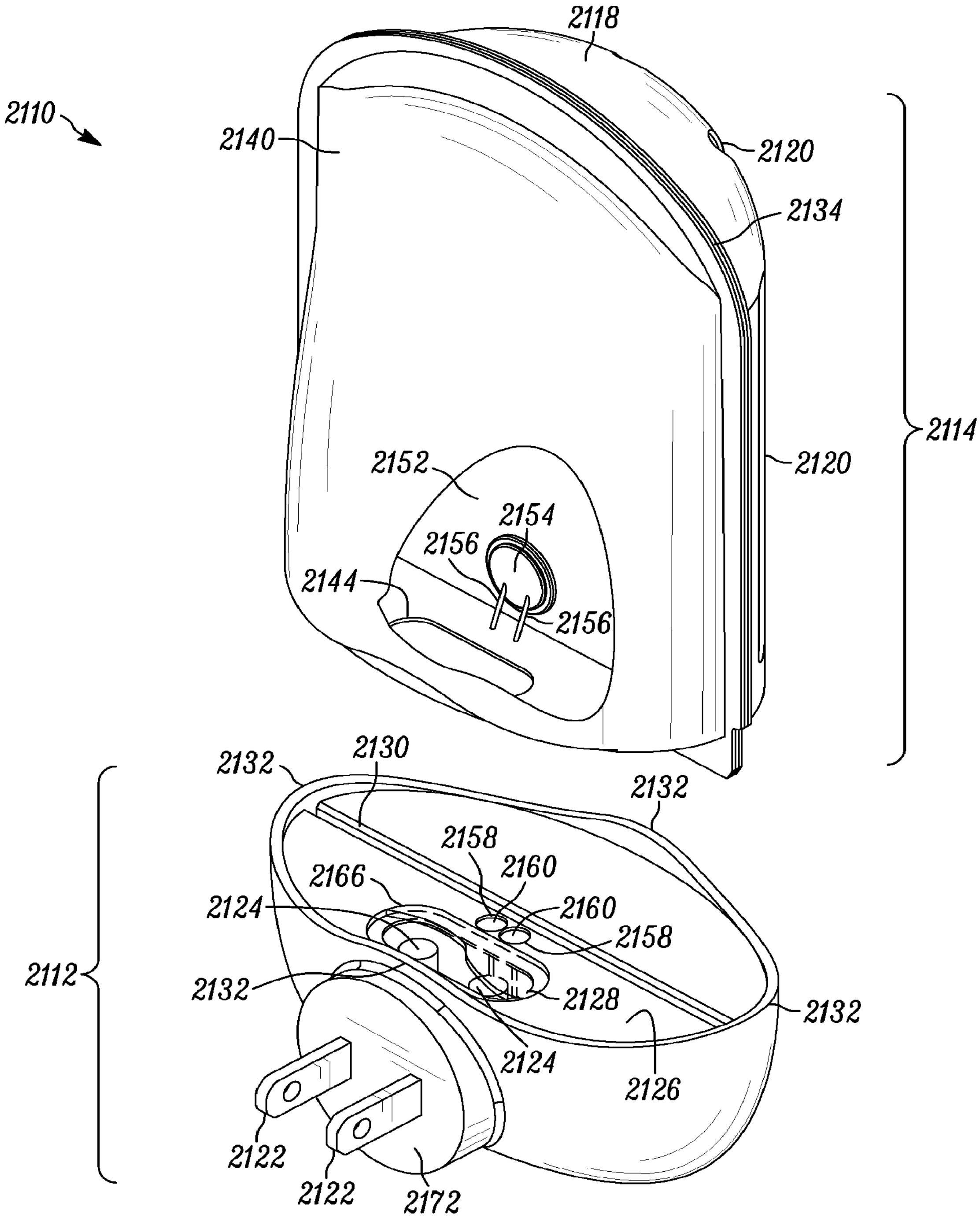
FIG. 52 is a rear perspective view of a twenty-first embodiment of an insect trap in accordance with principles of the disclosure.

FIG. 52 is a rear perspective view of a twenty-first embodiment of an insect trap, indicated generally at 2110. Insect trap 2110 includes a base portion 2112 and a removable trap portion 2114. Trap portion 2114 is shown partially cut away and removed from base portion 2112 in this view. Trap portion 2114 includes a front housing 2118 with at least one opening 2120 in its front surface 2116 (shown in FIG. 53), a rear housing 2140, and a divider 2134 with a rear surface 2152. Affixed to rear surface 2152 of divider 2134 is an electromechanical actuator 2154, preferably a transmitter or transceiver such as a piezoelectric actuator. Attached to actuator 2154 are electric trap wires 2156. While two trap wires 2156 are shown attached to actuator 2154, any suitable number may be used. Rear housing 2140 may include an opening 2144 on its bottom surface, or alternatively opening 2144 may be replaced by a transparent or translucent window (not shown).

Protruding from a rear surface 2172 of base portion 2112 are a plurality of electrically conductive prongs 2122, adapted to mount insect trap 2110 to a wall and provide power to insect trap 2110 by inserting conductive prongs 2122 into a standard household electrical wall socket. Alternatively, base portion 2112 may be configured to sit or hang wherever desired and receive power from batteries (not shown) mounted in base portion 2112. While an electrical socket and batteries have been described as providing power to insect trap 2110, any suitable power source may be used. Base portion 2112 includes a lighting element such as one or more LEDs 2124. In some embodiments, LEDs 2124 include at least one that emits UV light and at least one emits visible light. In some embodiments, LEDs 2124 include at least one that emits UV light and at least one that emits blue light to better attract a wide variety of insect species. In some embodiments, the lighting element emits a combination of wavelengths to mimic sunlight. In some embodiments, LEDs 2124 include at least one that emits IR light to better attract certain species of insects such as mosquitos and fleas. A top surface 2126 of base portion 2112 includes an opening 2166, which may be covered by a transparent or translucent window 2128, shown partially cut away to reveal LEDs 2124. Window 2128 protects LEDs 2124 from dust and insect debris, and allows base portion 2112 to be easily cleaned. In some embodiments, at least a portion of window 2128 and at least a portion of LEDs 2124 protrude from top surface 2126 of base portion 2112, and protrude into trap portion 2114 when trap portion 2114 is mounted to base portion 2112. In some embodiments, base portion 2112 does not include a window 2128, and at least a portion of LEDs 2124 protrude from top surface 2126 of base portion 2112 and protrude into trap portion 2114 when trap portion 2114 is mounted to base portion 2112. Mounted in one or more additional openings 2158 in top surface 2126 of base portion 2112 is a plurality of electrical base contacts 2160. While two base contacts 2160 are shown, any suitable number may be used. In top surface 2126 may be a slot 2130, and on the perimeter of top surface 2126 is a rim or upwardly directed protrusions 2132.

Figure 53:
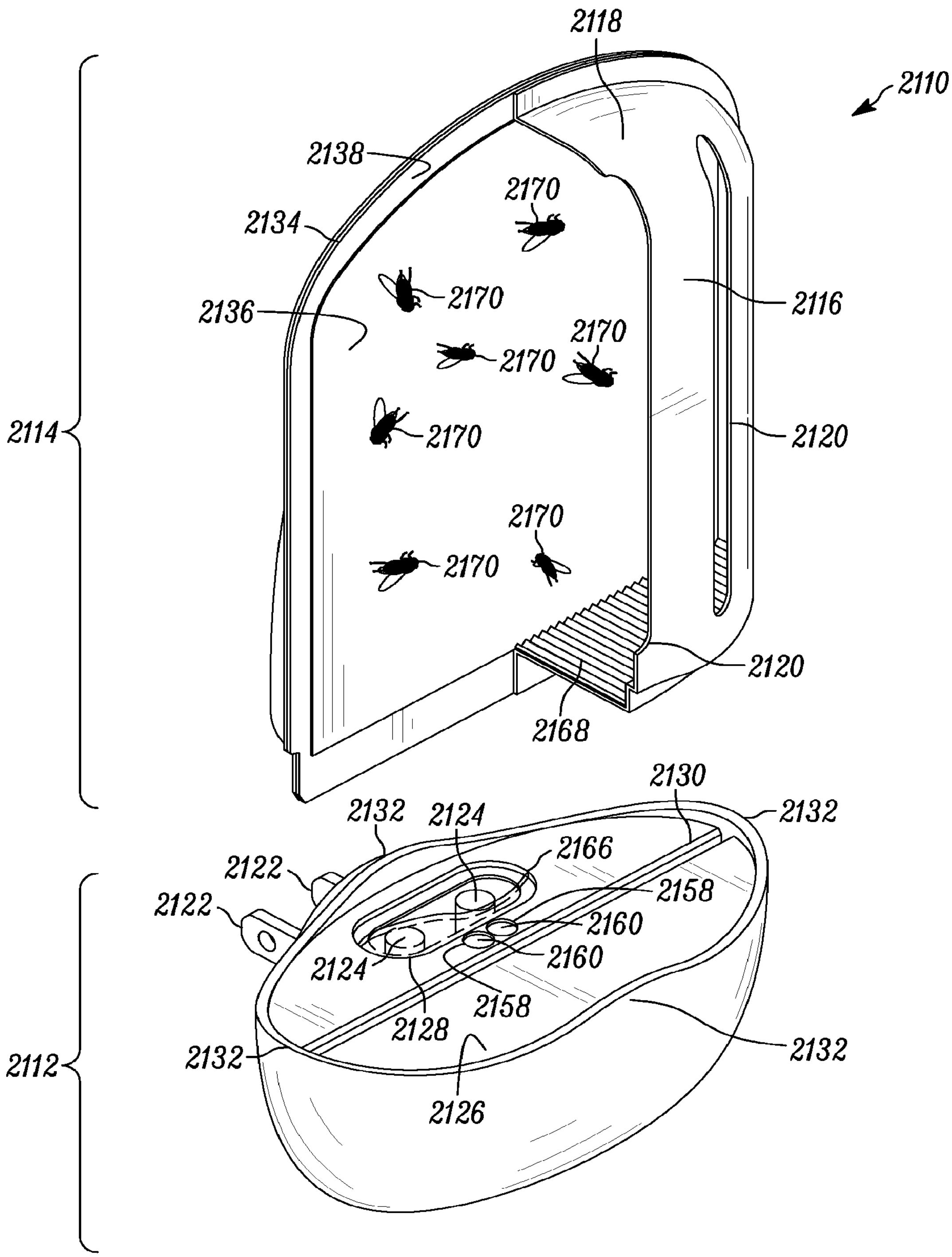
FIG. 53 is a front perspective view of the insect trap of FIG. 52.

FIG. 53 is a front perspective view of insect trap 2110. Trap portion 2114 is shown partially cut away and removed from base portion 2112 in this view. Opening 2120 in front housing 2118 may be configured to admit a wide variety of insects into insect trap 2110, or alternatively it may be configured to admit one or more specific insect species. In some embodiments, opening 2120 is configured to prevent user's fingers from penetrating opening 2120 and inadvertently touching trapped insects or adhesive when removing and replacing trap portion 2114. In some embodiments, opening 2120 has a size and shape such that a sphere 25 mm in diameter cannot pass through opening 2120, and has a size and shape such that a sphere 1 mm in diameter can pass through any portion of opening 2120. Opening 2120 may be of uniform or of varying width, shape and orientation, and if trap portion 2114 has more than one opening 2120, they may be of identical or of differing widths, shapes and orientations. Opening 2120 may be configured to attract one or more individual insect species or a variety of insect species. In some embodiments, divider 2134 is constructed from or includes a transparent or translucent material and may be coated with a transparent or translucent adhesive 2136 on its front surface 2138. During use, trapped insects 2170 may adhere to adhesive 2136 on front surface 2138 of divider 2134. In some embodiments, the material and thickness of divider 2134 and the material and thickness of adhesive 2136 are selected to transmit a substantial proportion of the UV and/or visible and/or IR light, for example greater than 60% of the light is transmitted through divider 2134 and adhesive 2136.

In some embodiments, divider 2134 may also be configured to polarize light transmitted through it in an orientation similar to that of daylight to further attract flying insects, a wide variety of which are known to detect polarized light. In some embodiments, mounted on the inside bottom of front housing 2118 is an insert 2168 configured to reflect and polarize light in an orientation similar to that of light reflecting from the surface of water to better attract a variety of insect species, especially those that breed near water. Insert 2168 may be configured of material that reflects and polarizes light, and may have ridges or other surface or subsurface features to enhance its reflecting and/or polarizing properties, thereby further attracting insects.

Figure 54:
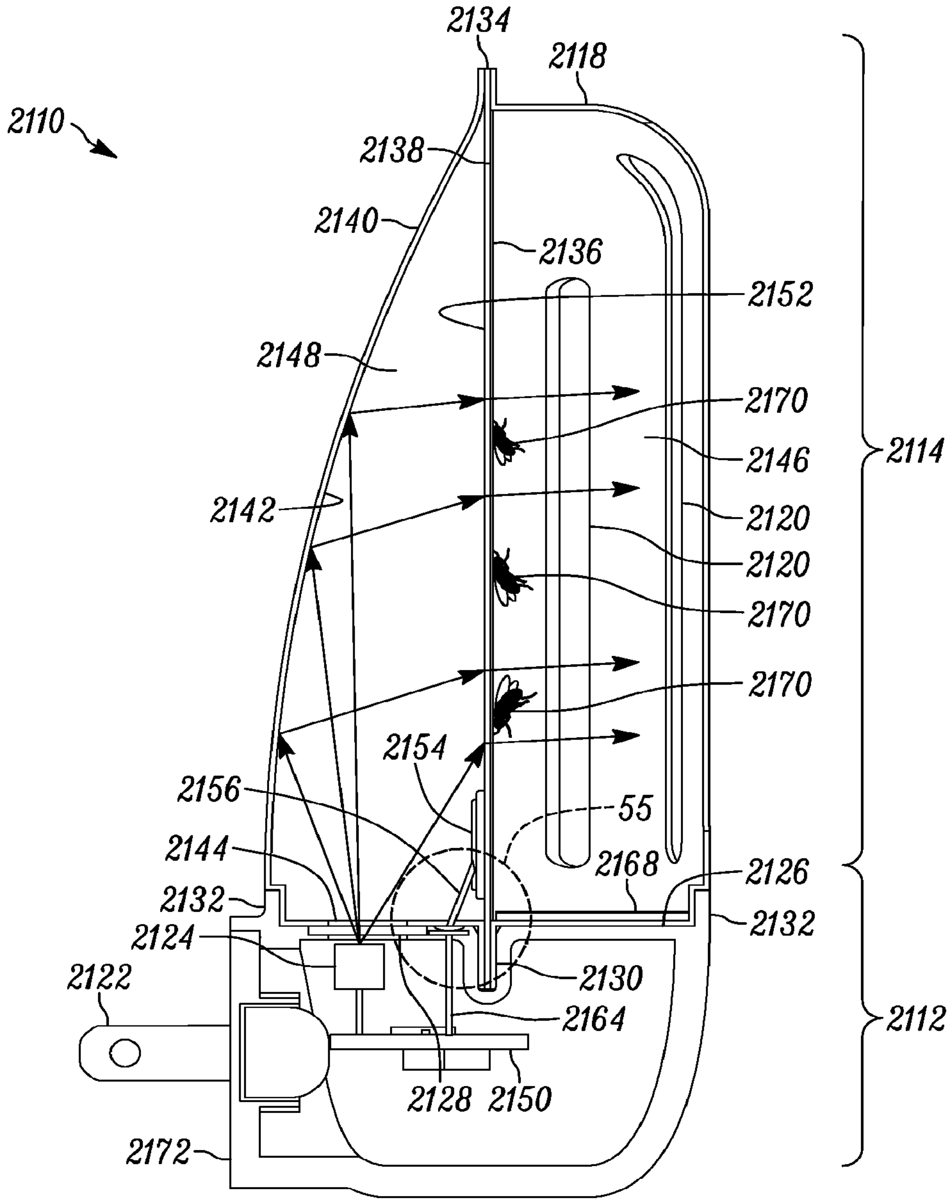
FIG. 54 is a cross-sectional view through the insect trap of FIG. 52.
Figure 55:
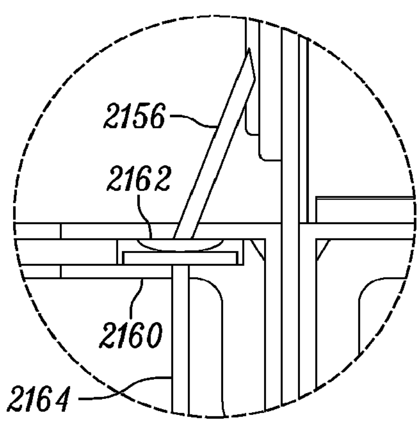
FIG. 55 is an enlarged view of a portion of FIG. 54.

FIG. 54 is a cross-sectional view through insect trap and FIG. 55 is an enlarged view of a portion of FIG. 54. In some embodiments, rear housing 2140 may have a reflective-coated inside surface 2142. Alternatively, the material and surface finish of rear housing 2140 may be configured to reflect and disperse UV and/or visible and/or IR light without a reflective coating.

In some embodiments, front housing 2118 and rear housing 2140 are thermoformed from opaque sheet plastic, creating a clean and aesthetically pleasing shape while maintaining low cost and disposability. Alternatively, other opaque, transparent or translucent materials such as paper, paperboard, cardboard or paper pulp may be used. In some embodiments, front housing 2118 and rear housing 2140 are constructed by injection molding or by other suitable manufacturing techniques. As shown, divider 2134 is substantially planar, and may be configured to be parallel to, or at an angle to the primary direction of the light produced by LEDs 2124. In some embodiments, divider 2134 may be formed into a convex, concave or saddle-shaped contour, or a combination of contours to optimize the even distribution of light. In some embodiments, divider 2134 may have ribs or other features (not shown) that increase adhesive surface area and create regions of light/dark contrast, which are highly visible to a wide variety of insects and may be more attractive to them.

In some embodiments, front housing 2118 may also be coated with transparent, translucent or opaque adhesive on its inside surface to provide additional insect trapping efficiency and capacity. In addition, front housing 2118 may also have a reflective coating (not shown) underneath the adhesive coating on its inside surface to enhance its attraction to insects and further improve the insect trapping efficiency and effectiveness. In some embodiments, front housing 2118, divider 2134 and rear housing 2140 are joined together where they intersect or engage by ultrasonic welding or high frequency (HF) welding, although they may also be permanently or removably joined together by gluing or any other suitable assembly method. Divider 2134 separates trap portion 2114 into a front enclosure 2146 and a rear enclosure 2148. Rear housing 2140 includes a plurality of electrical trap contacts 2162 (only one of which is shown) that correspond to base contacts 2160 in base portion 2112. Trap contacts 2162 are electrically connected to their corresponding trap wires 2156 and are configured to create an electrical contact with base contacts 2160 (only one of which is shown) when trap portion 2114 is mounted to base portion 2112. In some embodiments, base portion 2112 includes a circuit board 2150, having a programmable processor or chip (not shown) for executing commands, electrically connected to conductive prongs 2122 (only one of which is shown), LEDs 2124 (only one of which is shown), and a plurality of electric base wires 2164, that correspond to, and are electrically connected to, base contacts 2160. Accordingly, actuator 2154, mounted on rear surface 2152 of divider 2134, may be electrically connected to circuit board 2150 when trap portion 2114 is mounted to base portion 2112. For clarity, however, not all of the electrical connections are shown. Circuit board 2150 may include electronic circuitry to receive ordinary household current from conductive prongs 2122 and provide power to illuminate LEDs 2124. Circuit board 2150 may include an energy stabilizer such as a full wave rectifier circuit or any other circuit that provides steady voltage to LEDs 2124, although it may also provide a varying voltage to LEDs 2124 to provide a flickering light which mimics movement that some insect species, including mosquitoes, may find attractive. For example, light flickering frequencies in the approximate range of 0.05 Hz (e.g., to mimic the breathing rate of large mammals) to 250 Hz (e.g., the highest flicker frequency to attract male houseflies), may be desirable and the lighting element may be configured to flicker within this range. Circuit board 2150 may provide power to LEDs 2124 to provide UV and/or visible and/or IR light, although it may be configured to provide power to only UV LEDs 2124 or to only visible light LEDs 2124 or to only IR LEDs 2124, or to provide variable power to produce combinations of flickering UV and/or visible and/or IR light. Circuit board 2150 may also be configured to power actuator 2154 mounted on rear surface 2152 of divider 2134 to emit an insect-attracting sound. In some embodiments, the transmitter or transceiver may emit recorded and/or generated insect sounds or vibrations to better attract insects such as mosquitoes, midges, moths and flies, and may include one or more of insect call, reply, courtship and copulatory songs. In some embodiments, the transmitter or transceiver may emit recorded and/or generated insect-attracting sounds or vibrations such as the heartbeat of a mammal. For example, the transmitter or transceiver may emit an insect-attracting sound or sounds having a frequency in the range of approximately 0.5 Hz (e.g., the heart rate of large mammals) to approximately 240 kHz (e.g., the highest frequency detectable by insects). In some embodiments, the frequency is in the range of approximately 5 Hz to 100 kHz. In some embodiments, the frequency is in the range of approximately 35 Hz to 50 Khz. It is desirable for such insect-attracting sound to be detectable by an insect within approximately a 2-meter distance from insect trap 2110. It is desirable for such insect-attracting sound to be undetectable by a human beyond approximately a 1-meter distance from insect trap 2110.

As shown, slot 2130 in top surface 2126 of base portion 2112 and rim or protrusions 2132 on top surface 2126 of base portion 2112 engage with trap portion 2114 to secure it in place during use, although any other form of attachment may be substituted that allows trap portion 2114 to be securely but removably mounted on base portion 2112.

In the operation of insect trap 2110, conductive prongs 2122 are inserted into a wall electrical socket. Circuit board 2150 provides power to LEDs 2124 and to actuator 2154. LEDs 2124 emit light, represented by arrows, which transmits through window 2128 in base portion 2112, through opening 2144 in rear housing 2140 of trap portion 2114, into the rear enclosure 2148, and directly onto inside surface 2142 of rear housing 2140 and rear surface 2152 of divider 2134. In some embodiments, light is not manipulated in base portion 2112 and is emitted directly into trap portion 2114. Inside surface 2142 of rear housing 2140 may include a concave shape and may be configured to reflect and disperse the UV and visible light from LEDs 2124 to distribute the light evenly onto rear surface 2152 of divider 2134, although the shape of inside surface 2142 of rear housing 2140 may have a convex shape or a saddle shape or a combination of shapes, or may also have ribs or other features (not shown) to more evenly distribute the light. Alternatively, an optical enhancer such as an anamorphic lens or any other lens or combination of lenses (not shown) configured to distribute the UV and visible light (e.g., evenly, according to specific patterns, at a focal point, etc.) onto rear surface 2152 of divider 2134, may be mounted to rear housing 2140 at or near opening 2144 or to base portion 2112 at or near opening 2166, and may replace or augment the role of inside surface 2142 of rear housing 2140. In some embodiments, the light from LEDs 2124 directly strikes rear surface 2152 of divider 2134 at an oblique angle (e.g., an acute angle from approximately 0° to 90°) and spreads across divider 2134, and may replace or augment the role of inside surface 2142 of rear housing 2140 or of the lens or lenses mounted to rear housing 2140 or to base portion 2112.

Thereafter, the light transmits through divider 2134 and adhesive 2136 on front surface 2138, and into front enclosure 2146. The light may be further evenly distributed by the light-diffusing properties of divider 2134, adhesive 2136 on front surface 2138, or both. A portion of the light entering front enclosure 2146 continues through opening 2120 in front housing 2118 and into the area where the trap is installed. Actuator 2154 produces insect-attracting vibrations, which are amplified by divider 2134, and transmit through front enclosure and out through opening 2120. Insects are attracted to the UV and/or visible light transmitted through adhesive 2136 and through opening 2120 in front housing 2118. Insects are also attracted to the insect-attracting vibrations produced by actuator 2154. Insects fly or crawl into opening 2120 and onto adhesive 2136, where they become trapped. A user may observe trapped insects by looking through opening 2120 in front housing 2118. In some embodiments, circuit board 2150 periodically sends electrical pulses to actuator 2154, causing divider 2134 to vibrate. The vibrations in divider 2134 in turn cause actuator 2154 to create electrical response signals such as changes of voltage, resistance or charge. When trapped insects 2170 become stuck in adhesive 2136, they change the vibration characteristics of divider 2134, and thereby change the electrical response signals from actuator 2154. Circuit board 2150 is configured such that when a sufficient number of trapped insects 2170 are stuck in adhesive 2136, circuit board 2150 responds to the change in electrical response signals exceeding a predetermined threshold from actuator 2154 and cause LEDs 2124 to blink on and off, indicating that trap portion 2114 may need to be replaced. Alternatively, other visual indicator features, such as a change in the color of the light (e.g., to yellow, orange or red) or an audible indicator feature such as a tone, chime or voice, may augment or replace the blinking light indicator feature. The user may easily remove and discard the entire used trap portion 2114 without touching trapped insects, insect debris or adhesive, which remain out of reach inside trap portion 2114, and replace it with a new trap portion 2114. The new trap portion 2114 has fresh adhesive-coated surfaces and light-directing surfaces, ensuring that insect trap 2110 will continue to efficiently and effectively attract and trap insects.

In some embodiments, because trap portion 2114 mounts on top of, and not in front of, base portion 2112, insect trap 2110 protrudes minimally from the wall when plugged into an ordinary household wall socket, and therefore intrudes minimally into the home environment. In some embodiments, insect trap 2110 is configured such that when insect trap 2110 is mounted to a wall, its overall depth, defined by the overall distance insect trap 2110 protrudes from the wall, is smaller than its overall height and its overall width.

It should be appreciated that a benefit of insect trap 2110 is the manipulation of light within trap portion 2114. In some embodiments, light manipulation occurs solely within trap portion 2114. Light manipulation may include reflection, refraction, polarization, dispersion and/or diffusion and is achieved by engaging with a manipulative element or surface (e.g., inside surface 2142, divider 2134 and adhesive 2136). In some embodiments, light manipulation produces an even distribution of light on adhesive 2136. In some embodiments, light is manipulated to produce a predetermined pattern on adhesive 2136 or within trap portion 2114, for example, an even distribution, an even distribution with hot spots of higher intensity, hot spot patterns, and/or combinations thereof.

Any suitable adhesive material may be used as part of an adhesive surface for trapping an insect. In some embodiments, pressure sensitive adhesives such as acrylics, butyl rubber, natural rubber, nitriles, silicones, styrene block copolymers, styrene-ethylene/propylene, styrene-isoprene-styrene, vinyl ethers may be used. Generally, the thickness of such adhesives will be in the range of approximately 0.01 mm to 1 mm. In some embodiments, the adhesive thickness is in the range of approximately 0.05 mm to 0.2 mm, with a thickness of approximately 0.1 mm being most often used.

Insect trap 2110 of this configuration may accommodate a variety of different trap portions 2114 that may be removably mounted to base portion 2112, each trap portion 2114 being uniquely configured to attract and trap a specific species or multiple species of flying or non-flying insect. For example, the overall size and shape of trap portion 2114, the size, shape, location and orientation of opening 2120 in front housing 2118 of trap portion 2114, the vibration-producing properties of actuator 2154, the natural frequency and sound amplifying properties of trap portion 2114 and the electrical response signals from actuator 2154 may be uniquely configured to attract and trap a specific species or multiple species of flying or non-flying insect. For example, in some embodiments, trap portion 2114 is approximately 20 mm to 600 mm wide, 20 mm to 600 mm high and 5 mm to 150 mm deep. In some embodiments, trap portion 2114 is approximately 20 mm to 200 mm wide, 20 mm to 200 mm high and 5 mm to 80 mm deep. In some embodiments, trap portion 2114 is approximately 20 mm to 130 mm wide, 20 mm to 130 mm high and 5 mm to 50 mm deep.

In some embodiments, base portion 2112 is approximately 20 mm to 600 mm wide, 10 mm to 150 mm high and 10 mm to 150 mm deep. In some embodiments, base portion 2112 is 20 mm to 200 mm wide, 10 mm to 100 mm high and 10 mm to 80 mm deep. In some embodiments, base portion 2112 is 20 mm to 130 mm wide, 10 mm to 50 mm high and 10 mm to 50 mm deep.

As provided herein, opening 2120 may be a variety of shapes and/or sizes. For example, opening 2120 may be circular, square, rectangular, polygonal and/or elliptical in shape. Alternatively, opening 2120 may be slot shaped having a straight, curved or undulating shape or pattern. When opening 2120 is circular, opening 2120 may be approximately 0.5 mm to 30 mm in diameter. In some embodiments, circular opening 2120 is approximately 0.5 mm to 20 mm in diameter. In some embodiments, circular opening 2120 is approximately 0.5 mm to 15 mm in diameter. When opening 2120 is slot shaped, opening 2120 may be approximately 2 mm to 30 mm wide and 5 mm to 500 mm long. In some embodiments, slot shaped opening 2120 is approximately 2 mm to 20 mm wide and 5 mm to 200 mm long. In some embodiments, slot shaped opening 2120 is approximately 2 mm to 15 mm wide and 5 mm to 100 mm long.

In some embodiments, opening 2120 covers all or a portion of front housing 2118. For example, opening 2120 may cover a range of approximately 1% to 75% of the surface area of front housing 2118. In some embodiments, opening 2120 covers approximately 5% to 50% of the surface area of front housing 2118. In some embodiments, opening 2120 covers approximately 10% to 30% of the surface area of front housing 2118.

Figure 56:
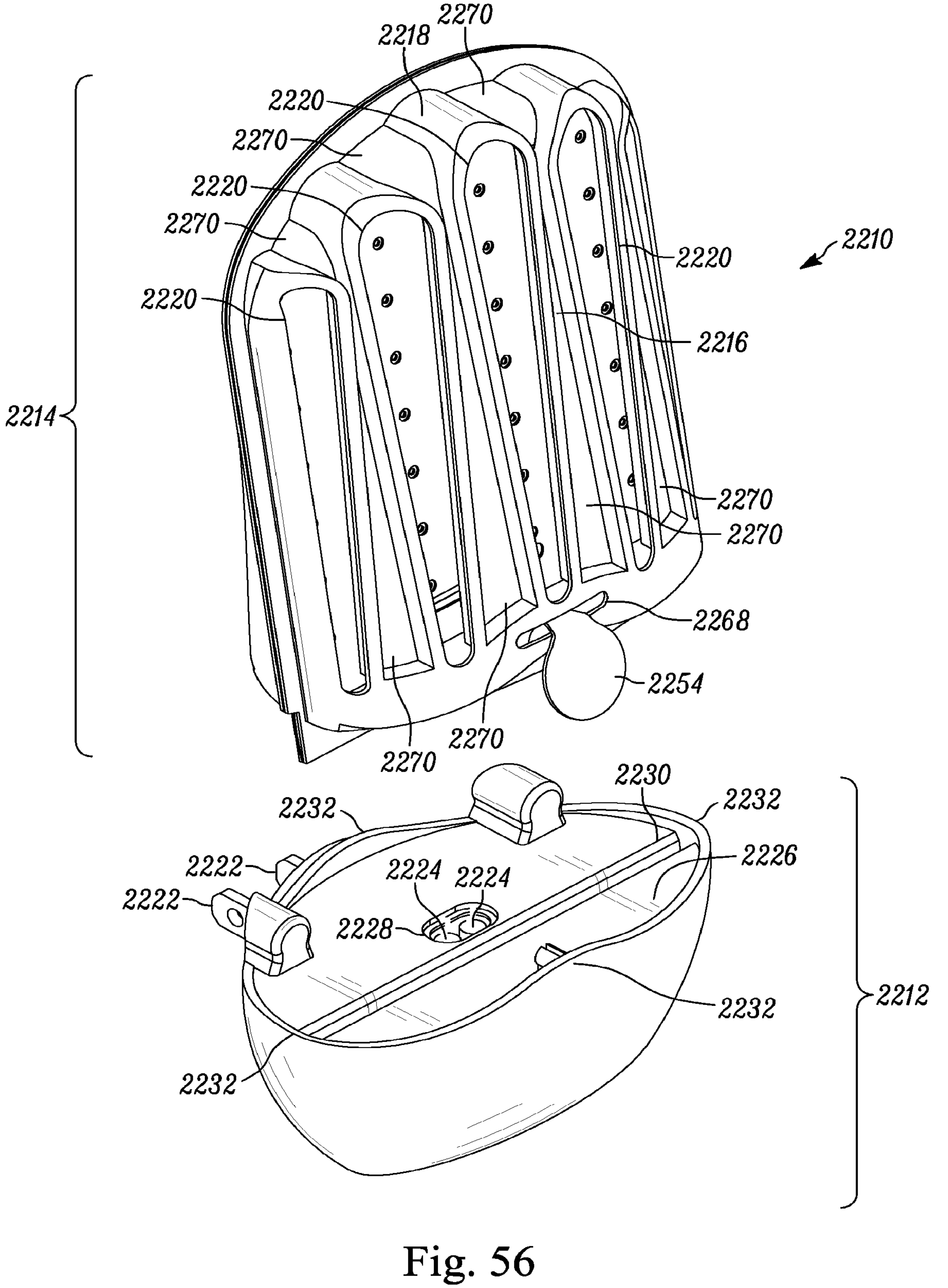
FIG. 56 is a front perspective view of a twenty-second embodiment of an insect trap in accordance with principles of the disclosure.

FIG. 56 is a front perspective view of a twenty-second embodiment of an insect trap, indicated generally at 2210. Insect trap 2210 includes a base portion 2212 and a removable trap portion 2214. Trap portion 2214 is shown removed from base portion 2212 in this view. Trap portion 2214 includes a front housing 2218 with a tab slot 2268 and at least one opening 2220 in a front surface 2216. Opening 2220 in front housing 2218 may be configured to admit a wide variety of insects into insect trap 2210, or alternatively it may be configured to admit one or more specific insect species.

In some embodiments, opening 2220 is configured to prevent user's fingers from penetrating opening 2220 and inadvertently touching dead insects or adhesive when removing and replacing trap portion 2214. In some embodiments, opening 2220 has a size and shape such that a sphere 25 mm in diameter cannot pass through opening 2220, and has a size and shape such that a sphere 1 mm in diameter can pass through any portion of opening 2220. Opening 2220 may be of uniform or of varying width, shape and orientation, and if trap portion 2214 has more than one opening 2220, they may be of identical or of differing widths, shapes and orientations. Opening 2220 may be configured to attract one or more individual insect species or a variety of insect species. In some embodiments, front housing 2218 is configured with ribs or reliefs 2270 surrounding opening 2220 to confer stiffness and strength to trap portion 2210 and to enable front housing 2218 to be made of thinner material. As shown, protruding from tab slot 2268 in front housing 2218 in trap portion 2214 is a removable tab 2254. Protruding from a rear surface 2278 (shown in FIG. 59) of base portion 2212 are a plurality of electrically conductive prongs 2222, adapted to mount insect trap 2210 to a wall and provide power to insect trap 2210 by inserting conductive prongs 2222 into a standard household electrical wall socket. Alternatively, base portion 2212 may be configured to sit or hang wherever desired and receive power from batteries (not shown) mounted in base portion 2212. While an electrical socket and batteries have been described as providing power to insect trap 2210, any suitable power source may be used. Base portion 2212 includes a top surface 2226 and a lighting element such as one or more LEDs 2224. In some embodiments, LEDs 2224 includes at least one that emits UV light and at least one that emits visible light. In some embodiments, LEDs 2224 includes at least one that emits UV light and at least one that emits blue light to better attract a wide variety of insect species. In some embodiments, the lighting element emits a combination of wavelengths to mimic sunlight. In some embodiments, LEDs 2224 include at least one that emits infrared (IR) light to better attract certain species of insects such as mosquitos and fleas. Mounted in top surface 2226 of base portion 2212 may be a transparent or translucent window 2228, shown partially cut away to reveal LEDs 2224. Window 2228 protects LEDs 2224 from dust and insect debris, and allows base portion 2212 to be easily cleaned. In some embodiments, at least a portion of window 2228 and at least a portion of LEDs 2224 protrude from top surface 2226 of base portion 2212 and into trap portion 2214 when trap portion 2214 is mounted to the base portion 2212. Alternatively, base portion 2212 may not include window 2228, and at least a portion of LEDs 2224 protrude from top surface 2226 of base portion 2212, and into trap portion 2214 when trap portion 2214 is mounted to base portion 2212. In top surface 2226 may be a slot 2230, and on the perimeter of top surface 2226 is a rim or upwardly directed protrusions 2232.

Figure 57:
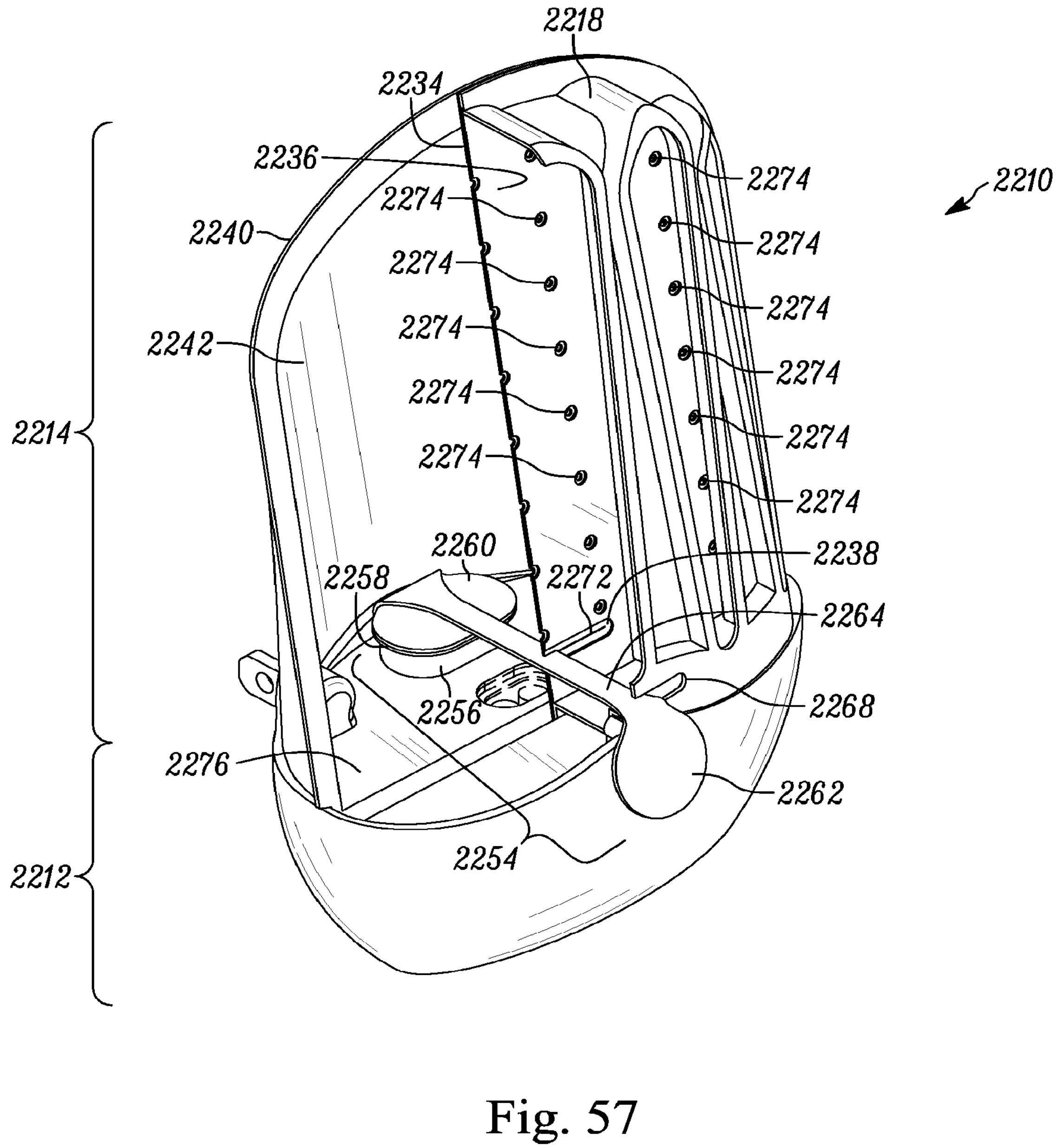
FIG. 57 is a front perspective view of the insect trap of FIG. 56.

FIG. 57 is a front perspective view of insect trap 2210. Trap portion 2214 is shown partially cut away in this view. In some embodiments, trap portion 2214 includes a divider 2234, constructed from or including a transparent or translucent material and coated with a transparent or translucent adhesive 2236 on its front surface 2238. In some embodiments, divider 2234 is configured to polarize light transmitted through it in an orientation similar to that of daylight to further attract flying insects, a wide variety of which are known to detect polarized light. In some embodiments, the material and thickness of divider 2234 and the material and thickness of adhesive 2236 are selected to transmit a substantial proportion of the UV and/or visible and/or IR light, for example greater than 60% of the light is transmitted through divider 2234 and adhesive 2236. Divider 2234 may include a divider slot 2272 and one or more perforations 2274. In some embodiments, the regions on front surface 2238 of divider 2234 immediately around divider slot 2272 and perforations 2274 are not coated with adhesive 2236. Trap portion 2214 includes a rear housing 2240 with an inside surface 2242 and a bottom inside surface 2276. As shown, an upwardly-facing cup 2256 is mounted on bottom inside surface 2276 of rear housing 2240. Cup 2256 may have a lip 2258 protruding from the perimeter of its open end. Cup 2256 may be constructed of any material or combination of materials that act as a barrier to any of the insect-attracting substances mentioned herein. Removable tab 2254 includes a sealing end 2260 and a web 2264 between sealing end 2260 and a grip end 2262, and may be made of any flexible and durable material or combination of materials that act as a barrier to any of the insect-attracting substances mentioned herein. As shown, sealing end 2260 is configured to cover the open end of cup 2256, and is affixed to lip 2258 of cup 2256 with an adhesive to create an airtight seal, thereby maintaining the freshness of any insect-attracting substances (not shown) inside cup 2256, as well as holding removable tab 2254 in place until it is removed by a user. Web 2264 may be folded over sealing end 2260 of removable tab 2254 and extends through divider slot 2272 in divider 2234 to tab slot 2268 in front housing 2218. Grip end 2262 of removable tab 2254 protrudes through tab slot 2268 and may be folded downwards over an outside portion of front housing 2218.

Figure 58:
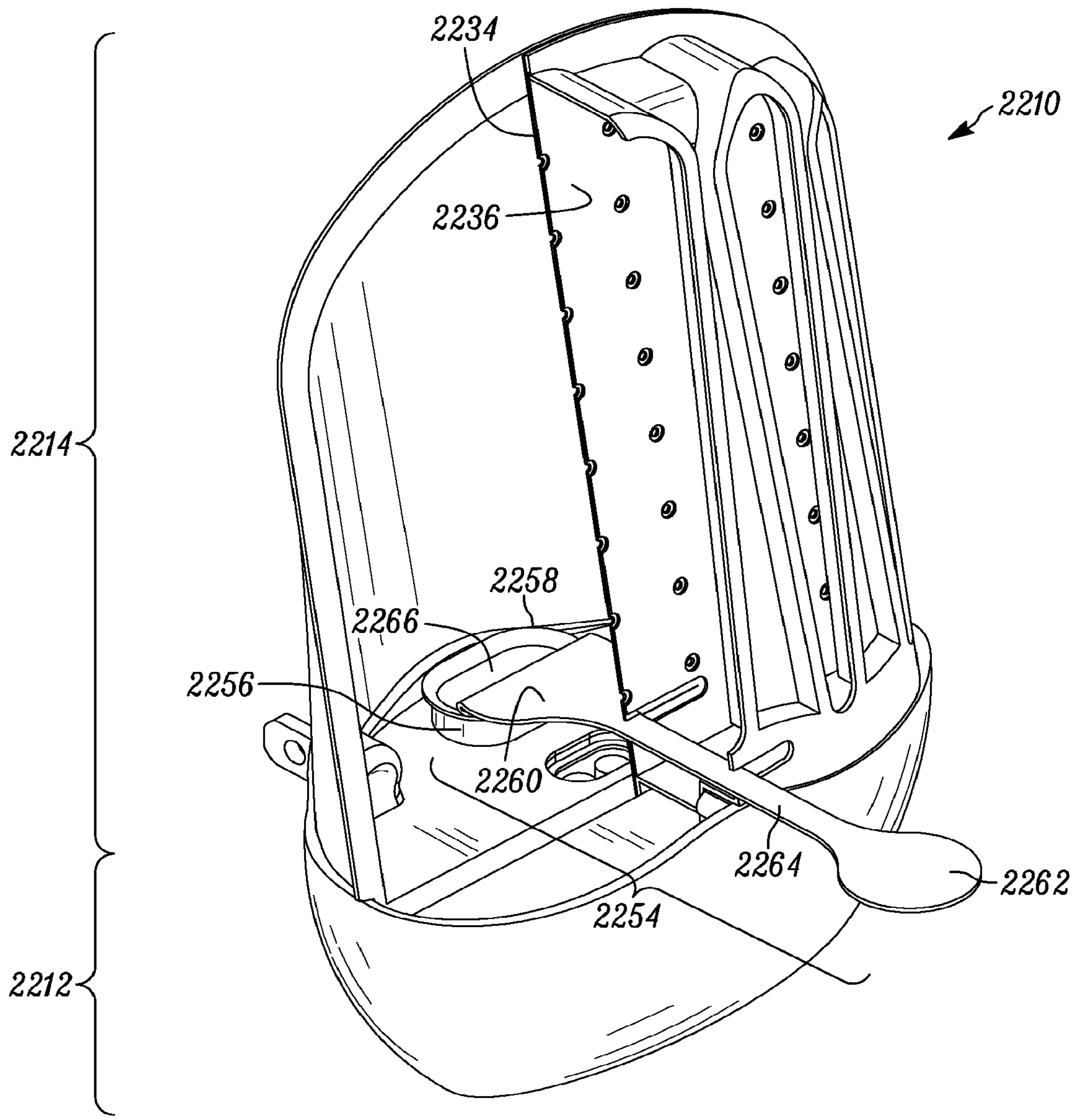
FIG. 58 is a front perspective view of the insect trap of FIG. 56.

FIG. 58 is a front perspective view of insect trap 2210. Trap portion 2214 is shown partially cut away and removable tab 2254 partially removed in this view. A user may grasp removable tab 2254 at grip end 2262 and may pull removable tab 2254 away from trap portion 2214, thereby breaking the seal between lip 2258 of cup 2256 and sealing end 2260 of removable tab 2254. Inside cup 2256 is a carrier material 2266 impregnated with one or more of insect-attracting substances. For example, carrier material 2266 may be impregnated with sorbitol, coleopteran attractants including brevicomin, dominicalure, frontalin, grandlure, ipsdienol, ipsenol, japonilure, lineatin, megatomoic acid, multistriatin, oryctalure, sulcatol, and trunc-call, dipteran attractants including ceralure, cue-lure, latilure, medlure, moguchun, muscalure, and trimedlure, homopteran attractants including rescalure, lepidopteran attractants such as disparlure, straight chain lepidopteran pheromones including codlelure, gossyplure, hexalure, litlure, looplure, orfralure, and ostramone, and other insect attractants such as eugenol, methyl eugenol, and siglure, or other substances to provide a scent that may further increase the insect-attracting efficiency of insect trap 2210. Breaking the seal between cup 2256 and removable tab 2254 releases the insect-attracting scent or scents from the carrier material 2266. The materials of trap portion 2214 (e.g., front housing 2218, rear housing 2240, divider 2234 and adhesive 2236) may also be impregnated with one or more insect attractants. It is desirable for such attractants to be detectable by an insect for approximately a 2-meter radius from insect trap 2210.

Figure 59:
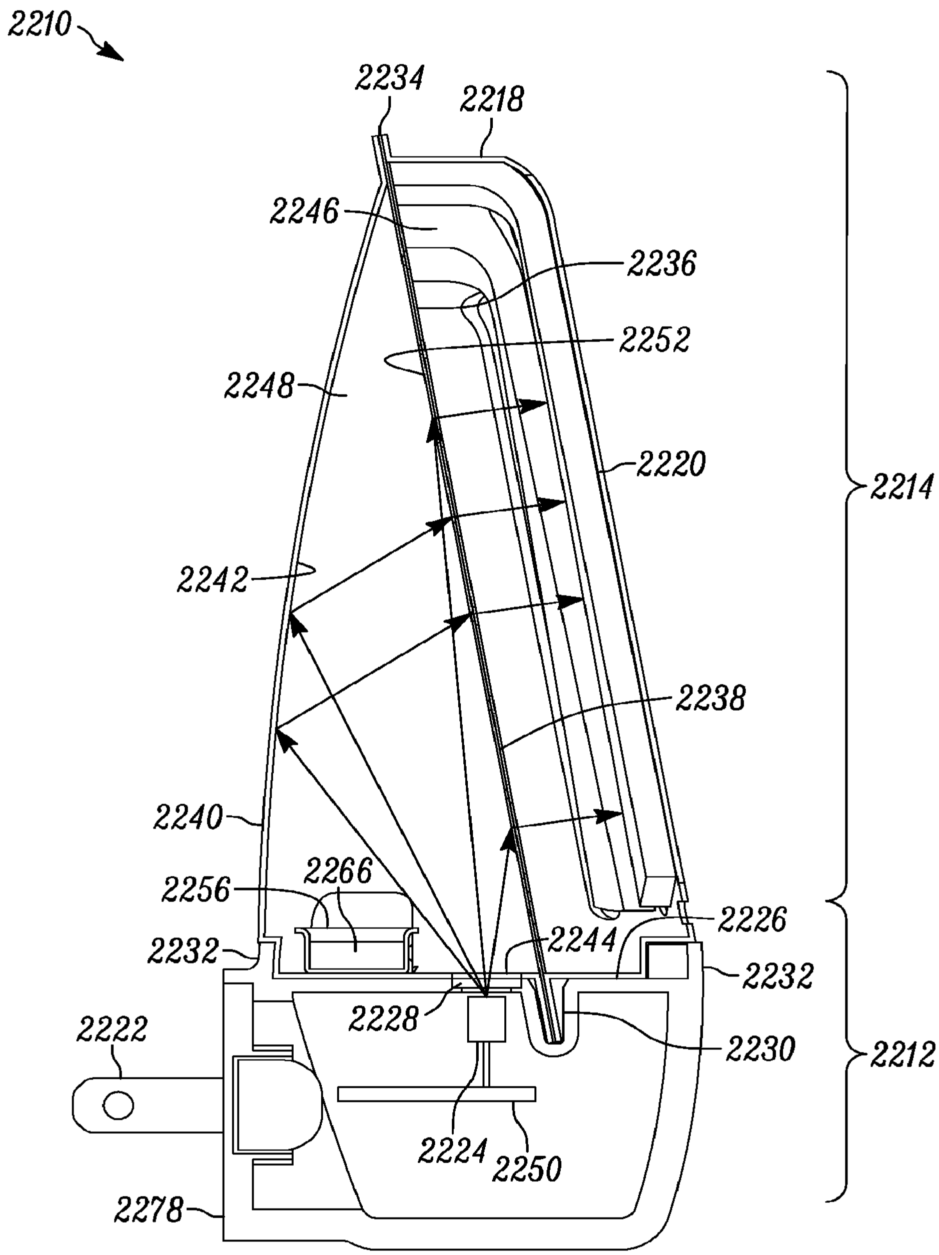
FIG. 59 is a cross-sectional view through the insect trap of FIG. 56.

FIG. 59 is a cross-sectional view through insect trap 2210. Removable tab 2254 has been completely removed in this view. In some embodiments, inside surface 2242 of rear housing 2240 has a reflective coating. Alternatively, the material and surface finish of rear housing 2240 may be configured to reflect and disperse UV and/or visible light without a reflective coating. Rear housing 2240 may include an opening 2244 in its bottom face, or alternatively opening 2244 may be replaced by a transparent or translucent window (not shown).

In some embodiments, front housing 2218 and rear housing 2240 are thermoformed from opaque sheet plastic, creating a clean and aesthetically pleasing shape while maintaining low cost and disposability. Alternatively, other opaque, transparent or translucent materials such as paper, paperboard, cardboard or paper pulp may be used. In some embodiments, front housing 2218 and rear housing 2240 are made by injection molding or by other suitable manufacturing techniques. As shown, divider 2234 has a rear surface 2252, and is substantially planar, and may be configured to be parallel to, or at an angle to, the primary direction (not shown) of the light produced by LEDs 2224. In some embodiments, divider 2234 may be formed into a convex, concave or saddle-shaped contour (not shown), or a combination of contours to optimize the even distribution of light. In some embodiments, divider 2234 may have ribs or other features (not shown) that increase adhesive surface area and create regions of light/dark contrast, which are highly visible to a wide variety of insects and may be more attractive to them.

In some embodiments, front housing 2218 is coated with transparent, translucent or opaque adhesive (not shown) on its inside surface to provide additional insect trapping efficiency and capacity. In addition, front housing 2218 may also have a reflective coating (not shown) underneath the adhesive coating on its inside surface to enhance its attraction to insects and further improve the insect trapping efficiency and effectiveness. In some embodiments, front housing 2218, divider 2234 and rear housing 2240 are joined together where they intersect or engage by ultrasonic welding or high frequency welding, although they may also be permanently or removably joined together by gluing or any other suitable assembly method. Divider 2234 separates trap portion 2214 into a front enclosure 2246 and a rear enclosure 2248.

In some embodiments, base portion 2212 includes a circuit board 2250 having a programmable processor or chip (not shown) for executing commands, electrically connected to conductive prongs 2222 (only one of which is shown) and LEDs 2224 (only one of which is shown). For clarity, not all of the electrical connections are shown. Circuit board 2250 may include electronic circuitry to receive ordinary household current from conductive prongs 2222 and provide power to illuminate LEDs 2224. Circuit board 2250 may include an energy stabilizer such as a full wave rectifier circuit or any other circuit that provides steady voltage to LEDs 2224, although it may also provide a varying voltage to LEDs 2224 to provide a flickering light that mimics movement that some insect species, including mosquitoes, may find attractive. For example, light flickering frequencies in the approximate range of 0.05 Hz (e.g., to mimic the breathing rate of large mammals) to 250 Hz (e.g., the highest flicker frequency to attract male houseflies), may be desirable and the lighting element may be configured to flicker within this range. Circuit board 2250 may provide power to LEDs 2224 to provide UV and/or visible and/or IR light, although it may be configured to provide power to only the UV LEDs 2224 or to only the visible light LEDs 2224 or to only the IR LEDs 2224, or to provide variable power to produce combinations of flickering UV and/or visible and/or IR light. Circuit board 2250 may also be configured to drive a transmitter or transceiver such as a piezoelectric speaker (not shown) or other device that may be mounted in base portion 2212 to emit an insect-attracting sound. In some embodiments, the transmitter or transceiver may emit recorded and/or generated insect sounds or vibrations to better attract insects such as mosquitoes, midges, moths and flies, and may include one or more of insect call, reply, courtship and copulatory songs.

In some embodiments, the transmitter or transceiver may emit recorded and/or generated insect-attracting sounds or vibrations such as the heartbeat of a mammal. For example, the transmitter or transceiver may emit an insect-attracting sound or sounds having a frequency in the range of approximately 0.5 Hz (e.g., the heart rate of large mammals) to approximately 240 kHz (e.g., the highest frequency detectable by insects). In some embodiments, the frequency is in the range of approximately 5 Hz to 100 kHz. In some embodiments, the frequency is in the range of approximately 35 Hz to 50 Khz. It is desirable for such insect-attracting sound to be detectable by an insect within approximately a 2-meter distance from insect trap 2210. It is desirable for such insect-attracting sound to be undetectable by a human beyond approximately a 1-meter distance from insect trap 2210.

As shown, slot 2230 in top surface 2226 of base portion 2212 and rim or protrusions 2232 on top surface 2226 of base portion 2212 engage with trap portion 2214 to secure it in place during use, although any other form of attachment may be substituted that may allow trap portion 2214 to be securely but removably mounted on base portion 2212.

In the operation of insect trap 2210, conductive prongs 2222 (only one of which is shown), are inserted into a wall electrical socket, and removable tab 2254 (not shown) is pulled from trap portion 2214 and removed, thereby breaking the seal between cup 2256 and removable tab 2254, and exposing carrier material 2266 and the insect-attracting substance or substances to the air and releasing an insect-attracting scent or scents through perforations 2274 (not shown in this view) in divider 2234, through opening 2220 in front housing 2218 and into the surrounding area where insect trap 2210 is installed. Cup 2256, carrier material 2266 and the insect-attracting substance or substances may be configured to release an insect-attracting scent or scents for a predetermined amount of time to correspond with the expected useful life of trap portion 2214, which may be e.g., a week, a month or three months, or another length of time. Alternatively, cup 2256, carrier material 2266 and the insect-attracting substance or substances may be configured to preferentially release one insect-attracting scent or group of scents earlier in the useful life of trap portion 2214 and another insect-attracting scent or group of scents later in the useful life of trap portion 2214 to attract more insects or a wider variety of insects with a changing scent, or to provide a stronger scent later in the useful life of trap portion 2214 to compensate for the reduced light emitted from trap portion 2214 when many insects are caught in adhesive 2236. Alternatively, cup 2256 and carrier material 2266 may be configured to release additional scents that may mask the insect-attracting scent or scents or mask or eliminate components of the insect-attracting scent or scents that humans may find objectionable, or that children or non-intended animals (e.g., pets) may find attractive, without substantially reducing their attractiveness to insects. LEDs 2224 emit light, represented by arrows, which transmits through window 2228 in base portion 2212, through opening 2244 in rear housing 2240 of trap portion 2214, into rear enclosure 2248, and directly onto inside surface 2242 of rear housing 2240 and rear surface 2252 of divider 2234. In some embodiments, light is not manipulated in base portion 2212 and is emitted directly into trap portion 2214. Inside surface 2242 of rear housing 2240 may include a concave shape and may be configured to reflect and disperse the UV and visible light from LEDs 2224 to distribute the light evenly onto rear surface 2252 of divider 2234, although inside surface 2242 of rear housing 2240 may have a convex shape or a saddle shape or a combination of shapes, or may also have ribs or other features (not shown) to more evenly distribute the light. Alternatively, an optical enhancer such as an anamorphic lens (not shown) or any other lens or combination of lenses configured to distribute the UV and visible light (e.g., evenly, according to specific patterns, at a focal point, etc.) onto rear surface 2252 of divider 2234, may be mounted to rear housing 2240 at or near opening 2244 or to base portion 2212 at or near window 2228, and may replace or augment the role of inside surface 2242 of rear housing 2240. Alternatively, the UV and visible light from the one or more LEDs 2224 may directly strike rear surface 2252 of divider 2234 at an oblique angle (e.g., an acute angle from approximately 0° to 90°) and may be spread across divider 2234, and may replace or augment the role of inside surface 2242 of rear housing 2240 or of the lens or lenses mounted to rear housing 2240.

Thereafter, the light transmits through divider 2234 and adhesive 2236 on its front surface 2238, and into front enclosure 2246. The light may be further evenly distributed by the light-diffusing properties of divider 2234, adhesive 2236, or both. A portion of the light entering front enclosure 2246 continues through opening 2220 in front housing 2218 and emits into the surrounding area where insect trap 2210 is installed. Insects are attracted to the light transmitted through adhesive 2236 and through opening 2220 in front housing 2218. Insects are also attracted to the scents and/or pheromones released from carrier material 2266 in cup 2256. In addition, heat generated by circuit board 2250 may warm carrier material 2266, and may thereby increase the release of insect-attracting scents and/or pheromones. Insects fly or crawl into opening 2220 and onto adhesive 2236, where they become trapped. A user may observe trapped insects by looking through opening 2220 in front housing 2218. When a sufficient number of insects have been trapped, the user may easily remove and discard the entire used trap portion 2214 without touching trapped insects, insect debris or adhesive, which remain out of reach inside trap portion 2214, and replace it with a new trap portion 2214. The new trap portion 2214 has fresh adhesive-coated surfaces and light-directing surfaces, ensuring that insect trap 2210 will continue to efficiently and effectively attract and trap insects.

In some embodiments, because trap portion 2214 mounts on top of, and not in front of, base portion 2212, insect trap 2210 protrudes minimally from the wall when plugged into an ordinary household wall socket, and therefore intrudes minimally into the home environment. In some embodiments, insect trap 2210 is configured such that when insect trap 2210 is mounted to a wall, its overall depth, defined by the overall distance insect trap 2210 protrudes from the wall, is smaller than its overall height and its overall width.

It should be appreciated that a benefit of insect trap 2210 is the manipulation of light within trap portion 2214. In some embodiments, light manipulation occurs solely within trap portion 2214. Light manipulation may include reflection, refraction, polarization, dispersion and/or diffusion and is achieved by engaging with a manipulative element or surface (e.g., inside surface 2242, divider 2234 and adhesive 2236). In some embodiments, light manipulation produces an even distribution of light on adhesive 2236. In some embodiments, light is manipulated to produce a predetermined pattern on adhesive 2236 or within trap portion 2214, for example, an even distribution, an even distribution with hot spots of higher intensity, hot spot patterns, and/or combinations thereof.

Any suitable adhesive material may be used as part of an adhesive surface for trapping an insect. In some embodiments, pressure sensitive adhesives such as acrylics, butyl rubber, natural rubber, nitriles, silicones, styrene block copolymers, styrene-ethylene/propylene, styrene-isoprene-styrene, vinyl ethers may be used. Generally, the thickness of such adhesives will be in the range of approximately 0.01 mm to 1 mm. In some embodiments, the adhesive thickness is in the range of approximately 0.05 mm to 0.2 mm, with a thickness of approximately 0.1 mm being most often used.

An insect trap 2210 of this configuration may accommodate a variety of different trap portions 2214 that may be removably mounted to base portion 2212, each trap portion 2214 being uniquely configured to attract and trap a specific species or multiple species of flying insect. For example, the overall size and shape of trap portion 2214, the size, shape, location and orientation of opening 2220 in front housing 2218, and the scent or scents impregnated in carrier material 2266, front housing 2218, divider 2234, adhesive 2236 or rear housing 2240, may be uniquely configured to attract and trap a specific species or multiple species of flying insect.

For example, in some embodiments, trap portion 2214 is approximately 20 mm to 600 mm wide, 20 mm to 600 mm high and 5 mm to 150 mm deep. In some embodiments, trap portion 2214 is approximately 20 mm to 200 mm wide, 20 mm to 200 mm high and 5 mm to 80 mm deep. In some embodiments, trap portion 2214 is approximately 20 mm to 130 mm wide, 20 mm to 130 mm high and 5 mm to 50 mm deep.

In some embodiments, base portion 2212 is approximately 20 mm to 600 mm wide, 10 mm to 150 mm high and 10 mm to 150 mm deep. In some embodiments, base portion 2212 is 20 mm to 200 mm wide, 10 mm to 100 mm high and 10 mm to 80 mm deep. In some embodiments, base portion 2212 is 20 mm to 130 mm wide, 10 mm to 50 mm high and 10 mm to 50 mm deep.

As provided herein, opening 2220 may be a variety of shapes and/or sizes. For example, opening 2220 may be circular, square, rectangular, polygonal and/or elliptical in shape. Alternatively, opening 2220 may be slot shaped having a straight, curved or undulating shape or pattern. When opening 2220 is circular, opening 2220 may be approximately 0.5 mm to 30 mm in diameter. In some embodiments, circular opening 2220 is approximately 0.5 mm to 20 mm in diameter. In some embodiments, circular opening 2220 is approximately 0.5 mm to 15 mm in diameter. When opening 2220 is slot shaped, opening 2220 may be approximately 2 mm to 30 mm wide and 5 mm to 500 mm long. In some embodiments, slot shaped opening 2220 is approximately 2 mm to 20 mm wide and 5 mm to 200 mm long. In some embodiments, slot shaped opening 2220 is approximately 2 mm to 15 mm wide and 5 mm to 100 mm long.

In some embodiments, opening 2220 covers all or a portion of front housing 2218. For example, opening 2220 may cover a range of approximately 1% to 75% of the surface area of front housing 2218. In some embodiments, opening 2220 covers 5 approximately 5% to 50% of the surface area of front housing 2218. In some embodiments, opening 2220 covers approximately 10% to 30% of the surface area of front housing 2218.

Figure 60:
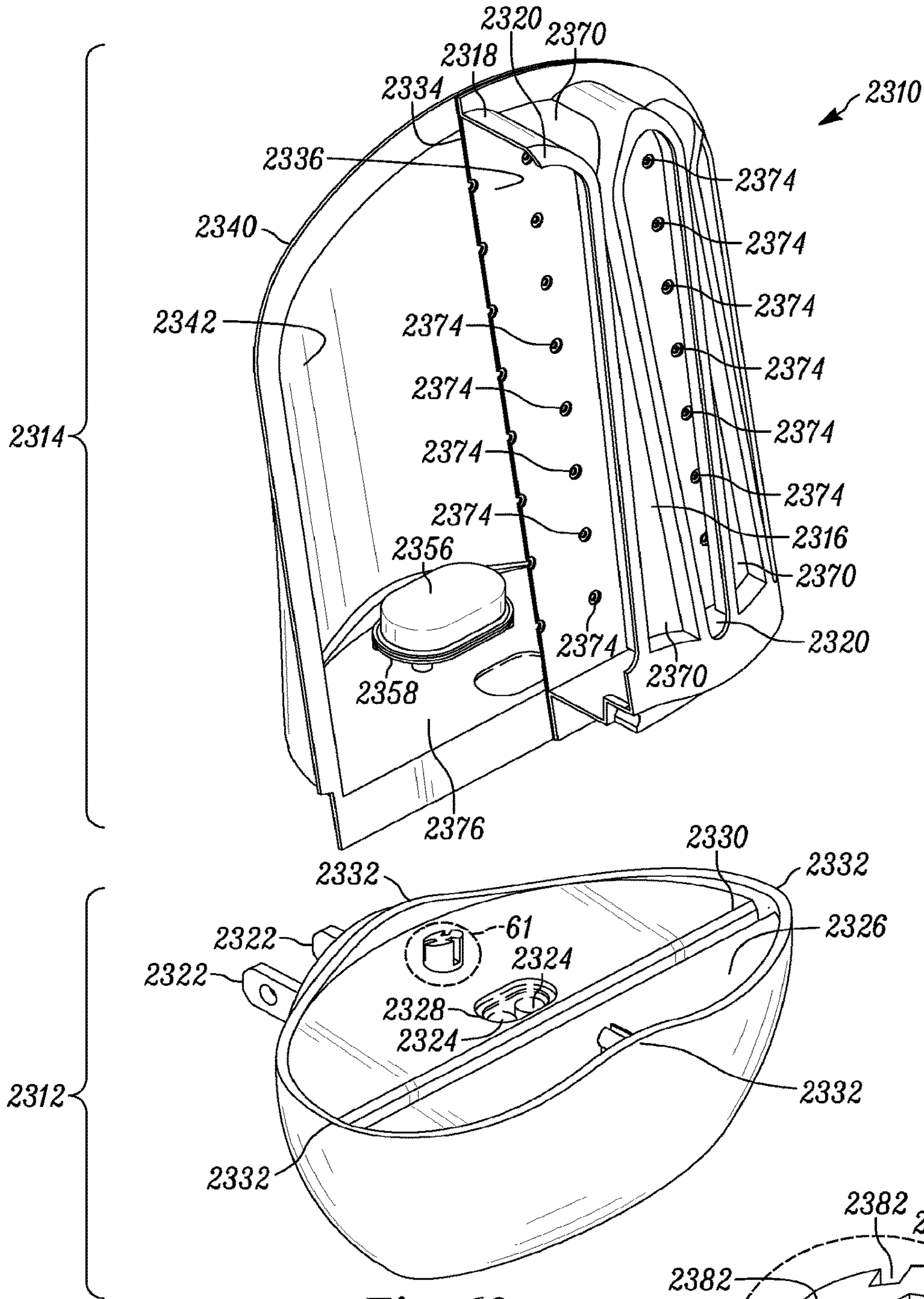
FIG. 60 is a front perspective view of a twenty-third embodiment of an insect trap in accordance with principles of the disclosure.
Figure 61:
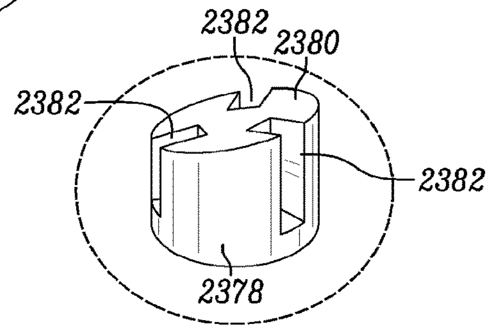
FIG. 61 is an enlarged view of a portion of FIG. 60.

FIG. 60 is a front perspective view of a twenty-third embodiment of an insect trap, indicated generally at 2310, and FIG. 61 is an enlarged view of a portion of FIG. 60. Insect trap 2310 includes a base portion 2312 and a removable trap portion 2314. Trap portion 2314 is shown partially cut away and removed from base portion 2312 in FIG. 60. Trap portion 2314 includes a front housing 2318 with at least one opening 2320 in a front surface 2316. Opening 2320 in front housing 2318 may be configured to admit a wide variety of insects into insect trap 2310, or alternatively it may be configured to admit one or more specific insect species. In some embodiments, opening 2320 is configured to prevent user's fingers from penetrating opening 2320 and inadvertently touching trapped insects or adhesive when removing and replacing trap portion 2314. In some embodiments, opening 2320 has a size and shape such that a sphere 25 mm in diameter cannot pass through opening 2320, and has a size and shape such that a sphere 1 mm in diameter can pass through any portion of opening 2320. Opening 2320 may be of uniform or of varying width, shape and orientation, and if trap portion 2314 has more than one opening 2320, they may be of identical or of differing widths, shapes and orientations. Opening 2320 may be configured to attract one or more individual insect species or a variety of insect species. In some embodiments, front housing 2318 is configured with ribs or reliefs 2370 surrounding opening 2320 to confer stiffness and strength to trap portion 2314 and to enable front housing 2318 to be made of thinner material. Trap portion 2314 includes a divider 2334, constructed from or including a transparent or translucent material and coated with a transparent or translucent adhesive 2336 on its front surface 2338 (shown in FIG. 62). In some embodiments, divider 2334 is configured to polarize light transmitted through it in an orientation similar to that of daylight to further attract flying insects, a wide variety of which are known to detect polarized light. In some embodiments, the material and thickness of divider 2334 and the material and thickness of adhesive 2336 are selected to transmit a substantial proportion of the light, for example greater than 60% of the light is transmitted through divider 2334 and adhesive 2236. Divider 2334 includes one or more perforations 2374. In some embodiments, the regions on front surface 2338 of divider 2334 immediately around perforations 2374 are not be coated with adhesive 2336. Trap portion 2314 includes a rear housing 2340 with an inside surface 2342 and a bottom inside surface 2376, and a downwardly-facing cup 2356. Cup 2356 may have a lip 2358 protruding from the perimeter of its open end, and may be made of any material or combination of materials that act as a barrier to any of the insect-attracting substances mentioned herein.

Protruding from a rear surface 2354 (shown in FIG. 62) of base portion 2312 may be a plurality of electrically conductive prongs 2322, adapted to mount insect trap 2310 to a wall and provide power to insect trap 2310 by inserting conductive prongs 2322 into a standard household electrical wall socket. Alternatively, base portion 2312 may be configured to sit or hang wherever desired and receive power from batteries (not shown) mounted in base portion 2312. While an electrical socket and batteries have been described as providing power to insect trap 2310, any suitable power source may be used. Base portion 2312 includes a top surface 2326 and a lighting element such as one or more LEDs 2324. In some embodiments, LEDs 2324 include at least one that emits UV light and at least one that emits visible light. In some embodiments, LEDs 2324 includes at least one that emits UV light and at least one that emits blue light to better attract a wide variety of insect species. In some embodiments, the lighting element emits a combination of wavelengths to mimic sunlight. In some embodiments, LEDs 2324 include at least one that emits IR light to better attract certain species of insects including mosquitos and fleas. Mounted in top surface 2326 of base portion 2312 may be a transparent or translucent window 2328, shown partially cut away to reveal LEDs 2324. Window 2328 protects LEDs 2324 from dust and insect debris, and allows base portion 2312 to be easily cleaned. In some embodiments, at least a portion of window 2328 and at least a portion of LEDs 2324 protrude from top surface 2326 of base portion 2312 and into trap portion 2314 when trap portion 2314 is mounted to base portion 2312. Alternatively, base portion 2312 may not include window 2328, and at least a portion of LEDs 2324 protrude from top surface 2326 of base portion 2312 and into trap portion 2314 when trap portion 2314 is mounted to the base portion 2312. In top surface 2326 may be a slot 2330, and on the perimeter of top surface 2326 is a rim or upwardly directed protrusions 2332. As shown, protruding from top surface 2326 of base portion 2312 is a punch 2378 with an angled top surface 2380 and one or more axial grooves 2382 that extend through angled top surface 2380, but do not extend to the bottom of punch 2378. Angled top surface 2380 of punch 2378 forms a point at the distal end of punch 2378. In some embodiments, the sides of punch 2378 are tapered such that punch 2378 has a larger cross section at its proximal end than at its distal end.

Figure 62:
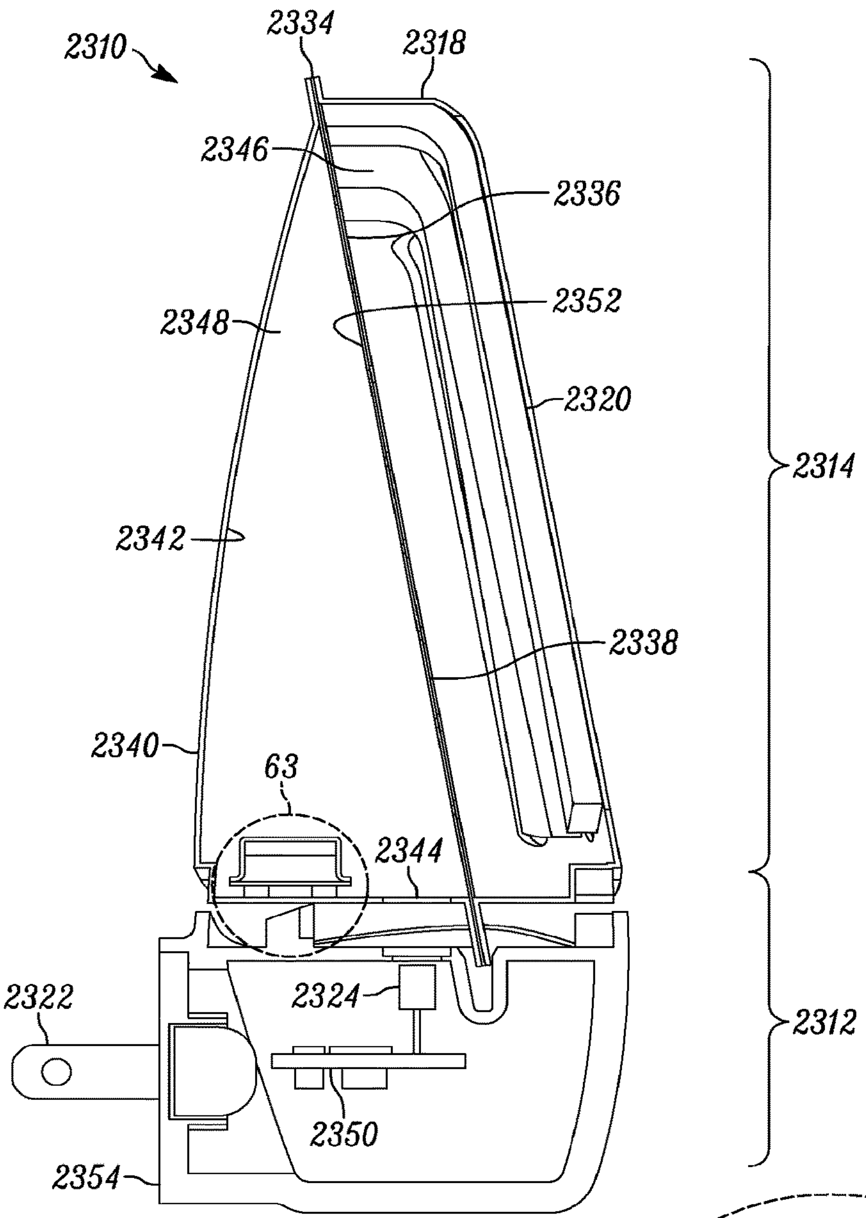
FIG. 62 is a cross-sectional view through the insect trap of FIG. 60.
Figure 63:
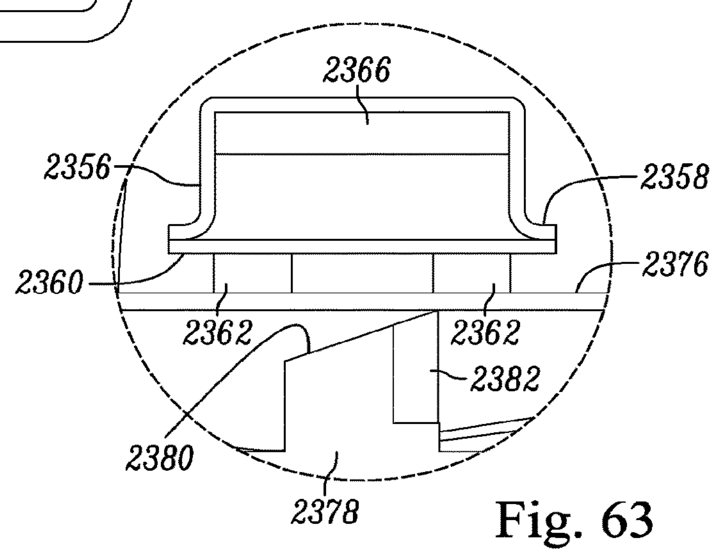
FIG. 63 is an enlarged view of a portion of FIG. 62.

FIG. 62 is a cross-sectional view through insect trap 2310 and FIG. 63 is an enlarged view of a portion of FIG. 62. Trap portion 2314 is raised above base portion 2312 in this view. A lid 2360 configured to cover the open end and lip 2358 of cup 2356, is affixed to lip 2358 of cup 2356 with an adhesive to create an airtight seal, thereby maintaining the freshness of any substances (not shown) inside sealed cup 2356. Lid 2360 may be made of a thin, durable, but puncturable material or combination of materials that may act as a barrier to any of the insect-attracting substances mentioned herein. Cup 2356 is mounted on at least one support post 2362, configured to mount cup 2356 and lid 2360 above bottom inside surface 2376 of rear housing 2340. In some embodiments, support post 2362 is replaced by at least one protrusion (not shown) in bottom inside surface 2376 of rear housing 2340. Inside cup 2356 is a carrier material 2366 impregnated with one or more insect-attracting substances. For example, carrier material 2366 may be impregnated with sorbitol, coleopteran attractants including brevicomin, dominicalure, frontalin, grandlure, ipsdienol, ipsenol, japonilure, lineatin, megatomoic acid, multistriatin, oryctalure, sulcatol, and trunc-call, dipteran attractants including ceralure, cue-lure, latilure, medlure, moguchun, muscalure, and trimedlure, homopteran attractants including rescalure, lepidopteran attractants such as disparlure, straight chain lepidopteran pheromones including codlelure, gossyplure, hexalure, litlure, looplure, orfralure, and ostramone, and other insect attractants such as eugenol, methyl eugenol, and siglure, or other substances to provide a scent that may further increase the insect-attracting efficiency of insect trap 2310. The materials of trap portion 2314 (e.g., front housing 2318, rear housing 2340, divider 2334 and adhesive 2336) may also be impregnated with one or more insect attractants. It is desirable for such attractants to be detectable by an insect for approximately a 2-meter radius from insect trap 2310.

In some embodiments, inside surface 2342 of rear housing 2340 has a reflective coating. Alternatively, the material and surface finish of rear housing 2340 may be configured to reflect and disperse UV and/or visible light without a reflective coating. Rear housing 2340 may include an opening 2344 on its bottom face, or alternatively opening 2344 may be replaced by a transparent or translucent window (not shown). In some embodiments, front housing 2318 and rear housing 2340 are thermoformed from sheet plastic, creating a clean and aesthetically pleasing shape while maintaining low cost and disposability. Alternatively, other opaque, transparent or translucent materials such as paper, paperboard, cardboard or paper pulp may be used. In some embodiments, front housing 2318 and rear housing 2340 are made by injection molding or by other suitable manufacturing techniques. As shown, divider 2334 has a rear surface 2352, and is substantially planar, and may be configured to be parallel to, or at an angle to, the primary direction (not shown) of the light produced by LEDs 2324. In some embodiments, divider 2334 is formed into a convex, concave or saddle-shaped contour (not shown), or a combination of contours to optimize the even distribution of light. In some embodiments, divider 2334 has ribs or other features (not shown) that increase adhesive surface area and create regions of light/dark contrast, which are highly visible to a wide variety of insects and may be more attractive to them.

In some embodiments, front housing 2318 is coated with transparent, translucent or opaque adhesive (not shown) on its inside surface to provide additional insect trapping efficiency and capacity. In addition, front housing 2318 may also have a reflective coating (not shown) underneath the adhesive coating on its inside surface to enhance its attraction to insects and further improve the insect trapping efficiency and effectiveness. In some embodiments, front housing 2318, divider 2334 and rear housing 2340 are joined together where they intersect or engage by ultrasonic welding or high frequency (HF) welding, although they may also be permanently or removably joined together by gluing or any other suitable assembly method. Divider 2334 separates trap portion 2314 into a front enclosure 2346 and a rear enclosure 2348.

In some embodiments, base portion 2312 includes a circuit board 2350 having a programmable processor or chip (not shown) for executing commands, electrically connected to conductive prongs 2322 (only one of which is shown) and LEDs 2324 (only one of which is shown). For clarity, not all of the electrical connections are shown. Circuit board 2350 may include electronic circuitry to receive ordinary household current from conductive prongs 2322 and provide power to illuminate LEDs 2324. Circuit board 2350 may include an energy stabilizer such as a full wave rectifier circuit or any other circuit that provides steady voltage to LEDs 2324, although it may also provide a varying voltage to LEDs 2324 to provide a flickering light, which mimics movement that some insect species, including mosquitoes, may find attractive. For example, light flickering frequencies in the approximate range of 0.05 Hz (e.g., to mimic the breathing rate of large mammals) to 250 Hz (e.g., the highest flicker frequency to attract male houseflies), may be desirable and the lighting element may be configured to flicker within this range. Circuit board 2350 may provide power to LEDs 2324 to provide UV and/or visible and/or IR light, although it may be configured to provide power to only UV LEDs 2324 or to only visible light LEDs 2324 or to only IR LEDs 2324, or to provide variable power to produce combinations of flickering UV and/or visible and/or IR light. Circuit board 2350 may also be configured to drive a transmitter or transceiver such as a piezoelectric speaker (not shown) or other device that may be mounted in base portion 2312 to emit an insect-attracting sound. In some embodiments, the transmitter or transceiver may emit recorded and/or generated insect sounds or vibrations to better attract insects such as mosquitoes, midges, moths and flies, and may include one or more of insect call, reply, courtship and copulatory songs. In some embodiments, the transmitter or transceiver may emit recorded and/or generated insect-attracting sounds or vibrations such as the heartbeat of a mammal. For example, the transmitter or transceiver may emit an insect-attracting sound or sounds having a frequency in the range of approximately 0.5 Hz (e.g., the heart rate of large mammals) to approximately 240 kHz (e.g., the highest frequency detectable by insects). In some embodiments, the frequency is in the range of approximately 5 Hz to 100 kHz. In some embodiments, the frequency is in the range of approximately 35 Hz to 50 Khz. It is desirable for such insect-attracting sound to be detectable by an insect within approximately a 2-meter distance from insect trap 2310. It is desirable for such insect-attracting sound to be undetectable by a human beyond approximately a 1-meter distance from insect trap 2310.

Figure 64:
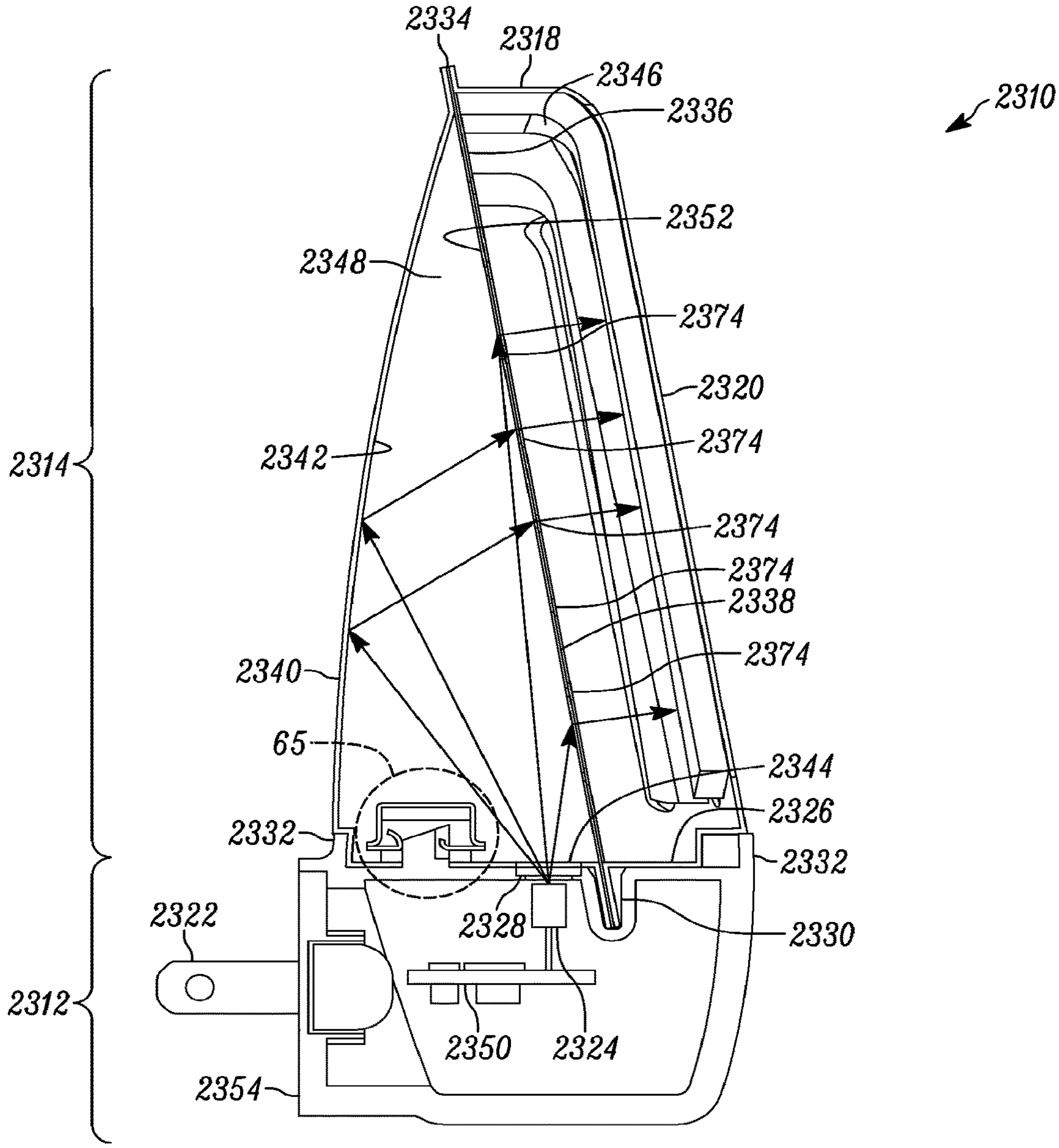
FIG. 64 is a cross-sectional view through the insect trap of FIG. 60.
Figure 65:
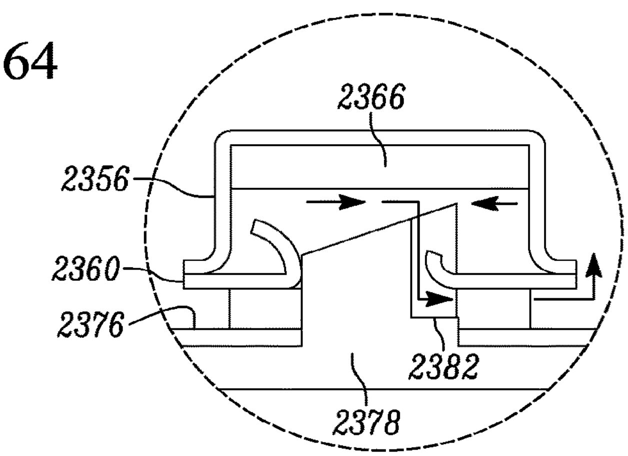
FIG. 65 is an enlarged view of a portion of FIG. 64.

FIG. 64 is a cross-sectional view through insect trap 2310 and FIG. 65 is an enlarged view of a portion of FIG. 64. Trap portion 2314 is shown mounted to base portion 2312 in this view. As shown, slot 2330 in top surface 2326 of base portion 2312 and rim or protrusions 2332 on top surface 2326 of base portion 2312 engage with trap portion 2314 to secure it in place during use, although any other form of attachment may be substituted that may allow trap portion 2314 to be securely but removably mounted on base portion 2312. Mounting trap portion 2314 to base portion 2312 causes the pointed distal end of punch 2378 to break through the bottom surface of rear housing 2340 and lid 2360. The portion or portions of lid 2360 corresponding to axial grooves 2382 in punch 2378 deform to create clearance between lid 2360 and punch 2378 and release the insect-attracting scent or scents through axial grooves 2382, into rear enclosure 2348 of trap portion 2314, shown by arrows, and on through perforations 2374 in divider 2334 and opening 2320 in front housing 2318, and on into the surrounding area where insect trap 2310 is installed. Because axial grooves 2382 do not extend to the proximal end of punch 2378, punch 2378 itself plugs the opening in the bottom of rear housing 2340 where punch 2378 has broken through, thereby ensuring that the insect-attracting scent or scents are released only through the one or more perforations 2374 in divider 2334.

In the operation of insect trap 2310, conductive prongs 2322 (only one of which is shown) are inserted into a wall electrical socket, and trap portion 2314 is mounted to base portion 2312, thereby breaking the sealed lid 2360 and releasing an insect-attracting scent or scents through perforations 2374 in divider 2334 and through opening 2320 in front housing 2318 and into the surrounding area where insect trap 2310 is installed. Cup 2356, carrier material 2366 and the insect-attracting substance or substances may be configured to release an insect-attracting scent or scents for a predetermined amount of time to correspond with the expected useful life of trap portion 2314, which may be e.g., a week, a month or three months, or another length of time. Alternatively, cup 2356, carrier material 2366 and the insect-attracting substance or substances may be configured to preferentially release one insect-attracting scent or group of scents earlier in the useful life of trap portion 2314 and another insect-attracting scent or group of scents later in the useful life of trap portion 2314 to attract more insects or a wider variety of insects with a changing scent, or to provide a stronger scent later in the useful life of trap portion 2314 to compensate for the reduced light emitted from trap portion 2314 when many insects are caught in adhesive 2336. Alternatively, cup 2356 and carrier material 2366 may be configured to release additional scents that may mask the insect-attracting scent or scents or mask or eliminate components of the insect-attracting scent or scents that humans may find objectionable, or that children or non-intended animals (e.g., pets) may find attractive, without substantially reducing its attractiveness to insects. LEDs 2324 emit light, represented by arrows, which transmits through window 2328 in base portion 2312, through opening 2344 in rear housing 2340 of trap portion 2314, into rear enclosure 2348 and directly onto inside surface 2342 of rear housing 2340 and rear surface 2352 of divider 2334. In some embodiments, light is not manipulated in base portion 2312 and is emitted directly into trap portion 2314. Inside surface 2342 of rear housing 2340 may include a concave shape and may be configured to reflect and disperse the UV and visible light from LEDs 2324 to distribute the light evenly onto rear surface 2352 of divider 2334, although the shape of inside surface 2342 of rear housing 2340 may have a convex shape or a saddle shape or a combination of shapes, or may also have ribs or other features (not shown) to more evenly distribute the light. Alternatively, an optical enhancer such as an anamorphic lens (not shown) or any other lens or combination of lenses configured to distribute the UV and visible light (e.g., evenly, according to specific patterns, at a focal point, etc.) onto rear surface 2352 of divider 2334, may be mounted to rear housing 2340 at or near opening 2344 or to base portion 2312 at or near window 2328, and may replace or augment the role of inside surface 2342 of rear housing 2340. Alternatively, the light from LEDs 2324 may directly strike rear surface 2352 of divider 2334 at an oblique angle (e.g., an acute angle from approximately 0° to 90°) and may be spread across divider 2334, and may replace or augment the role of inside surface 2342 of rear housing 2340 or of the lens or lenses mounted to rear housing 2340.

Thereafter, the light is transmitted through divider 2334 and adhesive 2336 on front surface 2338, and into front enclosure 2346. The light may be further evenly distributed by the light-diffusing properties of divider 2334, adhesive 2336, or both. A portion of the light entering front enclosure 2346 continues through opening 2320 in front housing 2318 and into the surrounding area where insect trap 2310 is installed. Insects are attracted to the light transmitted through adhesive 2336 and through opening 2320 in front housing 2318. Insects are also attracted to the scents and/or pheromones released from carrier material 2366 in cup 2356. In addition, heat generated by circuit board 2350 may warm carrier material 2366, and may thereby increase the release of insect-attracting scents and/or pheromones. Insects fly or crawl into opening 2320 and onto adhesive 2336, where they become trapped. A user may observe trapped insects by looking through opening 2320 in front housing 2318. When a sufficient number of insects have been trapped, the user may easily remove and discard the entire used trap portion 2314 without touching trapped insects, insect debris or adhesive, which remain out of reach inside trap portion 2314, and replace it with a new trap portion 2314. The new trap portion 2314 has fresh adhesive-coated surfaces and light-directing surfaces, ensuring that insect trap 2310 will continue to efficiently and effectively attract and trap insects.

In some embodiments, because trap portion 2314 mounts on top of, and not in front of, base portion 2312, insect trap 2310 protrudes minimally from the wall when plugged into an ordinary household wall socket, and therefore intrudes minimally into the home environment. In some embodiments, insect trap 2310 is configured such that when insect trap 2310 is mounted to a wall, its overall depth, defined by the overall distance insect trap 2310 protrudes from the wall, is smaller than its overall height and its overall width.

It should be appreciated that a benefit of insect trap 2310 is the manipulation of light within trap portion 2314. In some embodiments, light manipulation occurs solely within trap portion 2314. Light manipulation may include reflection, refraction, polarization, dispersion and/or diffusion and is achieved by engaging with a manipulative element or surface (e.g., inside surface 2342, divider 2334 and adhesive 2336). In some embodiments, light manipulation produces an even distribution of light on adhesive 2336. In some embodiments, light is manipulated to produce a predetermined pattern on adhesive 2336 or within trap portion 2314, for example, an even distribution, an even distribution with hot spots of higher intensity, hot spot patterns, and/or combinations thereof.

Any suitable adhesive material may be used as part of an adhesive surface for trapping an insect. In some embodiments, pressure sensitive adhesives such as acrylics, butyl rubber, natural rubber, nitriles, silicones, styrene block copolymers, styrene-ethylene/propylene, styrene-isoprene-styrene, vinyl ethers may be used. Generally, the thickness of such adhesives will be in the range of approximately 0.01 mm to 1 mm. In some embodiments, the adhesive thickness is in the range of approximately 0.05 mm to 0.2 mm, with a thickness of approximately 0.1 mm being most often used.

An insect trap 2310 of this configuration may accommodate a variety of different trap portions 2314 that may be removably mounted to base portion 2312, each trap portion 2314 being uniquely configured to attract and trap a specific species or multiple species of flying insect. For example, the overall size and shape of trap portion 2314, the size, shape, location and orientation of opening 2320 in front housing 2318 of trap portion 2314, and the scent or scents impregnated in carrier material 2366, front housing 2318, divider 2334, adhesive 2336 or rear housing 2340, may be uniquely configured to attract and trap a specific species or multiple species of flying insect.

For example, in some embodiments, trap portion 2314 is approximately 20 mm to 600 mm wide, 20 mm to 600 mm high and 5 mm to 150 mm deep. In some embodiments, trap portion 2314 is approximately 20 mm to 200 mm wide, 20 mm to 200 mm high and 5 mm to 80 mm deep. In some embodiments, trap portion 2314 is approximately 20 mm to 130 mm wide, 20 mm to 130 mm high and 5 mm to 50 mm deep.

In some embodiments, base portion 2312 is approximately 20 mm to 600 mm wide, 10 mm to 150 mm high and 10 mm to 150 mm deep. In some embodiments, base portion 2312 is 20 mm to 200 mm wide, 10 mm to 100 mm high and 10 mm to 80 mm deep. In some embodiments, base portion 2312 is 20 mm to 130 mm wide, 10 mm to 50 mm high and 10 mm to 50 mm deep.

As provided herein, opening 2320 may be a variety of shapes and/or sizes. For example, opening 2320 may be circular, square, rectangular, polygonal and/or elliptical in shape. Alternatively, opening 2320 may be slot shaped having a straight, curved or undulating shape or pattern. When opening 2320 is circular, opening 2320 may be approximately 0.5 mm to 30 mm in diameter. In some embodiments, circular opening 2320 is approximately 0.5 mm to 20 mm in diameter. In some embodiments, circular opening 2320 is approximately 0.5 mm to 15 mm in diameter. When opening 2320 is slot shaped, opening 2320 may be approximately 2 mm to 30 mm wide and 5 mm to 500 mm long. In some embodiments, slot shaped opening 2320 is approximately 2 mm to 20 mm wide and 5 mm to 200 mm long. In some embodiments, slot shaped opening 2320 is approximately 2 mm to 15 mm wide and 5 mm to 100 mm long.

In some embodiments, opening 2320 covers all or a portion of front housing 2318. For example, opening 2320 may cover a range of approximately 1% to 75% of the surface area of front housing 2318. In some embodiments, opening 2320 covers approximately 5% to 50% of the surface area of front housing 2318. In some embodiments, opening 2320 covers approximately 10% to 30% of the surface area of front housing 2318.

Figure 66:
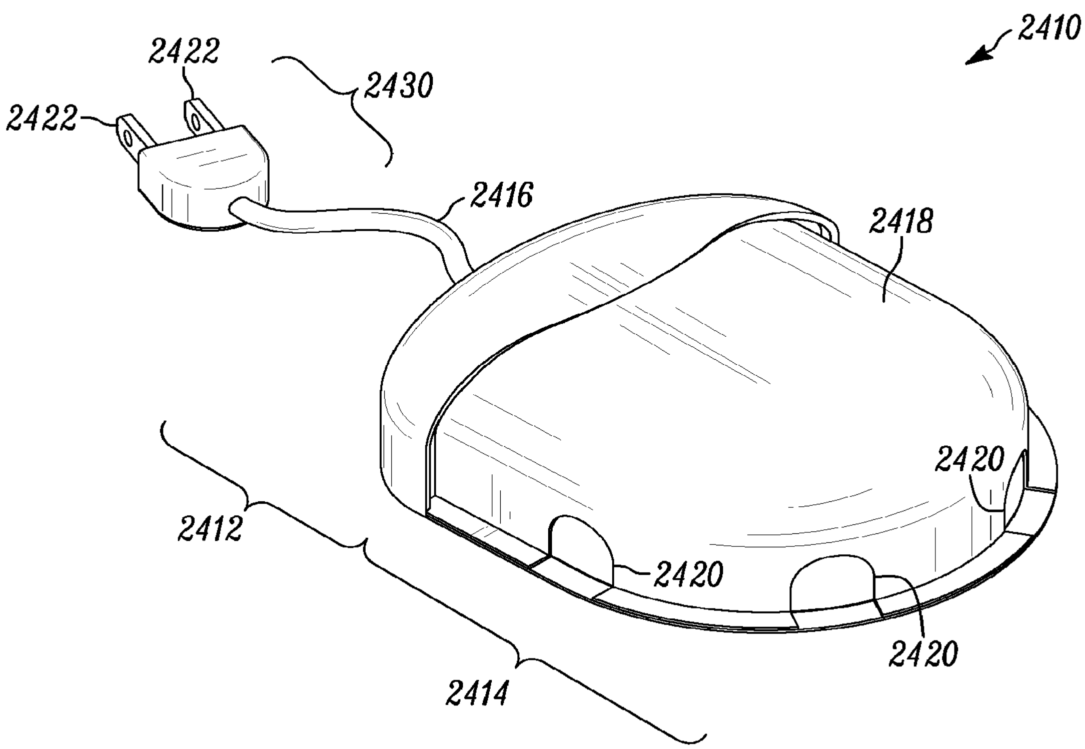
FIG. 66 is a front perspective view of a twenty-fourth embodiment of an insect trap in accordance with principles of the disclosure.

It should be appreciated that the principles described in this disclosure for attracting and trapping indoor flying insect pests are also beneficial for attracting and trapping indoor crawling and jumping arthropod pests. For example, while mosquitoes and flies have been described as being attracted to the disclosed insect traps, crawling or wingless insects such as cockroaches and crawling arthropod pests such as spiders may also be attracted by and trapped by the disclosed insect traps. FIG. 66 is a front perspective view of a twenty-fourth embodiment of an insect trap, indicated generally at 2410. Insect trap 2410 may include a base portion 2412, a removable trap portion 2414, an electrical cord 2416 and an electrical plug 2430 with a plurality of electrically conductive prongs 2422, adapted to provide power to insect trap 2410 by inserting conductive prongs 2422 into a standard household electrical wall socket. Alternatively, base portion 2412 may be configured to receive power from batteries (not shown) mounted in base portion 2412. While an electrical socket and batteries have been described as providing power to insect trap 2410, any suitable power source may be used. As shown, insect trap 2410 is configured to sit on the floor when in use and attract and trap crawling and hopping insects and other arthropod pests. Trap portion 2414 includes a housing 2418 with at least one opening 2420 on its perimeter. Opening 2420 may be configured to admit a wide variety of insects into insect trap 2410, or alternatively it may be configured to admit one or more specific insect species. In some embodiments, opening 2420 is configured to prevent the user's fingers from penetrating opening 2420 and inadvertently touching trapped insects or adhesive when removing and replacing trap portion 2414. In some embodiments, opening 2420 has a size and shape such that a sphere 25 mm in diameter cannot pass through opening 2420, and has a size and shape such that a sphere 1 mm in diameter can pass through any portion of opening 2420. Opening 2420 may be of uniform or of varying width, shape and orientation, and if trap portion 2414 has more than one opening 2420, they may be of identical or of differing widths, shapes and orientations. Opening 2420 may be configured to attract one or more individual insect species or a variety of insect species.

Figure 67:
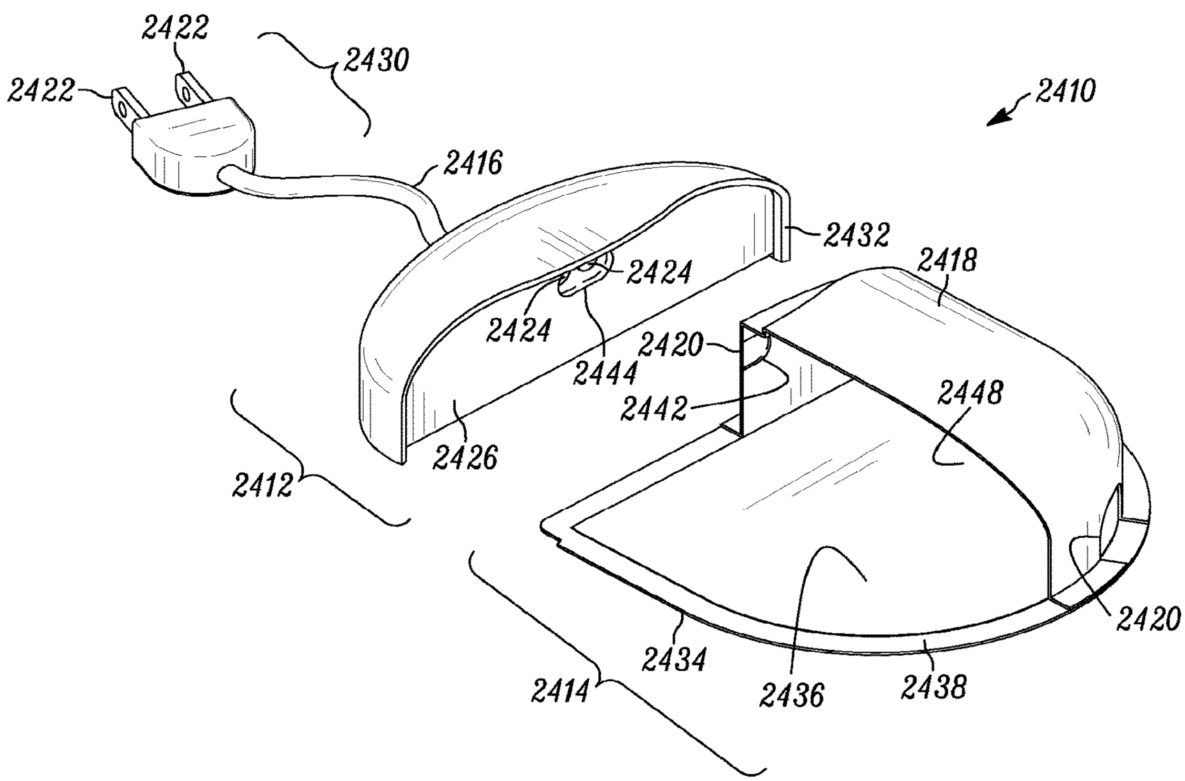
FIG. 67 is a front perspective view of the insect trap of FIG. 66.

FIG. 67 is a front perspective view of insect trap 2410. Trap portion 2414 is shown partially cut away and removed from base portion 2412 in this view. Base portion 2412 includes a lighting element such as one or more LEDs 2424. In some embodiments, LEDs 2424 include at least one that emits UV light and at least one that emits visible light. In some embodiments, LEDs 2424 include at least one that emits UV light and at least one that emits blue light to better attract a wide variety of insect species. In some embodiments, the lighting element emits a combination of wavelengths to mimic sunlight. In some embodiments, LEDs 2424 include at least one that emits IR light to better attract certain species of insects including fleas. In a front surface 2426 of base portion 2412 is at least one opening 2444, and mounted in opening 2444 may be a transparent or translucent window (not shown). The window protects LEDs 2424 from dust and insect debris and allows base portion 2412 to be easily cleaned. In some embodiments, at least a portion of LEDs 2424 protrude from front surface 2426 of base portion 2412, and into trap portion 2414 when trap portion 2414 is mounted to base portion 2412. On the perimeter of front surface 2426 may be a forwardly directed rim 2432. Trap portion 2414 includes a bottom plate 2434 with a top surface 2438, at least a portion of which is coated with an adhesive 2436. In some embodiments, the bottom surface (not shown) of bottom plate 2434 is planar or is planar at its perimeter and is configured such that insects cannot crawl under insect trap 2410 when insect trap 2410 is placed on a floor. As shown, housing 2418 has at least one opening 2442 that corresponds to opening 2444 in base portion 2412. In some embodiments, opening 2442 in housing 2418 has a transparent or translucent window 2440. In some embodiments, housing 2418 has a reflective coating (not shown) on its inside surface (not shown). Alternatively, the material and surface finish of housing 2418 may be configured to reflect and disperse UV light and/or visible light and/or IR light without a reflective coating on its inside surface. Housing 2418 may also be coated with transparent, translucent or opaque adhesive on its inside surface (not shown) to provide additional insect trapping efficiency and capacity. In some embodiments, adhesive 2436 is configured to reflect and disperse UV and/or visible light and/or IR light. Housing 2418 and bottom plate 2434 form an enclosure 2448. In some embodiments, housing 2418 is thermoformed from opaque sheet plastic, creating a clean and aesthetically pleasing shape while maintaining low cost and disposability. Alternatively housing 2418 may be constructed of other opaque, transparent or translucent materials such as paper, paperboard, cardboard or paper pulp. In some embodiments, housing 2418 is constructed by injection molding or by other suitable manufacturing techniques. In some embodiments, housing 2418 and bottom plate 2434 are joined together where they intersect or engage with an adhesive, although they may also be joined by other commonly used packaging assembly techniques such as ultrasonic welding or high frequency (HF) welding, or by any other suitable assembly method. The materials of trap portion 2414 may also include one or more insect attractants. For example, housing 2418 and/or bottom plate 2434 and/or adhesive 2436 may be impregnated with sorbitol, coleopteran attractants including brevicomin, dominicalure, frontalin, grandlure, ipsdienol, ipsenol, japonilure, lineatin, megatomoic acid, multistriatin, oryctalure, sulcatol, and trunc-call, dipteran attractants including ceralure, cue-lure, latilure, medlure, moguchun, muscalure, and trimedlure, homopteran attractants including rescalure, lepidopteran attractants such as disparlure, straight chain lepidopteran pheromones including codlelure, gossyplure, hexalure, litlure, looplure, orfralure, and ostramone, and other insect attractants such as eugenol, methyl eugenol, and siglure, or other substances to provide a scent that may further increase the insect-attracting efficiency of insect trap 2410. In such embodiments, the insect attractant is integral to trap portion 2414. Alternatively, the insect attractants may be embedded in a separate piece (not shown) that may mount on an inside surface of enclosure 2448 or through an opening in housing 2418. It is desirable for such attractants to be detectable by an insect for approximately a 2-meter radius from insect trap 2410.

Figure 68:
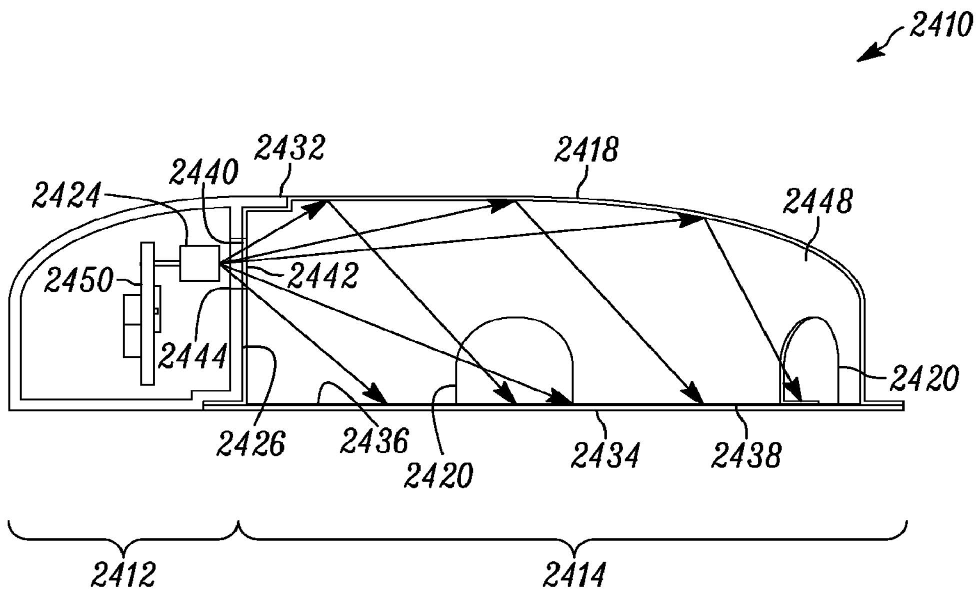
FIG. 68 is a cross-sectional view of the insect trap of FIG. 66.

FIG. 68 is a cross-sectional view through insect trap 2410. For clarity, cord 2416, plug 2430 and conductive prongs 2422 are not shown in this view. In some embodiments, base portion 2412 has a circuit board 2450 having a programmable processor or chip (not shown) for executing commands, electrically connected to cord 2416, conductive prongs 2422 and LEDs 2424 (only one of which is shown). For clarity, however, not all of the electrical connections are shown. Circuit board 2450 may include electronic circuitry to receive ordinary household current from conductive prongs 2422 and provide power to illuminate LEDs 2424. Circuit board 2450 may include an energy stabilizer such as a full wave rectifier circuit or any other circuit that may provide steady voltage to LEDs 2424, although it may also provide a varying voltage to LEDs 2424 to provide a flickering light, which mimics movement that some insect species, may find attractive. Circuit board 2450 may provide power to LEDs 2424 to provide UV and/or visible and/or IR light although it may be configured to provide power to only the one or more UV LEDs 2424 or to only the visible light LEDs 2424 or to only the IR LEDs 2424, or to provide variable power to produce combinations of flickering UV and/or visible and/or IR light. Circuit board 2450 may also be configured to drive a transmitter or transceiver such as a piezoelectric speaker (not shown) or other device that may be mounted in base portion 2412 to emit insect-attracting sounds. In some embodiments, the transmitter or transceiver may emit recorded and/or generated insect sounds or vibrations to better attract insects, and may include one or more of insect call, reply, courtship and copulatory songs. In some embodiments, the transmitter or transceiver may emit recorded and/or generated insect-attracting sounds or vibrations such as the heartbeat of a mammal. For example, the transmitter or transceiver may emit an insect-attracting sound or sounds having a frequency in the range of approximately 0.5 Hz (e.g., the heart rate of large mammals) to approximately 240 kHz (e.g., the highest frequency detectable by insects). In some embodiments, the frequency is in the range of approximately 5 Hz to 100 kHz. In some embodiments, the frequency is in the range of approximately 35 Hz to 50 Khz. It is desirable for such insect-attracting sound to be detectable by an insect within approximately a 2-meter distance from insect trap 2410. It is desirable for such insect-attracting sound to be undetectable by a human beyond approximately a 1-meter distance from insect trap 2410.

As shown, rim 2432 on front surface 2426 of base portion 2412 engages with trap portion 2414 to secure it in place during use, although any other form of attachment may be substituted that allows trap portion 2414 to be securely but removably mounted on base portion 2412.

In the operation of insect trap 2410, conductive prongs 2422 (not shown) are inserted into a wall electrical socket, and LEDs 2424 emit light, represented by arrows, which is transmitted through opening 2444 in base portion 2412 and into enclosure 2448, and directly onto the inside surface of housing 2418 and adhesive 2436 on top surface 2438 of bottom plate 2434. In some embodiments, light is not manipulated in base portion 2412 and is emitted directly into trap portion 2414.

The inside surface of housing 2418 may include a concave shape and may be configured to reflect and disperse the UV and/or visible and/or IR light from LEDs 2424 to distribute the light evenly onto adhesive 2436 on top surface 2438 of bottom plate 2434 and through enclosure 2448 and out through opening 2420 of housing 2418, although the inside surface of housing 2418 may have a convex shape or a saddle shape or a combination of shapes, or may also have ribs or other features to more evenly distribute the light, or may also have ribs or other features to more evenly distribute the light. Alternatively, an optical enhancer such as an anamorphic lens or any other lens or combination of lenses (not shown) configured to distribute the UV and/or visible and/or IR light (e.g., evenly, according to specific patterns, at a focal point, etc.) onto the inside surface of housing 2418, may be mounted to trap portion 2414 at or near opening 2442 or to base portion 2412 at or near opening 2444, and may replace or augment the role of the reflective-coated inside surface of housing 2418. In some embodiments, the light from LEDs 2424 may directly strike the adhesive 2436 on top surface 2438 of bottom plate 2434 at an oblique angle (e.g., an acute angle from approximately 0° to 90°) and be spread across the adhesive 2436, and may replace or augment the light-distributing role of the inside surface of housing 2418 or the lens or lenses mounted to trap portion 2414 or to base portion 2412. The light may be further evenly distributed by the light-diffusing properties of window 2440 in trap portion 2414, by adhesive 2436 on top surface 2438 of bottom plate 2434, or by a combination of the two.

Thereafter, a portion of the light entering enclosure 2448 continues through opening 2420 in housing 2418 and into the surrounding area where insect trap 2410 is installed. Insects are attracted to the light transmitted through opening 2420 and hop or crawl into opening 2420 and onto adhesive 2436, where they become trapped. A user may observe trapped insects by looking through opening 2420 in housing 2418. When a sufficient number of insects have been trapped, the user may easily remove and discard the entire used trap portion 2414 without touching the trapped insects, insect debris or adhesive, which remain out of reach inside trap portion 2414, and replace it with a new trap portion 2414. The new trap portion 2414 has fresh adhesive-coated surfaces, ensuring that insect trap 2410 will continue to efficiently and effectively attract and trap insects.

In some embodiments, because trap portion 2414 mounts beside, and not on top of or underneath base portion 2412, insect trap 2410 protrudes minimally from the floor and therefore intrudes minimally into the home environment. In some embodiments, insect trap 2410 is configured such that when placed on a floor, its overall height, defined by the overall distance insect trap 2410 protrudes from the floor, is smaller than its overall length and its overall width.

It should be appreciated that a benefit of insect trap 2410 is the manipulation of light within trap portion 2414. In some embodiments, light manipulation occurs solely within trap portion 2414. Light manipulation may include reflection, refraction, polarization and/or diffusion and is achieved by engaging with a manipulative element or surface (e.g., the inside surface of housing 2418 and adhesive 2436). In some embodiments, light manipulation produces an even distribution of light on adhesive 2436. In some embodiments, light is manipulated to produce a predetermined pattern on adhesive 2436 or within trap portion 2414, for example, an even distribution, an even distribution with hot spots of higher intensity, hot spot patterns, and/or combinations thereof.

Any suitable adhesive material may be used as part of an adhesive surface for trapping an insect. In some embodiments, pressure sensitive adhesives such as acrylics, butyl rubber, natural rubber, nitriles, silicones, styrene block copolymers, styrene-ethylene/propylene, styrene-isoprene-styrene, vinyl ethers may be used. Generally, the thickness of such adhesives will be in the range of approximately 0.01 mm to 1 mm. In some embodiments, the adhesive thickness is in the range of approximately 0.05 mm to 0.2 mm, with a thickness of approximately 0.1 mm being most often used.

An insect trap 2410 of this configuration may accommodate a variety of different trap portions 2414 that may be removably mounted to base portion 2412, each trap portion 2414 being uniquely configured to attract and trap a specific species or multiple species of insects. For example, the overall size and shape of trap portion 2414, the size, shape, location and orientation of opening 2420 in housing 2418, and the scent or scents impregnated in housing 2418, bottom plate 2434, or adhesive 2436, may be uniquely configured to attract and trap a specific species or multiple species of insects.

For example, in some embodiments, trap portion 2414 is approximately 20 mm to 600 mm wide, 20 mm to 600 mm long and 5 mm to 150 mm high. In some embodiments, trap portion 2414 is approximately 20 mm to 200 mm wide, 20 mm to 200 mm long and 5 mm to 80 mm high. In some embodiments, trap portion 2414 is approximately 20 mm to 130 mm wide, 20 mm to 130 mm long and 5 mm to 50 mm high.

In some embodiments, base portion 2412 is approximately 20 mm to 600 mm wide, 10 mm to 150 mm long and 10 mm to 150 mm high. In some embodiments, base portion 2412 is 20 mm to 200 mm wide, 10 mm to 100 mm long and 10 mm to 80 mm high. In some embodiments, base portion 2412 is 20 mm to 130 mm wide, 10 mm to 50 mm long and 10 mm to 50 mm high.

Figure 69:
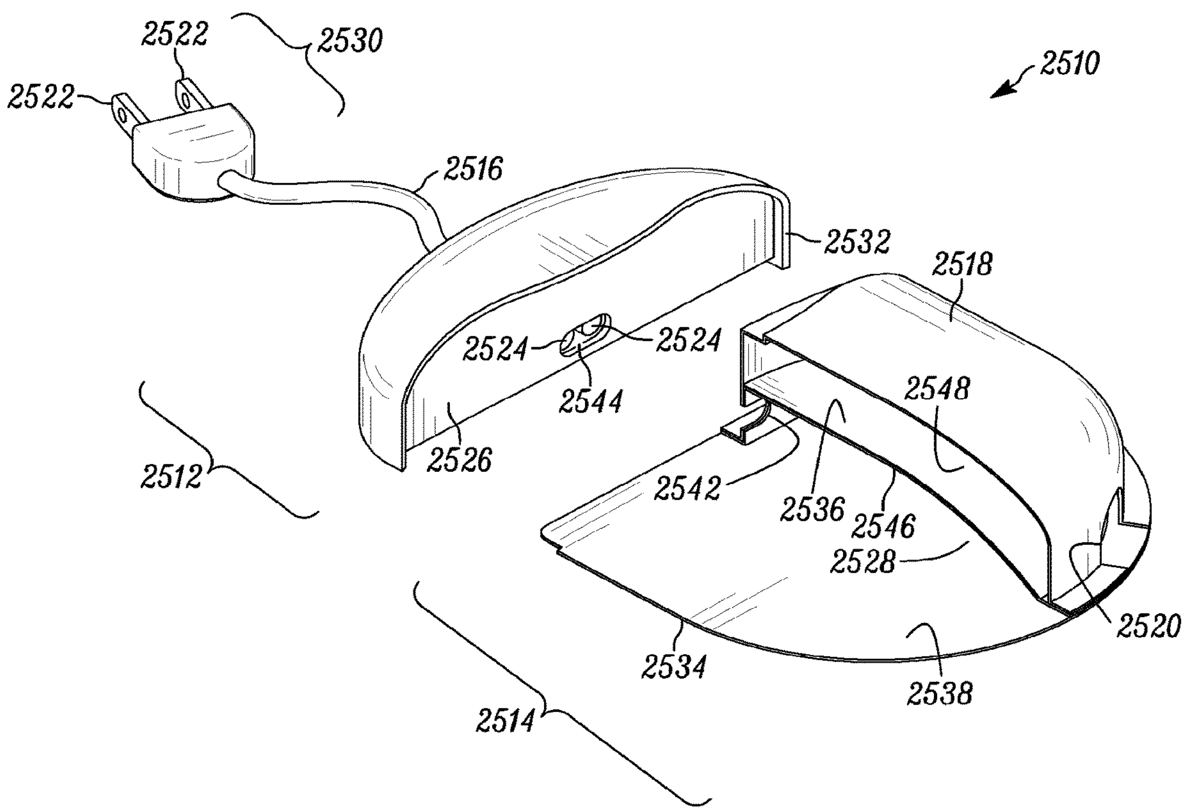
FIG. 69 is a front perspective view of a twenty-fifth embodiment of an insect trap in accordance with principles of the disclosure.

FIG. 69 is a front perspective view of a twenty-fifth embodiment of an insect trap, indicated generally at 2510. Insect trap 2510 includes a base portion 2512 and a removable trap portion 2514. Trap portion 2514 is shown partially cut away and removed from base portion 2512 in this view. As shown, base portion 2512 includes an electrical cord 2516 and an electrical plug 2530 with a plurality of electrically conductive prongs 2522, adapted to provide power to insect trap 2510 by inserting conductive prongs 2522 into a standard household electrical wall socket. Alternatively, base portion 2512 may be configured to receive power from batteries (not shown) mounted in base portion 2512. While an electrical socket and batteries have been described as providing power to insect trap 2510, any suitable power source may be used. As shown, insect trap 2510 is configured to sit on the floor when in use and attract and trap crawling and hopping insects or pests. Trap portion 2514 includes a housing 2518 with at least one opening 2520 on its perimeter. Opening 2520 in housing 2518 may be configured to admit a wide variety of insects into insect trap 2510, or alternatively it may be configured to admit one or more specific insect species. In some embodiments, opening 2520 is configured to prevent the user's fingers from penetrating opening 2520 and inadvertently touching trapped insects or adhesive when removing and replacing trap portion 2514. In some embodiments, opening 2520 has a size and shape such that a sphere 25 mm in diameter cannot pass through opening 2520, and has a size and shape such that a sphere 1 mm in diameter can pass through any portion of opening 2520. Opening 2520 may be of uniform or of varying width, shape and orientation, and if trap portion 2514 has more than one opening 2520, they may be of identical or of differing widths, shapes and orientations. Opening 2520 may be configured to attract one or more individual insect species or a variety of insect species. Base portion 2512 includes a lighting element such as one or more LEDs 2524. In some embodiments, LEDs 2524 include at least one that emits UV light and at least one that emits visible light. In some embodiments, LEDs 2524 include at least one that emits UV light and at least one that emits blue light to better attract a wide variety of insect species. In some embodiments, the lighting element emits a combination of wavelengths to mimic sunlight. In some embodiments, LEDs 2524 include at least one that emits IR light to better attract certain species of insects including fleas. In a front surface 2526 of base portion 2512 is at least one opening 2544, and mounted in opening 2544 may be a transparent or translucent window (not shown) that may protect LEDs 2524 from dust and insect debris, and may allow base portion 2512 to be easily cleaned. However, the window is not required. In some embodiments, at least a portion of LEDs 2524 protrude from front surface 2526 of base portion 2512 and into trap portion 2514 when trap portion 2514 is mounted to base portion 2512. On the perimeter of front surface 2526 may be a forwardly directed rim 2532. Trap portion 2514 includes a bottom plate 2534 with a top surface 2538. In some embodiments, the bottom surface (not shown) of bottom plate 2534 is planar or is planar at its perimeter and is configured such that insects cannot crawl under insect trap 2510 when it is placed on a floor. In some embodiments, top surface 2538 of bottom plate 2534 has a reflective coating (not shown). Alternatively, the material of bottom plate 2534 and the surface finish of top surface 2538 of bottom plate 2534 may be configured to reflect UV and/or visible and/or IR light without a reflective coating on its inside surface. Trap portion 2514 also includes a divider 2546, comprised of transparent or translucent material and that may have a convex shape. Divider 2546 has a top surface, of which at least a portion is coated with a transparent or translucent adhesive 2536, and a bottom surface (not shown). In some embodiments, housing 2518 is coated with adhesive on its inside surface (not shown) to provide additional insect trapping efficiency and capacity. In some embodiments, the inside surface of housing 2518 is configured to reflect and disperse UV and/or visible and/or IR light. In some embodiments, the adhesive coating the inside surface of housing 2518 may be configured to reflect and disperse UV and/or visible and/or IR light. As shown, housing 2518 and divider 2546 form a top enclosure 2548, and divider 2546 and bottom plate 2534 form a bottom enclosure 2528. As shown, housing 2518 and divider 2546 each have at least one opening 2542 corresponding to opening 2544 in front surface 2526 of base portion 2512. In some embodiments, opening 2542 may have a transparent or translucent window (not shown). In some embodiments, housing 2518 is thermoformed from opaque sheet plastic, creating a clean and aesthetically pleasing shape while maintaining low cost and disposability. Alternatively, they may be constructed of other opaque, transparent or translucent materials such as paper, paperboard, cardboard or paper pulp. In some embodiments, housing 2518 is constructed by injection molding or by other suitable manufacturing techniques. In some embodiments, housing 2518, divider 2546 and bottom plate 2534 are joined together where they intersect or engage with an adhesive, although they may also be joined by other commonly used packaging assembly techniques such as ultrasonic welding or high frequency (HF) welding or by any other suitable assembly method. The materials of trap portion 2514 may also include one or more of insect-attracting substances. For example, housing 2518 and/or divider 2546 and/or bottom plate 2534 and/or adhesive 2536 may be impregnated with sorbitol, coleopteran attractants including brevicomin, dominicalure, frontalin, grandlure, ipsdienol, ipsenol, japonilure, lineatin, megatomoic acid, multistriatin, oryctalure, sulcatol, and trunc-call, dipteran attractants including ceralure, cue-lure, latilure, medlure, moguchun, muscalure, and trimedlure, homopteran attractants including rescalure, lepidopteran attractants such as disparlure, straight chain lepidopteran pheromones including codlelure, gossyplure, hexalure, litlure, looplure, orfralure, and ostramone, and other insect attractants such as eugenol, methyl eugenol, and siglure, or other substances to provide a scent that may further increase the insect-attracting efficiency of insect trap 2510. In such embodiments, the insect attractant is integral to trap portion 2414. Alternatively, the insect attractants may be embedded in a separate piece (not shown) that may mount on an inside surface of top enclosure 2548 or through an opening in housing 2518. It is desirable for such attractants to be detectable by an insect for approximately a 2-meter radius from insect trap 2510.

Figure 70:
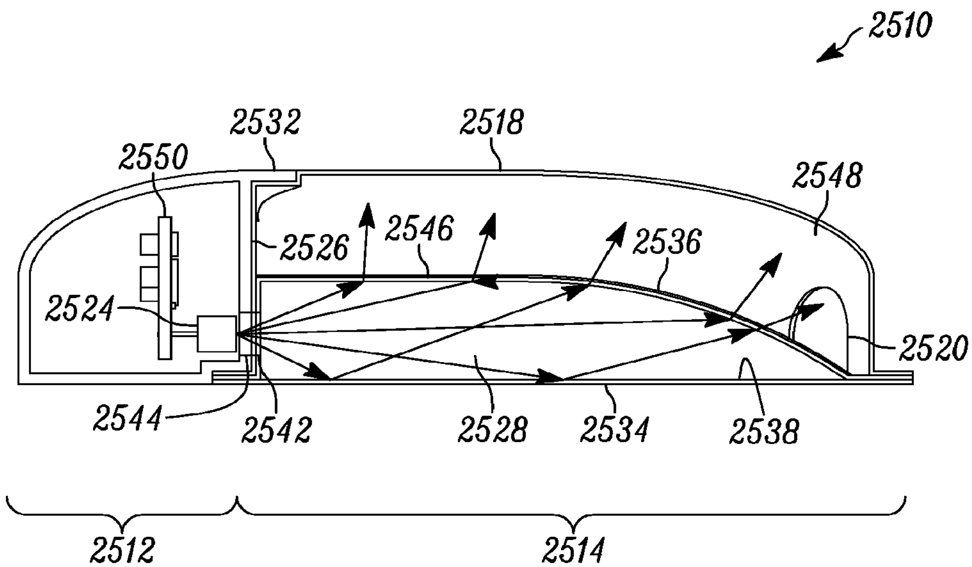
FIG. 70 is a cross-sectional view of the insect trap of FIG. 69.

FIG. 70 is a cross-sectional view through insect trap 2510. For clarity, cord 2516, plug 2530 and conductive prongs 2522 are not shown in this view. In some embodiments, base portion 2512 has a circuit board 2550 having a programmable processor or chip (not shown) for executing commands, electrically connected to cord 2516, conductive prongs 2522, and LEDs 2524. For clarity, however, not all of the electrical connections are shown. Circuit board 2550 may include electronic circuitry to receive ordinary household current from conductive prongs 2522 and provide power to illuminate LEDs 2524. Circuit board 2550 may include an energy stabilizer such as a full wave rectifier circuit or any other circuit that may provide steady voltage to LEDs 2524, although it may also provide a varying voltage to LEDs 2524 to provide a flickering light which mimics movement that some insect species may find attractive. Circuit board 2550 may provide power to LEDs 2524 to provide UV and/or visible and/or IR light, although it may be configured to provide power to only UV LEDs 2524 or to only visible light LEDs 2524 or to only IR LEDs 2524, or to provide variable power to produce combinations of flickering UV and/or visible and/or IR light. Circuit board 2550 may also be configured to drive a transmitter or transceiver such as a piezoelectric speaker (not shown) or other device that may be mounted in base portion 2512 to emit insect-attracting sounds or vibrations.

In some embodiments, the transmitter or transceiver may emit recorded and/or generated insect sounds or vibrations to better attract insects, and may include one or more of insect call, reply, courtship and copulatory songs. In some embodiments, the transmitter or transceiver may emit recorded and/or generated insect-attracting sounds or vibrations such as the heartbeat of a mammal. For example, the transmitter or transceiver may emit an insect-attracting sound or sounds having a frequency in the range of approximately 0.5 Hz (e.g., the heart rate of large mammals) to approximately 240 kHz (e.g., the highest frequency detectable by insects). In some embodiments, the frequency is in the range of approximately 5 Hz to 100 kHz. In some embodiments, the frequency is in the range of approximately 35 Hz to 50 Khz. It is desirable for such insect-attracting sound to be detectable by an insect within approximately a 2-meter distance from insect trap 2510. It is desirable for such insect-attracting sound to be undetectable by a human beyond approximately a 1-meter distance from insect trap 2510.

As shown, rim 2532 on front surface 2526 of base portion 2512 engages with trap portion 2514 to secure it in place during use, although any other form of attachment may be substituted that allows trap portion 2514 to be securely but removably mounted on base portion 2512.

In the operation of insect trap 2510, conductive prongs 2522 are inserted into a wall electrical socket, and LEDs 2524 emit light, represented by arrows, which transmits through opening 2544 in base portion 2512 and opening 2542 in trap portion 2514 and into bottom enclosure 2528, and directly onto the bottom surface of divider 2546 and top surface 2538 of bottom plate 2534. In some embodiments, light is not manipulated in base portion 2512 and is emitted directly into trap portion 2514. Top surface 2538 of bottom plate 2534 may be configured to reflect and disperse the light from LEDs 2524 to project the light evenly onto the bottom surface of divider 2546, although top surface 2538 of bottom plate 2534 may have a convex shape or a saddle shape or a combination of shapes, or may also have ribs or other features to more evenly distribute the light. Alternatively, an optical enhancer such as an anamorphic lens (not shown) or any other lens or combination of lenses configured to distribute the light (e.g., evenly, according to specific patterns, at a focal point, etc.) onto the bottom surface of divider 2546, may be mounted to trap portion 2514 at or near opening 2542 or to base portion 2512 at or near opening 2544, and may replace or augment the role of top surface 2538 of bottom plate 2534. In some embodiments, the light from LEDs 2524 may directly strike top surface 2538 of bottom plate 2534 at an oblique angle (e.g., an acute angle from approximately 0° to 90°) and be spread across top surface 2538, and may replace or augment the light-distributing role of the bottom surface of divider 2546 or the lens or lenses mounted to trap portion 2514 or to base portion 2512.

Thereafter, the light transmits through divider 2546 and adhesive 2536 and into top enclosure 2548. The light may be further evenly distributed by the light-diffusing properties of divider 2546, adhesive 2536, or by a combination of the two. A portion of the light entering top enclosure 2548 transmits through opening 2520 and into the surrounding area where insect trap 2510 is installed. Insects and other arthropod pests are attracted to the light transmitted through opening 2520, and hop or crawl into opening 2520 and onto adhesive 2536, where they become trapped. A user may observe trapped insects by looking through opening 2520. When a sufficient number of insects have been trapped, the user may easily remove and discard the entire used trap portion 2514 without touching the trapped insects, insect debris or adhesive, which remain out of reach inside trap portion 2514, and replace it with a new trap portion 2514. New trap portion 2514 has fresh adhesive-coated surfaces, ensuring that insect trap 2510 will continue to efficiently and effectively attract and trap insects.

In some embodiments, because trap portion 2514 mounts beside, and not on top of or underneath base portion 2512, insect trap 2510 protrudes minimally from the floor and therefore intrudes minimally into the home environment. In some embodiments, insect trap 2510 may be configured such that when placed on a floor, its overall height, defined by the overall distance insect trap 2510 protrudes from the floor, is smaller than its overall length and its overall width.

It should be appreciated that a benefit of insect trap 2510 is the manipulation of light within trap portion 2514. In some embodiments, light manipulation occurs solely within trap portion 2514. Light manipulation may include reflection, refraction, polarization, dispersion and/or diffusion and is achieved by engaging with a manipulative element or surface (e.g., inside surface of housing 2518 and adhesive 2536). In some embodiments, light manipulation produces an even distribution of light on adhesive 2536. In some embodiments, light is manipulated to produce a predetermined pattern on adhesive 2536 or within trap portion 2514, for example, an even distribution, an even distribution with hot spots of higher intensity, hot spot patterns, and/or combinations thereof.

Any suitable adhesive material may be used as part of an adhesive surface for trapping an insect. In some embodiments, pressure sensitive adhesives such as acrylics, butyl rubber, natural rubber, nitriles, silicones, styrene block copolymers, styrene-ethylene/propylene, styrene-isoprene-styrene, vinyl ethers may be used. Generally, the thickness of such adhesives will be in the range of approximately 0.01 mm to 1 mm. In some embodiments, the adhesive thickness is in the range of approximately 0.05 mm to 0.2 mm, with a thickness of approximately 0.1 mm being most often used.

Insect trap 2510 of this configuration may accommodate a variety of different trap portions 2514 that may be removably mounted to base portion 2512, each trap portion 2514 being uniquely configured to attract and trap a specific species or multiple species of insects. For example, the overall size and shape of trap portion 2514, the size, shape, location and orientation of opening 2520 in housing 2518 of trap portion 2514, and the scent or scents impregnated in housing 2518, bottom plate 2534, divider 2546 or adhesive 2536, may be uniquely configured to attract and trap a specific species or multiple species of insects.

For example, in some embodiments, trap portion 2514 is approximately 20 mm to 600 mm wide, 20 mm to 600 mm long and 5 mm to 150 mm high. In some embodiments, trap portion 2514 is approximately 20 mm to 200 mm wide, 20 mm to 200 mm long and 5 mm to 80 mm high. In some embodiments, trap portion 2514 is approximately 20 mm to 130 mm wide, 20 mm to 130 mm long and 5 mm to 50 mm high.

In some embodiments, base portion 2512 is approximately 20 mm to 600 mm wide, 10 mm to 150 mm long and 10 mm to 150 mm high. In some embodiments, base portion 2512 is 20 mm to 200 mm wide, 10 mm to 100 mm long and 10 mm to 80 mm high. In some embodiments, base portion 2512 is 20 mm to 130 mm wide, 10 mm to 50 mm long and 10 mm to 50 mm high.

Figure 71:
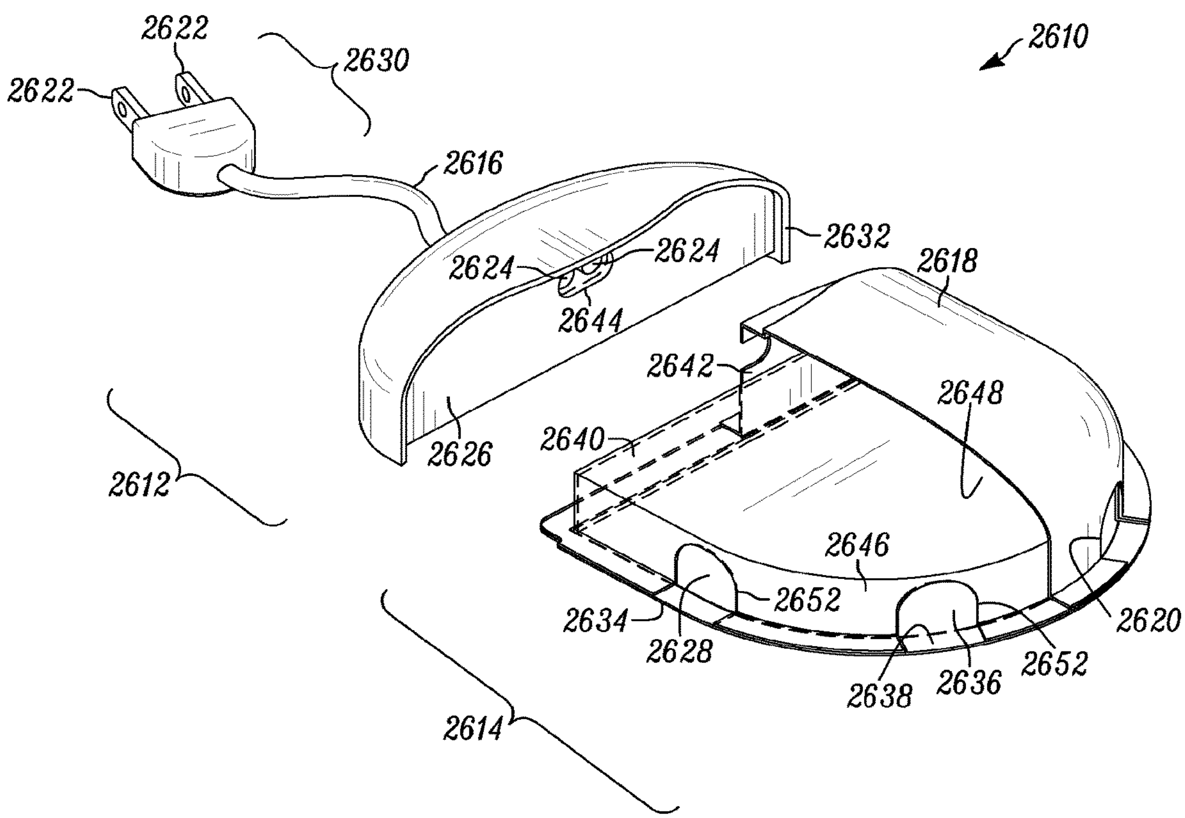
FIG. 71 is a front perspective view of a twenty-sixth embodiment of an insect trap in accordance with principles of the disclosure.

FIG. 71 is a front perspective view of a twenty-sixth embodiment of an insect trap, indicated generally at 2610. Insect trap 2610 includes a base portion 2612 and a removable trap portion 2614. Trap portion 2614 is shown partially cut away and removed from base portion 2612 in this view. As shown, base portion 2612 includes an electrical cord 2616 and an electrical plug 2630 with a plurality of electrically conductive prongs 2622, adapted to provide power to insect trap 2610 by inserting conductive prongs 2622 into a standard household electrical wall socket. Alternatively, base portion 2612 may be configured to receive power from batteries (not shown) mounted in base portion 2612. While an electrical socket and batteries have been described as providing power to insect trap 2610, any suitable power source may be used. As shown, insect trap 2610 is configured to sit on the floor when in use and attract and trap crawling and hopping insects and other arthropod pests. Trap portion 2614 includes a housing 2618 with at least one opening 2620 on its perimeter. Opening 2620 in housing 2618 may be configured to admit a wide variety of insects into insect trap 2610, or alternatively it may be configured to admit one or more specific insect species. In some embodiments, opening 2620 is configured to prevent the user's fingers from penetrating opening 2620 and inadvertently touching trapped insects or adhesive when removing and replacing trap portion 2614. In some embodiments, opening 2620 has a size and shape such that a sphere 25 mm in diameter cannot pass through opening 2620, and has a size and shape such that a sphere 1 mm in diameter can pass through any portion of opening 2620. Opening 2620 may be of uniform or of varying width, shape and orientation, and if trap portion 2614 has more than one opening 2620, they may be of identical or of differing widths, shapes and orientations. Opening 2620 may be configured to attract one or more individual insect species or a variety of insect species. In some embodiments, the inside surface (not shown) of housing 2618 may have a reflective coating. Alternatively, the material of housing 2618 and the surface finish of the inside surface of housing 2618 may be configured to reflect light without a reflective coating on its inside surface. Base portion 2612 includes a lighting element such as one or more LEDs 2624. In some embodiments, LEDs 2624 include at least one that emits UV light and at least one that emits visible light. In some embodiments, LEDs 2624 include at least one that emits UV light and at least one that emits blue light to better attract a wide variety of insect species. In some embodiments, the lighting element emits a combination of wavelengths to mimic sunlight. In some embodiments, LEDs 2624 include at least one that emits IR light to better attract certain species of insects including fleas. In a front surface 2644 of base portion 2612 is at least one opening 2620, and mounted in opening 2620 may be a transparent or translucent window (not shown), which may protect LEDs 2624 from dust and insect debris, and may allow base portion 2612 to be easily cleaned. However, the window is not required. In some embodiments, at least a portion of LEDs 2624 protrude from front surface 2626 of base portion 2612 and into trap portion 2614 when trap portion 2614 is mounted to base portion 2612. On the perimeter of front surface 2626 may be a forwardly directed rim 2632. Trap portion 2614 includes a bottom plate 2634 with a top surface 2638, at least a portion of which is coated with an adhesive 2636. In some embodiments, the bottom surface (not shown) of bottom plate 2634 is planar or is planar at its perimeter and is configured such that insects cannot crawl under insect trap 2610 when it is placed on a floor. Trap portion 2614 includes a divider 2646, comprised of transparent or translucent material and which includes a top surface 2640. In some embodiments, divider 2646 is coated on its inside surfaces with a transparent or translucent adhesive to provide additional insect trapping efficiency and capacity. Divider 2646 has at least one opening 2652 that corresponds to opening 2620 in housing 2618. As shown, housing 2618 and divider 2646 form a top enclosure 2648, and divider 2646 and bottom plate 2634 form a bottom enclosure 2628. As shown, housing 2618 has at least one opening 2642 that corresponds to opening 2644 in front surface 2626 of base portion 2614. In some embodiments, opening 2642 has a transparent or translucent window (not shown). In some embodiments, housing 2618 is thermoformed from opaque sheet plastic, creating a clean and aesthetically pleasing shape while maintaining low cost and disposability. Alternatively, they may be constructed of other opaque, transparent or translucent materials such as paper, paperboard, cardboard or paper pulp. In some embodiments, housing 2618 is constructed by injection molding or by other suitable manufacturing techniques. In some embodiments, housing 2618, divider 2646 and bottom plate 2634 are joined together where they intersect or engage with an adhesive, although they may also be joined together by other commonly used packaging assembly techniques such as ultrasonic welding or high frequency (HF) welding or by any other suitable assembly method. The materials of trap portion 2614 may also include one or more of insect-attracting substances. For example, housing 2618 and/or divider 2646 and/or bottom plate 2634 and/or adhesive 2636 may be impregnated with sorbitol, coleopteran attractants including brevicomin, dominicalure, frontalin, grandlure, ipsdienol, ipsenol, japonilure, lineatin, megatomoic acid, multistriatin, oryctalure, sulcatol, and trunc-call, dipteran attractants including ceralure, cue-lure, latilure, medlure, moguchun, muscalure, and trimedlure, homopteran attractants including rescalure, lepidopteran attractants such as disparlure, straight chain lepidopteran pheromones including codlelure, gossyplure, hexalure, litlure, looplure, orfralure, and ostramone, and other insect attractants such as eugenol, methyl eugenol, and siglure, or other substances to provide a scent that may further increase the insect-attracting efficiency of insect trap 2610. In such embodiments, the insect attractant is integral to trap portion 2614. Alternatively, the insect attractants may be embedded in a separate piece (not shown) that may mount on an inside surface of bottom enclosure 2628 or through an opening in housing 2618. It is desirable for such attractants to be detectable by an insect for approximately a 2-meter radius from insect trap 2610.

Figure 72:
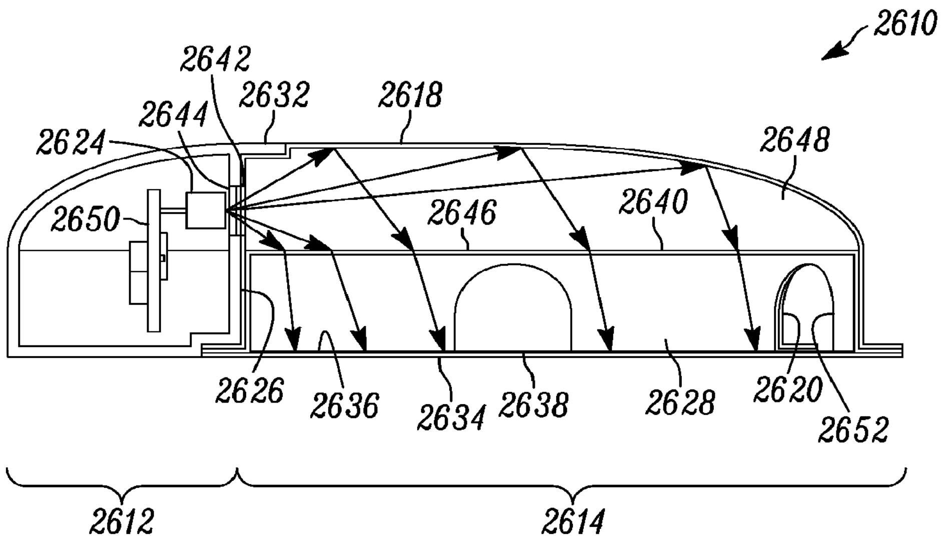
FIG. 72 is a cross-sectional view of the insect trap of FIG. 71.

FIG. 72 is a cross-sectional view of insect trap 2610. For clarity, cord 2616, plug 2630 and conductive prongs 2622 are not shown. In some embodiments, base portion 2612 has a circuit board 2650 having a programmable processor or chip (not shown) for executing commands, electrically connected to cord 2616, conductive prongs 2622 and LEDs 2624. For clarity, however, not all of the electrical connections are shown. Circuit board 2650 may include electronic circuitry to receive ordinary household current, for example from conductive prongs 2622 and provide power to illuminate LEDs 2624. Circuit board 2650 may include an energy stabilizer such as a full wave rectifier circuit or any other circuit that may provide steady voltage to LEDs 2624, although it may also provide a varying voltage to LEDs 2624 to provide a flickering light which mimics movement that some insect species may find attractive. Circuit board 2650 may provide power to LEDs 2624 to provide UV and/or visible and/or IR light, although it may be configured to provide power to only UV LEDs 2624 or to only visible light LEDs 2624 or to only IR LEDs 2624, or to provide variable power to produce combinations of flickering UV and/or visible and/or IR light. Circuit board 2650 may also be configured to drive a transmitter or transceiver such as a piezoelectric speaker (not shown) or other device that may be mounted in base portion 2612 to emit insect-attracting sounds or vibrations. In some embodiments, the transmitter or transceiver may emit recorded and/or generated insect sounds or vibrations to better attract insects, and may include one or more of insect call, reply, courtship and copulatory songs. In some embodiments, the transmitter or transceiver may emit recorded and/or generated insect-attracting sounds or vibrations such as the heartbeat of a mammal.

For example, the transmitter or transceiver may emit an insect-attracting sound or sounds having a frequency in the range of approximately 0.5 Hz (e.g., the heart rate of large mammals) to approximately 240 kHz (e.g., the highest frequency detectable by insects). In some embodiments, the frequency is in the range of approximately 5 Hz to 100 kHz. In some embodiments, the frequency is in the range of approximately 35 Hz to 50 Khz. It is desirable for such insect-attracting sound to be detectable by an insect within approximately a 2-meter distance from insect trap 2610. It is desirable for such insect-attracting sound to be undetectable by a human beyond approximately a 1-meter distance from insect trap 2610.

As shown, rim 2632 on front surface 2626 of base portion 2612 engages with trap portion 2614 to secure it in place during use, although any other form of attachment may be substituted that allows trap portion 2614 to be securely but removably mounted on base portion 2612.

In the operation of insect trap 2610, conductive prongs 2622 (not shown) are inserted into a wall electrical socket, and LEDs 2624 light, represented by arrows, which transmits through opening 2644 in base portion 2612 and opening 2642 in housing 2618, and into top enclosure 2648, and directly onto the inside surface of housing 2618 and top surface 2640 of divider 2646. In some embodiments, light is not manipulated in base portion 2612 and is emitted directly into trap portion 2614. In some embodiments, the inside surface of housing 2618 is configured to reflect the light from LEDs 2624 to project the light onto and through top surface 2640 of divider 2646 and on into bottom enclosure 2628, although the inside surface of housing 2618 may also have ribs or other features (not shown) to more evenly distribute the light. Top surface 2640 of divider 2646 may be planar or convex or concave or be a combination of forms to more evenly distribute the light onto adhesive 2636. In some embodiments, an optical enhancer such as an anamorphic lens (not shown) or any other lens or combination of lenses configured to distribute the light (e.g., evenly, according to specific patterns, at a focal point, etc.) through divider 2646 and onto adhesive 2636, may be mounted to trap portion 2614 at or near opening 2642 in housing 2618 or to base portion 2612 at or near opening 2644, and may replace or augment the role of inside surface of housing 2618. The light may be further evenly distributed by the light-diffusing properties of divider 2646, the adhesive coating the inside surface of divider 2646, or by a combination of the two. In some embodiments, the light from LEDs 2624 may directly strike top surface 2640 of divider 2646 at an oblique angle (e.g., an acute angle from approximately 0° to 90°) and be spread across top surface 2640, and may replace or augment the light-distributing role of top surface 2640 of divider 2646 or of the lens or lenses mounted to trap portion 2614 or to base portion 2612.

Thereafter, a portion of the light entering bottom enclosure 2628 continues through opening 2652 in divider 2646 and its corresponding opening 2620 in housing 2618 and into the surrounding area where insect trap 2610 is installed. Insects and other arthropod pests are attracted to the light transmitted through opening 2652 in divider 2646 and its corresponding opening 2620 in housing 2618, and crawl through opening 2620 in housing 2618 and its corresponding opening 2652 in divider 2646 and onto adhesive 2636 on bottom plate 2634, where they become trapped. A user may observe trapped insects by looking through opening 2620 in housing 2618 and its corresponding opening 2652 in divider 2646. When a sufficient number of insects have been trapped, the user can easily remove and discard entire used trap portion 2614 without touching the trapped insects, insect debris or adhesive, which remain out of reach inside trap portion 2614, and replace it with a new trap portion 2614. New trap portion 2614 has fresh adhesive-coated surfaces, ensuring that insect trap 2610 continues to efficiently and effectively attract and trap insects.

In some embodiments, because trap portion 2614 mounts beside, and not on top of or underneath base portion 2612, insect trap 2610 protrudes minimally from the floor and therefore intrudes minimally into the home environment. In some embodiments, insect trap 2610 is configured such that when placed on a floor, its overall height, defined by the overall distance insect trap 2610 protrudes from the floor, is smaller than its overall length and its overall width.

It should be appreciated that a benefit of insect trap 2610 is the manipulation of light within trap portion 2614. In some embodiments, light manipulation occurs solely within trap portion 2614. Light manipulation may include reflection, refraction, polarization, dispersion and/or diffusion and is achieved by engaging with a manipulative element or surface (e.g., inside surface of housing 2618 and adhesive 2636). In some embodiments, light manipulation produces an even distribution of light on adhesive 2636. In some embodiments, light is manipulated to produce a predetermined pattern on adhesive 2636 or within trap portion 2614, for example, an even distribution, an even distribution with hot spots of higher intensity, hot spot patterns, and/or combinations thereof.

Any suitable adhesive material may be used as part of an adhesive surface for trapping an insect. In some embodiments, pressure sensitive adhesives such as acrylics, butyl rubber, natural rubber, nitriles, silicones, styrene block copolymers, styrene-ethylene/propylene, styrene-isoprene-styrene, vinyl ethers may be used. Generally, the thickness of such adhesives will be in the range of approximately 0.01 mm to 1 mm. In some embodiments, the adhesive thickness is in the range of approximately 0.05 mm to 0.2 mm, with a thickness of approximately 0.1 mm being most often used.

An insect trap 2610 of this configuration may accommodate a variety of different trap portions 2614 that may be removably mounted to base portion 2612, each trap portion 2614 being uniquely configured to attract and trap a specific species or multiple species of insects. For example, the overall size and shape of trap portion 2614, the size, shape, location and orientation of opening 2620 in housing 2618 of trap portion 2614, and the scent or scents impregnated in housing 2618, bottom plate 2634, divider 2646 or adhesive 2636, may be uniquely configured to attract and trap a specific species or multiple species of insects.

For example, in some embodiments, trap portion 2614 is approximately 20 mm to 600 mm wide, 20 mm to 600 mm long and 5 mm to 150 mm high. In some embodiments, trap portion 2614 is approximately 20 mm to 200 mm wide, 20 mm to 200 mm long and 5 mm to 80 mm high. In some embodiments, trap portion 2614 is approximately 20 mm to 130 mm wide, 20 mm to 130 mm long and 5 mm to 50 mm high.

In some embodiments, base portion 2612 is approximately 20 mm to 600 mm wide, 10 mm to 150 mm long and 10 mm to 150 mm high. In some embodiments, base portion 2612 is 20 mm to 200 mm wide, 10 mm to 100 mm long and 10 mm to 80 mm high. In some embodiments, base portion 2612 is 20 mm to 130 mm wide, 10 mm to 50 mm long and 10 mm to 50 mm high.

Figure 73:
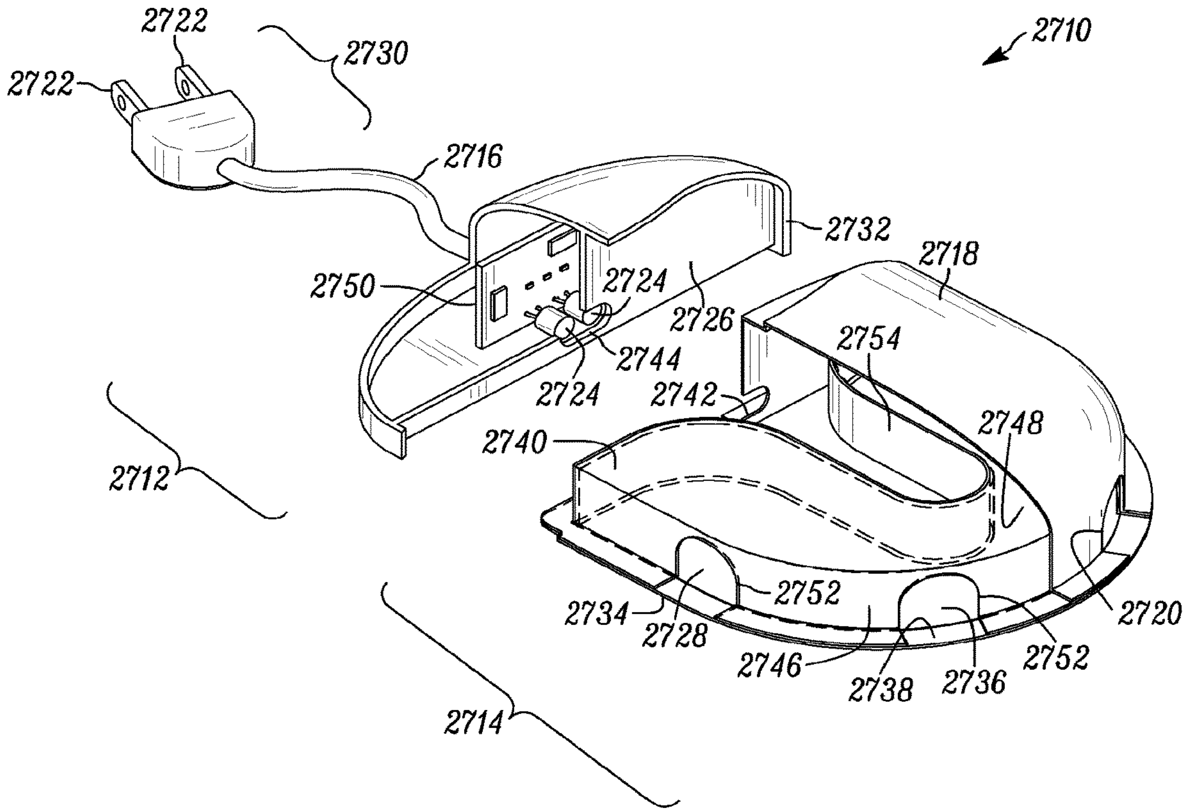
FIG. 73 is a front perspective view of a twenty-seventh embodiment of an insect trap in accordance with principles of the disclosure.

FIG. 73 is a front perspective view of a twenty-seventh embodiment of an insect trap, indicated generally at 2710. Insect trap 2710 includes a base portion 2712 and a removable trap portion 2714. Trap portion 2714 and base portion 2712 are shown partially cut away, and trap portion 2714 is shown removed from base portion 2712 in this view. Insect trap 2710 is configured to be placed on the floor and to attract and trap crawling and hopping insects or pests. As shown, base portion 2712 includes an electrical cord 2716 and an electrical plug 2730 with a plurality of electrically conductive prongs 2722, adapted to provide power to insect trap 2710 by inserting conductive prongs 2722 into a standard household electrical wall socket. Alternatively, base portion 2712 may be configured to receive power from batteries (not shown) mounted in base portion 2712. While an electrical socket and batteries have been described as providing power to insect trap 2710, any suitable power source may be used. Base portion 2712 includes a lighting element such as one or more LEDs 2724. In some embodiments, LEDs 2724 include at least one that emits ultraviolet (UV) light and at least one that emits visible light. In some embodiments, LEDs 2724 include at least one that emits UV light and at least one that emits blue light to better attract a wide variety of insect species. In some embodiments, the lighting element emits a combination of wavelengths to mimic sunlight. In some embodiments, LEDs 2764 include at least one that emits IR light to better attract certain species of insects including fleas. In a front surface 2726 of base portion 2712 is at least one opening 2744, and mounted in opening 2744 may be a transparent or translucent window (not shown), which may protect LEDs 2724 from dust and insect debris, and may allow base portion 2712 to be easily cleaned. However, the window is not required. In some embodiments, at least a portion of LEDs 2724 may protrude from front surface 2726 of base portion 2712, and into trap portion 2714 when trap portion 2714 is mounted to base portion 2712. On the perimeter of front surface 2726 may be a forwardly directed rim 2732.

Trap portion 2714 includes a housing 2718 with at least one opening 2720 on its perimeter. Opening 2720 in housing 2718 may be configured to admit a wide variety of insects into insect trap 2710, or alternatively it may be configured to admit one or more specific insect species. In some embodiments, opening 2720 is configured to prevent the user's fingers from penetrating opening 2720 and inadvertently touching trapped insects or adhesive when removing and replacing trap portion 2714. In some embodiments, opening 2720 has a size and shape such that a sphere 25 mm in diameter cannot pass through opening 2720, and has a size and shape such that a sphere 1 mm in diameter can pass through any portion of opening 2720. Opening 2720 may be of uniform or of varying width, shape and orientation, and if trap portion 2714 has more than one opening 2720, they may be of identical or of differing widths, shapes and orientations. Opening 2720 may be configured to attract one or more individual insect species or a variety of insect species. In some embodiments, the inside surface (not shown) of housing 2718 has a reflective coating. Alternatively, the material of housing 2718 and the surface finish of the inside surface of housing 2718 may be configured to reflect and disperse light without a reflective coating on its inside surface. Trap portion 2714 includes a bottom plate 2734 with a top surface 2738, at least a portion of which is coated with an adhesive 2736. In some embodiments, the bottom surface (not shown) of bottom plate 2734 is planar or is planar at its perimeter and may be configured such that insects cannot crawl under insect trap 2710 when it is placed on a floor. Trap portion 2714 includes a divider 2746, comprised of transparent or translucent material and which includes a top surface 2740. In some embodiments, divider

2746 is coated on its inside surfaces with a transparent or translucent adhesive to provide additional insect trapping efficiency and capacity. Divider 2746 has at least one opening 2752 that corresponds to opening 2720 in housing 2718. Divider 2746 may be thermoformed from a transparent or translucent plastic that may allow for a low cost and disposability, although it may also be made by injection molding, and it may also be made of other transparent or translucent materials. Trap portion 2714 also includes a diffuser 2754, only half of which is shown in this view, made of transparent or translucent material with light-diffusing characteristics. Alternatively, diffuser 2754 may have a surface finish or surface features or a surface coating that provides light-diffusing characteristics to diffuser 2754. In some embodiments, diffuser 2754 is a strip of sheet material that fits into a recess in divider 2746 and conforms to the shape of the surfaces of divider 2746 that it contacts. Alternatively, diffuser 2754 may be molded or thermoformed to shape. As shown, housing 2718 and divider 2746 form a top enclosure 2748, and divider 2746 and bottom plate 2734 form a bottom enclosure 2728. As shown, housing 2718 includes at least one opening 2742 that corresponds to opening 2744 in front surface 2726 of base portion 2712. In some embodiments, opening 2742 has a transparent or translucent window (not shown). In some embodiments, housing 2718 is thermoformed from opaque sheet plastic, creating a clean and aesthetically pleasing shape while maintaining low cost and disposability. Alternatively, they may be constructed of other opaque, transparent or translucent materials such as paper, paperboard, cardboard or paper pulp. In some embodiments, housing 2718 is constructed by injection molding or by other suitable manufacturing techniques. In some embodiments, housing 2718, divider 2746 and bottom plate 2734 are joined together where they intersect or engage with an adhesive, although they may also be joined together by other commonly used packaging assembly techniques such as ultrasonic welding or high frequency (HF) welding or by any other suitable assembly method. For example, housing 2718 and/or divider 2746 and/or bottom plate 2734 and/or adhesive 2736 may be impregnated with sorbitol, coleopteran attractants including brevicomin, dominicalure, frontalin, grandlure, ipsdienol, ipsenol, japonilure, lineatin, megatomoic acid, multistriatin, oryctalure, sulcatol, and trunc-call, dipteran attractants including ceralure, cue-lure, latilure, medlure, moguchun, muscalure, and trimedlure, homopteran attractants including rescalure, lepidopteran attractants such as disparlure, straight chain lepidopteran pheromones including codlelure, gossyplure, hexalure, litlure, looplure, orfralure, and ostramone, and other insect attractants such as eugenol, methyl eugenol, and siglure, or other substances to provide a scent that may further increase the insect-attracting efficiency of insect trap 2710. Alternatively, the insect attractants may be embedded in a separate piece (not shown) that may mount on an inside surface of divider 2746 or through an opening in housing 2718. It is desirable for such attractants to be detectable by an insect for approximately a 2-meter radius from insect trap 2710.

In some embodiments, base portion 2712 includes a circuit board 2750 having a programmable processor or chip (not shown) for executing commands, electrically connected to cord 2716, conductive prongs 2722 and LEDs 2724. For clarity, however, the electrical connections are not shown. Circuit board 2750 may also include electronic circuitry to receive ordinary household current, for example, from conductive prongs 2722 and provide power to illuminate LEDs 2724. Circuit board 2750 may include an energy stabilizer such as a full wave rectifier circuit or any other circuit that may provide steady voltage to LEDs 2724, although it may also provide a varying voltage to LEDs 2724 to provide a flickering light, which mimics movement that some insects find attractive. Circuit board 2750 may provide power to LEDs 2724 to provide both UV and/or visible and/or IR light, although it may be configured to provide power to only UV LEDs 2724 or to only visible light LEDs 2724 or to only IR LEDs 2724, or to provide variable power to produce combinations of flickering UV and/or visible and/or IR light. Circuit board 2750 may also be configured to drive a transmitter or transceiver such as a piezoelectric speaker (not shown) or other device that may be mounted in base portion 2712 to emit insect-attracting sounds or vibrations. In some embodiments, the transmitter or transceiver may emit recorded and/or generated insect sounds or vibrations to better attract insects, and may include one or more of insect call, reply, courtship and copulatory songs. In some embodiments, the transmitter or transceiver may emit recorded and/or generated insect-attracting sounds or vibrations such as the heartbeat of a mammal. For example, the transmitter or transceiver may emit an insect-attracting sound or sounds having a frequency in the range of approximately 0.5 Hz (e.g., the heart rate of large mammals) to approximately 240 kHz (e.g., the highest frequency detectable by insects). In some embodiments, the frequency is in the range of approximately 5 Hz to 100 kHz. In some embodiments, the frequency is in the range of approximately 35 Hz to 50 Khz. It is desirable for such insect-attracting sound to be detectable by an insect within approximately a 2-meter distance from insect trap 2710. It is desirable for such insect-attracting sound to be undetectable by a human beyond approximately a 1-meter distance from insect trap 2710.

As shown, rim 2732 on front surface 2726 of base portion 2712 engages with trap portion 2714 to secure it in place during use, although any other form of attachment may be substituted that allows trap portion 2714 to be securely but removably mounted on base portion 2712.

In the operation of insect trap 2710, conductive prongs 2722 (not shown) are inserted into a wall electrical socket, and LEDs 2724 emit light, represented by arrows, which transmits through opening 2744 in base portion 2712 and opening 2742 in housing 2718, into top enclosure 2748, and directly onto diffuser 2754, top surface 2740 of divider 2746 and the inside surface of housing 2718. In some embodiments, light is not manipulated in base portion 2712 and is emitted directly into trap portion 2714. Diffuser 2754 transmits the light evenly through the corresponding surfaces of divider 2746 and into bottom enclosure 2728. In some embodiments, the inside surface of housing 2718 may be configured to reflect and disperse light from LEDs 2724 through divider 2746 into bottom enclosure 2728, and evenly onto adhesive 2736 coating top surface 2738 of bottom plate 2734, although the inside surface of housing 2718 may also have ribs or other features (not shown) to more evenly distribute the light. Top surface 2740 of divider 2746 may be planar or convex or concave or be a combination of forms to more evenly distribute the light onto adhesive 2736. In some embodiments, an optical enhancer such as an anamorphic lens (not shown) or any other lens or combination of lenses configured to distribute the light (e.g., evenly, according to specific patterns, at a focal point, etc.) through divider 2746 and onto adhesive 2736, may be mounted to trap portion 2714 at or near opening 2742 in housing 2718 or to base portion 2712 at or near opening 2744, and may replace or augment the role of the reflective-coated inside surface of housing 2718. The light may be further evenly distributed by the light-diffusing properties of divider 2746, the adhesive coating the inside surface of divider 2746, or by a combination thereof. In some embodiments, the light from LEDs 2724 may directly strike top surface 2740 of divider 2746 at an oblique angle (e.g., an acute angle from approximately 0° to 90°) and be spread across top surface 2740, and may replace or augment the light-distributing role of the top surface 2740 of divider 2746 or of the lens or lenses mounted to trap portion 2714 or to base portion 2712.

Thereafter, a portion of the light entering bottom enclosure 2728 continues through opening 2752 in divider 2746 and its corresponding opening 2720 in housing 2718 and into the surrounding area where insect trap 2710 is installed. Insects and other arthropod pests are attracted to the light from diffuser 2754 and from adhesive 2736 that transmits through opening 2752 in divider 2746 and its corresponding opening 2720 in housing 2718, and hop or crawl through opening 2720 in housing 2718 and its corresponding opening 2752 in divider 2746 and onto adhesive 2736, where they may become trapped. A user may observe trapped insects by looking through opening 2720 in housing 2718 and its corresponding opening 2752 in divider 2746. When a sufficient number of insects have been trapped, the user can easily remove and discard the entire used trap portion 2714 without touching trapped insects, insect debris or adhesive, which remain out of reach inside trap portion 2714, and replace it with a new trap portion 2714. New trap portion 2714 has fresh adhesive-coated surfaces, ensuring that insect trap 2710 continues to efficiently and effectively attract and trap insects.

In some embodiments, because trap portion 2714 mounts beside, and not on top of or underneath base portion 2712, insect trap 2710 protrudes minimally from the floor and therefore intrudes minimally into the home environment. In some embodiments, insect trap 2710 may be configured such that when placed on a floor, its overall height, defined by the overall distance insect trap 2710 protrudes from the floor, is smaller than its overall length and its overall width.

It should be appreciated that a benefit of insect trap 2710 is the manipulation of light within trap portion 2714. In some embodiments, light manipulation occurs solely within trap portion 2714. Light manipulation may include reflection, refraction, polarization, dispersion and/or diffusion and is achieved by engaging with a manipulative element or surface (e.g., inside surface of housing 2718 and adhesive 2736). In some embodiments, light manipulation produces an even distribution of light on adhesive 2736. In some embodiments, light is manipulated to produce a predetermined pattern on adhesive 2736 or within trap portion 2714, for example, an even distribution, an even distribution with hot spots of higher intensity, hot spot patterns, and/or combinations thereof.

Any suitable adhesive material may be used as part of an adhesive surface for trapping an insect. In some embodiments, pressure sensitive adhesives such as acrylics, butyl rubber, natural rubber, nitriles, silicones, styrene block copolymers, styrene-ethylene/propylene, styrene-isoprene-styrene, vinyl ethers may be used. Generally, the thickness of such adhesives will be in the range of approximately 0.01 mm to 1 mm. In some embodiments, the adhesive thickness is in the range of approximately 0.05 mm to 0.2 mm, with a thickness of approximately 0.1 mm being most often used.

An insect trap 2710 of this configuration may accommodate a variety of different trap portions 2714 that may be removably mounted to base portion 2712, each trap portion 2714 being uniquely configured to attract and trap a specific species or multiple species of insects. For example, the overall size and shape of trap portion 2714, the size, shape, location and orientation of opening 2720 in housing 2718 of trap portion 2714, and the scent or scents impregnated in housing 2718, bottom plate 2734, divider 2746 or adhesive 2736, may be uniquely configured to attract and trap a specific species or multiple species of insects.

For example, in some embodiments, trap portion 2714 is approximately 20 mm to 600 mm wide, 20 mm to 600 mm long and 5 mm to 150 mm high. In some embodiments, trap portion 2714 is approximately 20 mm to 200 mm wide, 20 mm to 200 mm long and 5 mm to 80 mm high. In some embodiments, trap portion 2714 is approximately 20 mm to 130 mm wide, 20 mm to 130 mm long and 5 mm to 50 mm high.

In some embodiments, base portion 2712 is approximately 20 mm to 600 mm wide, 10 mm to 150 mm long and 10 mm to 150 mm high. In some embodiments, base portion 2712 is 20 mm to 200 mm wide, 10 mm to 100 mm long and 10 mm to 80 mm high. In some embodiments, base portion 2712 is 20 mm to 130 mm wide, 10 mm to 50 mm long and 10 mm to 50 mm high.

In an aspect, an insect trap is disclosed including: a trap portion including an enclosure having an adhesive surface and a first opening, wherein the adhesive surface is at least partially contained within the enclosure and is configured to adhere to an insect; and a base portion including a lighting element and a mounting portion, wherein the lighting element is configured to provide light to the trap portion, and wherein the mounting portion is configured to communicate with and receive power from a power source; wherein the trap portion is configured to removably engage with the base portion and receive light from the base portion when engaged therewith. In an embodiment, the first opening is configured to allow an insect to enter into the enclosure. In an embodiment, the enclosure includes a second opening, the second opening configured to allow light to emit from the enclosure. In an embodiment, within the base portion, the light is not manipulated. In an embodiment, the enclosure includes a third opening, the third opening configured to allow light to be received from base portion into the enclosure. In an embodiment, wherein the enclosure is configured to distribute the light in a predetermined pattern. In an embodiment, the enclosure includes: a front housing portion having a first internal surface; and a rear housing portion having a second internal surface, wherein the front housing portion and rear housing portion are matingly engaged with each other to form the enclosure; and wherein at least one of the first or second internal surfaces is configured to manipulate light. In an embodiment, at least one of the first or second internal surfaces includes an adhesive surface. In an embodiment, the rear housing portion has a concave surface, the concave surface configured to reflect light evenly within the enclosure. In an embodiment, light is transmitted through the adhesive surface, illuminating the adhesive surface to attract an insect to the adhesive surface. In an embodiment, the enclosure includes: a front housing portion having a first internal surface; a rear housing portion having a second internal surface; and a divider portion disposed at least partially between the front housing portion and rear housing portion, wherein the front housing portion and rear housing portion are matingly engaged with each other to form the enclosure; and wherein the divider portion divides the enclosure into a front enclosure portion and a rear enclosure portion. In an embodiment, the divider portion includes a rear surface including translucent material and includes a front surface including an adhesive surface. In an embodiment, the second internal surface of the rear housing portion includes a concave surface, the concave surface configured to reflect light onto the rear surface of the divider portion. In an embodiment, light is transmitted through the adhesive surface, illuminating the adhesive surface to attract an insect to the adhesive surface. In an embodiment, the rear surface of the divider portion is configured to receive the light from the second internal surface of the rear housing portion or directly from the lighting element. In an embodiment, the divider portion is configured to receive light at an oblique angle and spread across the divider portion. In an embodiment, the divider portion is configured to manipulate light. In an embodiment, the divider portion includes a planar or contoured shape, wherein the shape of the divider portion is configured to optimize light distribution. In an embodiment, the base portion includes a protrusion and wherein the trap portion includes a recess for receiving the protrusion, wherein when the protrusion is received by the trap portion, the base portion and trap portion are engaged. In an embodiment, the trap portion includes a protrusion and wherein the base portion includes a recess for receiving the protrusion, wherein when the protrusion is received by the base portion, the base portion and trap portion are engaged. In an embodiment, the trap portion includes a polymeric, fibrous, or carbon-based material. In an embodiment, the mounting portion includes an electrical plug having rigid conductors protruding substantially perpendicularly and directly from the rear surface of the mounting portion, wherein the conductors are insertable into an electrical power outlet. In an embodiment, the power source includes an electrical power outlet or a battery. In an embodiment, the lighting element includes a light emitting diode (LED). In an embodiment, the lighting element includes an ultraviolet (UV) LED and a blue LED. In an embodiment, the base portion includes an energy stabilizer configured to provide a constant voltage to the lighting element. In an embodiment, the energy stabilizer includes full rectifier circuit. In an embodiment, the base portion includes an opening, the opening configured to allow light to emit from the base portion to the trap portion. In an embodiment, the opening includes a transparent or translucent window. In an embodiment, the opening is proximate to the lighting element. In an embodiment, the trap portion includes an insect attractant. In an embodiment, the insect attractant is selected from the group consisting of: sorbitol, coleopteran attractants, dipteran attractants, homopteran attractants, lepidopteran, straight chain lepidopteran pheromones, eugenol, methyl eugenol, and siglure. In an embodiment, the coleopteran attractants include brevicomin, dominicalure, frontalin, grandlure, ipsdienol, ipsenol, japonilure, lineatin, megatomoic acid, multistriatin, oryctalure, sulcatol, and trunc-call. In an embodiment, the dipteran attractants include ceralure, cue-lure, latilure, medlure, moguchun, muscalure, and trimedlure. In an embodiment, the homopteran attractants include rescalure. In an embodiment, the lepidopteran attractants include disparlure. In an embodiment, the straight chain lepidopteran pheromones include codlelure, gossyplure, hexalure, litlure, looplure, orfralure, and ostramone. In an embodiment, the insect attractant is integral to the enclosure. In an embodiment, the base portion includes a transmitter. In an embodiment, the transmitter includes a piezoelectric speaker configured to emit an insect-attracting sound. In an embodiment, the insect-attracting sound includes frequencies in the range of approximately 0.2 Hz to 240 KHz. In an embodiment, the base includes a switch, the switch configured to allow a user to control a property of the trap. In an embodiment, the property is selected from the group consisting of: power, light intensity, light wavelength or frequency, light flickering, light patterns, and combinations thereof. In an embodiment, the switch includes a mechanical switch, an optical switch, an electronic switch, an electromechanical switch, or a Hall effect sensor. In an embodiment, the enclosure includes a reflective surface. In an embodiment, the adhesive surface is proximate to the reflective surface. In an embodiment, the base portion includes a circuit configured to a varying voltage to the lighting element, wherein the lighting element provides intermittent light to the trap portion. In an embodiment, the enclosure includes an outer surface, the outer surface at least partially surrounded by sleeve that is configured to reduce the amount of light emitted by the enclosure. In an embodiment, the at least one of the first or second internal surfaces includes a textured surface, the textured surface configured to increase the surface area of the enclosure. In an embodiment, the textured surfaces include ribs extending at least a portion of the length of the first or second internal surfaces. In an embodiment, the at least one of the first or second internal surfaces include a textured surface, the textured surface configured to increase the surface area of the enclosure. In an embodiment, the textured surfaces include ribs extending at least a portion of the length of the first or second internal surfaces. In an embodiment, the trap further includes: a light conducting body located proximate to the second internal surface of the rear housing portion, the light conducting body having a front surface and a rear surface and the light conducting body configured to receive light from the base portion and distribute the light in a predetermined pattern in the enclosure. In an embodiment, the front surface of the light conducting body further includes an adhesive material. In an embodiment, the rear surface of the light reflecting body is configured to reduce the amount of light from being emitted in a predetermined direction. In an embodiment, the light conducting body is tapered, having a thicker depth at a portion proximate to the base portion and a thinner depth at an opposite end. In an embodiment, the rear surface of the light conducting body is configured to reflect light into the light conducting body. In an embodiment, light is reflected multiple times within the light conducting body before being emitted into the enclosure. In an embodiment, the rear surface includes a rear cover or a matte layer. In an embodiment, the base portion further includes an optical enhancer, the optical enhancer configured to direct the light into the trap portion in a predetermined pattern. In an embodiment, the optical enhancer includes a lens. In an embodiment, the enclosure includes an inner sleeve and the base portion includes an outer sleeve, the inner sleeve configured to align with the outer sleeve. In an embodiment, the outer sleeve includes a face plate having an opening. In an embodiment, the face plate opening corresponds to an enclosure opening, the openings providing an alignment means. In an embodiment, the inner sleeve is configured to be dropped into the outer sleeve. In an embodiment, the inner sleeve includes a tab for holding on to the inner sleeve. In an embodiment, the base portion includes a docking switch, the docking switch configured to activate the lighting element when the trap portion is correctly engaged with the base portion. In an embodiment, the trap portion includes a docking switch activator, the docking switch activator configured to activate the docking switch when the trap portion is correctly engaged with the base portion. In an embodiment, the docking switch includes a mechanical switch, an optical switch, an electronic switch, an electromechanical switch, or a Hall effect sensor.

In an aspect, an insect trap is disclosed including: a trap portion including: an enclosure having an adhesive surface and a first opening, wherein the adhesive surface is at least partially contained within the enclosure and is configured to adhere to an insect, and a lighting element at least partially contained within the enclosure, wherein the lighting element is configured to provide light within the enclosure and wherein the lighting element is configured to communicate with and receive power from a power source; and a base portion configured to removably engage the trap portion and provide access to the power source. In an embodiment, the lighting element includes a plurality of electrical trap contacts and wherein the base portion includes a plurality of electrical base contacts, the trap contacts configured to communicate with the base contacts to provide power to the lighting element. In an embodiment, the base contacts are in communication with the power source. In an embodiment, the lighting element includes a light emitting diode (LED).

In an aspect, a removable insect trap cartridge is disclosed including: an enclosure defining the cartridge, the enclosure having an adhesive surface and a first opening, wherein the adhesive surface is at least partially contained within the enclosure and is configured to adhere to an insect, wherein the first opening is configured to allow an insect to enter the enclosure, and wherein the enclosure is configured to provide light in a predetermined pattern within the enclosure. In an embodiment, the enclosure further includes a lighting element. In an embodiment, the lighting element includes a light emitting diode (LED). In an embodiment, the lighting element includes an ultraviolet (UV) LED and a blue LED. In an embodiment, the enclosure includes: a front housing portion having a first internal surface; and a rear housing portion having a second internal surface, wherein the front housing portion and rear housing portion are matingly engaged with each other to form the enclosure; and wherein at least one of the first or second internal surfaces is configured to manipulate light. In an embodiment, at least one of the first or second internal surfaces includes an adhesive surface. In an embodiment, the rear housing portion has a concave surface, the concave surface configured to reflect light evenly within the enclosure. In an embodiment, light is transmitted through the adhesive surface, illuminating the adhesive surface to attract an insect to the adhesive surface. In an embodiment, the enclosure includes: a front housing portion having a first internal surface; a rear housing portion having a second internal surface; and a divider portion disposed at least partially between the front housing portion and rear housing portion, wherein the front housing portion and rear housing portion are matingly engaged with each other to form the enclosure; and wherein the divider portion divides the enclosure into a front enclosure portion and a rear enclosure portion. In an embodiment, the divider portion includes a rear surface having translucent material and includes a front surface having an adhesive surface. In an embodiment, the second internal surface of the rear housing portion includes a concave surface, the concave surface configured to reflect light onto the rear surface of the divider portion. In an embodiment, light is transmitted through the adhesive surface, illuminating the adhesive surface to attract an insect to the adhesive surface. In an embodiment, the rear surface of the divider portion is configured to receive the light from the second internal surface of the rear housing portion or directly from a lighting element. In an embodiment, the enclosure includes a bottom surface, the bottom surface configured to be removably received in a pluggable base. In an embodiment, wherein the enclosure includes biodegradable materials. In an embodiment, the enclosure includes an outer surface, the outer surface including a decorative element. In an embodiment, the decorative element includes a shape selected from the group consisting of: a flower, a plant, a shell, a company logo, a sports team logo, a football, a basketball, a soccer ball, a hockey puck, a football helmet or a hockey stick. In an embodiment, the trap portion includes an insect attractant. In an embodiment, the insect attractant is selected from the group consisting of: sorbitol, coleopteran attractants, dipteran attractants, homopteran attractants, lepidopteran, straight chain lepidopteran pheromones, eugenol, methyl eugenol, and siglure. In an embodiment, the insect attractant is detectable by an insect at a distance of approximately 2 meters from the cartridge. In an embodiment, the enclosure includes a textured surface, the textured surface configured to increase the surface area of the enclosure. In an embodiment, the textured surface includes ribs extending at least a portion of the length of the enclosure. In an embodiment, the cartridge further includes: a light conducting body located within the enclosure, the light conducting body configured to receive light and distribute the light in a predetermined pattern in the enclosure. In an embodiment, the enclosure includes an inner sleeve that is configured to be received into and aligned with an outer sleeve. In an embodiment, the outer sleeve includes a face plate having an opening. In an embodiment, the face plate opening corresponds to an enclosure opening, the openings providing an alignment means. In an embodiment, the inner sleeve includes a tab for holding on to the inner sleeve. In an embodiment, the cartridge includes a docking switch activator, the docking switch activator configured to activate a docking switch when the cartridge is correctly engaged with a base portion. In an embodiment, the docking switch activator includes a mechanical switch, an optical switch, an electronic switch, an electromechanical switch, or a Hall effect sensor.

In an aspect, a method is disclosed including: providing a base portion of an insect trap; providing a first trap portion of an insect trap, wherein the first trap portion includes an opening; mounting the first trap portion to the base portion; coupling the base portion to a power source to provide power to a lighting element, wherein the lighting element is within the base portion or first trap portion and wherein the lighting element is configured to attract an insect into the first trap portion; and receiving an insect into the first trap portion through the opening. In an embodiment, the method further includes: separating the first trap portion from the base portion; and disposing of the first trap portion, wherein the insect remains in the disposed first trap portion. In an embodiment, the first trap portion is disposed without the human contact with the insect in the first trap portion. In an embodiment, the first trap portion includes an adhesive surface and wherein the insect adheres to the adhesive surface. In an embodiment, the base portion includes a docking switch, wherein the docking switch is configured to activate the lighting element when the first trap portion is correctly mounted to the base portion. In an embodiment, upon separating the first trap portion from the base portion, the lighting element is powered off. In an embodiment, upon separating the first trap portion from the base portion, the lighting element is partially shielded from emitting light. In an embodiment, the method further includes: providing a second trap portion of an insect trap, wherein the second trap portion includes an opening; and mounting the second trap portion to the base portion. In an embodiment of the fourth aspect, the first insect trap and second insect trap have different configurations.

In an aspect, a docking apparatus is disclosed including: a docking structure configured to activate in response to a docking activator, the docking activator located on a separate piece configured to engage the docking structure, wherein the docking structure is in communication with a power source and is configured to control power to a lighting element. In an embodiment, the docking activator includes a surface, a protrusion, a tab or a magnet. In an embodiment, the docking structure is configured to close when the docking activator engages with it and is configured to open when the docking activator disengages from it. In an embodiment, the docking structure is configured to activate in response to pressure from the docking activator. In an embodiment, the docking structure is configured to activate in response to displacement from the docking activator.

In an aspect, a removable insect trap cartridge is disclosed including: an enclosure defining the cartridge, the enclosure having an adhesive surface and a first opening, wherein the adhesive surface is at least partially contained within the enclosure and is configured to adhere to an insect, and a docking activator, the docking activator configured to engage a docking structure in a mounting portion.

Insect traps disclosed herein may attract and trap insects effectively and efficiently. They may be less costly than existing traps. They may be small enough to fit wherever needed, and be conveniently movable from one location to another. They may protrude minimally when mounted on a wall. The removable and replaceable trap portions may be attractive in appearance, but also be inexpensive and disposable, and may be easy for the user to maintain without touching trapped insects or adhesive.

The above description of the disclosed embodiments is provided to enable any person skilled in the art to make or use the disclosure. Various modifications to these embodiments will be readily apparent to those skilled in the art, and the generic principles described herein can be applied to other embodiments without departing from the spirit or scope of the disclosure. Thus, it is to be understood that the description and drawings presented herein represent exemplary embodiments of the disclosure and are therefore representative of the subject matter, which is broadly contemplated by the present disclosure. It is further understood that the scope of the present disclosure fully encompasses other embodiments and that the scope of the present disclosure is accordingly limited by nothing other than the appended claim.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An insect trap, comprising:

a trap portion including an enclosure having an adhesive surface and a first opening, wherein the adhesive surface is at least partially contained within the enclosure and is configured to adhere to an insect; and a base portion including a lighting element and a mounting portion, wherein the lighting element is configured to provide light to the trap portion, wherein the light is transmitted through the adhesive surface, and wherein the mounting portion is directly connected to electrically conductive prongs and is further configured to communicate with and receive power from a power source;

wherein the trap portion mounts on top of the base portion; wherein the trap portion is configured to removably engage with the base portion and receive light from the base portion when engaged therewith;

wherein the base portion comprises a snap protrusion and wherein the trap portion comprises a snap recess for receiving the snap protrusion, wherein when the snap protrusion is received by the trap portion, the base portion and trap portion are engaged in a snap fit;

wherein the enclosure further comprises a divider portion disposed at least partially between a front housing and a rear housing, the divider portion having a front surface and a rear surface, wherein the front housing and rear housing are matingly engaged with each other to form the enclosure; and the adhesive surface is formed by applying a coating of an adhesive over the front surface of the divider portion, wherein the adhesive is transparent or translucent.

2. The insect trap of claim 1, wherein the snap fit configured to provide positive tactile or audible cue to a user that the trap is properly engaged.

3. The insect trap of claim 1, wherein the snap fit is engageable and disengageable by a force of less than about 50 Newtons.

4. The insect trap of claim 1, wherein the snap fit is configured for single-handed engagement or disengagement.

5. The insect trap of claim 1, wherein the base portion is configured to remain upright when placed on a horizontal surface.

6. The insect trap of claim 1, wherein the base portion comprises a bottom flat surface or legs to enable base portion to remain upright.

7. The insect trap of claim 1, wherein the trap portion does not mount in front of the base portion.

8. The insect trap of claim 1, wherein the insect trap protrudes from a wall when plugged into a wall socket.

9. The insect trap of claim 1, wherein when the insect trap is mounted to a wall, the overall depth of the insect trap is less than the overall height of the insect trap.

10. The insect trap of claim 1, wherein when the insect trap is mounted to a wall, the overall depth of the insect trap is less than the overall width of the insect trap.

11. The insect trap of claim 1, wherein the divider portion comprises text or graphics configured to provide light and dark contrast areas for attracting insects.

12. The insect trap of claim 11, wherein the text or graphics are applied to the front surface, the rear surface or both the front surface and the rear surface of the divider portion.

13. The insect trap of claim 11, wherein the text or graphics are visible through the adhesive surface in ambient light or when illuminated from behind or both.

14. The insect trap of claim 1, wherein the divider portion is transparent or translucent.

15. The insect trap of claim 1, wherein the first opening has a shape and size such that a sphere 25 mm in diameter cannot pass through the first opening.

* * * * *